United States Patent [19]
Kawasaki et al.

[11] Patent Number: 5,617,173
[45] Date of Patent: Apr. 1, 1997

[54] CAMERA SYSTEM HAVING POWER ZOOM LENS

[75] Inventors: Masahiro Kawasaki; Hiroyuki Takahashi; Yoshinari Tanimura, all of Tokyo, Japan

[73] Assignee: Asahi Kogaku Kogyo Kabushiki Kaisha, Tokyo, Japan

[21] Appl. No.: 390,431

[22] Filed: Feb. 17, 1995

Related U.S. Application Data

[63] Continuation of Ser. No. 136,120, Oct. 13, 1993, abandoned, which is a continuation of Ser. No. 886,794, May 21, 1992, abandoned.

[30] Foreign Application Priority Data

May 21, 1991 [JP] Japan ..................................... 3-218146
Nov. 29, 1991 [JP] Japan ..................................... 3-342123

[51] Int. Cl.$^6$ ............................................... G03B 13/36
[52] U.S. Cl. ............................................. 396/78; 396/82
[58] Field of Search .......................... 354/400, 402–409, 354/195.1, 195.11, 195.12, 286

[56] References Cited

U.S. PATENT DOCUMENTS

| | | |
|---|---|---|
| 4,083,057 | 4/1978 | Quinn . |
| 4,145,732 | 3/1979 | Pandres, Jr. . |
| 4,156,933 | 5/1979 | Pandres, Jr. . |
| 4,166,675 | 9/1979 | Kanno . |
| 4,269,489 | 5/1981 | Takimoto et al. . |
| 4,477,167 | 10/1984 | Ishikawa et al. . |
| 4,509,842 | 4/1985 | Taniguchi et al. . |
| 4,550,992 | 11/1985 | Ohtsuka et al. . |
| 4,662,736 | 5/1987 | Taniguchi et al. . |
| 4,671,640 | 6/1987 | Akada et al. . |
| 4,719,485 | 1/1988 | Shikaumi . |
| 4,731,629 | 3/1988 | Aoshima et al. . |

(List continued on next page.)

FOREIGN PATENT DOCUMENTS

| | | |
|---|---|---|
| 0357056 | 3/1990 | European Pat. Off. . |
| 0360294 | 3/1990 | European Pat. Off. . |
| 0361513 | 4/1990 | European Pat. Off. . |
| 0361355 | 4/1990 | European Pat. Off. . |
| 3126779 | 5/1982 | Germany . |
| 3611784 | 1/1987 | Germany . |
| 3921618 | 1/1990 | Germany . |
| 53-113527 | 10/1978 | Japan . |
| 55-52006 | 4/1980 | Japan . |
| 58-125005 | 7/1983 | Japan . |
| 58-202432 | 11/1983 | Japan . |

(List continued on next page.)

OTHER PUBLICATIONS

English Language Translation of the German Office Action of Oct. 4, 1993.
English Language Translation of the German Office Action of Oct. 1, 1993.
English Language Translation of the German Office Action of Sep. 30, 1993.
English Language Translation of the German Office Action of Sep. 28, 1993.
Minolta Techno Report, "Lens Drive Control With A Soft Governor," 1896, with English Translation.

*Primary Examiner*—Russell E. Adams
*Attorney, Agent, or Firm*—Greenblum & Bernstein P.L.C.

[57] ABSTRACT

A camera system having a power zoom lens and an automatic focusing device, comprising a zoom motor for zooming the power zoom lens, a focal length detecting device for detecting a focal length of the power zoom lens, an object distance detecting device for detecting a distance of an object which is in focus, and a calculation device for calculating an image magnification in accordance with the focal length and the object distance detected by the focal length detecting device and the object distance detecting device, respectively, and then calculating a target focal length at which the image magnification is kept constant, in accordance with the object distance detected by the object distance detecting device.

14 Claims, 91 Drawing Sheets

U.S. PATENT DOCUMENTS

| | | |
|---|---|---|
| 4,782,355 | 11/1988 | Sakai et al. . |
| 4,840,470 | 6/1989 | Ohtake . |
| 4,857,951 | 8/1989 | Nakajima et al. . |
| 4,866,468 | 9/1989 | Himuro et al. . |
| 4,881,094 | 11/1989 | Terui et al. . |
| 4,908,643 | 3/1990 | Tamada et al. . |
| 4,924,249 | 5/1990 | Aihara et al. . |
| 4,935,763 | 6/1990 | Itoh et al. . |
| 4,942,417 | 7/1990 | Miyazawa et al. . |
| 4,951,075 | 8/1990 | Tokumaru et al. . |
| 4,962,400 | 10/1990 | Otani et al. . |
| 4,967,218 | 10/1990 | Numako et al. . |
| 4,984,001 | 1/1991 | Himuro . |
| 5,010,358 | 4/1991 | Miyamoto ............... 354/402 |
| 5,036,349 | 7/1991 | Suzuki et al. . |
| 5,043,754 | 8/1991 | Aihara et al. . |
| 5,063,402 | 11/1991 | Shimada et al. . |
| 5,065,172 | 11/1991 | Ogawa . |
| 5,065,175 | 11/1991 | Suzuki et al. . |
| 5,066,968 | 11/1991 | Suzuki et al. . |
| 5,066,969 | 11/1991 | Kawasaki . |
| 5,093,680 | 3/1992 | Suzuki et al. . |
| 5,122,825 | 6/1992 | Tokumaru et al. . |
| 5,150,144 | 10/1992 | Soshi et al. . |
| 5,159,364 | 10/1992 | Yanagisawa et al. . |
| 5,159,377 | 10/1992 | Suzuki et al. ............ 354/400 |
| 5,162,831 | 11/1992 | Haraguchi et al. . |
| 5,166,717 | 5/1991 | Kawasaki et al. . |
| 5,170,200 | 12/1992 | Kawasaki et al. . |
| 5,181,061 | 1/1993 | Kawasaki et al. . |
| 5,182,591 | 1/1993 | Kawasaki et al. . |
| 5,189,458 | 2/1993 | Miyamoto et al. . |
| 5,196,880 | 3/1993 | Ishibashi et al. . |
| 5,223,877 | 6/1993 | Kawasaki et al. . |
| 5,227,828 | 7/1993 | Kiragaya . |
| 5,227,831 | 7/1993 | Miyazaki et al. ........ 354/402 |
| 5,231,442 | 7/1993 | Kitazawa et al. ........ 354/400 |
| 5,239,330 | 7/1993 | Uenaka . |
| 5,274,414 | 12/1993 | Taniguchi et al. ....... 354/400 |
| 5,276,476 | 1/1991 | Uenaka . |
| 5,280,317 | 1/1994 | Haraguchi et al. . |
| 5,291,233 | 3/1994 | Hashimoto et al. ..... 354/400 |
| 5,291,235 | 3/1994 | Uenaka . |
| 5,305,044 | 4/1994 | Suzuki et al. . |
| 5,315,345 | 5/1994 | Kawasaki et al. . |
| 5,321,459 | 6/1994 | Uenaka . |
| 5,331,367 | 7/1994 | Kawasaki et al. . |
| 5,359,382 | 10/1994 | Uenaka . |
| 5,363,165 | 11/1994 | Kawasaki et al. . |
| 5,367,354 | 11/1994 | Kawasaki et al. . |
| 5,396,306 | 3/1995 | Kawasaki et al. . |
| 5,416,559 | 5/1995 | Uenaka . |
| 5,428,419 | 6/1995 | Suzuki et al. ........... 354/400 |
| 5,519,370 | 10/1992 | Takahashi . |

FOREIGN PATENT DOCUMENTS

| | | |
|---|---|---|
| 58-223108 | 12/1983 | Japan . |
| 59-204013 | 11/1984 | Japan . |
| 61-133431 | 6/1986 | Japan . |
| 61-133430 | 6/1986 | Japan . |
| 61-252517 | 11/1986 | Japan . |
| 61-292608 | 12/1986 | Japan . |
| 62-118328 | 5/1987 | Japan . |
| 63-11613 | 1/1988 | Japan . |
| 63-220118 | 9/1988 | Japan . |
| 64-44429 | 2/1989 | Japan . |
| 64-74515 | 3/1989 | Japan . |
| 2039681 | 8/1980 | United Kingdom . |
| 2183412 | 6/1987 | United Kingdom . |
| 2212679 | 7/1989 | United Kingdom . |
| 2221107 | 1/1990 | United Kingdom . |
| 2232262 | 12/1990 | United Kingdom . |
| 2233777 | 1/1991 | United Kingdom . |
| 2234600 | 2/1991 | United Kingdom . |
| 2235552 | 3/1991 | United Kingdom . |
| 2241074 | 8/1991 | United Kingdom . |
| 2241073 | 8/1991 | United Kingdom . |
| 2244564 | 12/1991 | United Kingdom . |

CAMERA SYSTEM HAVING POWER ZOOM LENS

This application is a continuation, of application Ser. No. 08/136,120, filed Oct. 13, 1993, now abandoned, which is a continuation of application Ser. No. 07/886,794, filed May 21, 1992, now abandoned.

BACKGROUND OF THE INVENTION

1. Field of the Invention

The present invention relates to a power zoom lens, and a camera system having such a power zoom lens.

This application is related to the commonly assigned applications U.S. Ser. No. 410,880, No. 652,038, No. 407, 424, No. 414,477, No. 414,478, No. 670,733, No. 406,523, and No. 414,476, the disclosure of which are expressly incorporated by reference herein.

2. Description of Related Art

A power zoom lens having an automatic focusing device and a power zoom device, and a camera system having such a power zoom lens are known. Also, special photographic technologies in which the power zoom lens is employed have been developed. For instance, as disclosed in U.S. Ser. No. 07/410,880 the assignee of which is same as that of the present application, a constant image magnification zooming means in which a set image magnification is kept constant is known. In this method, after the image magnification is set, a target focal length, at which the image magnification is constant, is obtained by calculation in accordance with the amount of defocus of an object to be taken. The power zooming is then carried out in accordance with the target focal length thus obtained.

However, in a single lens reflex camera, since a coefficient (which will be referred to as a "K value" hereinafter) for an angular displacement of the AF motor necessary to move the focal point by a unit displacement varies in accordance with the focal length, the defocus amount varies during the zooming operation. Consequently, it is necessary to correct the defocus amount, in view of the change in K value, to obtain a correct target focal length. However, this results in a complicated calculation.

The error of the defocus amount increases as the focusing lens unit moves away from the focal position. In view of the increase in error of the K value, a backlash of the lens driving system, and an error of measurement of the angular displacement of the motor, etc., it can not always be guaranteed that the focusing lens unit will be moved to the focal position by one calculation. As a result, there is a possibility of an occurrence of a searching operation in which when the focusing lens unit stops before the focal position, a further movement thereof in the same direction is necessary, and when the focusing lens unit moves beyond the focal position, a returning movement thereof in the opposite direction is necessary. Under such circumstances, every time the focusing lens unit stops at a position other than the focal position, the target focal length must be recalculated.

As can be understood from the above discussion, neither a quick calculation nor a smooth operation of the focusing lens unit can be effected by the known method in which the target focal length is calculated based on the defocus amount, since the calculation values necessary for the focusing control and those necessary for the zooming control interfere with each other.

SUMMARY OF THE INVENTION

The primary object of the present invention is to provide a power zoom lens and a camera system in which the zooming control can be effected by a simple calculation and no interference between the focusing control and the zooming control occurs.

To achieve the object mentioned above, according to the present invention, there is provided a camera system having a power zoom lens and an automatic focusing device, comprising a zoom motor for zooming the power zoom lens, a focal length detecting means for detecting a focal length of the power zoom lens, an object distance detecting means for detecting a distance of an object which is in focus, and a calculation means for calculating an image magnification in accordance with the focal length and the object distance detected by the focal length detecting means and the object distance detecting means, respectively, and then calculating a target focal length at which the image magnification is kept constant, in accordance with the object distance detected by the object distance detecting means.

The present disclosure relates to subject matter contained in Japanese patent application Nos. 03-218146 (filed on May 21, 1991) and 03-342123 (filed on Nov. 29, 1991) which are expressly incorporated herein by reference in its entirety.

DETAILED DESCRIPTION OF PREFERRED EMBODIMENTS

Figure 1:
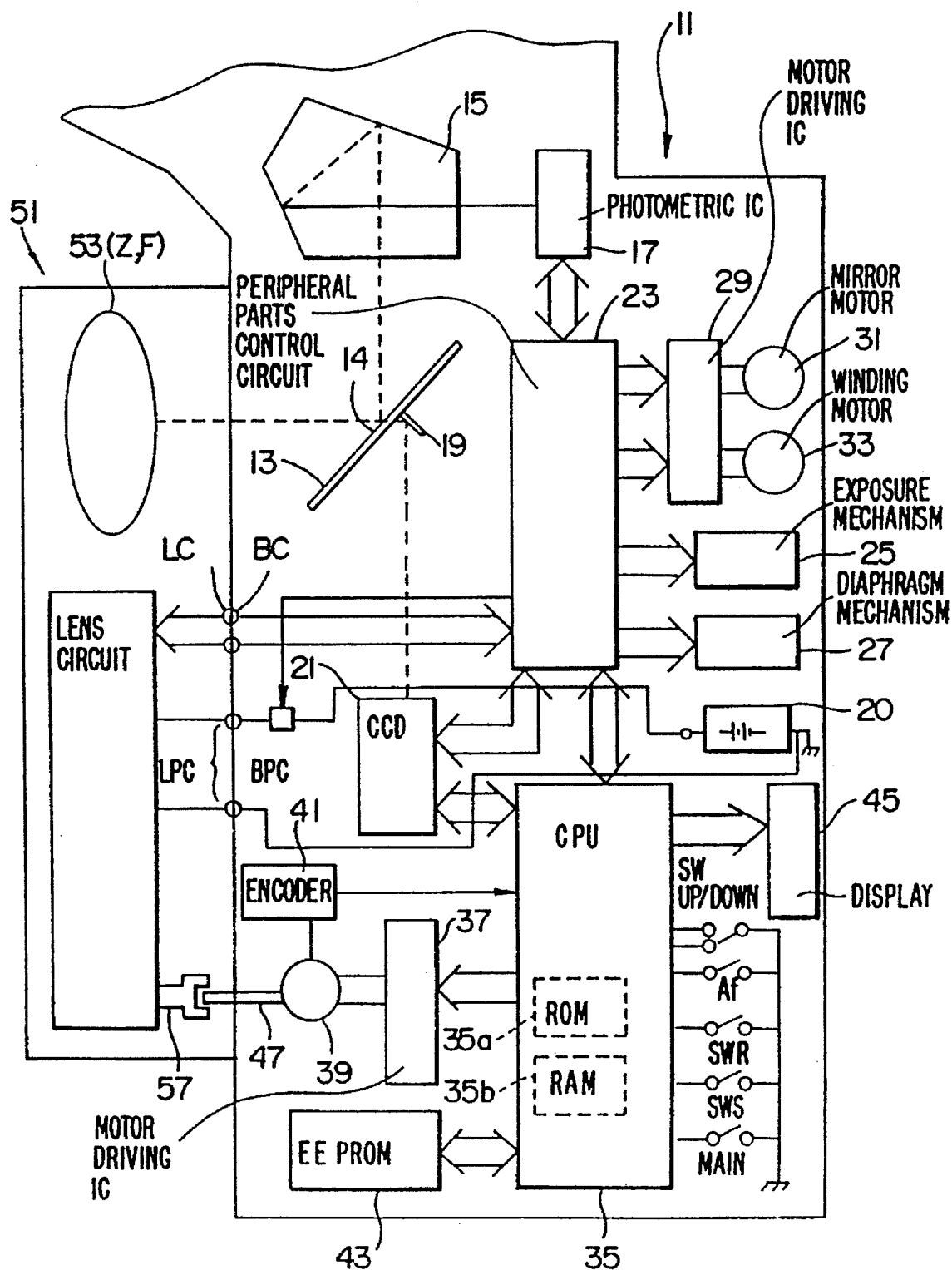
FIG. 1 is a block diagram showing an outline of one embodiment of a body of a single lens reflex camera to which the invention is applied.
Figure 2:
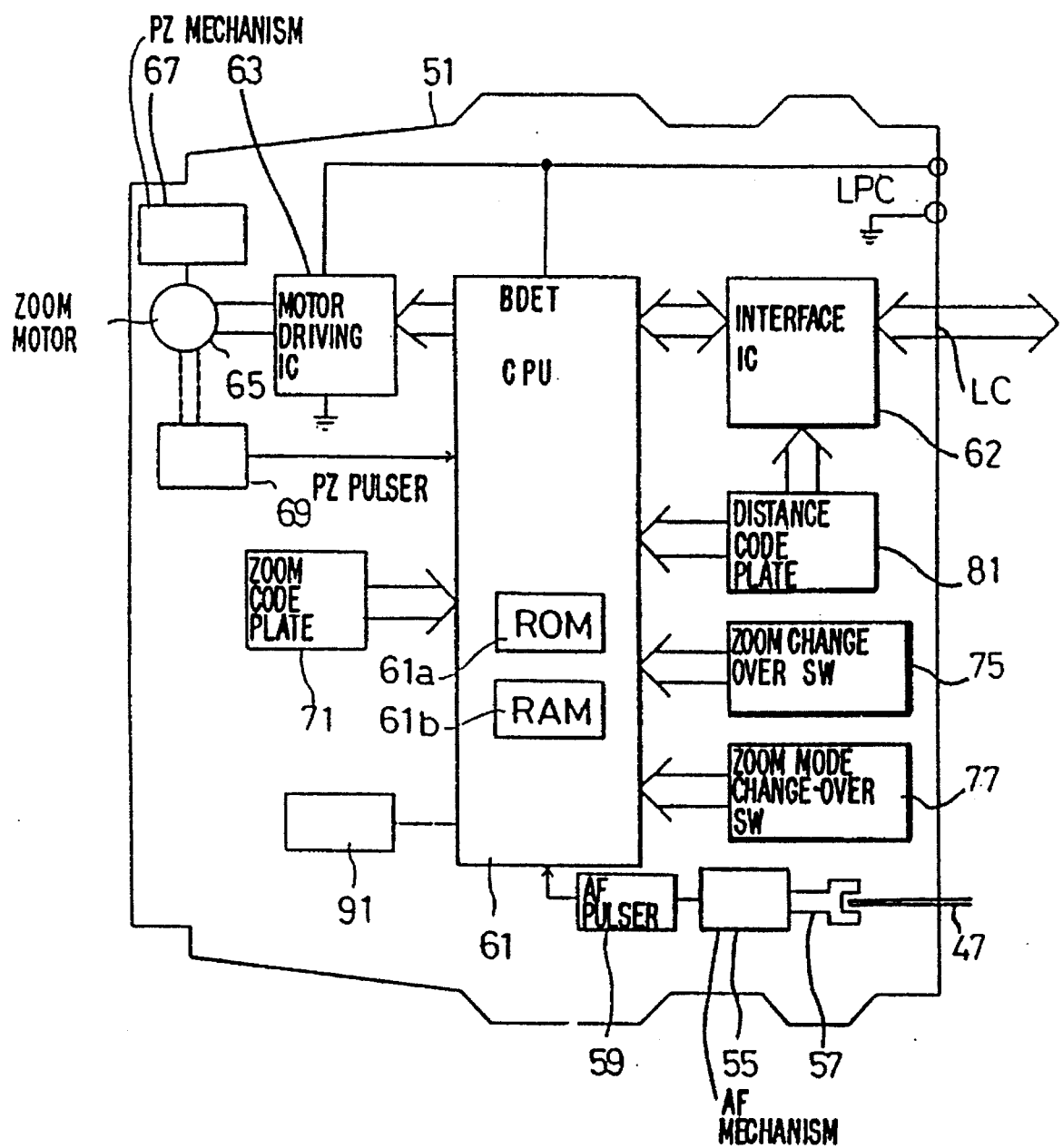
FIG. 2 is a block diagram showing an outline of one embodiment of a powered zoom lens for a single lens reflex camera to which the invention is applied.
Figure 3:
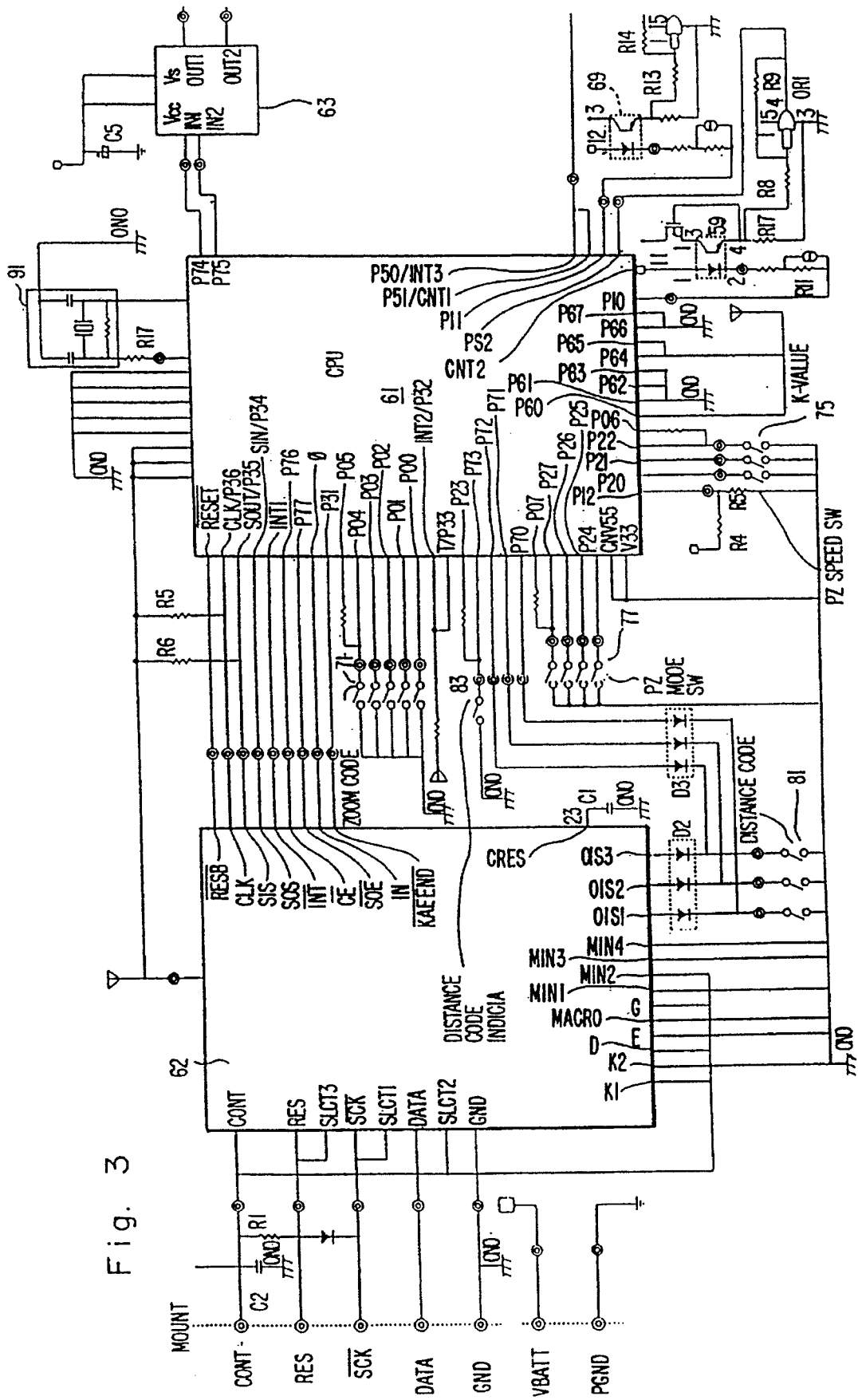
FIG. 3 is a block diagram illustrating one embodiment of a circuit construction for the powered zoom lens.

The invention will be explained below with reference to several embodiments illustrated in the drawings. In the drawings, FIG. 1 is a block diagram illustrating a main construction of the body portion of an autofocus (AF) single lens reflex camera to which the invention is applied. FIG. 2 is a block diagram illustrating a main construction of a powered zoom lens to which the invention is applied. FIG. 3 is a block diagram of the powered zoom lens circuitry to which the invention is applied.

The AF single lens reflex camera includes a camera body 11, and a photographing lens (powered zoom lens) 51 releasably attached to the camera body 11. Most of the luminous flux of an object to be taken (object flux) incident on the camera body 11 from a zooming optical system 53 of the photographing lens 51 are reflected by a main mirror 13 onto a pentaprism 15 constituting a finder optical system, and then a portion of the reflected light beam is directed to a light receiving element (not shown) of a photometric IC. A portion of the object flux, having been directed to the camera body 11 and made incident upon half mirrors 13 and 14, passes through the half mirrors and is reflected downwardly by a sub-mirror 19 to be directed onto a macrometric CCD sensor unit 21.

A photometric IC 17 includes a light receiving element for receiving the object flux. An electric signal generated by the light receiving element in accordance with amount of light input into the light receiving element is subject to logarithmic-compression and A/D conversion and is then outputted, as a digital photometric signal, to a main (body) CPU 35. The main CPU 35 performs a predetermined operation on the basis of information, including the photometric signal and film speed, so as to calculate an appropriate shutter speed and diaphragm value for exposure. An exposure mechanism (shutter mechanism) 25 and a diaphragm mechanism 27 are driven on the basis of the shutter speed and diaphragm value.

Macrometric CCD sensor unit 21 is a macrometric sensor of a conventional phase difference type (not shown). The unit 21 includes a split optical system for splitting the object flux in half, and a CCD line sensor for receiving both of the split object flux so as to integrate them (i.e., storing photoelectric transfer and charges thereof). The macrometric CCD sensor unit 21 outputs the data integrated by the CCD line sensor to the main CPU 35. The macrometric CCD sensor unit 21 is driven by a control circuit for peripheral parts 23. The macrometric CCD sensor unit 21 includes a monitor element. The peripheral parts control circuit 23 detects luminance of the object (object luminance) through the monitor element, so as to change integration time, based on the detected results.

Peripheral parts control circuit 23 performs a predetermined exposure operation on the basis of the digital photometric signal and film speed information so as to calculate an appropriate shutter speed and diaphragm value for exposure. The exposure mechanism (shutter mechanism) 25 and diaphragm mechanism 27 are driven on the basis of the shutter speed and diaphragm value so as to perform exposure. The peripheral parts control circuit 23, upon release, drives a mirror motor 31 by means of a motor drive circuit (motor drive IC) 29 so as to perform an up/down operation of the main mirror 13, and then drives a winding motor 33 so as to wind a film after completion of exposure.

Main CPU 35 communicates with a lens CPU 61 so as to transmit data, command, etc. through the connection with the peripheral parts control circuit 23, a group of electric contacts BC mounted on the mount surface of the camera body, and a group of electric contacts LC mounted on a mount surface of powered zoom lens 51.

Main CPU 35 calculates a defocus amount by performing a predetermined operation (predictor operation) on the basis of the integrated data outputted from the macrometric CCD sensor unit 21, and calculates rotational direction and rotational speed (i.e., pulse number of an encoder 41) of an AF motor 39. The main CPU 35 drives the AF motor 39 by means of the AF motor drive circuit 37 on the basis of the above rotational direction and pulse number.

Main CPU 35 counts a pulse outputted from the encoder 41 in accordance with rotation of the AF motor 39. When the amount of count reaches the above pulse number, the main CPU 35 stops the AF motor 39. The main CPU 35 quickly accelerates the AF motor 39 upon initial actuationthereof. Thereafter, the main CPU 35 activates a DC drivemode to decelerate the motor 39, so as to stop the motor 39 when it arrives at a target position. The main CPU 35 iscapable of controlling the AF motor 39 at a constant speed in accordance with the time between pulses outputted from the encoder 41. Rotational movement of the AF motor 39 is transmitted to an AF drive mechanism 55 of the photographing lens 51 through a connection between an AF joint 47 mounted on the camera body 11 and an AF joint 57 mounted on the photographing lens 51. A group of focusing lenses 53F is driven by the AF drive mechanism 55.

Main CPU 35 has incorporated therein a ROM 35a for storing a program therein and a RAM 35b for storing predetermined data therein. A E²PROM 43 is connected to the main CPU 35 as an external memory means. The E²PROM 43 stores various functions and constants necessary for the operation or calculation of AF (autofocus) and PZ (power zoom), in addition to various constants inherent to the camera body 11.

Also connected to the main CPU 35 are photometric switch SWS, which is turned ON upon half-depression of a release button (not shown), and a release switch SWR, which is turned ON upon full-depression of the release button, an autofocus switch SWAF, a main switch SWM, which turns the electric supply to the main CPU 35 and peripheral equipment ON/OFF, and an up-down switch SWUP/DOWN.

The set modes, such as AF mode, exposure mode and photographing mode, and exposure data, such as shutter speed and diaphragm value, are displayed on a display device 45 by means of the main CPU 35. Usually ,the display device 45 is provided at two points, i.e., at points on the outer surface of the camera body 11 and in the field of view of a finder.

A pair of electric pins BPC for supplying electricity, obtained from a battery 20, to the photographing lens is provided adjacent to the mount of the camera body 11. A pair of electric pins LPC, which are electrically connected with the electric pins BPC upon mounting, is also provided on the powered zoom lens 51.

Powered zoom lens 51 includes, as a photographing optical system, a zooming optical system 53, which has a group of focusing lenses 53F and a group of zooming lenses 53Z.

The group of focusing lenses 53F is driven by an AF mechanism 55. The driving force of the AF motor 39 is transmitted to the AF mechanism 55 through the AF joints 57 and 47. AF pulse outputted from an AF pulser 59 in accordance with the rotation of the AF mechanism 55 is counted and measured by a lens CPU 61. The lens CPU 61 includes an AF pulse hardware counter for counting the AF pulse.

The group of zooming lenses 53Z is driven by a PZ (power zooming) mechanism 67. A zoom motor 65 for driving the PZ mechanism 67 is controlled by the lens CPU 61 via a motor drive IC 63. The amount of displacement of the group of zooming lenses 53Z is counted and measured by the lens CPU 61, which counts PZ pulse outputted from a PZ pulser 69 in accordance with the rotational movement of zoom motor 65.

Pulsers 59 and 69 include a rotatable disk which has a plurality of slits extending in the radial direction thereof and spaced in the circumferential direction in an equidistant manner, for example. The pulsers 59 and 69 further include LEDs and photodiodes (photo-interrupter), each disposed at opposite sides of each of the slits. The rotatable disk of each of the pulsers 59 and 69 rotates sequentially with the rotation of the AF mechanism 55 and PZ mechanism 67. The LED of each of the pulsers 59 and 69 is controlled by the lens CPU 61 to be turned ON/OFF and the output (pulse) of the photodiode is input in the lens CPU 61.

Figure 4:
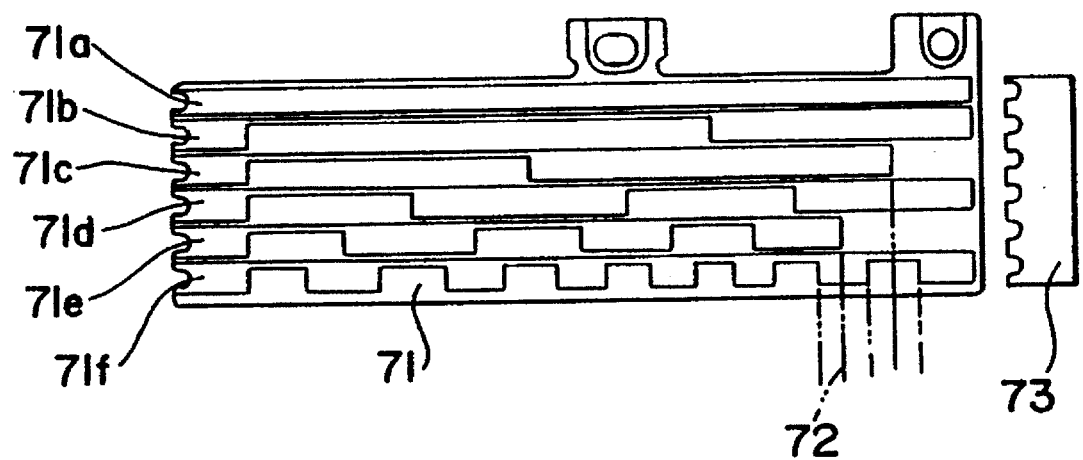
FIG. 4 is a developed plan view of a zoom code plate of the powered zoom lens.
Figure 5:
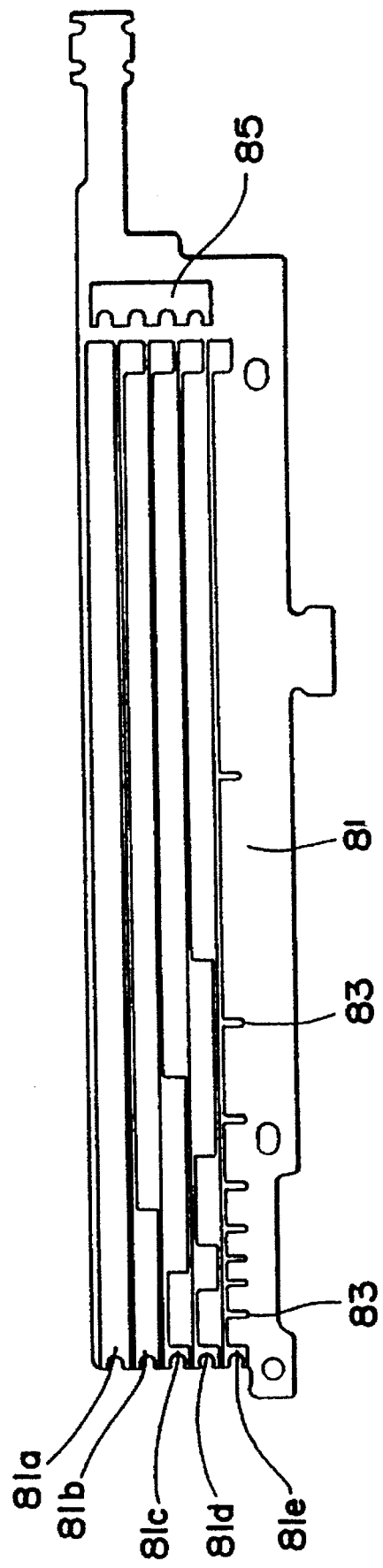
FIG. 5 is a a developed plan view of a focal length code plate of the powered zoom lens.

The absolute position of the group of zooming lenses 53Z (i.e., focal length) and the absolute position of the group of focusing lenses 53F (i.e., object distance to be focused upon) are detected by a zoom code plate 71 and distance code plate 81, respectively. FIGS. 4 and 5 illustrate developed views of the code plates 71 and 81, respectively. Brushes 73 and 85 slidably engage with an array of codes 71a–71f of the code plate 71 and an array of codes 81a–81e of the code plate 81, respectively.

Code 71a and code 81a of the code plates 71 and 81, respectively, are grounded. A plurality of codes 71b–71e and 81b–81e are connected to an input port of the lens CPU 61. The total range of displacement of the group of zooming lenses 53Z is divided by the zoom code plate 71 into 26 segments. Each of the segments is distinguished by absolute positional (i.e., focal length) information with 5 bits. The total range of displacement of the group of focusing lenses 53F is divided by the distance code plate 81 into 8 segments. Each segment is distinguished by absolute position (i.e., distance of object) information with 3 bits. Relative position in each divided segment is detected by counting pulse number outputted from the pulser 69 and 59. Indicia 83 of the array of codes 81e of the distance code plate 81 is provided to detect a central position of each of the segments. A boundary position 72 of each segment of the code plate 71 and the indicia 83 of the code plate 81 is used as a critical position at which point a count value of each of the pulsers is corrected.

Powered zoom lens 51 includes, as actuation switches, a switch 75 for changing zoom speed, and a switch 77 for changing zoom mode. The zoom speed changing switch 75 includes a switch (the detail of which is not shown) which controls, in the powered zooming mode, tele-direction zooming and wide-direction zooming, and three zoom speed modes in each of the zooming directions. The zoom mode changing switch 77 includes a switch for changing between powered zooming and manual driven zooming (D/M), a PA switch for changing between a manual powered zooming mode and a plurality of powered zooming modes performed under a constant control, and SL switch for storing actual focal length or the like during controlled, powered zooming mode (i.e., powered zooming mode under constant image magnification). Although not specifically shown in the drawings, the zoom speed changing switch 75 will be actuated sequentially with a zoom operating ring which is inserted into a lens barrel for rotation and displacement in the optical axis direction, and which is normally urged toward a neutral position with respect to the rotational direction. The zoom operating ring also includes a mechanism for mechanically changing between powered zooming and manual zooming.

The contacts of each of the above zoom speed changing switch 75 and zoom mode changing switch 77 is connected to the lens CPU 61. The lens CPU performs a control operation with respect to the powered zooming in response to actuation of the switches.

Lens CPU 61 is connected with the main CPU 35 through an interface 62, a communication contacts LC and BC, and a peripheral parts control circuit 23 of the camera body, so as to perform a bi-directional communication with the main CPU 35 of predetermined data. The data to be transmitted from the lens CPU 61 to the main CPU 35 includes, open diaphragm value AVMIN, maximum diaphragm value AVMAX, minimum and maximum focal length, actual focal length, actual distance of an object, K-value information, as well as, AF pulse number, PZ pulse number etc. "K-value" is intended to be pulse number data of the encoder 41 (AF pulser 59) necessary to displace the image surface, imaged by the zooming optical system 53, by a unit length (for example, 1 mm).

FIG. 3 is a block diagram illustrating the circuit of the powered zoom lens 51 in more detail. A group of electric contacts LC includes 5 terminals, i.e., CONT terminal connected to the interface 62, RES terminal, SCK terminal, DATA terminal and GND terminal. Through the CONT terminal and GND terminal, a voltage necessary for the actuation of the lens CPU 61 is supplied from the camera body 11, and through the remaining terminals, i.e., $\overline{\text{RES}}$ terminal, $\overline{\text{SCK}}$ terminal and DATA terminal, communication is performed. In principle, $\overline{\text{RES}}$ terminal is assigned to a reset signal, $\overline{\text{SCK}}$ terminal to a clock, and DATA terminal to data communication such as predetermined information and commands. In this specification, the sign "$^{-}$" represents a top bar. It is noted that any elements which are denoted with this prefix correspond to an active-low or reversed signal. The electricity pin LPC includes a VBATT terminal and PGND terminal. Electric power necessary to drive the zoom motor 65 is supplied from the battery 20 in the camera body 11 through the VBATT and PGND terminals. Supply of electricity is controlled by the CPU 35 by means of the peripheral parts control circuit 23. In the drawings, reference numeral 91 designates a clock generation circuit. The VBTT terminal is connected both with a motor drive IC 63 and the port P12 of the lens CPU 61, which is for monitoring voltage, through a register R4.

MAIN OPERATION OF THE LENS CPU

Figure 6:
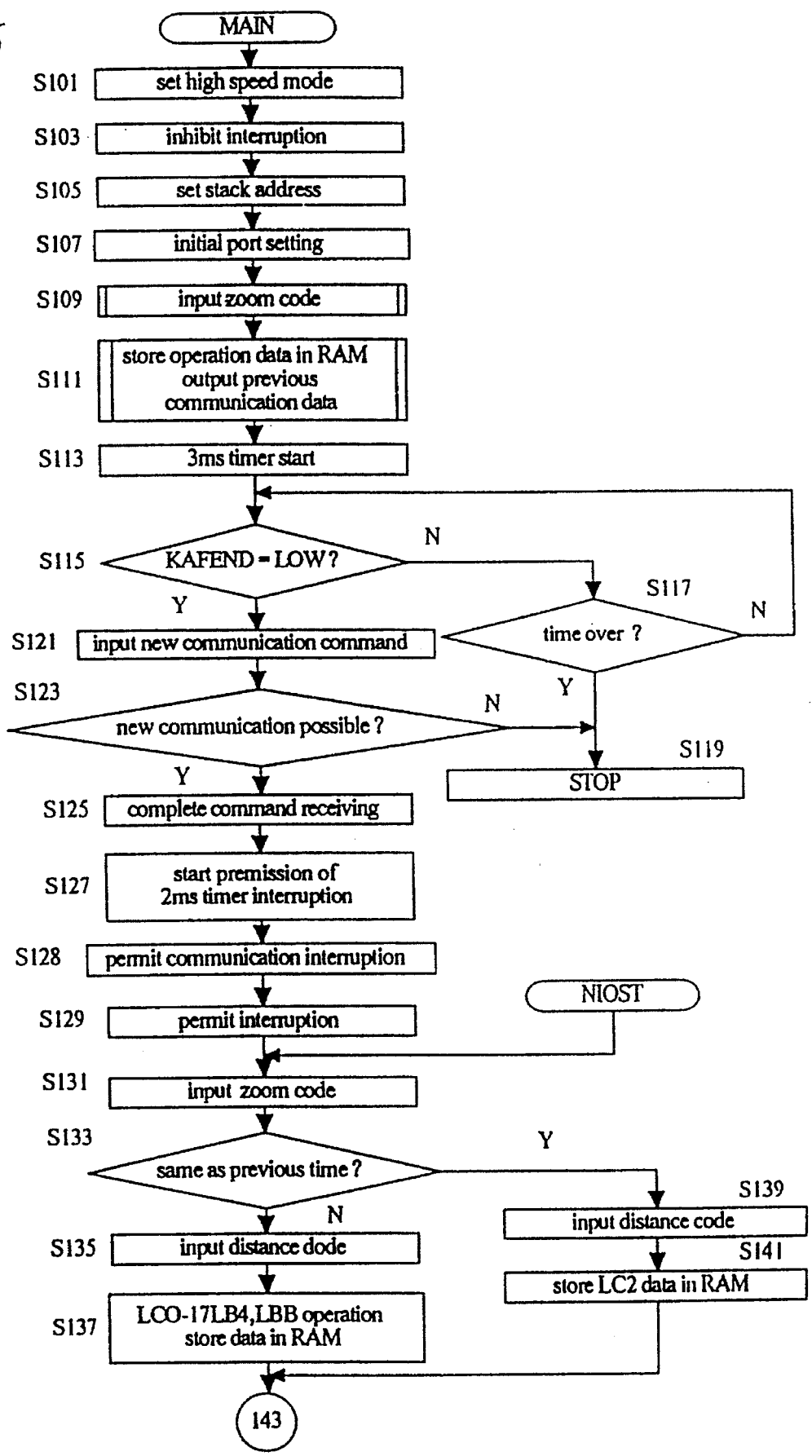
FIGS. 6 and 7 are a main flow chart of a lens CPU.
Figure 7:
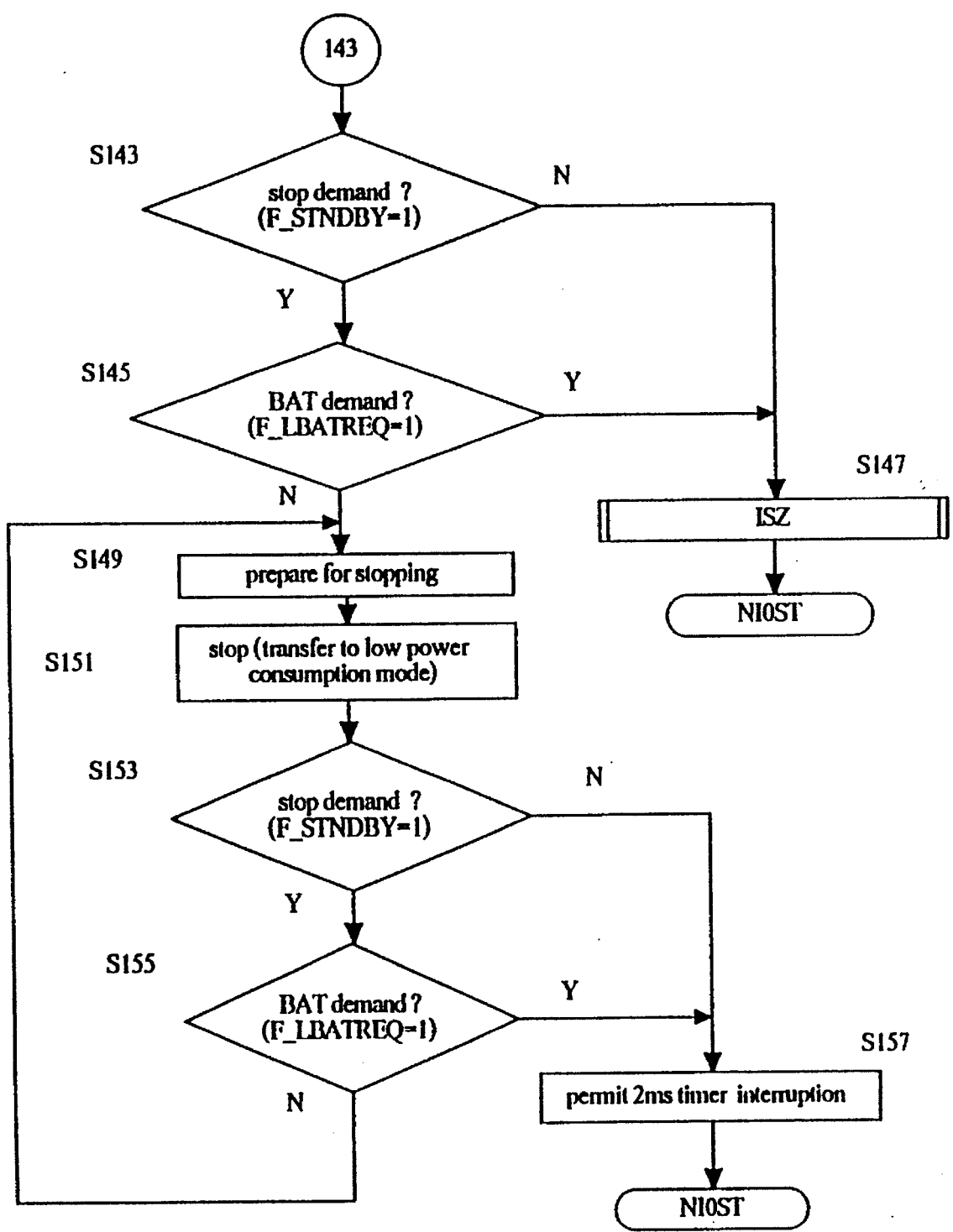

The main operation of the lens CPU 61 will be explained below with reference to FIGS. 6 and 7. Instruction commands are shown in Tables 1 and 2. Commands (data) utilized to transmit various camera body data from the camera body to the lens are shown in Table 3. Commands utilized to transmit various lens data from the lens to the camera body are shown in Table 4. A memory map of RAM 61b of the lens CPU 61 is shown in Tables 5 to 11.

In the main routine, the lens CPU 61 first sets a high-speed actuation mode (Step (hereinafter "S") 101). And the lens CPU 61 performs an inhibition of interruption operation, sets stack address, and initializes the port P, and then inputs the present absolute zoom code from the zoom code plate 71 (S103–S109). Then, the data calculated based on the zoom code is stored in the RAM 61b, and a group of data (LC0–LC15 in Table 5) stored in the RAM 61b, by means of communication (former communication) in accordance with a clock signal of the camera body 11, is transmitted to the camera body (S111). After completion of communication, a 3-ms timer is started (S113).

When the former communication has been completed, KAFEND signal ("L" level") will be outputted from the interface 62 before 3 ms has passed, in accordance with the 3 ms timer. However, if the former communication completion signal (KAFEND signal) is not outputted before 3 ms has passed, in accordance with the 3 ms timer, a stop operation (stopping of clock 91) is performed to break the main routine (S115, S117, S119). When the KAFEND signal is outputted before 3 ms has passed, the operation has been performed in a normal manner. Accordingly, a command is received from the camera body 11 by means of communication. If the command received is not a new communication command, identifying the camera as one which is suitable for new communication, a stop operation is performed to prevent mis-communication with a camera body which is unsuitable for the new communication (S121, S123, S119). The "new communication" is defined in this specification as a state in which a bi-directional communication of commands and data is possible between the camera body and photographing lens in synchronization with the clock of the photographing lens.

When the new communication command is received, a command receipt completion signal is outputted to the camera body, so as to start permission of a 2 ms timer interruption, permit interruption of new communication, and permit other possible interruptions (S123, S125, S127, S128, S129). Accordingly, an interruption operation of the 2 ms timer and interruption of new communication is made possible. The above operations are all initially performed when the main switch of the camera body 11 is turned on and electricity is supplied from the camera body 11. While the main switch is on, the following operations will be repeated.

A zoom code is inputted from the zoom code plate 71 (S131). If the zoom code is different from the previous one, distance code data is inputted and lens code data LC2, including the distance code data, is stored in RAM 61b (see FIG. 5). Then, an operation or calculation is performed on the basis of the data of zoom code, so as to store the calculated data in the lens RAM 61b as LC0-17 and LB4, LBB data (S133, S135, S137). If the zoom code is the same as previous one, distance code data is inputted from the camera body 11 and lens code data (LC2), including the distance code data, is stored in the lens RAM 61b at a predetermined address (S133, S139, S141).

It is determined whether there was a stop demand during communication interruption from the camera body (i.e., whether or not flag F_STANDBY is set), or whether there was an electric demand during interruption of the 2 ms timer (i.e., whether or not flag F_LBATREQ is set). When there is no stop demand, or when there is electric demand, constant image magnification operation (ISZ) is performed, followed by NIOST operation (i.e., the process is returned to step S131 of the main routine so as to repeat the above operation). The above corresponds to steps S143, S145 and S147. It is to be noted that "electricity demand" is a demand which asks the camera body 11 (body CPU) to supply the powered zoom lens 51 with electricity from the battery 20 in order to drive the zoom motor 65 via electric source pins BPC and LPC.

When a stop demand exists and a battery or electricity demand does not exist, a stop operation is performed after making preparation for stopping (i.e., preparation for inhibition of the 2 ms timer interruption and cancellation of stop). The above corresponds to steps S143, S145, S149 and S151. The lens CPU 61 stops the clock 91 to enter the low power consumption mode (standby). The stopped state (low power consumption mode) can only be cancelled by, for example, communication interruption from the camera body, and the process returns to normal operation (clock 91 operation). When returning to the normal operation, the process returns to step S153 after completion of the communication interruption routine. When the stop demand is cancelled or electricity demand is generated in the communication interruption, the process returns to S131 after permitting 2 ms timer interruption and starting the 2 ms timer. Otherwise, the process returns to step S149 to again enter stop condition or the power save mode (S153, S155, S157).

INTI OPERATION

Figure 8:
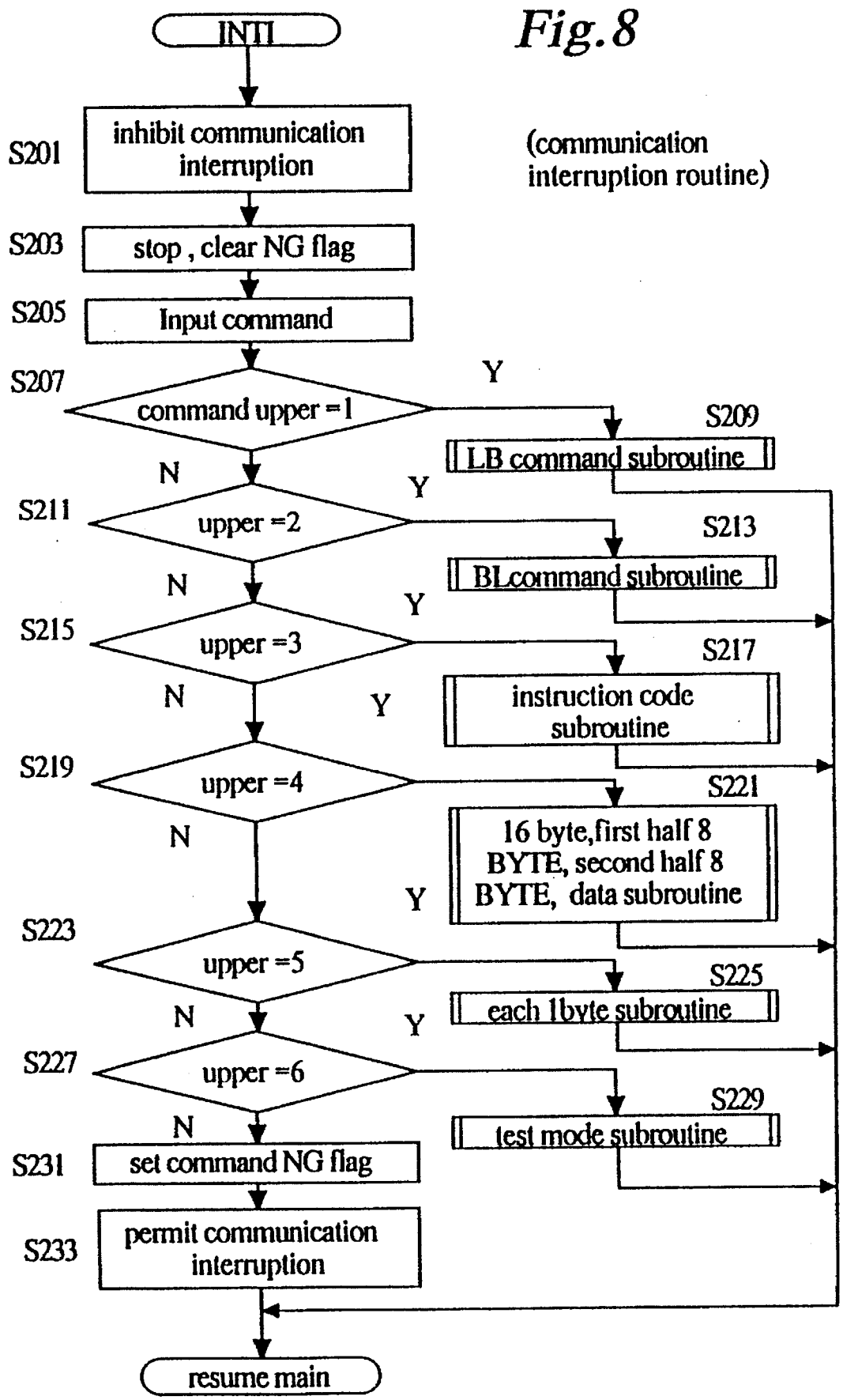
FIG. 8 is a flow chart regarding communication interruption of the lens CPU.

The communication interruption operation, shown in FIG. 8, is performed by the lens CPU 61 and will be explained below. An INTI operation is an operation to conduct communication interruption in which an operation is performed on the basis of the commands and data, etc. received during communication. This operation commences when the interruption signal output from interface 62 is inputted to the port INT1 of the lens CPU 61.

When the process enters the communication interruption, the communication interruption is inhibited and command is inputted from the camera body 11 after clearing stop flag (F_STNDBY) and NG flag (F_SCKNG, F_CMDNG) in steps S201, S203 and S205. The process checks the upper 4 bits of the command as inputted and proceeds to an appropriate subroutine depending on the upper bits (S207 and S229). In each of the subroutines, an appropriate operation is performed depending on the lower bits. In the illustrated embodiment, subroutines making identification from the upper 4 bits include a BL command subroutine, instruction code subroutine, a 16-byte (first half 8-byte data/second half 8-byte) data subroutine, byte by byte data subroutine, and a test mode subroutine (S209, S213, S217, S221, S225 and S229).

If the above 4 bits are not those set above, the process sets command NG flag F_CMNDNG and returns to the main routine after permitting communication interruption (S227, S231 and S233).

2 ms TIMER INTERRUPTION OPERATION

Figure 9:
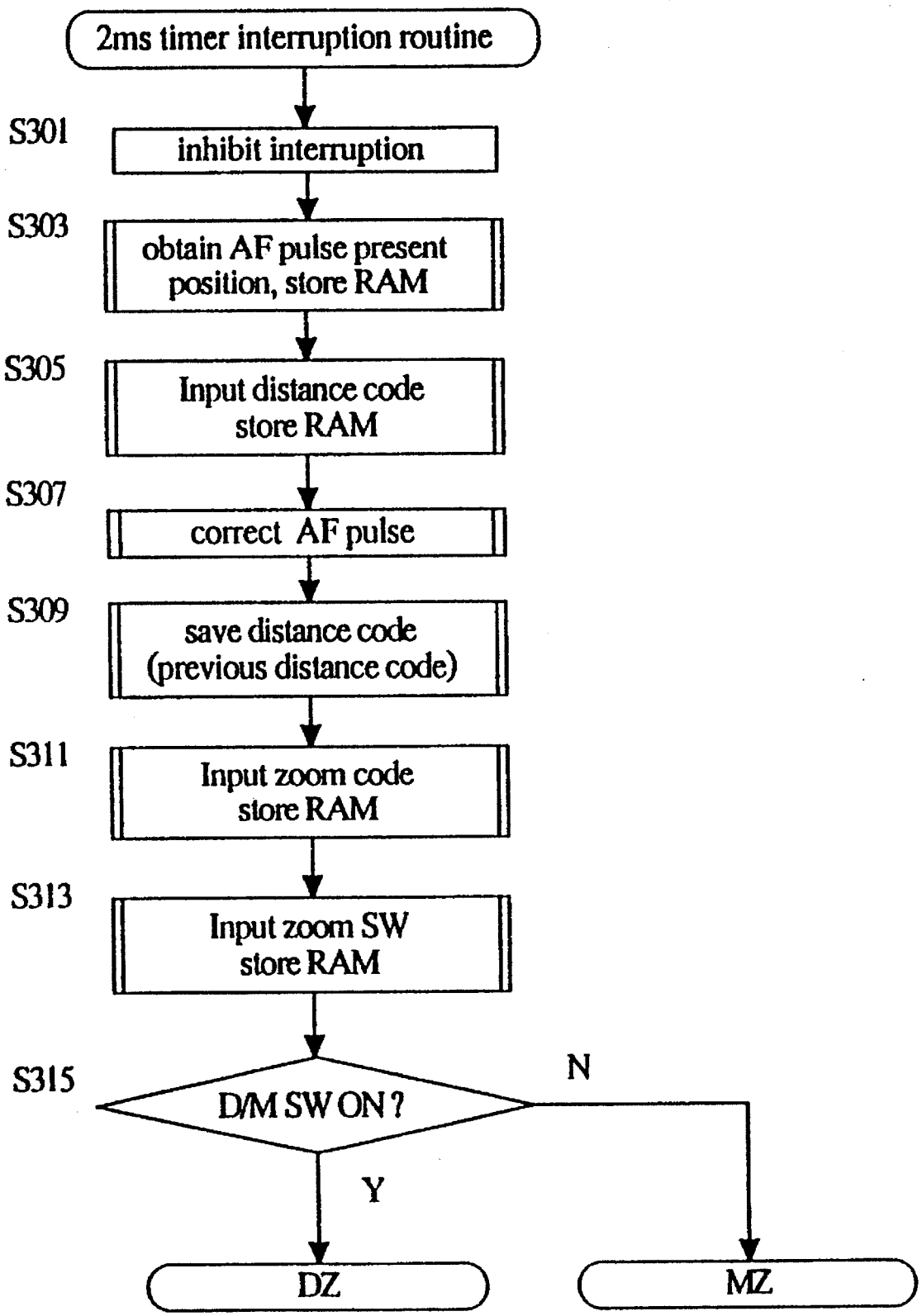
FIG. 9 is a flow chart regarding 2 ms timer interruption.

The operation of the lens CPU 61 when receiving interruption of the 2 ms timer will be explained below with reference to the 2 ms timer interruption flow chart shown in FIG. 9. The 2 ms timer is a hard timer incorporated in the lens CPU 61 for outputting interruption signals in each 2 ms. The 2 ms timer interruption is a periodic interval operation which conducts an interruption operation upon the passing of the 2 ms interval of the 2 ms timer, provided that interruption is permitted.

In the 2 ms timer interruption operation, all other interruptions are inhibited. Then, a present value is inputted from the AF pulse counter to be stored in lens RAM 61b, and present distance code data is inputted from the distance code plate 81 to be stored in RAM 61b (S303, S305). If desired, AF pulse number is corrected, and the present distance code is stored in lens RAM 61b as previous distance code, at a different address, for the next 2 ms timer interruption operation (S307, S309).

The present zoom code is read from the zoom code plate 71 and stored in lens RAM 61b as a present zoom code. The process inputs the state of zoom mode changing switch 77 and the state of the zoom speed changing switch 75 (S311, S313). The process proceeds to the DZ operation when the powered zoom mode is selected, and to the MZ operation when the manual zoom mode is selected (S315).

DZ OPERATION

Figure 10:
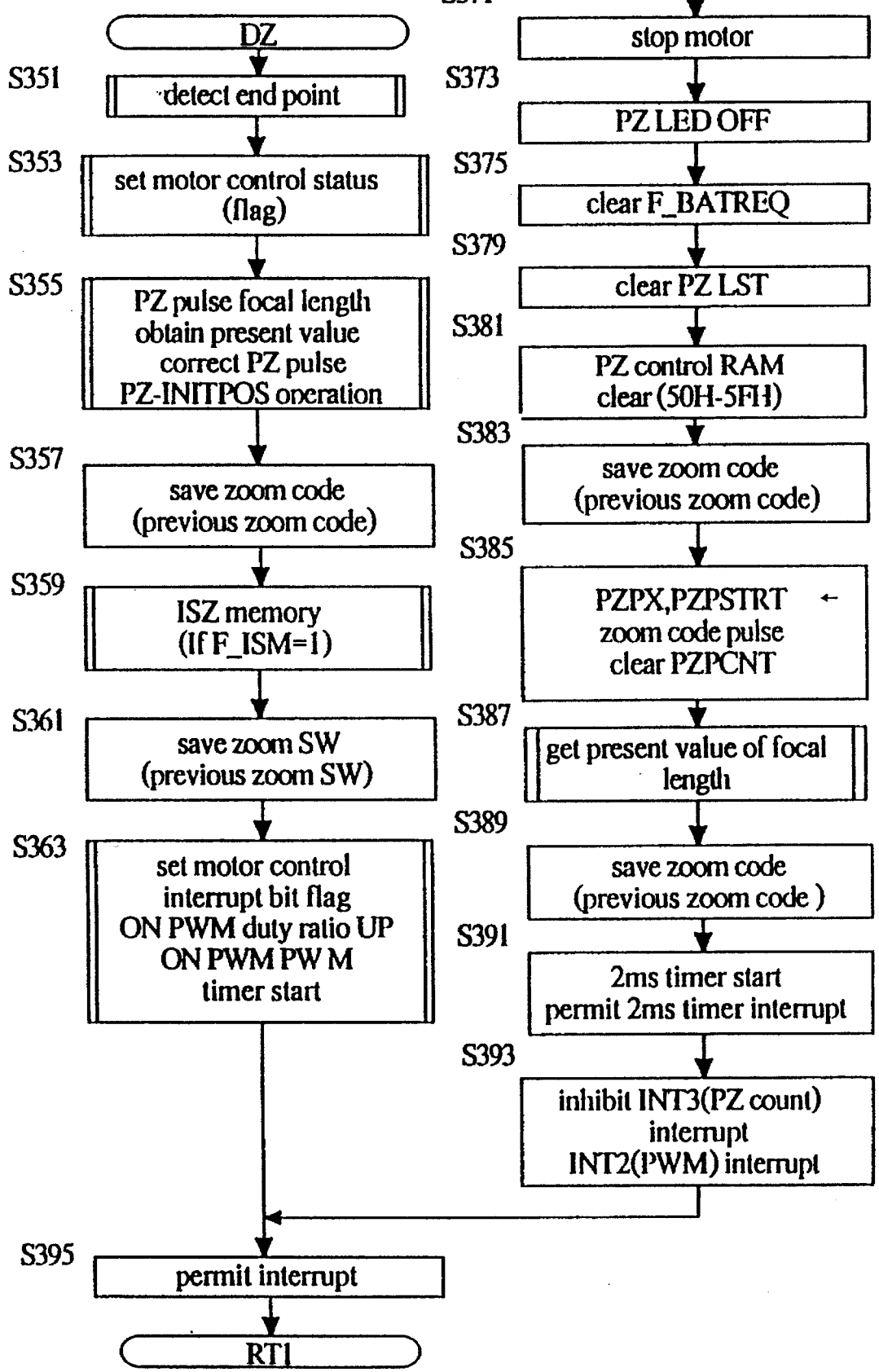
FIG. 10 is a flow chart regarding powered zoom/manual zoom operation.

The DZ operation and MZ operation shown in FIG. 10 are flowcharts regarding an electrically driven (powered) zoom operation and manual (hand operated) zoom operation, respectively. These operations are performed by the lens CPU 61.

In powered zoom (DZ) operation, an end point detection operation to identify if the group of zooming lenses 53Z has reached the end point thereof is performed (S351).

The flags for controlling the motor, etc. are set depending upon the zoom mode changing switch 75 and control flags, such as flag F_MOVTRG, F_MOV, etc. PZ pulse, and present value of the focal length are inputted to be stored the in RAM 61b. If desired, PZ pulse is corrected. When the present position of the group of zooming lenses 53Z is unknown, a position initializing operation (PZ-INITPOS) to the group of zooming lenses 53Z is performed, and the zoom code is stored at a different address as a previous zoom code in preparation for the next 2 ms timer interruption operation (S353, S355, S357).

If the constant image magnification zoom mode (F_ISM=1, i.e., ISZ operation) is selected, ISZ memory operation is performed and the state of zoom switch 75 and 77 is stored in preparation for the next 2 ms timer interruption operation (S357–S361). According to the flag set in step S353, drive control for the zoom motor 65, set-up of interruption bit-flag, duty ratio up operation for PWM control are performed. If PWM control is conducted, the PWM timer is started (S363). Then, the process permits interruption and returns to the step concerned (S395).

In manual zoom (MZ) subroutine, the zoom motor 65 is first stopped, LED of PZ pulser 69 is turned off, battery request (electricity demand) flag F-LBTREQ is cleared, and the bit of each of the PZ lens state PZ_LIST data is cleared (S371, S373, S375, S379).

Data regarding PZ control stored in lens RAM 61b at a given address is cleared, and zoom code is stored in preparation for the next 2 ms timer interruption operation. PZ pulse number, roughly detected from the zoom code, is stored in lens RAM 61b as the present value of PZ pulse (PZPX), and a start value of PZ pulse (PZPSTART) and PZ pulse counter (PZPCNT) is cleared. The present value of PZ pulse, as roughly detected, is converted into a present focal length (rough data) to be stored in the memory (S383, S385, S387).

The state of zoom switches 75 and 77 is stored in preparation for the next 2 ms timer interruption operation. Then, the 2 ms timer is started to allow 2 ms timer interruption and to inhibit interruption of INT3 (PZ pulse count) and INT 2 (PWM) in steps S389 through S393. The process permits another interruption and returns to the step concerned (S395).

METHOD FOR CONTROLLING PWM

Figure 11:
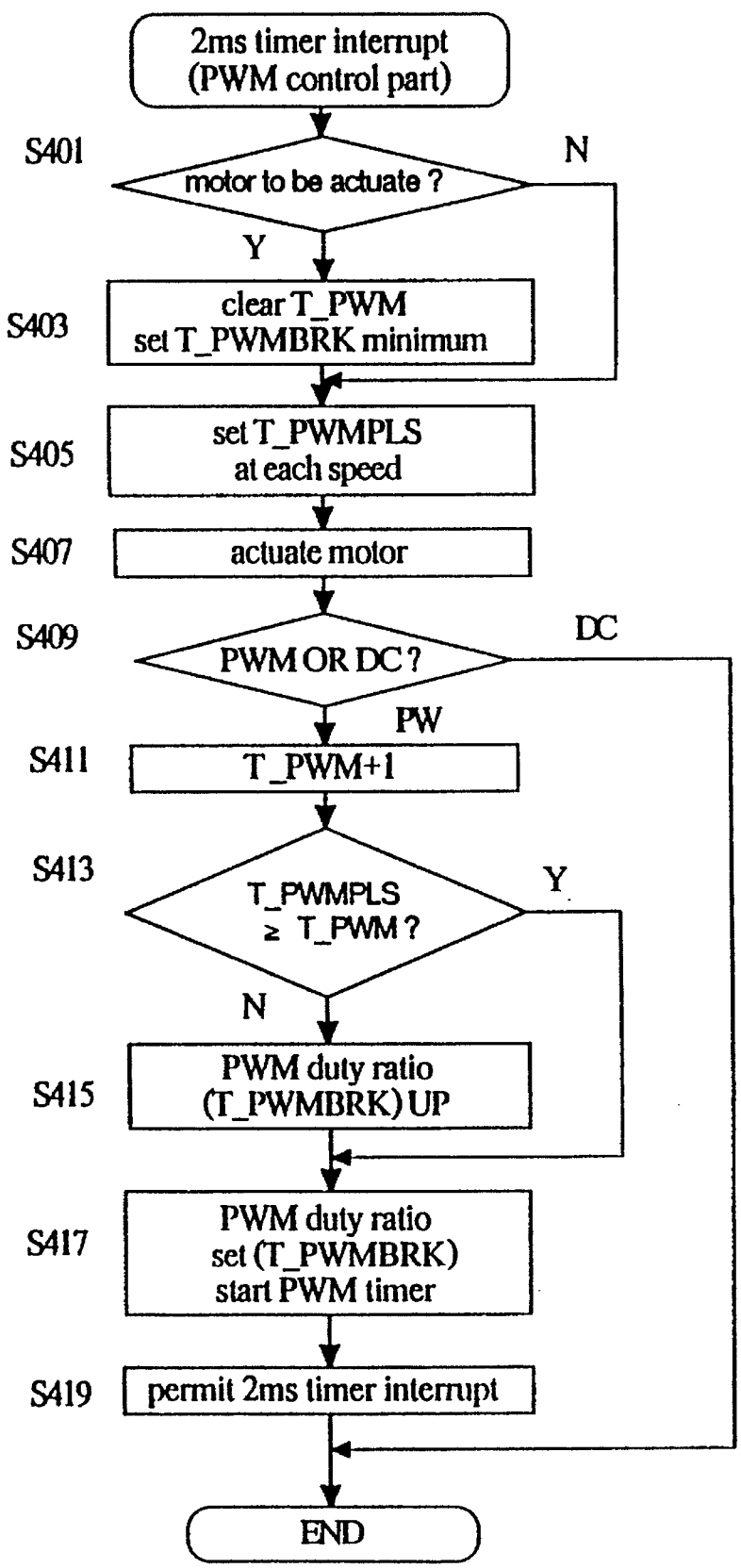
FIG. 11 is a flow chart regarding PWM 2 ms timer interruption.
Figure 12:
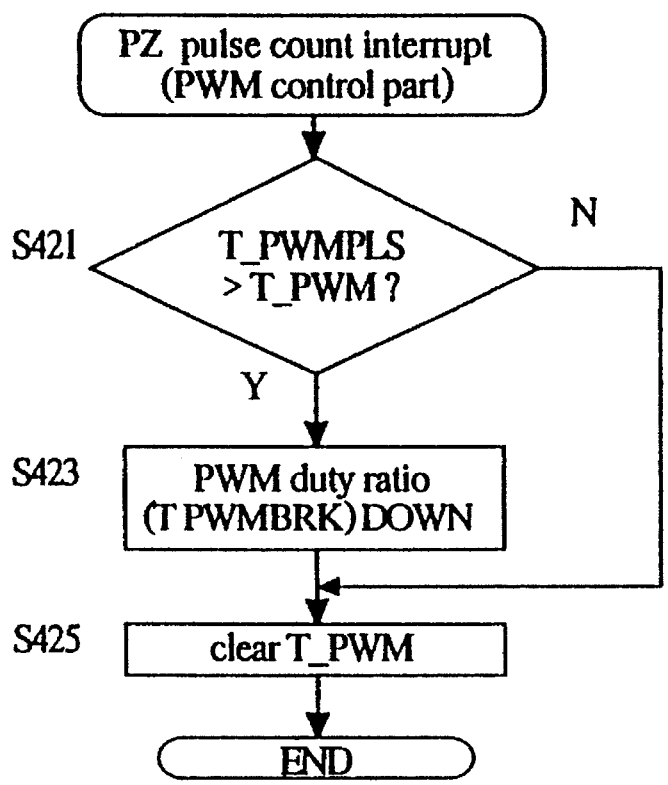
FIG. 12 is a flow chart regarding PZ pulse count interruption treatment.
Figure 13:
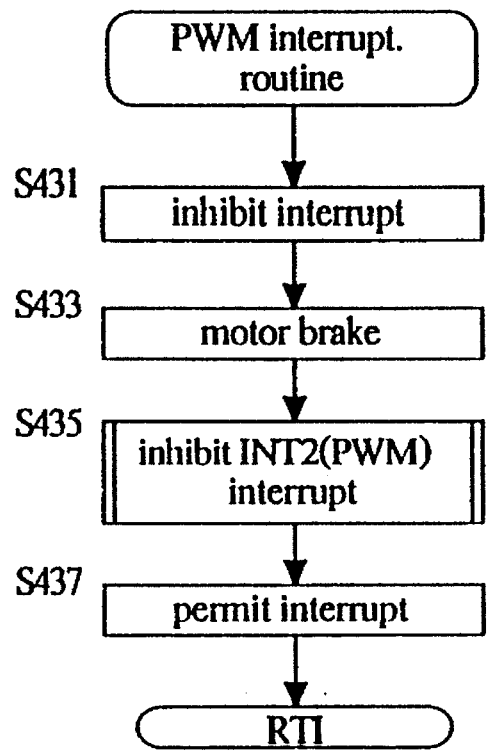
FIG. 13 is a flow chart regarding PWM interruption.
Figure 14:
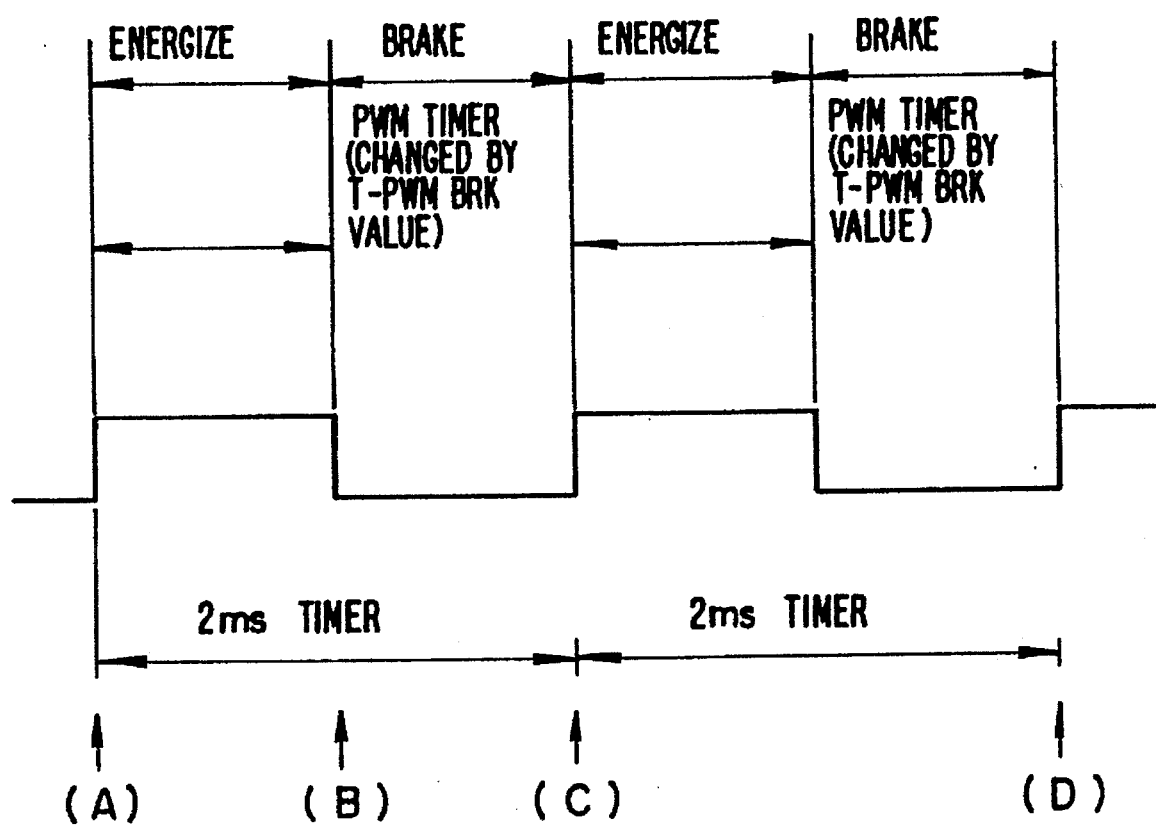
FIG. 14 is a time chart regarding PWM control.

PWM control method will be explained below on the basis of the flow chart shown in FIGS. 11 to 13. FIG. 11 shows the portion of the 2 ms timer interruption routine, shown in FIGS. 9 and 10, which relates to PWM control. FIG. 12 shows the portion of the PZ pulse count interruption routine shown in FIGS. 95 and 96, which relates to PWM control. FIG. 13 show PWM interruption routine (brake operation) during PWM control. The relationship between the main flow of FIG. 6 and various interruption routines will be explained hereinafter. It is possible to interrupt, by one of the communication interruptions (2 ms timer interruption or PWM interruption), the loops of main flows steps S127–S131 and S131–S157 shown in FIG. 6. It is also possible to effect the interruption by one of 2 ms timer interruption, PZ pulse count interruption or PWM interruption in the communication interruption routine. In PWM control, speed is controlled by increasing or decreasing a ratio (PWM duty ratio T_PWMBRK) between a period of time in which power is supplied and a period of time in which power is not supplied. In other words, according to the illustrated embodiment, a constant speed control is realized by increasing PWM duty ratio (T_PWMBRK) so as to prolong power supply time to the zoom motor 65, when a PZ pulse is not detected within a predetermined period of time, thereby making the control speed higher, or by decreasing PWM duty ratio (T_PWMBRK) so as to shorten the power supply time to the zoom motor 65 when PZ pulse is detected within a predetermined period of time, thereby making the control speed slower (see FIG. 14).

In the illustrated embodiment, upon starting (i.e., when the motor is brought into actuation from its stopped state or braked state), the duty ratio is set at the minimum (i.e., the shortest power supply time) and then the zoom motor 65 is supplied with power to count pulses outputted from the PZ pulser 69. When no pulses are outputted within a predetermined period of time, the duty ratio is gradually increased. When pulse is output within the predetermined period of time, the duty ratio is decreased. Thus, the zoom motor 65 is driven under acceleration control or constant speed control, so that pulses are outputted at a preset time, period or cycle. Also, by setting the duty ratio at the minimum when the motor is actuated, it enabels the photographer to effect a very smooth zooming operation.

The process first checks if the zoom motor 65 is to be actuated (if flag F_START is set) in S401. If it is to be actuated, PWM timer T_PWM is cleared and PWM duty ratio T_PWMBRK is set at the minimum value (lowest speed), so as to actuate the zoom motor at the lowest speed. Then, the process proceeds to step S405. If the motor is not to be actuated, the process proceeds to step S405 without performing any operations (S401, S403).

In step S405, the process set pulse duration (pulse period P_PWMPLS) in accordance with the speed set by the zoom speed changing switch 75, etc. so as to supply electricity to the zoom motor 65 (S405, S407). This means that the zooming speed is controlled so that the PZ pulse is outputted at a pulse duration T_PWMPLS.

The process checks if the PWM drive mode or the DC drive mode is suited to the zooming speed. If PWM drive mode is selected, the process proceeds to step S411. If, however, the DC drive mode is selected, the process will be returned (S409). In step S411, one increment is added to the PWM timer T_PWM. The process checks if such value, having been increased by one increment, exceeds pulse period T_PWMPLS. If exceeded, PWM duty ratio (T_PWMBRK) is increased, and if not exceeded, no operation is performed (S413, S415). That is, if PZ pulse is given within a predetermined period of time (T_PWMPLS), PWM duty ratio (T_PWMBRK) is increased to prolong the power supply time, thus prescribing a high speed operation to the preset speed.

The process will be completed after setting PWM duty ratio (T_PWMBRK), starting PWM timer and permitting interruption of the 2 ms timer (S417, S419). It should be noted that steps S407–S419 correspond to times (A), (C) and (D) in FIG. 14, respectively.

When PA pulse is outputted from PA pulser 69, the process enters the PZ pulse count interruption operation in FIG. 12. In the PZ pulse count interruption operation, the pulse period (T_PWMPLS) is compared with PWM timer T_PWM. If the pulse period (T_PWMPLS) is larger than PWM timer, a pulse is outputted within the pulse period T_PWMPLS, and thus the PWM duty ratio T_PWMBRK is decreased and the PWM timer T_PWM is cleared. If the pulse period T_PWMPLS is less than the PWM timer, a pulse is outputted after one pulse period T_PWMPLS, so that the PWM timer T_PWM is cleared to complete the process at this time (S421, S423, S425).

In PWM interruption routine in FIG. 13, the process inhibits interruption, and breaks the zoom motor 65 so as to inhibit interruption of INT2 (PWM), while allowing another interruption, and the process is returned. The operation in the above corresponds to time (B) in FIG. 14.

In the PWM control according to this embodiment, the pulse period T_PWMPLS is set at three stages, i.e., low speed at 8, medium speed at 4, and high speed at 3, depending upon the speed designated by the zoom speed changing switch 75 etc. The PWM timer T_PWM is cleared when the motor is actuated and when the process transfers to PZ pulse count interruption operation upon receipt of PZ pulse outputted from the PZ pulser 69. Thereafter, the PWM timer is counted-up in the 2 ms timer interruption routine at S411, until after the PZ pulse is outputted. Accordingly, PWM timer T_PWM indicates a time which is a multiple of the time elapsed since the previous PZ pulse was outputted. It should be noted, however, that, duration of PZ pulse is greater than the period of 2 ms timer interruption, even in a high speed mode.

For example, when high speed 3 is assigned (i.e., pulse duration T-TWMPLS=3), the time period elapsed since the previous PZ pulse was outputted is 2 ms×3=6 ms. When low speed 8 is assigned, T_PWMPLS will be 8. The operation during the low speed will be explained with reference to the flow charts illustrated in FIGS. 11 and 12. If, in step S413 of the 2 ms timer interruption, it is determined that the pulse period T_PWMPLS is smaller than PWM timer T_PWM, i.e., when it has been passed more than 2 ms×8=16 ms has passed since the previous PZ pulse was outputted, the process proceeds to PWM duty ratio increase (S415).

On the other hand, and in the PZ pulse count interruption operation, if it is determined that the pulse period T_PWMPLS is larger than PWM timer T_PWM during the check in step S421, the PZ pulse is outputted before 2 ms×8=16 ms has passed after the previous PZ pulse was output. Accordingly, PWM duty ratio is decreased (S423).

As shown above, a constant speed control in which PZ pulse duration is kept constant is made possible, by increasing or decreasing duty ratio (T_PWMBRK) of PWM so that the PZ pulse is outputted at a predetermined pulse cycle or period (T_PWMPLS). The PZ pulse duration, and thus control speed, may be changed by changing pulse period T_PWMPLS to be set.

CONSTANT IMAGE MAGNIFICATION RATIO ZOOMING

Constant image magnification zooming (IZS) will be explained. Constant image magnification zooming is a control in which image magnification ratio m represented by m=f/D may be kept constant regardless of variation in object distance, wherein object distance and focal length are represented by D and f, respectively.

First, the principle of constant image magnification zooming will be explained. For clearer illustration, the zoom lens constituted by two lens groups of first group and second group will be used in the explanation. Image magnification ratio m of the zoom lens is given by equation ① below.

$$m_1 = x/f_1$$
$$m_2 = f/f_1$$
$$m = m_1 * m_2 = x*f/f_1^2 \qquad (1)$$

wherein;
m: image magnification ratio
$m_1$ (m1): magnification ratio of the first group
$m_2$ (m2): magnification ratio of the second group
f: composite focal length
$f_1$ (f1): focal length of first lens group
x: amount of advancement of the first lens group from ∞ end (amount of displacement)

Amount of advancement upon setting image magnification ratio $x_0$(x0), focal length $f_0$(f0), and image magnification ration $m_0$(m0) is given by:

$$m_0 = x_0 * f_0 / f_1^2 \qquad (2)$$

If a focal length f which satisfies the following equation ③ is found when the lens is displaced to x by means of focusing operation, the image magnification ratio can be maintained constant.

$$m_0 = x * f / f_1^2 \qquad (3)$$

From equations ② and ③, $$x_0 * f_0 / f_1^2 = x * f / f_1^2$$

Thus, focal length f, which is to be found, is given as follows:

$$f = x_0 * f_0 / x \qquad (4)$$

If defocus amount Δx at the lens advancement amount x is obtained by means of AF macrometer, objective focal length f can be calculated by:

$$f = x_0 * f_0 / (x + \Delta x) \qquad (5)$$

The principle (theory) of constant image magnification ratio zooming is explained above. In practical (applied) control, however, the amount of advancement of the lens is managed by the focal length code plate, AF pulser, etc. The AF pulser is designed so that it will have a linear relationship with the amount of advancement of the lens.

Thus, the amount of advancement x, $x_0$ in equation ④ and ⑤ may be replaced with an AF pulse number from the ∞ end and a defocus amount with defocus pulse number.

An actual operational method in the illustrated embodiment will be explained below. In this embodiment, the lens CPU 61 performs constant image magnification ratio zooming (control zooming). The operation is performed on the basis of image magnification ratio supplied from the camera body 11 or on the basis of object distance and focal length at a given instance.

(1) When image magnification ratio $m_0$ is sent from the body:

(i) provisional set value, pulse number for advancement $x_0$ and focal length $f_0$ is obtained from $m_0$.

first, let $f_0 = |f_1|$               (6)

let amount of advancement corresponding to $x_0$ be X, and using equation (2);

$$m_0 = X * f_0 / f_1^2 \quad (7)$$

let AF pulse number per 1 mm of lens advancement amount be k;

$$x_0 = X * k \quad (8)$$

from equation (8), (6) and (7), objective advancement pulse number $x_0$ is given as follow;

$$x_0 = m_0 * |f_1| * k \quad (9)$$

(ii) next, $x_0$ $f_0$ will be obtained;
from equations (6) and (9), $x_0 * f_0$ is obtained as follows;

$$x_0 f_0 = x_0 * f_0 \quad (10)$$

(iii) objective focal length f is obtained;
f is obtained on the basis of present position (present advancement pulse number) x as follows;

$$f = x_0 f_0 / x \quad (11)$$

f is also obtained on the basis of defocal pulse number $\Delta x$ as follows;

$$f = x_0 f_0 / (x + \Delta x) \quad (12)$$

(2) When f is to be obtained on the basis of advancement pulse number $x_0$ stored in the lens RAM 61b and focal length $f_0$;

(i) $x_0$ $f_0$ will be obtained the above $x_0$ and $f_0$, using equation (10) as follows:

$$x_0 f_0 = x_0 * f_0$$

(ii) magnification ratio $m_0$ will be obtained by using equations (7), (8) and (10) as follows;

$$m_0 = x_0 f_0 / (f1^2 * k) \quad (13)$$

(iii) objective focal length f is obtained as follows; f will be obtained in a way same as above (iii) in (1).

(iiii) $f_1$ is data peculiar to the lens and is stored in ROM 61a.

ISZ OPERATION

Figure 15:
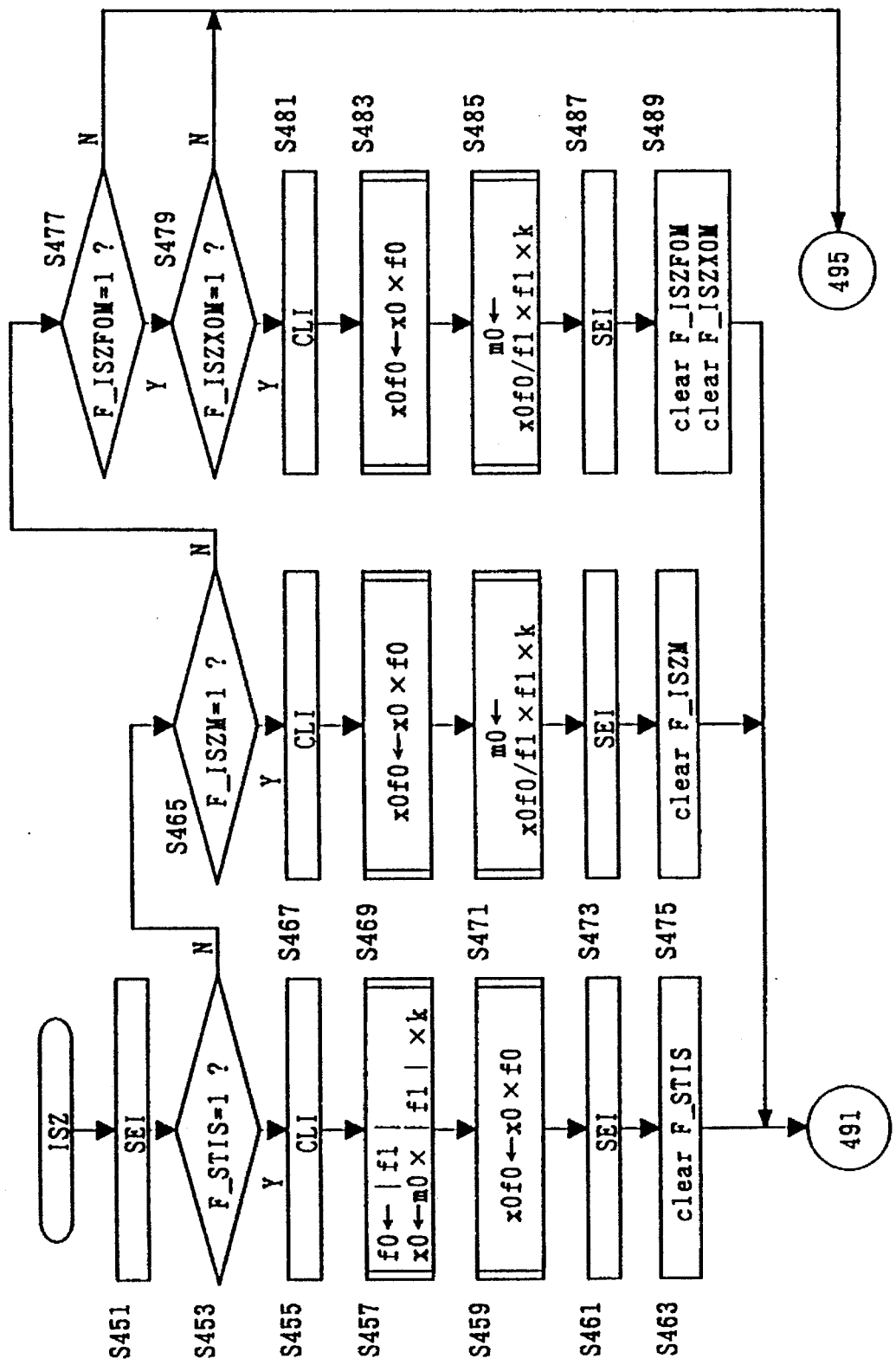
FIGS. 15 and 16 are a flow chart regarding zoom control under constant image magnification.
Figure 16:
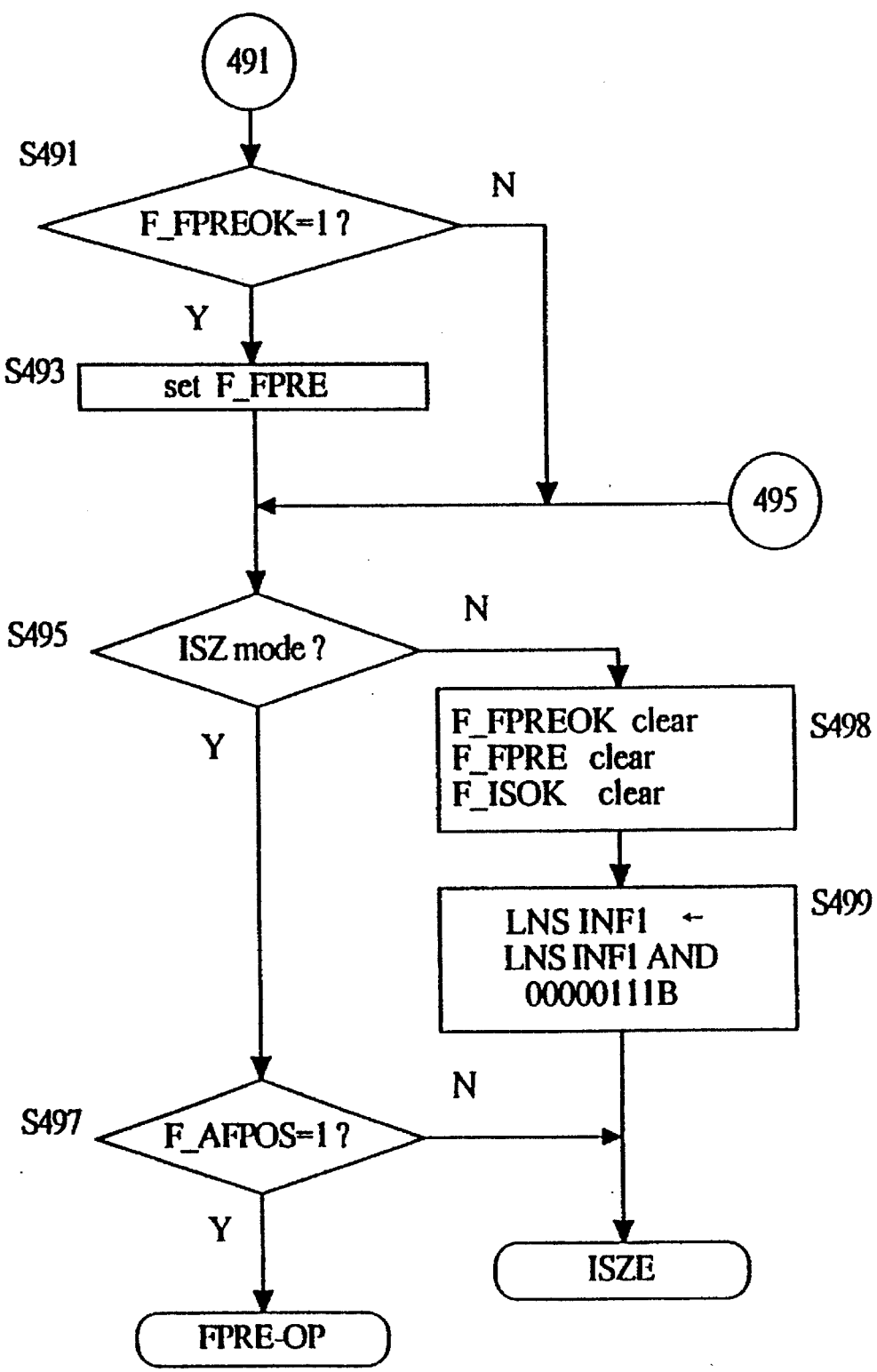

A calculation operation regarding constant image magnification ratio zooming (ISZ) of the embodiment based on the above described principle will be explained in detail with reference to flow charts shown in FIGS. 15 and 16. This operation is performed by the lens CPU 61.

Image magnification ratio is set by the zoom speed changing switch 75 or set-up switch (SL switch). This will be explained later in detail with reference to FIG. 90.

The ISZ operation is related to calculation of the preset image magnification ratio and to calculation of focal length for maintaining the preset image magnification ratio. The focal length will be calculated in the case where focusing is required and the case where focusing is not required. In each case, calculation is made by the photographing lens or camera body. When focusing is required, the focal length, image magnification ratio and objective lens advancement amount are calculated on the basis of amount of advancement of lens upon focusing. When focusing is not required, image magnification ratio and objective lens advancement amount are calculated on the basis of defocus amount and present focal length.

The process first performs inhibition of communication interruption (SEI) and checks the flags (F_STIS, F_ISZM, F_ISZFOM, F_ISZXOM) in order to determine the way in which the ISZ operation is being performed, on the basis of communication information transferred from the camera body 11 (S451, S453, S465, S477, S479). These flags indicate that communication regarding ISZ has been performed in relation to the camera body 11. In each communication, the flag is set (stored) in RAM 61b. The required operation or calculation will be made on the basis of the flags.

F_STIS is a flag to indicate that data transferred from the body is to be used, F_ISZM is a flag to indicate that data from the photographing lens is to be used, F_ISZFOM is a flag to indicate that focal length f data is to be used, and F_ISZXOM is a flag to indicate that object distance x data from the body is to be used.

When constant image magnification ratio zooming is performed on the basis of the image magnification ratio sent from the camera body 11 (F_STIS=1), communication interruption is permitted (CLI), $x_0 \times f_0$ is obtained from the above equations (6), (9) and (10) to be stored in RAM 61b at a predetermined address, and interruption is inhibited so as to clear flag F_STIS (S455–S463).

In the case that the image magnification ratio has been stored and constant image magnification ratio zooming is performed on the basis of the focal length and object distance stored in the memory (F_STIS=0, F_ISZM=1), interruption is permitted, $x_0 \times f_0$ is calculated from the above object distance (advancement pulse number) $x_0$ and focal length $f_0$, image magnification ratio $m_0$ is calculated using equation (13) so as to be stored in RAM 61b at a predetermined address, communication interruption is inhibited, and flag F_ISZM is cleared (S465–S475).

In the case that constant image magnification ratio zooming is performed on the basis of focal length $f_0$ sent from the camera body 11 and object distance (advancement pulse number) $x_0$ (F_STIS=0, F_ISZM=0 and ISZFOM=1, F_ISZXOM=1), $x_0 f_0$ is first calculated on the basis of focal length $f_0$ as received and object distance $x_0$ so as to be stored in memory. Image magnification ratio $m_0$ is calculated from equation (13). Interruption is inhibited and flags F_ISZFOM, F_ISZXOM are cleared (S477–S489). In a case other than the above, it is noted that no communication regarding operation is conducted in relation to the camera body 11. Accordingly, no operation is performed in such a case.

Then, flag F_PREOK is checked so as to determine if predictor amount already sent from the camera body is effective. If effective, flag F_FPRE is set-up, otherwise, flag F_FPRE is not set-up (S491–S493).

Checking is done if the mode is the ISZ zooming mode. If the mode is the ISZ zooming mode, the current flag is checked if it is a flag (F_AFPOS=1) which recognizes the position of the present focusing lens 53F (object distance). If the position of the present focusing lens is known (F_AFPOS=1), the process proceeds to the FPRE-OP operation in which control is performed using predictor amount, otherwise, the process passes through the ISZ operation (S495, S497).

If the mode is not the controlled zooming mode, flags F_FPREOK, F_FPRE, F_ISOK are cleared. Then, the content at a predetermined address (LNS_INF1) and logical sum of of each of the bits ⌈00000111B⌋ are stored at a predetermined address (LNS_INF1). Thereafter, the process passes through the ISZ operation (S495, S498, S499).

FPRE-OP OPERATION

Figure 17:
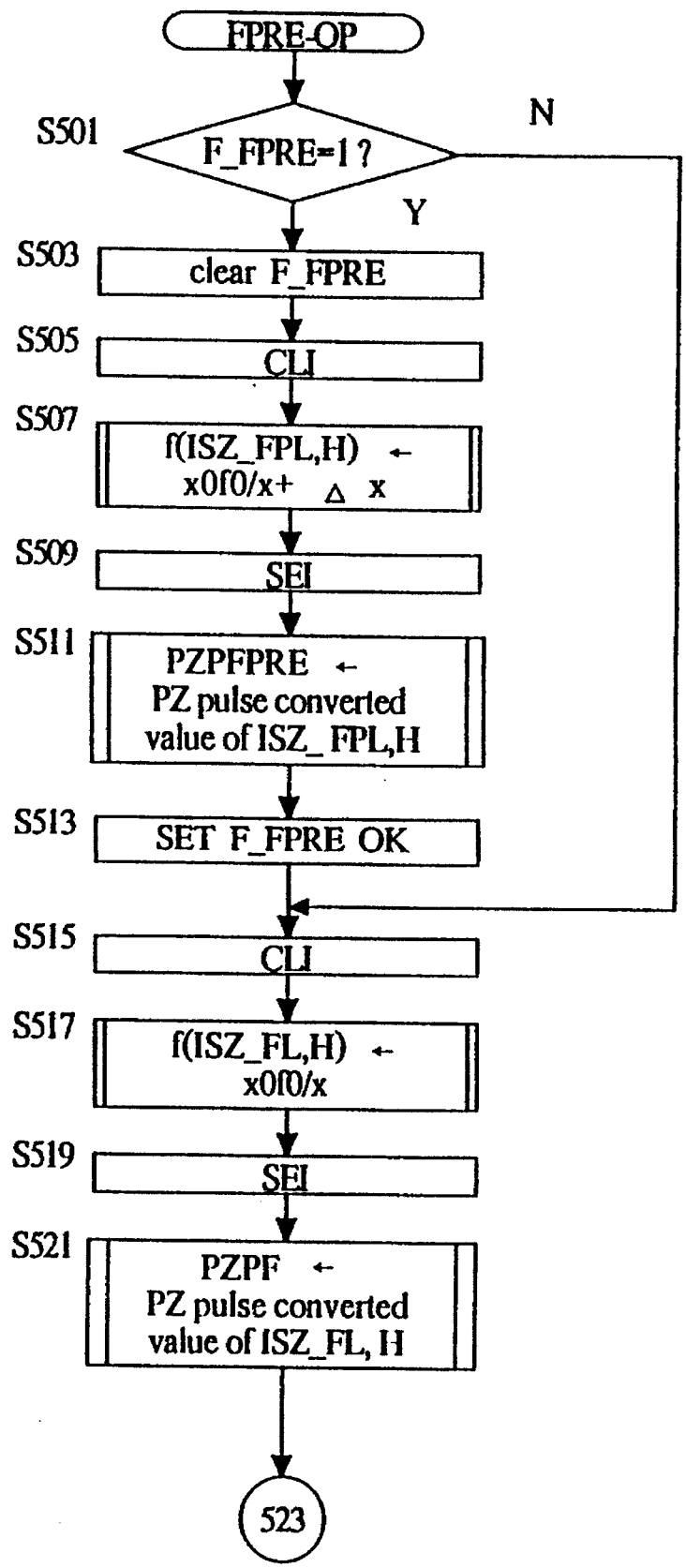
FIGS. 17 and 18 are a flow chart of a predictor operation regarding the amount of defocus.

The (FPRE-OP) operation shown in S501–S513 in which objective focal length f is obtained on the basis of predictor amount will be explained with reference to the flow chart shown in FIG. 17. This process is performed by the lens CPU 61 when predictor amount is sent from the camera body 11 during communication of the CPU with the camera body 11 (during this communication, flag F_FPRE is stored (memorized) in RAM 61b), or when steps S453 S463, S465–S475 or S477–S489 are performed to change or modify $x_0 f_0$ values by the communication of the CPU with the camera body 11 regarding ISZ and flag F_FPRE is set in S491–S493. The flag F_FPRE is a flag which determines whether or not the calculation ($f = x_0 f_0/(x + \Delta x)$) to obtain objective focal length f based on predictor amount is performed.

When entering this operation, the process checks if the flag F_FPRE is set so as to determine whether the operation based on predictor amount is to be performed (S501). If flag F_FPRE is not set, the process jumps to S515. Otherwise, the process proceeds with the following operation.

First F_FPRE is cleared and communication interruption is inhibited. Objective focal length f is calculated from equation (12),utilizing predictor amount, and communication interruption is inhibited (S503–S509). Then, the objective focal length f is transformed to objective PZ pulse number from a WIDE end so as to be stored in RAM 61b at a predetermined address (PZPFPRE). Flag F_FPREOK which indicates that the operation based on the predictor amount is effective is set. Then, the process proceeds to step S515 (S511, S513).

S515–S521 are steps in which objective focal length f is calculated on the basis of present AF pulse (advancement pulse number).

In S515, permission of interruption (CLI) is performed. Objective focal length f is calculated using equation (11) so as to be stored in RAM 61b at a predetermined address (ISZ_FL,H) and then inhibition of interruption (SEI) is performed (S515, S517). The objective focal length f calculated in the above is transformed into objective PZ pulse from the WIDE end. The transformed pulse value is stored in RAM 61b at a predetermined address (PZPF) in S519, S521.

The content of bits 3 through 7 of LNS_INF1, calculated in S529, will be explained below. LNS_INF1 is information which is periodically sent from the lens to the camera body by means of communication. Bits 3 through 7 are information regarding ISZ mode.

Bits 6 and 7 are flags which indicate whether objective PZ pulse (PZPFPRE or PZPF) obtained by ISZ operation is positioned on the WIDE side or TELE side with respect to the present PZ pulse. If the objective PZ pulse is positioned on the WIDE side, bit 7 is set, and if it is positioned on the TELE side, bit 6 is set. If the objective PZ pulse is between the WIDE side and TELE side, neither bit 6 nor 7 is set.

Bits 3 through 5 indicate, by ⅛ segments, an approximate value which is the difference between the objective PZ pulse number and pulse number of the present position, i.e., PZ pulse number required for the lens to move from the present position to the objective position, divided by the total PZ pulse number (i.e., PZ pulse number required for the lens to move from the WIDE end to the TELE end). Bits 3, 4 and 5 are weighted by ⅛, ¼ and ½, respectively. The above value will be zero when the present position is equal to the objective position. Thus, bits 3 through 5 are all cleared. If the present position is at the WIDE end and the objective position is at the TELE end, or vice versa, the value will be ⅞ and therefore bits 3 through 5 are all set at "1".

Thus, the camera body 11 receives, in LSN_INF1, periodically or upon request for information from the photographing lens 51, so that the camera body is able to send appropriate ISZ control information to the photographing lens 51.

The process checks if the operation based on predictor amount is effective (F_REOK=1). If effective, objective PZ pulse number (PZPFPRE), obtained by using predictor amount, is stored in accumulator (ACC). If not effective, objective PZ pulse number (PZPF) obtained on the basis of present AF pulse number is stored in the accumulator (S523, S525, S527).

Then, the values of bits 3 through 7 in LNS_INF1 are calculated on the basis of the objective PZ pulse number stored in the accumulator. The thusly calculated values are stored in RAM 61b at a predetermined address (i.e., bits 3 through 7 of LNS_INF1) and an interruption inhibition operation (SEI) is performed (S529, S531).

The following operation is performed, provided that constant image magnification ratio zooming is selected, that position (focal length) of the present group of zooming lenses 53Z is obtained (flag F_PZPOS=1), and that constant image magnification ratio zooming is being performed (flag F_ISOK=1). If any one of the above conditions is not satisfied, the process jumps to step S551 (S533–S537).

If operation of objective focal length based on the predictor amount (PZ pulse number) is effective (flag F_FPREOK=1), and control flag for ISZ is set up (flag F_ISZD=1), the PZ pulse number obtained by using predictor amount (from equation (11)) is stored in RAM 61b at a predetermined address (PZPTRGT) as objective pulse number (S539, S541, S543). If, however, operation of objective focal length based on the predictor amount is not effective (F_FPREOK=) or ISZ control flag is cleared, PZ pulse number obtained on the basis of AF pulse of the present position (advancement pulse number) using equation (12) is stored in the above predetermined address (PZPTRGT) in S539, S541 and S545. Flag F_ISZD is data which is sent from the body 11 by means of communication and stored in RAM 61b. If F_ISZD=1, ISZ control is performed on the basis of the calculated value based on the predictor amount. If F_ISZD=0, ISZ control is performed on the basis of the calculated value based on the present position of AF pulse.

Zoom speed data (bit 6, 7 of BD_ST1) sent from the camera body 11 and stored in RAM 61b is stored in RAM 61b at a predetermined address (bit 2, 3 of SPDDRC2). Constant image magnification ratio zooming flag F_ISZ is set up and interruption is permitted. Then the operation is returned (S547, S549, S551). Constant image magnification ratio flag F_ISZ indicates that the CPU 61 has completed calculating the distance of the target focusing point, and that preparations for the motor and the zoom lens to be driven have been made. When the constant image magnification ratio flag F_ISZ has been set, a constant image magnification ratio zooming operation is performed in the 2 ms timer interruption routine. The values of PZPTRGT, SPDDRC are also used in the 2 ms timer interruption routine.

INSTRUCTION OPERATION

An instruction operation to be performed in the photographing lens 51 when instruction codes (command) are received from the camera body 11 will be explained below with reference to flow charts shown in FIGS. 19 to 26, together with tables 1 and 2 indicating content of instruction codes. The instruction codes are details of S217 in communication interruption routine of FIG. 8. Each instruction operation is performed depending upon the lower bits of the command.

Figure 19:
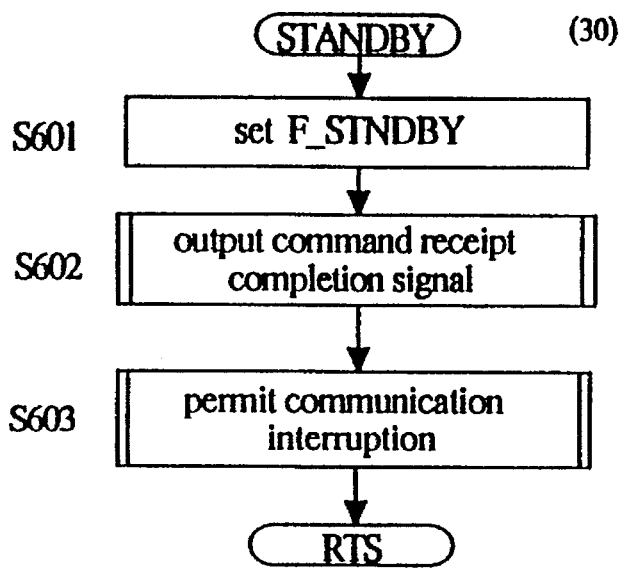
FIG. 19 is a flow chart regarding a standby operation.

STANDBY command is a command to cause the lens CPU 61 to be brought into a sleep mode. A flow chart regarding an operation upon input of STANDBY command is shown in FIG. 19.

The lens CPU 61, upon receipt of STANDBY COMMAND, sets up flag F_STNDBY, transmits command receipt completion command to the body 11, allows communication interruption and is returned (S601, S602, S603). Lens CPU 61 checks flag F_STNDBY in the main routine at step S143. If flag F_STNDBY is set up, lens CPU stops clock 91 and is transferred into a low power consumption mode (standby mode)(See FIG. 7).

Figure 20:
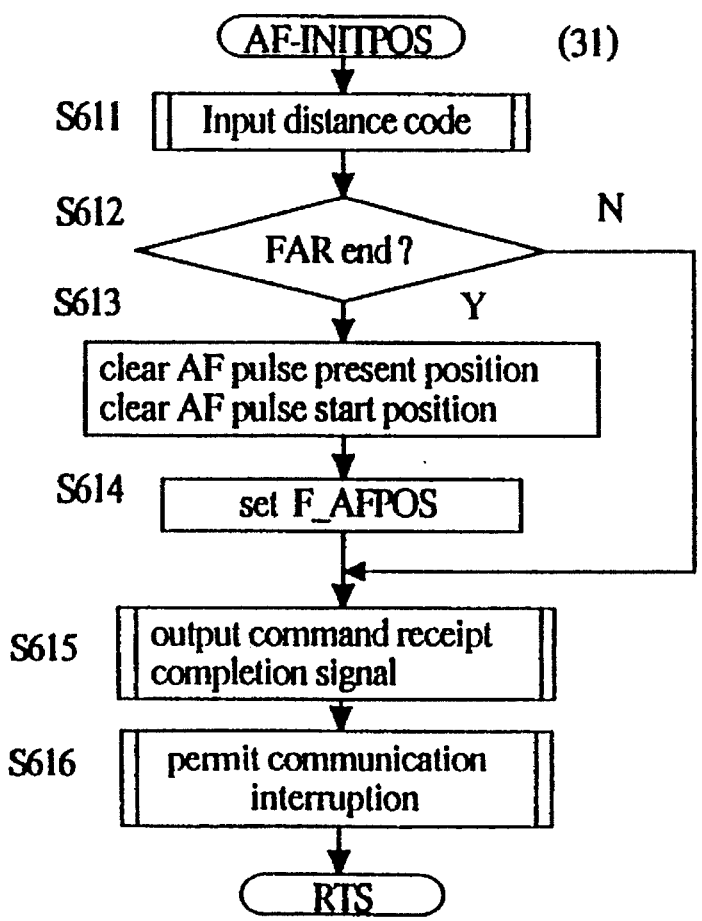
FIG. 20 is a flow chart regarding an initializing operation for AF pulse.

AF-INTPOS command is a command which is sent after the camera body 11 has displaced the focusing lens 53F to ∞ end by means of AF motor 39. This command is an initializing operation command for AF to clear an AF pulse counter of the photographing lens 51. A flow chart regarding an operation performed by lens CPU 61, when AF-INSTPOS command is inputted is shown in FIG. 20.

Lens CPU 61, when AF-INITPOS command is input, inputs distance code data from distant code plate 81 (S611). If the code data corresponds to the ∞ end (far end), AF pulse present position data (AFPXL, H) in RAM 61b and F pulse start position data (AFPSTRTL, H) are cleared. A flag to identify that the present position of focusing lens 53F is known F_FPOS is set up and the process proceeds to S615. If the code data does not correspond to the ∞ end, the process skips through the above step and proceeds to S615. The process outputs command receipt completion command to body 11, allows communication interruption and is returned (S615, S616).

Figure 21:
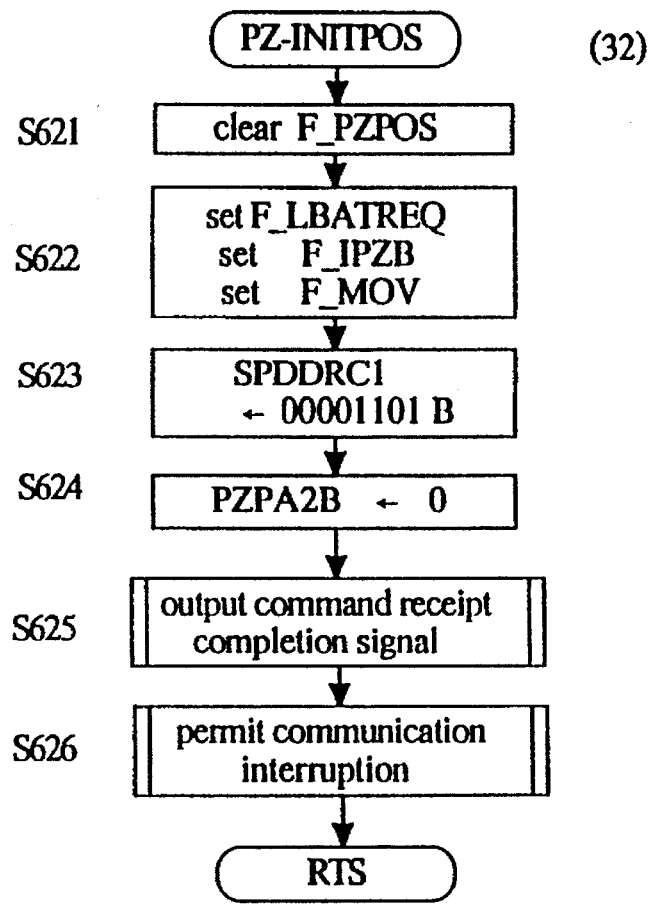
FIG. 21 is a flow chart regarding an initialization operation for powered zoom position.

PZ-INITPOS command is a command which causes the lens CPU 61 to perform an initialization operation so as to identify the zooming position. In this embodiment, PZ pulse number corresponding to code of zoom code plate 71 is set in the PZ pulse counter when zoom motor 65 is actuated, to detect the boundary 72 of code of zoom code plate 71. A flow chart regarding an operation performed when PZ-INITPOS command is input is shown in FIG. 21. The operations such as counting of PZ pulse will be explained later in POS-NG OPERATION shown in FIG. 86.

Lens CPU 61, when PZ-INTPOS code is input, clears flag F_PZPOS, sets up flags F_BATREQ, F_IPZB and F_MOV, stores a predetermined data (lowest speed, direction TELE) in lens RAM 61b at SPDDRC1, and sets PZPA2B of the PZ pulse counter to zero. The PZ pulse counter counting PZ pulse from the present position to the code boundary (S621–S624). The process outputs command receipt completion signal, allows communication interruption and is returned (S625–S626). The initializing operation regarding power zooming (PZ) is performed on the basis of the above set value during the 2 ms timer interruption operation.

Figure 22:
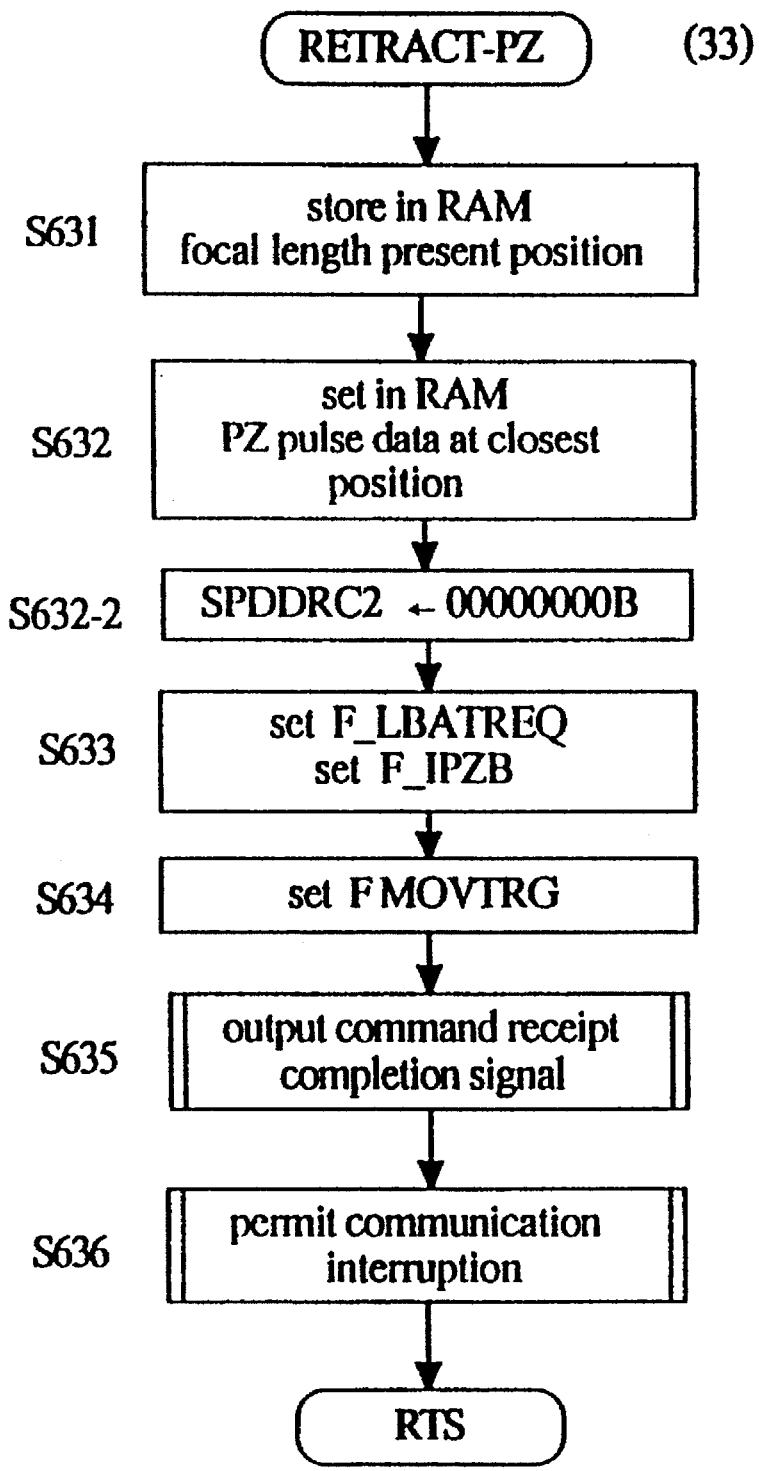
FIG. 22 is a flow chart regarding an accommodation operation for the powered zoom lens.

RETRACT-PZ is a command which effects power zooming of the photographing lens 51 to minimize the length of (i.e., retract) the photographing lens barrel, when, for example, the main switch of the camera body is turned off. A flow chart regarding an operation upon input of the RETRACT-PZ command is shown in FIG. 22.

Lens CPU 61, upon receipt of the RETRACT-PZ command, stores present focal length data in RAM 61b at a predetermined address (RETPOS L,H), set PZ pulse data by which length of lens barrel becomes minimum (data inherent to the lens) in RAM 61b at a predetermined address, and set predetermined data (maximum speed) in SPDDRC2 (S631, S632, S632-2). The Lens CPU also sets each flag F_BATREQ, F_IPZB and flag F_MOVTRG, sends command receipt completion signal, and permits communication interruption. The process is then returned (S634–S636).

The focal length data before retraction (accommodation) is sent to the camera body 11 by means of a separate communication command (FOCALLEN-X which will be explained hereinafter. Flag F_BATREQ is a flag which asks for electric supply to the power zoom lens 51 for the power zooming operation thereof, flag F_IPZB is a flag which indicates that zooming control (ISZ, PZ-INITPOS, etc.) is being conducted in the lens, and flag F_MOVTRG is a flag which moves zooming lens 53Z to an objective pulse position stored in address PZPTRG in the 2 ms timer interruption operation. Accommodation operation regarding the zooming lens 53Z is performed in the 2 ms timer interruption routine on the basis of the above set value.

Figure 23:
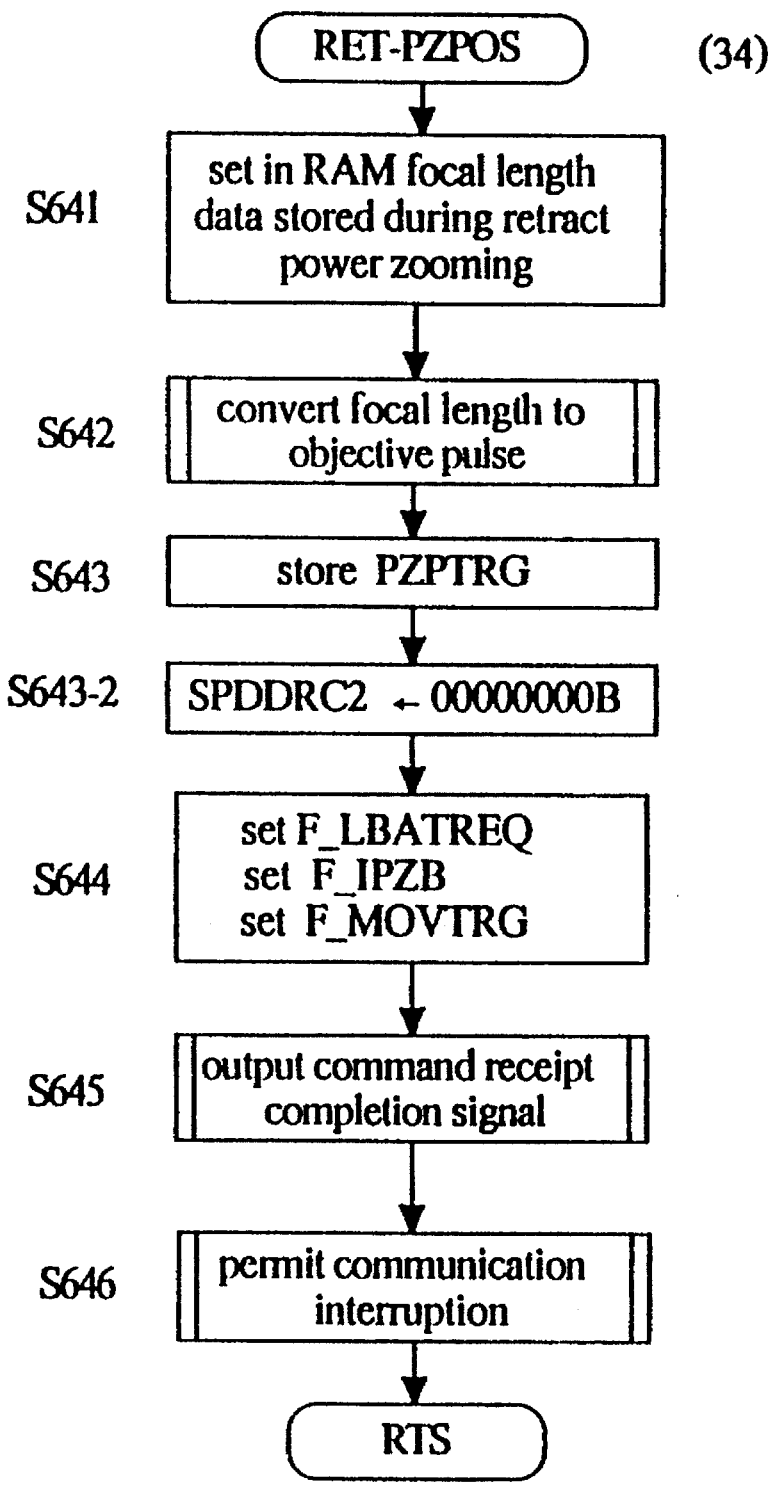
FIG. 23 is a flow chart regarding a return operation for the powered zoom lens.

RET-PZPOS is a command which is to return the zooming lens from its retracted state to the state before it is retracted, in other words, it is a command to return the zooming lens 53Z to its state before retraction or accommodation, for instance, when the main swithch of the camera body SWMAIN is turned ON (to the position of focal length before retract power zooming is performed). A flow chart showing an operation upon input of the RET-PZPOS command is shown in FIG. 23.

When the lens CPU 61 receives the RET-PZPOS command, the lens CPU 61 sets the focal length data, which is one of the data items stored in the address, before retraction, designated by the code of the command and which is sent immediately before retract power zooming, at a predetermined address (FCLL, H) of the lens RAM 61b (S641). It should be noted that, focal length data stored before retraction sent from the camera body 51 by means of separate communication command is stored in the address RET-POSL,H.

The above focal length data is converted into objective pulse number and stored in RAM 61b at a predetermined address as objective pulse number PZPTRG. A predetermined PZ speed data (high speed) is stored in SPDDRC2. Flags F_BATREQ, F_IPZB, F_MOVTRG are set. Command receipt completion signal is transmitted and communication interruption is permitted. The process is then returned (S642–S646). It is noted that the return operation is also performed in the 2 ms timer interruption operation.

Figure 24:
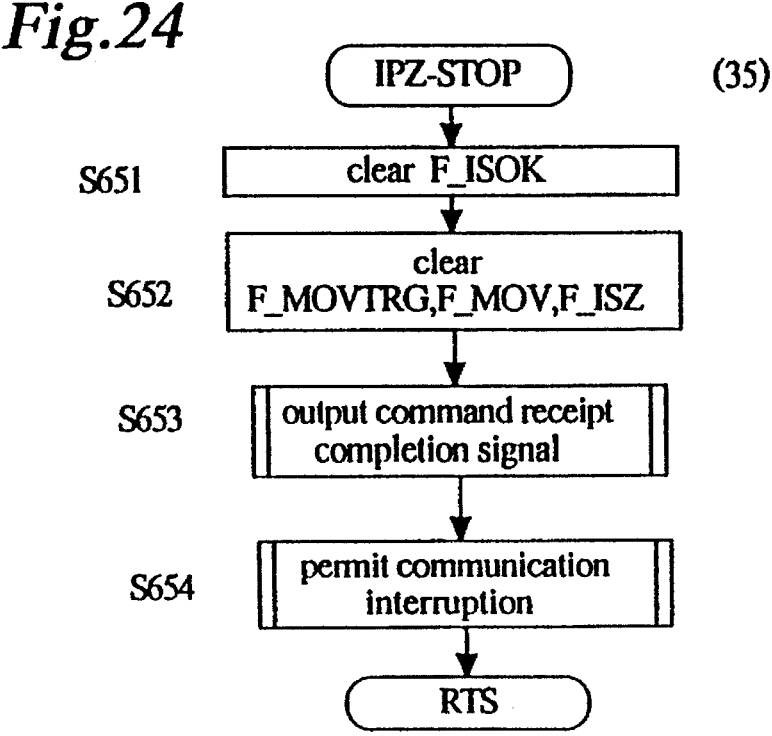
FIG. 24 is a flow chart regarding a stop operation for the powered zoom.

IPZ-STOP is a command which stops the power zooming operation. This command is a command which stops controlled power zooming such as ISZ (constant image magnification), PZ-INITPOS (return), RETRACT-PZ (retraction or accommodation). It is not a command to stop manual power zooming. A flow chart regarding an operation upon input of the IPZ-STOP command is shown in FIG. 24.

Lens CPU 61, when the IPZ-STOP command has been inputted, clears flag F_ISOK, together with flags (F_MOVTARG, F_MOV, F_ISZ) regarding performance of power zooming operation (S651, S652). Lens CPU 61 outputs command receipt completion signal and permits communication interruption and the process is then returned (S653, S654). Since the above flags are cleared, controlled power zooming such as ISZ (i.e., other than manual power zooming) is not performed in the 2 ms timer interruption operation.

Figure 25:
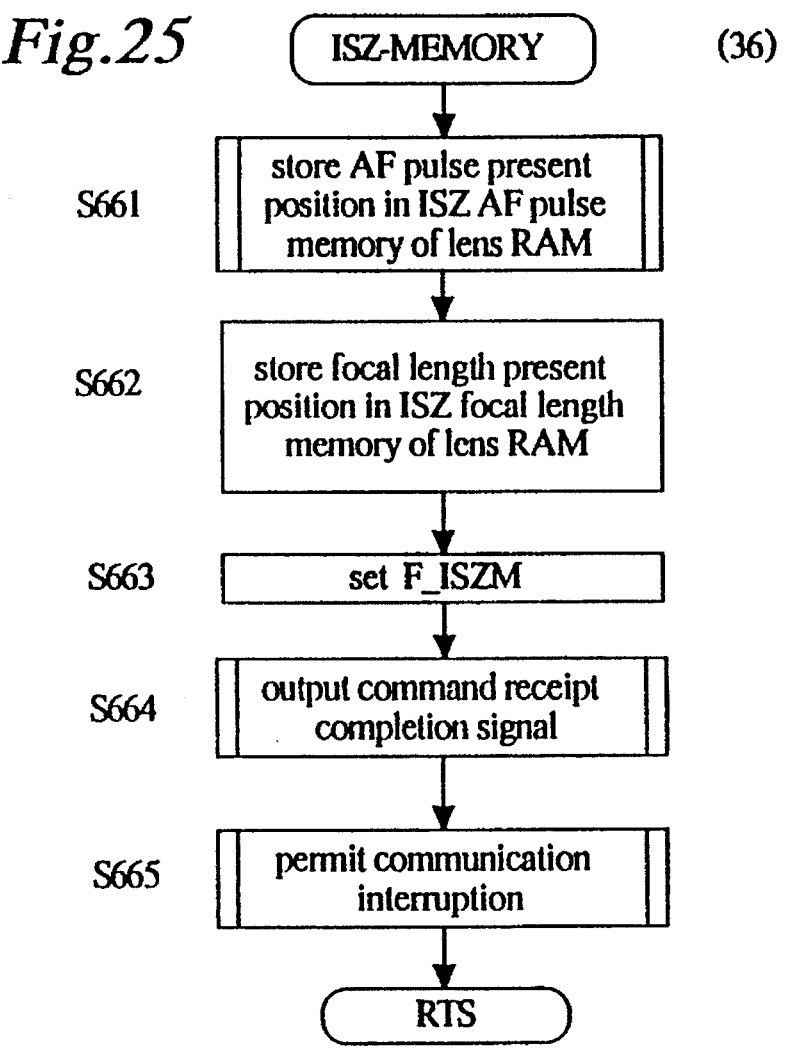
FIG. 25 is a flow chart effective upon receipt of data required for constant image magnification zooming.

ISZ-MEMORY is a command which stores present values of AF pulse and focal length in order to perform constant image magnification zooming. A flow chart regarding an operation upon input of ISZ-MEMORY command is shown in FIG. 25.

When ISZ-MEMORY command is inputted, lens CPU 61 stores present value (AFPXL,H) of AF pulse counter in ISZAF pulse memory (ISZ_AFPL,H) in lens RAM 61b at a predetermined address. Lens CPU stores present value (FCLXL,H) of focal length in ISZ focal length memory (ISZ_FCLL,H) (in lens RAM 61b at a predetermined address) in steps S661, S662. Flag F_ISZM is set, command receipt completion command is outputted, and communication interruption is permitted. The process is then returned (S663–S665). On the basis of the above values, operation of ISZ indicated by S465–S475 in FIG. 15 is performed.

Figure 26:
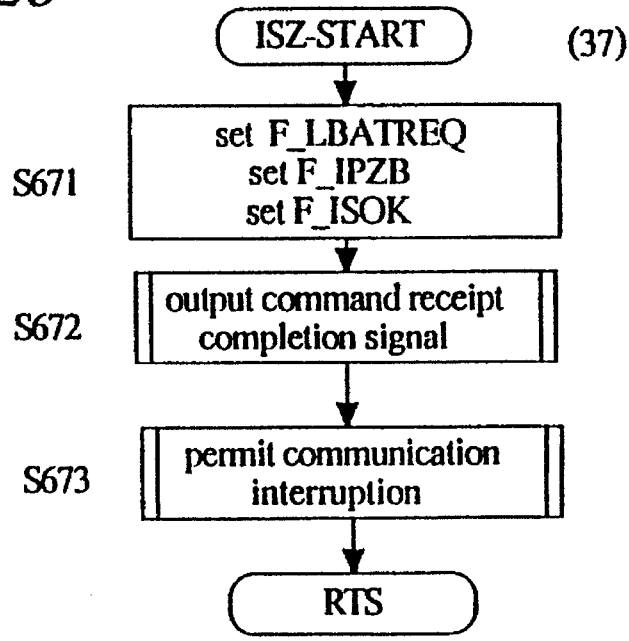
FIG. 26 is a flow chart regarding a constant image magnification zooming operation.

ISZ-START is a command which starts constant image magnification zooming. A flow chart regarding an operation upon input of the ISZ-START command is shown in FIG. 26.

When the ISZ-START command is inputted, lens CPU 61 sets flags F_BATREQ, F_IPZB, F_ISOK and outputs a data transmission completion signal. Communication interruption is permitted and the process is returned (S671–S673). On the basis of the above values, the 2 ms timer interruption operation and operations at and after S537 in FIG. 18 will be performed.

BL COMMAND SUBROUTINE

Operation in photographing lens 51 upon receipt of BL command from camera body 11 will be explained with reference to FIGS. 27 to 37. The BL command communication operation is similar to that performed in the instruction command subroutine, except that the command receipt completion signal is first outputted, then data is inputted, and the inputted completion signal is outputted. BL command is a detail of S213 in the communication interruption subroutine of FIG. 8. Each command operation is performed depending upon the content of lower bits of the command.

Figure 27:
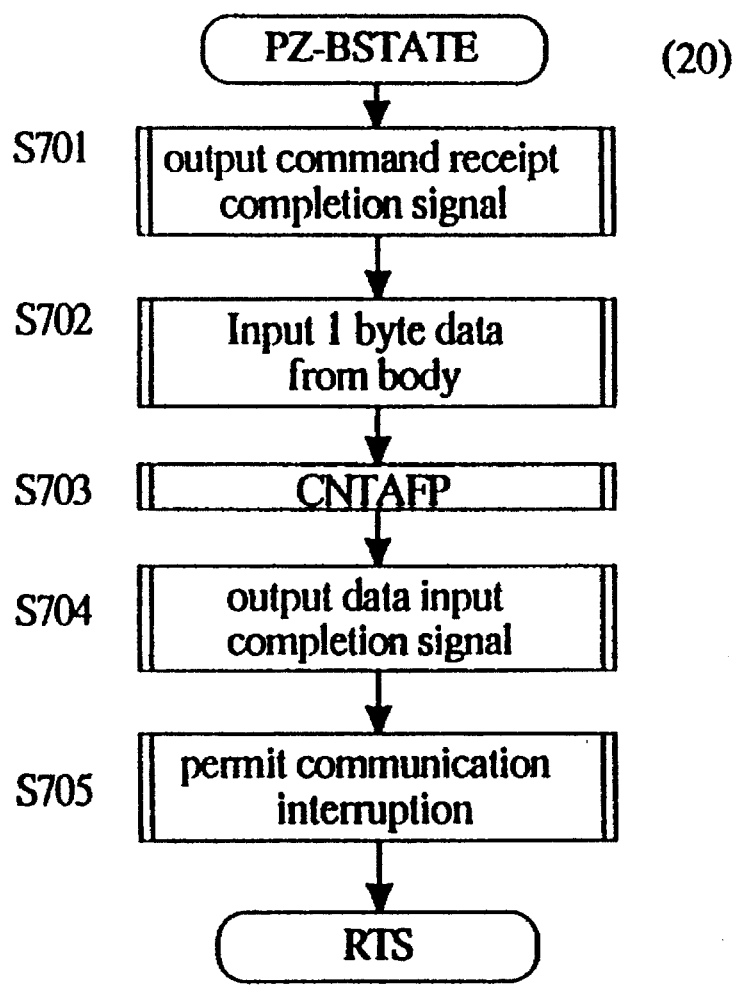
FIG. 27 is a flow chart effective upon receipt of input information regarding constant image magnification zooming.

PZ-BSTATE (20) is a command which sends necessary data to IPZ (constant image magnification ratio zooming). The data sent by this command includes data which indicates the status of focusing lens 53F, i.e., whether the lens is at the far end (infinite end) (F_ENDF=1) or the near end (closest end) (F_ENDN=1), in far move (F_FARM=1) or near move (F_NEARM=1), whether or not the lens is in overlap integration (F_OVAF=1), whether or not it is in a moving object prediction mode (F_MOBJ=1), whether or not it is in a focusing state (F_AFIF=1), whether an image magnification ratio should be stored by means of command (communication) from the body or by means of judgement of the lens CPU 61 (F_ISM=1), etc. A flow chart regarding an operation upon receipt of PZ-BSTATE command is shown in FIG. 27.

When the PZ-BSTATE command is inputted, lens CPU 61 sends command receipt completion signal, inputs PZ-BSTATE data of 1 byte from camera body 11, and performs subroutine CNTAFP regarding an AF pulse count operation (S701–S703). Detail of the CNTAFP subroutine is shown in FIGS. 39 to 43 which will be explained hereinafter.

Data input completion signal is outputted and communication interruption is permitted. Then, the process is returned (S704, S705). The camera according to this embodiment has an AF drive source mounted to the body 11. Accordingly, when AF pulse is counted in lens 51, driving direction information of AF, etc. is always sent from body 11 to lens 51 by means of this command, before actuating AF and after changing driving direction.

Figure 28:
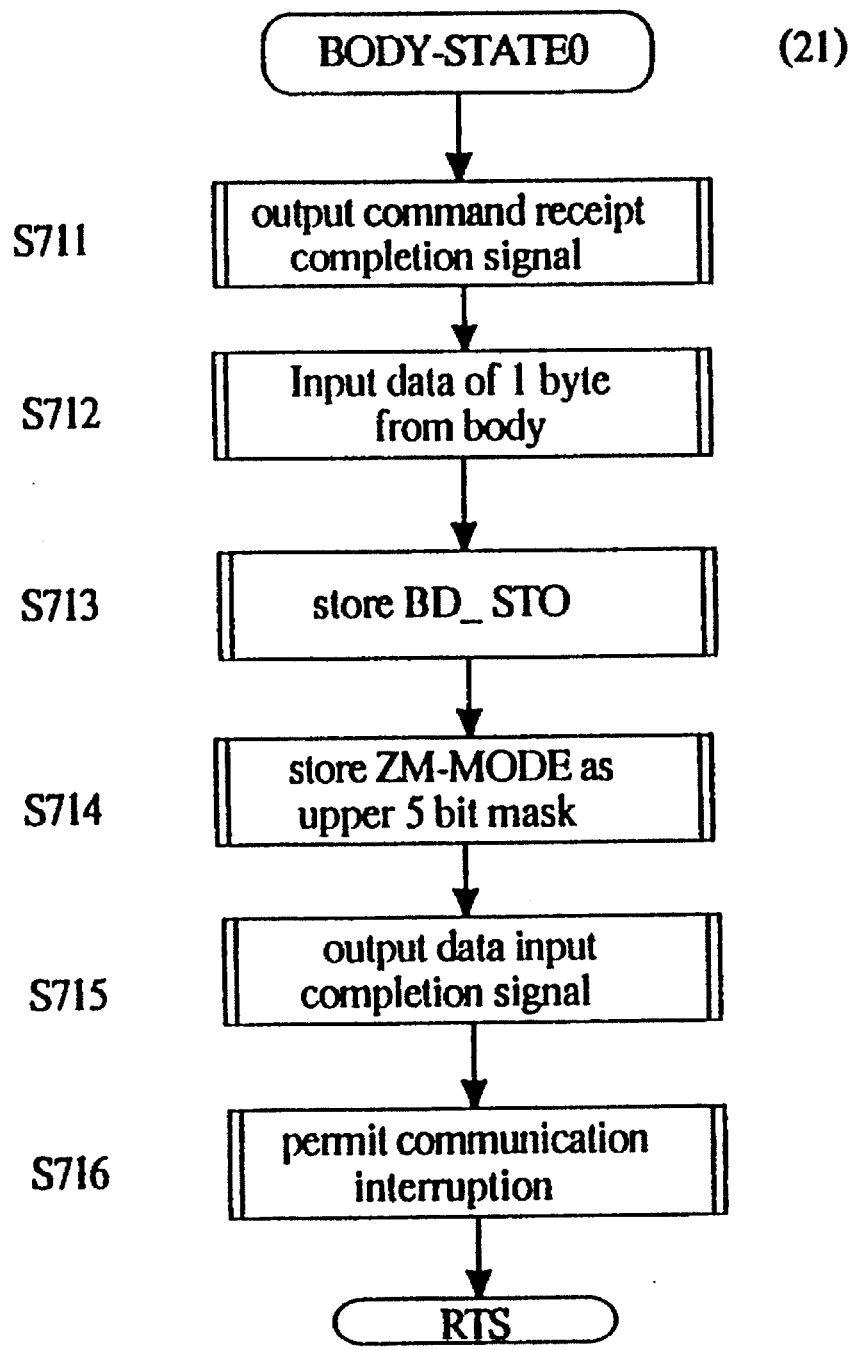
FIG. 28 is a flow chart effective upon receipt of input regarding condition of a camera body.

BODY-STATE0 is a command which informs the photographing lens of data regarding the state or condition of the body. This command is sent during periodical communication between the photographing lens and camera body. A flow chart regarding an operation upon receipt of the BODY-STATE0 command is shown in FIG. 28.

When the BODY-STATE0 command is inputted, lens CPU 61 sends a command receipt completion signal, and inputs data (BODY-STATE0) of 1 byte regarding the status of the body 11 from the body so as to store the data in lens RAM 61 at BD_ST0 (S711–S713). When the upper 5 bits of the above 1 byte data are masked and stored in lens RAM 61b at ZM_MODE, a data input completion signal is outputted and communication interruption is permitted. The process is then returned (S714–S716).

In the lower 3 bits, BODY-STATE0 data includes information regarding power zooming mode of the camera body 11, such as, constant image magnification ratio (ISZ), during-exposure (EXZ), manual power zooming (MPZ), etc. BODY-STATE0 data includes, in the upper 5 bits, information regarding the ON/OFF status of an electric source of the body circuit system (F_VDD=1), the ON/OFF status of the photometric switch (F_SWS=0), supply of electricity from the body 11 to the zoom motor (F_BATT=1), AF/MF changing switch of the body 11 being AF or MF (F_SWAF), and the mode of AF being single or continuous (F_MAF).

Figure 29:
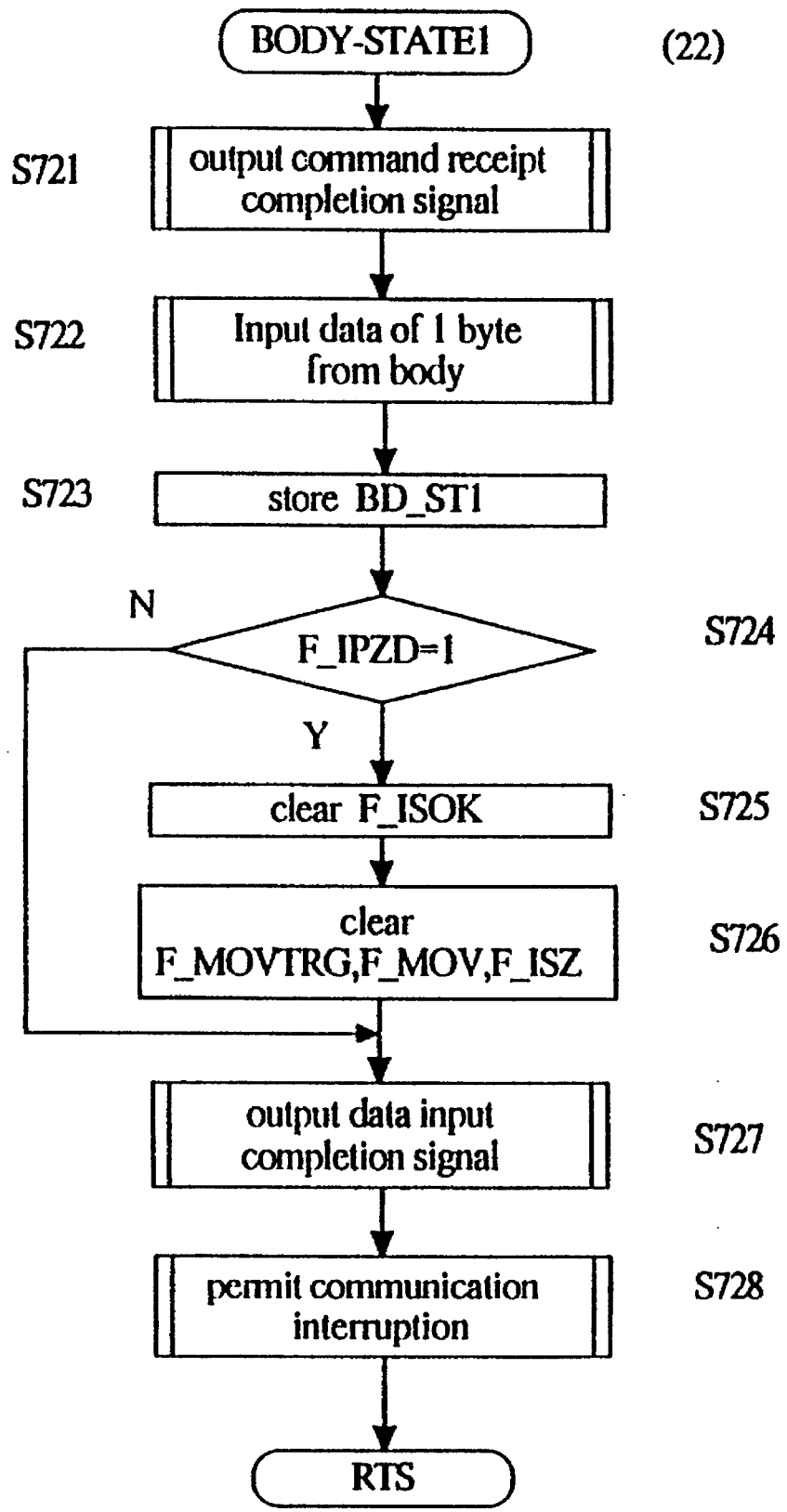
FIG. 29 is a flow chart effective upon receipt of input regarding body sequence information.

BODY-STATE1 is a command which sends data regarding the status of the camera body 11, similar to those in BODY-STATE0 command. This command includes information regarding the status of sequence of operations of the camera body 11. A flow chart regarding an operation upon receipt of BODY-STATE1 command is shown in FIG. 29.

Upon receipt of the BODY-STATE1 command, the lens CPU 61 sends command receipt completion signal and inputs data (BODY-STATE1) of 1 byte from the body 11 so as to store them in lens RAM 61b at BD_ST1 (S721–S723). If flag F_IPZD is set, flags F_ISOK, together with flags F_MOVTRG, F_MOV, F_ISZ of address BD_ST1 is cleared. If flag F_IPZD is not set, the above operation is not performed (S724, S725, S726). A data input completion signal is outputted, and then communication interruption is permitted. Finally, the process is returned (S724, S727, S728).

Operation to be performed when flag F_IPZD is set is an operation similar to the IPZ-STOP command of instruction code 35. This command causes the lens CPU 61 to receive information regarding the body and to perform IPZ-STOP command. Flags relating to the command will be explained below.

F_IPZD is a flag which identifies whether or not an operation similar to IPZ-STOP is to be performed.

F_MPZD is a flag which identifies whether or not manual power zooming is to be inhibited. When F_MPZD is set, manual power zooming is inhibited. Flag F_MPZD is referred to during the 2 ms timer interruption operation.

F_ISZD is a flag which identifies whether or not ISZ is to be controlled on the basis of AF pulse number of the present position (during focusing) or on the basis of focal length obtained from predictor amount. This flag is referred to during a subroutine of ISZ (S541 in FIG. 18).

Figure 18:
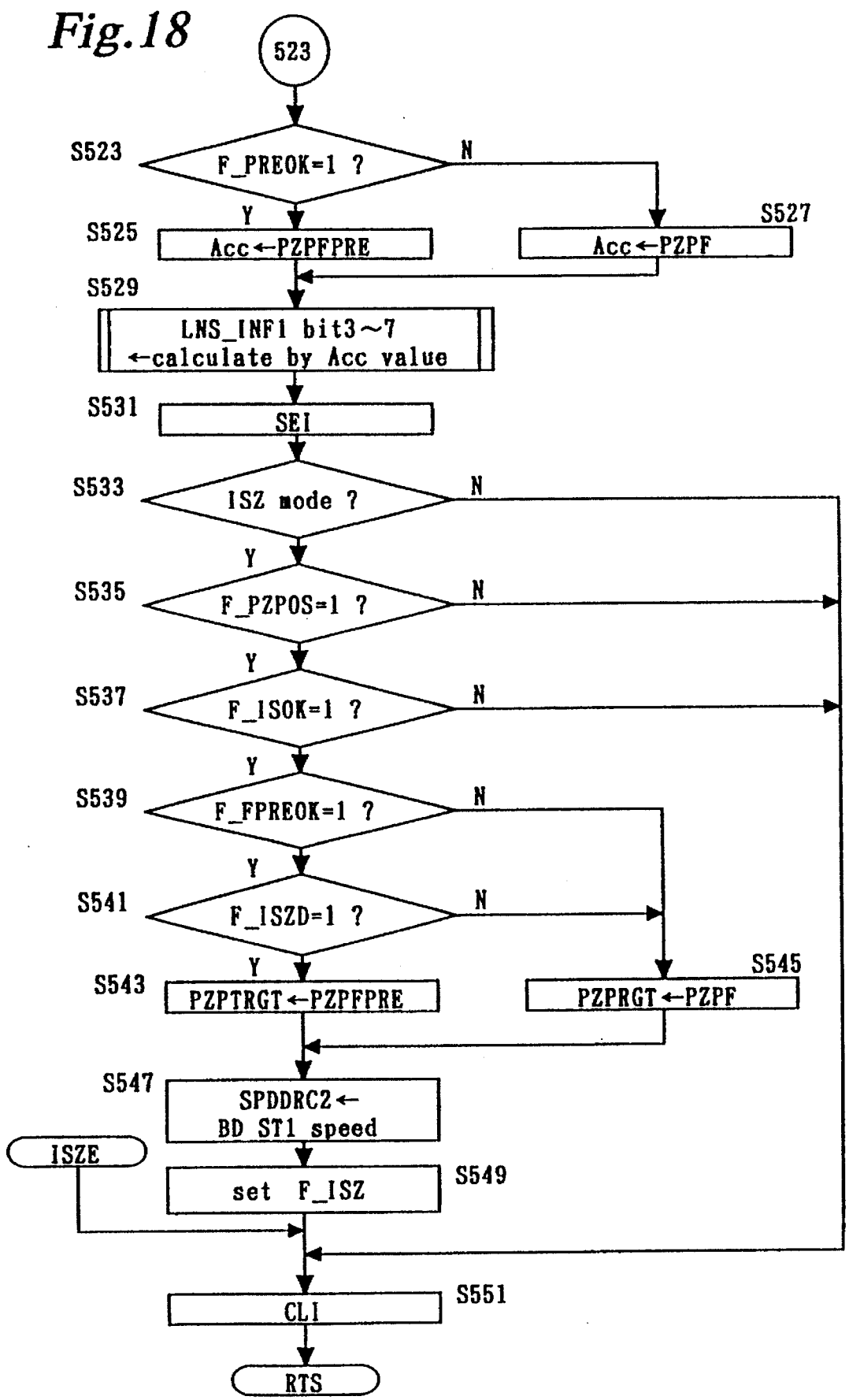

F_ISSPA and F_ISSPB are flags which identify the control speed of ISZ and are referred to in S547 in FIG. 18.

Figure 30:
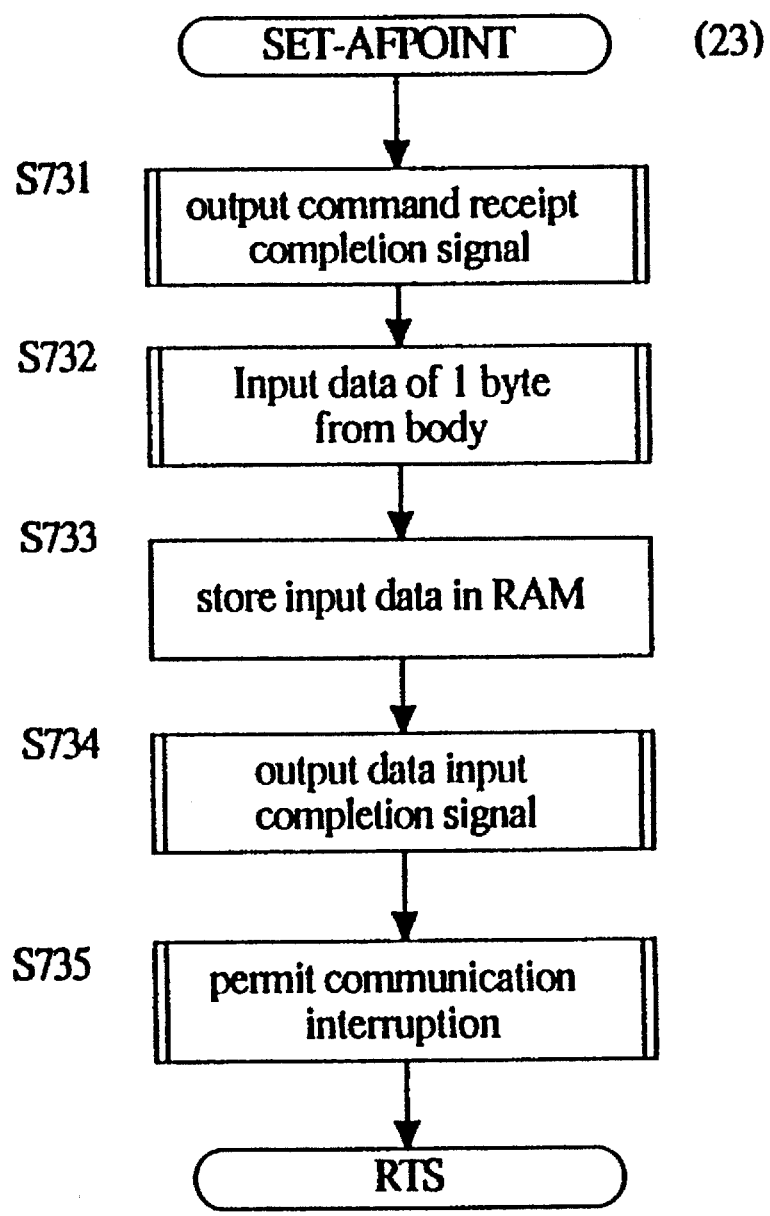
FIG. 30 is a flow chart effective upon receipt of input regarding AF pulse from the camera body side.

A flow chart regarding an operation upon receipt of SET-AFPOINT command is shown in FIG. 30.

Lens CPU 61 inputs SET-AFPOINT command (23), outputs a command receipt completion signal, receives SET-AFPOINT data of 1 byte from the body side, so as to set them in lens RAM 61b at a predetermined address, outputs a data input completion signal and permits communication interruption. The process is then returned (S731–S735).

SET-AFPOINT command is performed before communication of LB command and LENS-AFPULSE (15).

LENS-AFPULSE command determines which AFPULSE is to be sent from lens 51 to body 11, depending upon information sent by SET-AFPOINT command.

When bit3 (X) is set, AF pulse (AFPULSE (AFPXL,H)) of the present position is sent.

When bit7 (ISZM) is set, AF pulse number (AFPUSE (ISZ_AFPL,H)), obtained when image magnification ratio is stored during ISZ mode, is sent. It is to be noted that it is impossible for bit3 and bit7 to be set at the same time.

Neither bit3 nor bit7 is set, bits 4 through 6 (FM0, FM1, FM2) become effective.

8 segments (0–7) for memorizing AF pulse data are provided in the lens RAM 61b of lens CPU 61 (AFPOL, H–AFP7L,H). AF pulse data may be stored in respective segments by means of a command from the body 11. Three bits of bit 4 through 6 designate addresses 0 to 7. AF pulse data memorized in such addresses will be transmitted. This command only serves to designate one of the AF pulse data to be sent to the body 11 in LENS-AFPULSE (15).

Figure 31:
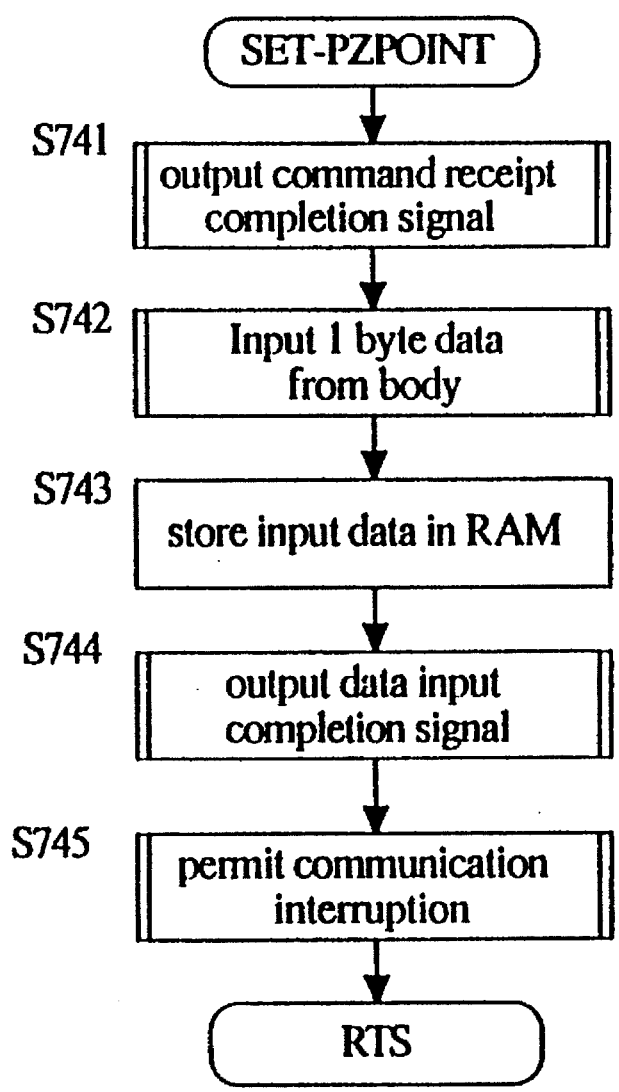
FIG. 31 is a flow chart effective upon receipt of input regarding PZ pulse from the camera body.

A flow chart regarding an operation upon receipt of SET-PZPOINT command is shown in FIG. 31.

When SET-PZPOINT command (24) is inputted, lens CPU 61 outputs a command receipt completion signal, receives SET-PZPOINT data from the body side and sets the same in the lens RAM 61b at a predetermined address, outputs a data input completion signal, and permits communication interruption. The process is then returned (S741–S745).

The SET-AFPOINT command is performed before communication of the LB command and FOCALLEN-X(16).

The LENS-AFPULSE command determines, on the basis of information sent by SET-PZPOINT command, whether focal length data of the present position or the focal length obtained when image magnification ratio is memorized during ISZ mode is to be sent to the body 11.

When bit3 (X) is set, focal length data (FCLXL,H) of the present position is sent.

When bit7 (ISZM) is set, focal length (focal length (ISZ_FCLL,H) of ISZ memory) obtained when image magnification ratio is stored during ISZ mode is sent. It is to be noted that it is impossible for bit3 and bit7 to be set at the same time.

When neither bit3 nor bit7 is set, bits 4 through 6 (FM0, FM1, FM2) become effective.

8 segments (0–7) for memorizing focal length are provided in lens RAM 61b (FCL0L,H–FCL7L,H). Focal length may be stored in respective segments by means of SET-PZPOINT command from the body 11. Three bits of bit 4 through 6 designate addresses 0 to 7. The focal lengths memorized in such addresses will be transmitted. This command only serves to designate one of the focal lengths to be sent to the body 11 in FOCALLEN-X (16).

Figure 32:
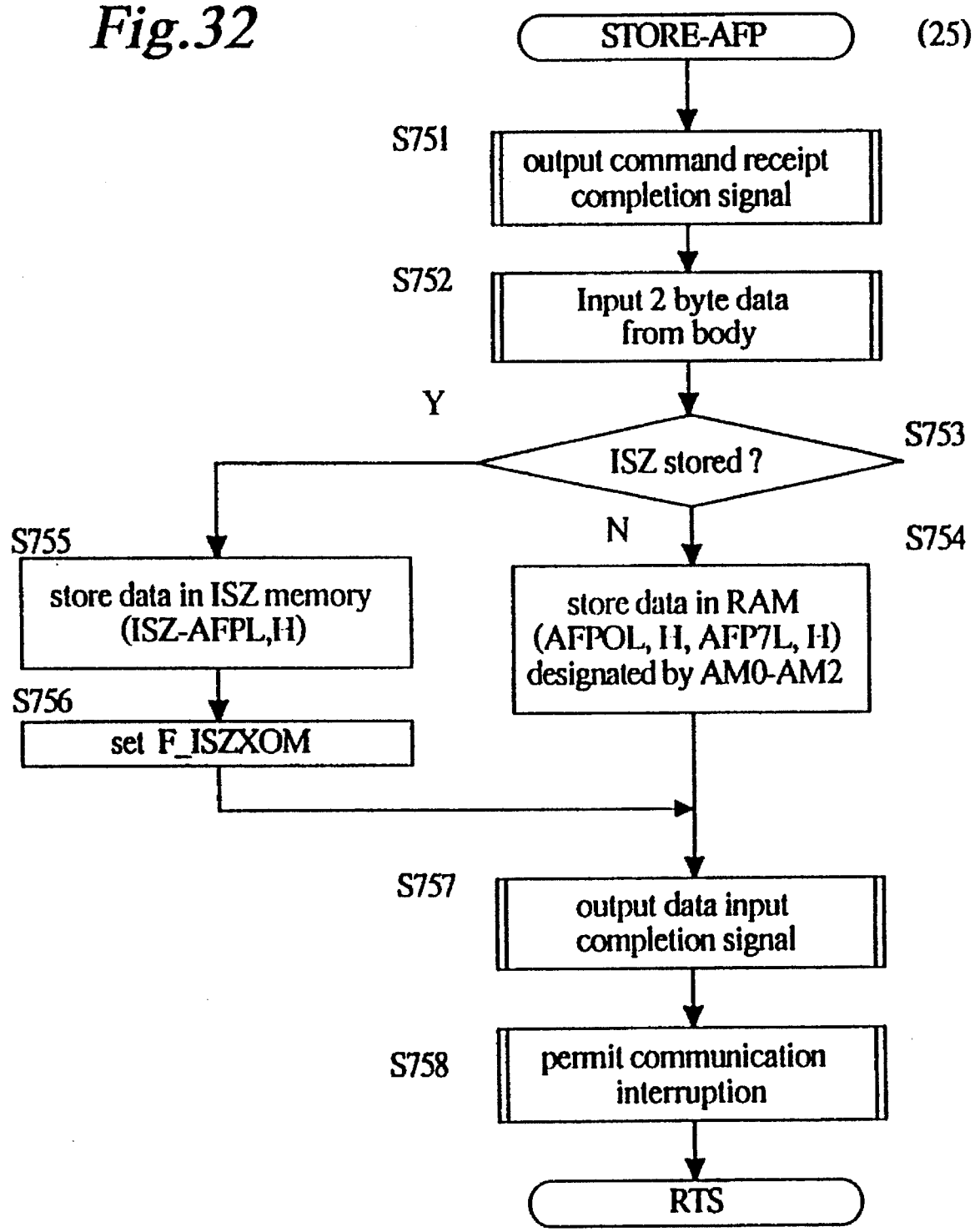
FIG. 32 is a flow chart effective upon receipt of a command which memorizes AF pulse data counted in the lens.

STORE is a command which sets predetermined AF pulse data at a designated address. A flow chart regarding an operation upon receipt of STORE-AFP command is shown in FIG. 32.

Lens CPU 61, upon receipt of STORE-AF command (25), outputs a command receipt completion signal and inputs data of 2 bytes from the camera body 11 (S751, S752). If one of the bits is not ISZ memory (ISZM=0), the input data is stored in lens RAM 61b at address (AFPOL,H–AFP7L,H), designated by AM0–AM 2 of the data. The data is otherwise (ISZM=1), and is stored in the ISZ memory (ISZ-AFPL,H) of lens RAM 61b (S751–S756). ISZ operational flag F_ISZXOM is set, data input completion signal is outputted, and communication interruption is permitted. The process is then returned (S757–S758).

Figure 33:
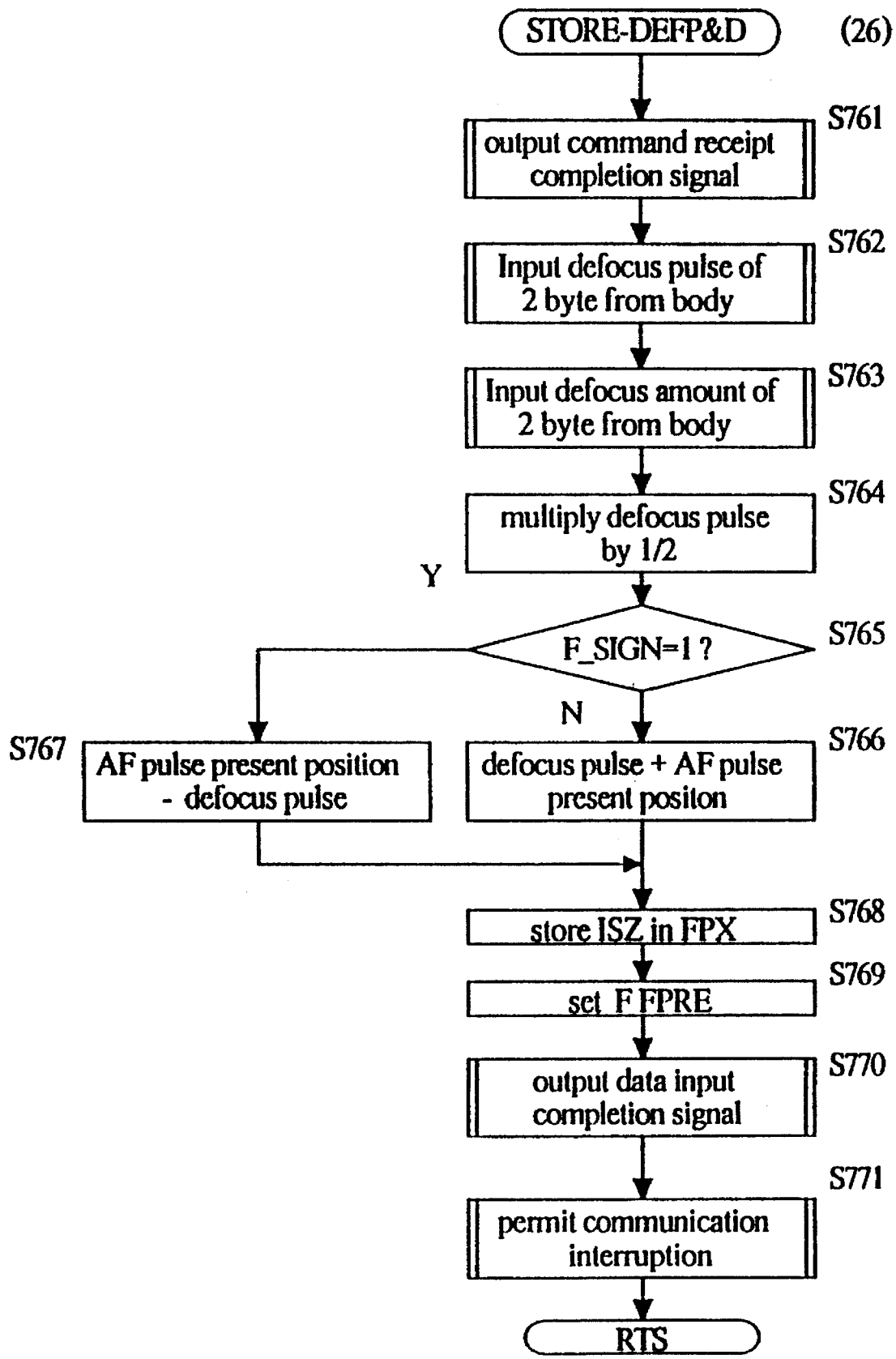
FIG. 33 is a flow chart regarding an operation for storing defocus amount, determined by AF on the body side, in a lens memory.

STORE-DEFP&D (26) is a command which causes lens RAM 61b to store defocus amount and defocal pulse regarding camera body 11. A flow chart regarding an operation upon receipt of the STORE-DEFP&D command is shown in FIG. 33.

Lens CPU 61, upon receipt of STORE-DEFP&D command, outputs a command input completion signal, and inputs defocus pulse data of 2 bytes and defocus amount data of 2 bytes from the camera body 11. The thusly inputted defocus pulse is multiplied by ½ (S761–S764). In the illustrated embodiment, since the ratio of body AF pulse to lens AF pulse is 2:1, input defocus pulse is multiplied by ½. The ratio may be set as desired.

If flag F_SIGN has been cleared, the defocus pulse number is added to the present AF pulse number so as to store the added value in ISZ_FPX. If flag F_SIGN has not been cleared, the defocus pulse number is subtracted from the present AF pulse number and the subtracted value is stored in ISZ_FPX. When flag F_SIGN=1, the defocus amount is toward the FAR end, and when F_SIGN=0, the defocus amount is toward the NEAR end. Then, flag F_FREE is set, a data input completion signal is outputted, and communication interruption is permitted. The process is then returned (S765–S771). Defocus pulse transmitted by means of communication as described above is used in ISZ operation routine so as to obtain objective focal length by utilizing defocus pulse. Flag F_FREE is a flag which gives an indication to perform an operation using a predictor amount.

STORE-PZP (27) is a command which causes present AF position (position of focusing lens or focusing object distance) and present position of PZ (position of group of zooming lenses 53Z or focal length) to be stored in a designated memory (address).

STORE-PZF is a command which causes the focal length designated by camera body 11 to be stored at a predetermined address.

Figure 34:
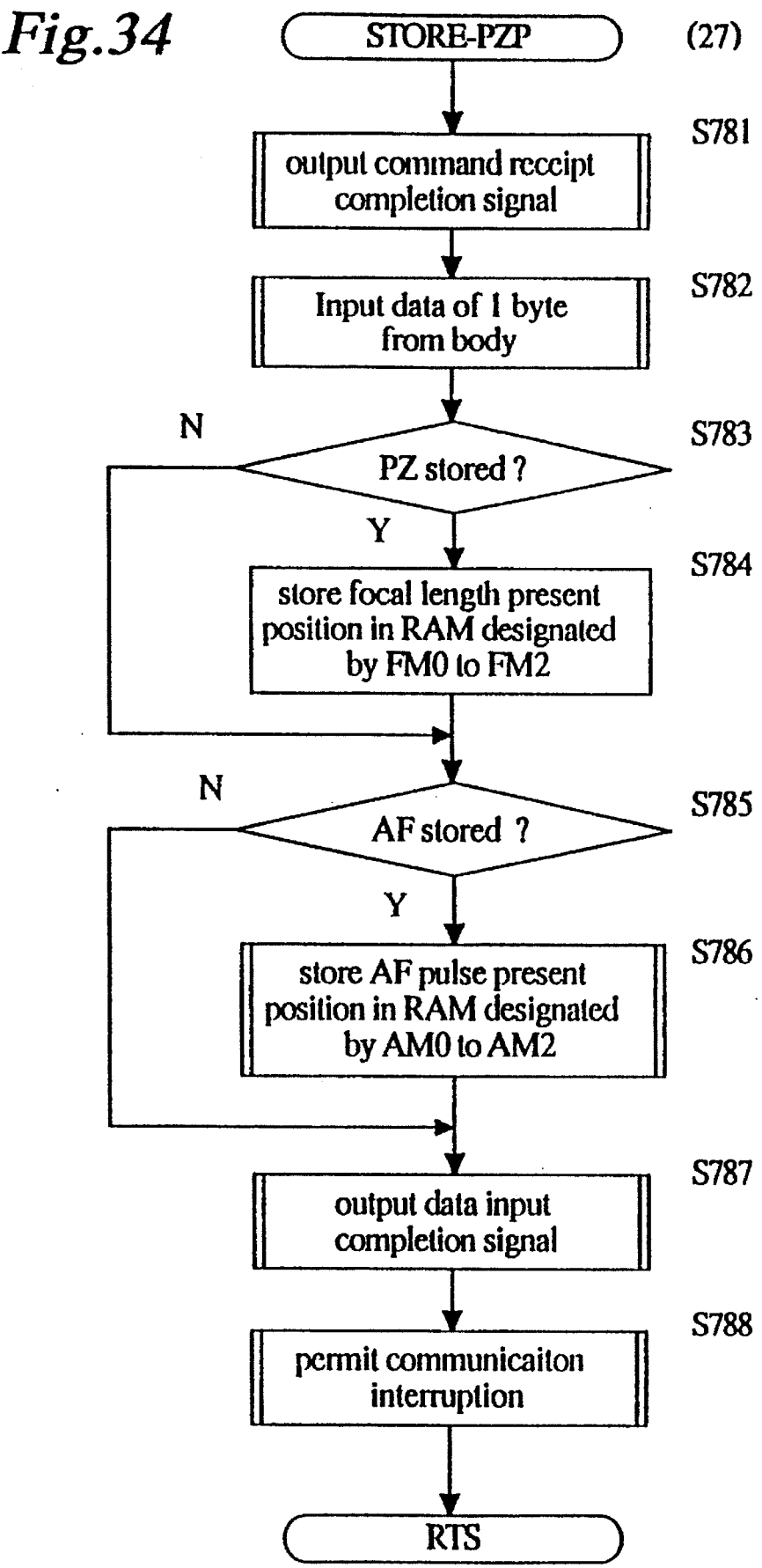
FIG. 34 is a flow chart regarding a storing operation for designated PZ pulse data and focal length data.

A flow chart regarding an operation upon receipt of the STORE-PZP command is shown in FIG. 34.

Lens CPU 61, upon receipt of the STORE-PZP command, outputs a command receipt completion signal and inputs data of 1 byte from the camera body 11 (S781, S782). If PZ memory is designated (when PZM flag is set), focal length data of the present position is stored in the address (FCL0L, H–FCL7L,H designated by FM0–FM2, otherwise the focal length data is not stored (S783, S784).

If AF memory is designated (when AFM flag is set), an AF pulse number of the present position is stored in the address (AFP0L,H–AFP7L,H) designated by AM0–AM2. Otherwise, a data input completion signal is simply outputted, while permitting communication interruption. The process is then returned (S785–S788).

Figure 35:
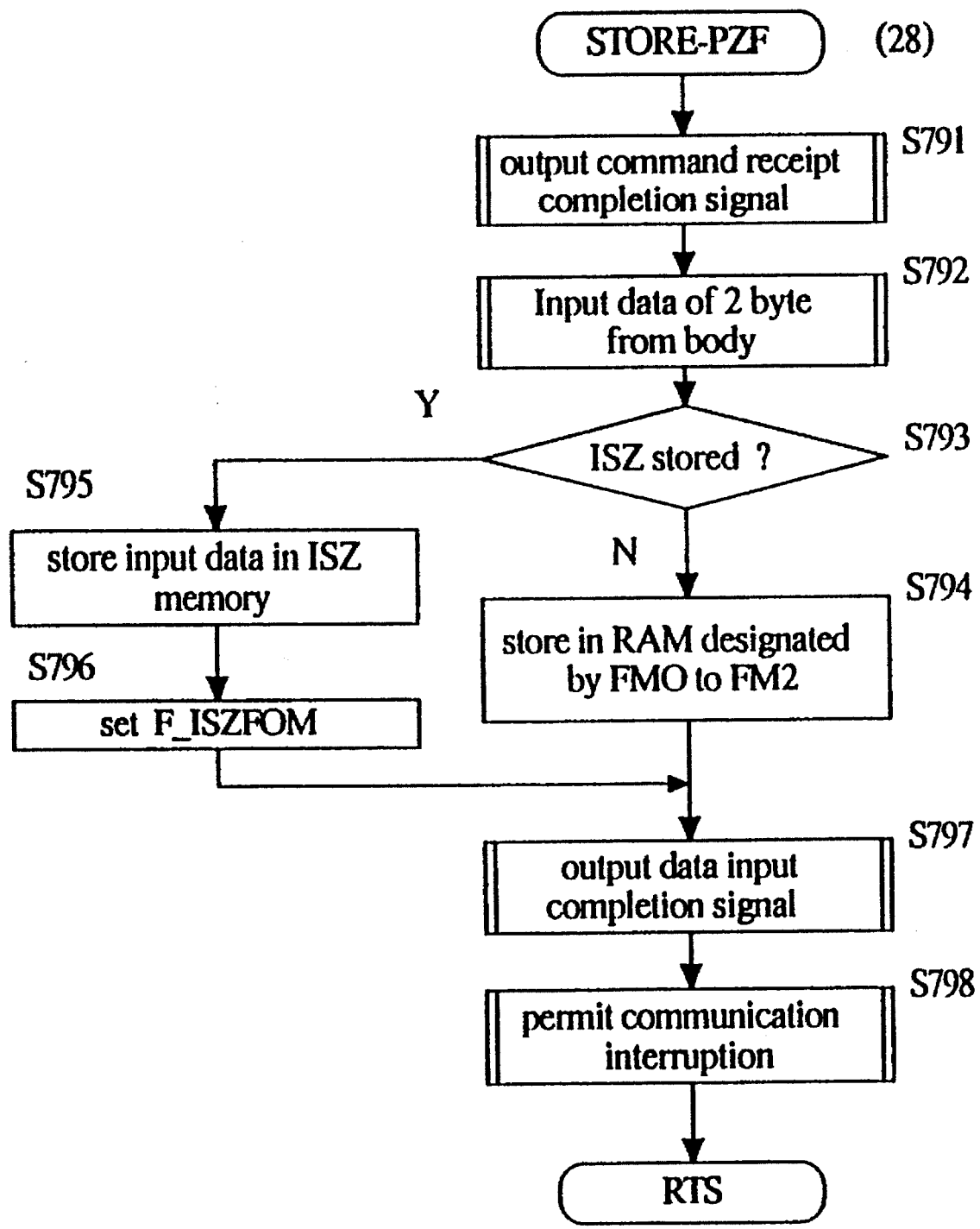
FIG. 35 is a flow chart regarding an operation for storing defocus amount obtained in the AF on the body side in the lens memory.

A flow chart regarding an operation upon receipt of STORE-PZF command is shown in FIG. 35.

Lens CPU 61, upon receipt of a STORE-PZF command, inputs data of 2 bytes from the camera body. If this command is not ISZ memory (if flag F_ISZM is not set), the thusly inputted data of 2 bytes are stored in lens RAM 61b at address (FCL0L,H–FCL7L,H) designated by bits FM0 FM2. If the command is ISZ memory (if ISZM is set), the thusly inputted data is stored in ISZ memory and a flag F_ISZFOM, which performs operation on the basis of focal length, is set up (S791–S796). A data input completion signal is outputted and communication interruption is permitted. The process is then returned (S797–S798).

Figure 36:
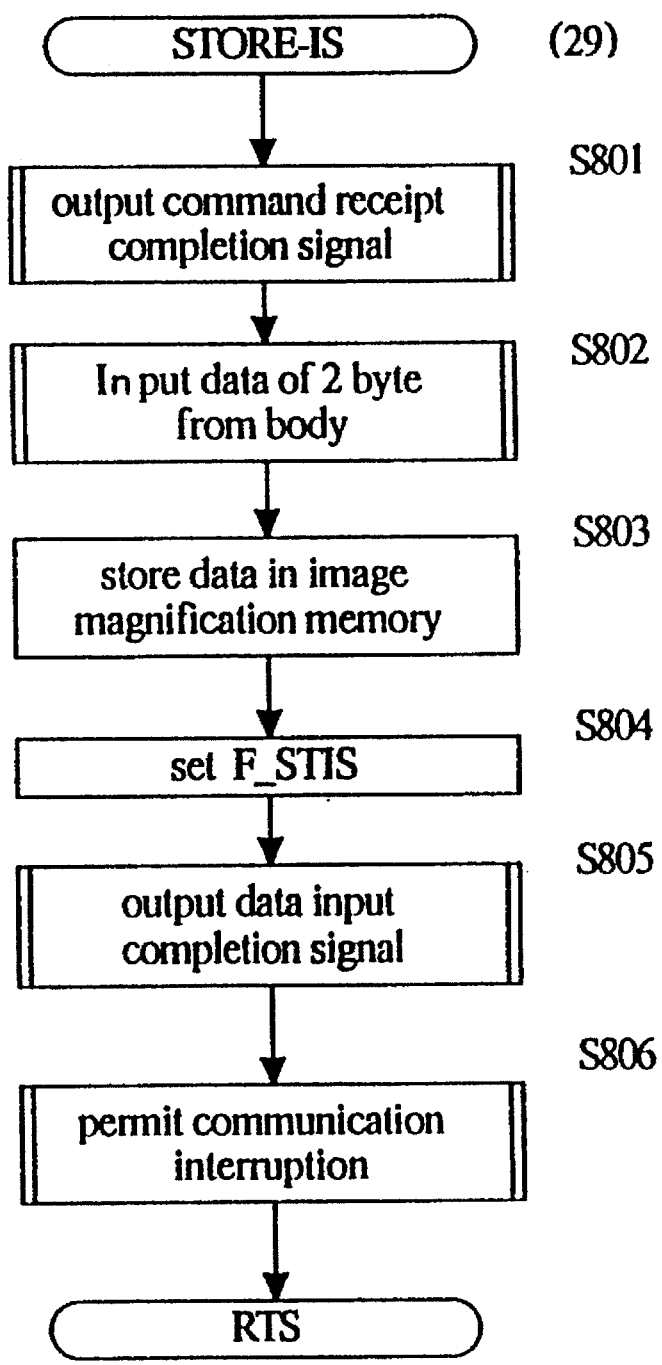
FIG. 36 is a flow chart regarding an operation for storing constant image magnification zooming data received from the camera body.

STORE-IS (29) is a command which causes the image magnification ratio memory (address ISZ-IMGL,H of lens RAM 61b) to store an image magnification ratio. A flow chart regarding an operation upon receipt of the STORE-IS command is shown in FIG. 36.

Lens CPU 61, upon receipt of the STORE-IS command, outputs a command receipt completion signal, inputs data of 2 bytes regarding an image magnification ratio from the camera body 11, stores the data in an image magnification ratio memory (ISZ-IMGL,H), and sets flag F_STIS (S801–S804). The data input completion signal is outputted and communication interruption is permitted. The process is then returned (S805–S806). Flag F_STIS is a flag which performs in an operation of image magnification constant zooming in accordance with the image magnification ratio sent from the camera body.

MOVE-PZMD (2A) is a command which causes power zooming in the designated direction or toward a focal length in the designated memory (address in lens RAM 61b).

MOVE-PZF (2B) is a command which performs power zooming to a designated focal length, for example, to a focal length calculated in the camera body 11. The data of this command includes data regarding focal length and zooming speed.

Figure 37:
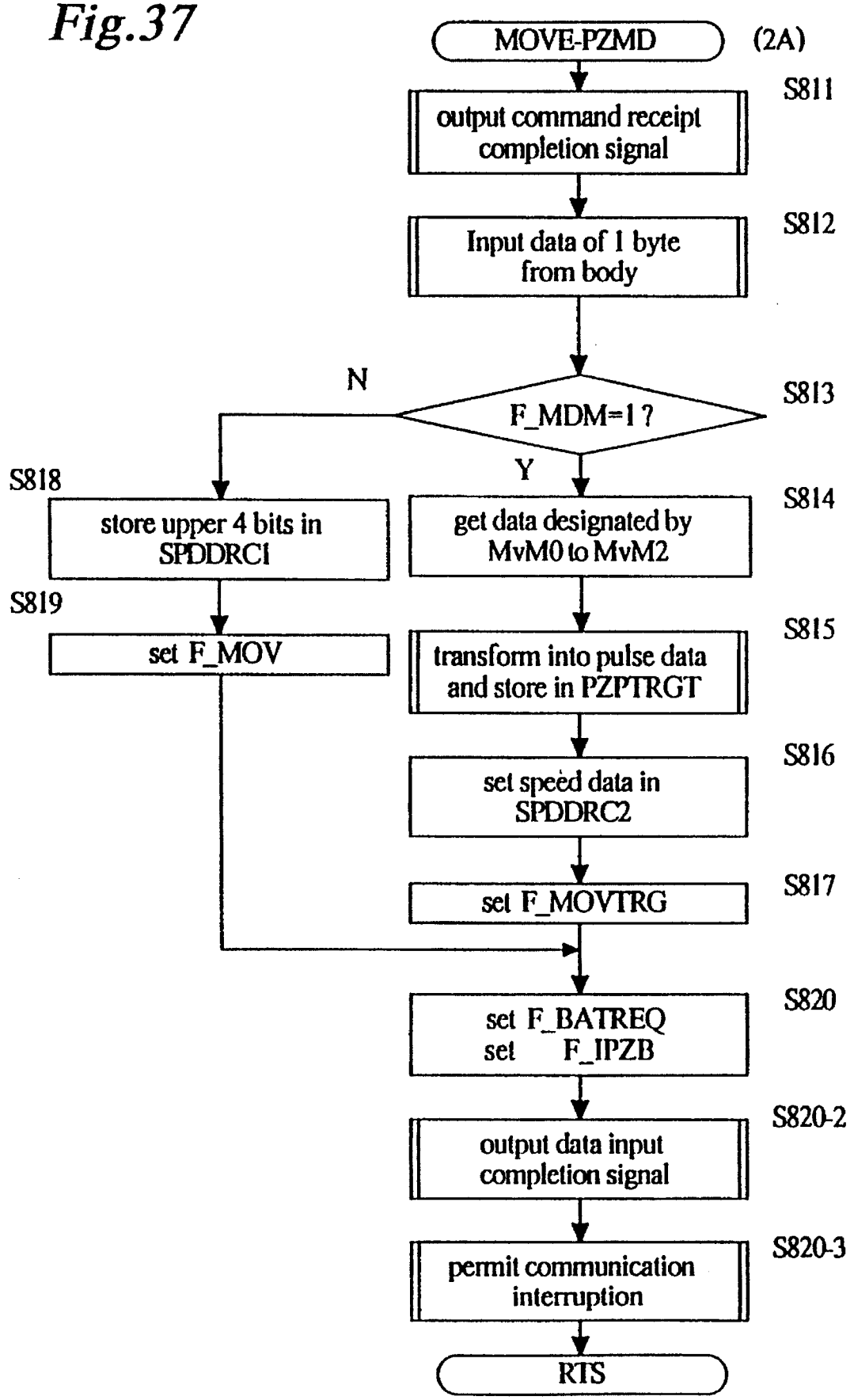
FIG. 37 is a flow chart regarding powered zooming in a designated direction or to a designated position.

A flow chart regarding an operation upon receipt of the MOVE-PZMD command is shown in FIG. 37.

Lens CPU 61, when the MOVE-PZMD command is inputted, outputs a command input completion signal, and inputs data of 1 byte from the camera body 11 (S811–S812). If the flag F_MDM is set in the input data, data is read out from the address (FCL0L,H–FCL7L,H) designated by MVM0–MVM2. The read out data is converted into PZ pulse data and stored in lens RAM 61b at PZPTRGET. Driving speed data (F_SPA, F_SPB of bits 6 and 7) is stored in SPDDRC2, and flag F_MOVTRG is set. If flag F_MDM is not set, the upper 4 bits of the input data are stored in address SPDDRC1 and flag F_MOV is set (S813–S819). These data are referred to in the 2 ms timer interruption routine so as to perform power zooming in a designated manner.

When flags F_LBATREQ and F_IPZB are set a, data input completion signal is outputted and communication interruption is permitted. The process is then returned (S820–S820-2). If flag F_MDM (bit3) is set, the command is to perform power zooming toward the focal length stored in the designated memory. If flag F_MDM is not set, the command is to perform power zooming in a direction designated by flag F_MDT and F_MDW (bits 4 and 5). Flag F_MDT designates driving in the TELE direction, flag F_MDW designates driving in the WIDE direction, and flags F_SPA and F_SPB (bits 6 and 7) designate zooming speed.

Figure 38:
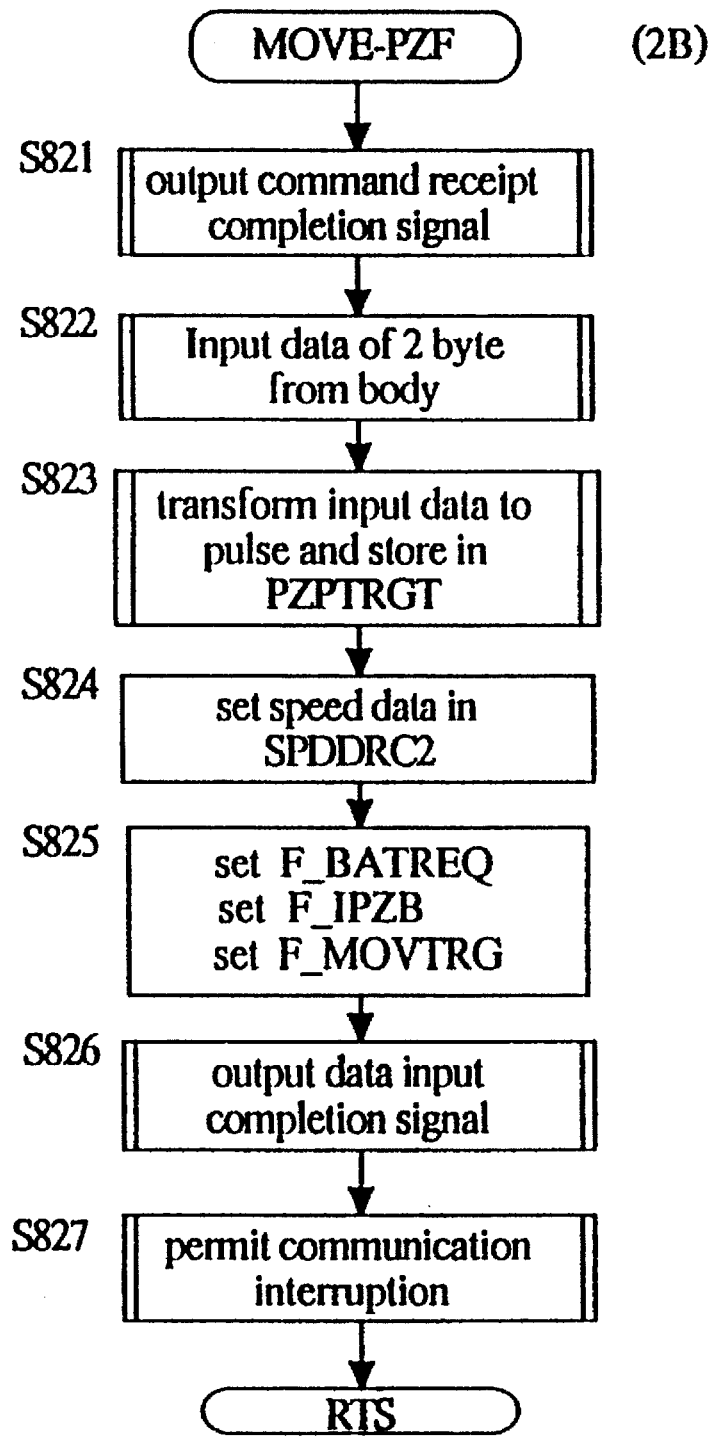
FIG. 38 is a flow chart regarding the powered zooming operation based on the data designated by the camera body.
Figure 39:
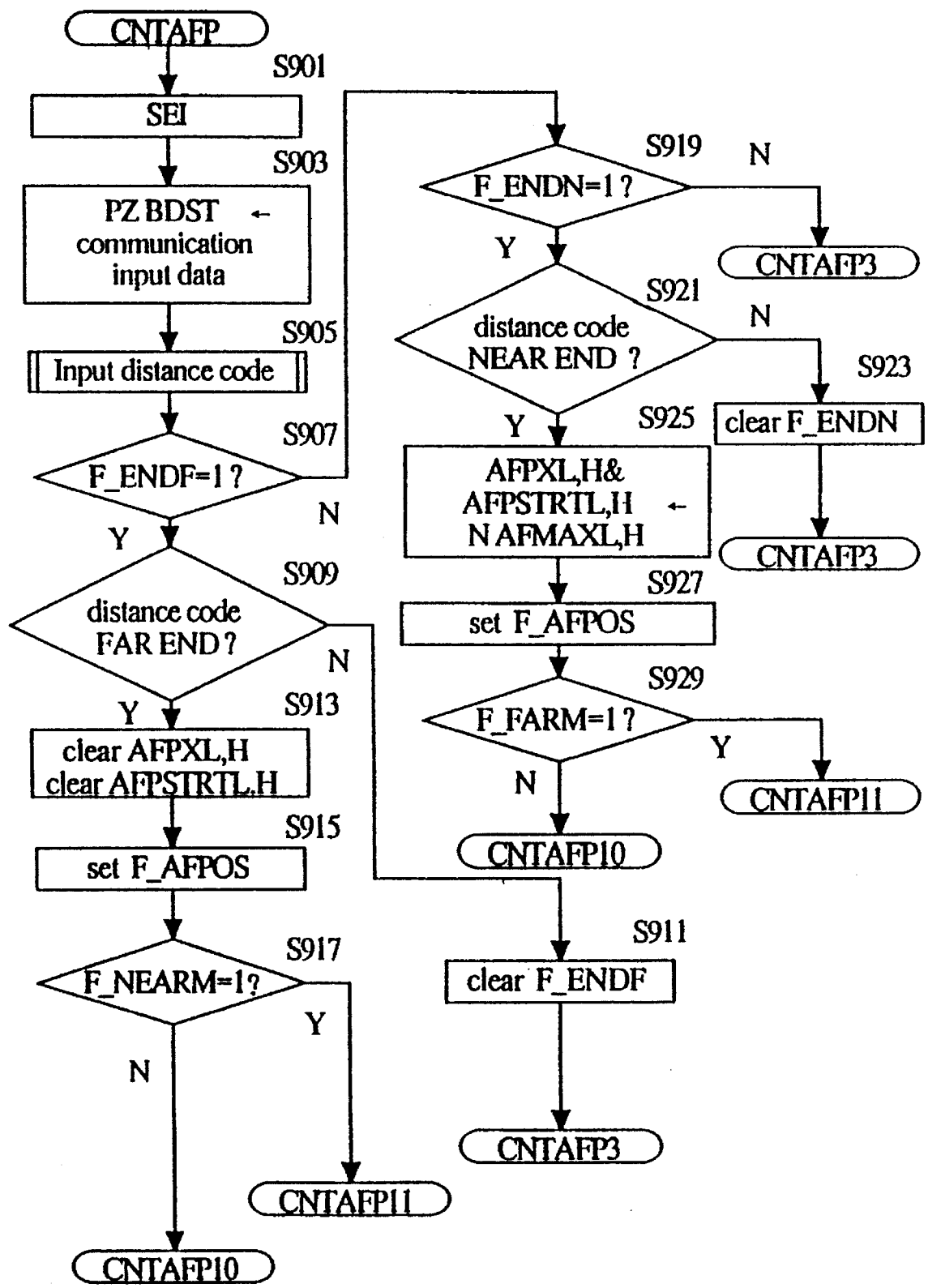
FIGS. 39, 40, 41, 42 and 43 are a lens flow chart regarding an AF pulse count operation.

A flow chart regarding an operation upon receipt of MOVE-PZF command is shown in FIG. 38.

Lens CPU 61, when the MOVE-PZf command is inputted, outputs a command receipt completion signal, inputs focal length data of 2 bytes from camera body 11, converts input focal length data into PZ pulse data so as to store the same in the lens RAM 61b at address PZPTRGT, sets speed data in SPDDRC2, and sets flags F_BATREQ, F_IPZB, F_MOVTRG. These data are referred to in the 2 ms timer interruption routine so as to perform power zooming in a designated manner. A data input completion signal is outputted and communication interruption is permitted. The process is then returned (S821–S827).

CNTAF OPERATION

An AF pulse count operation in the photographing lens 51 will be explained below with reference to the flow charts shown in FIGS. 39 to 43. This count operation is a detail of an operation executed in S703 by means of the PZ-BSTATE command (20) shown in FIG. 27. In the illustrated embodiment, the value of the AF pulse counter is cleared (set to zero) when the focusing lens 53F reaches the FAR end (infinite photographing position). On the other hand, a maximum value is set at the AF pulse counter when the focusing lens reaches the NEAR end (closest photographing position). In the case of NEAR MOVE (driven toward closest distance), the AF pulse outputted from AF pulser 59 is added thereto. In the case of FAR MOVE (driven toward infinite), the AF pulse is subtracted therefrom.

Interruption is inhibited, data inputted during communication is stored at address PZ_BDST, and the present distance code is inputted from the distance code plate 81 (S901 S905).

If flag F_ENDF to identify FAR END (infinite position) is set, it is checked if the inputted distance code is a code of the FAR END (S907–S909). If the distance code is FAR END, the present AF pulse value and AF pulse count start value (address AFPZL,H, AFPSTRTL,H) are cleared and a flag F_AFPOS is set up to indicate that the AF pulse of the present position is known (S909, S913, S915). If a flag F_NEARM to identify NEAR MOVE is cleared, the process jumps to CNTAFP10 operation. If an F_NEARM flag is set, the process jumps to a CNTAFP11 operation, since the driving direction is to be changed (S917). If the detected distance code is not the FAR END code, far end flag F_ENDF is cleared and the process jumps to a CNTAFP3 operation (S909 and S911).

If the far end flag F_ENDF is cleared, the near end flag F_ENDN, which identifies the near end (closest focusing position) is checked. If the near end flag is cleared, the process proceeds to CNTAFP3 (S919).

If the near end flag F_ENDN is set, the process checks if the distance code is a near end code. If it is not a near end code, the far end flag F_ENDN is cleared and the process proceeds to a CNTAFP3 operation (S919–S923). If the distance code is the near end, the AF pulse count value and AF pulse count star value are set at a maximum (set N_AFMAXL,H at AFPXL,H, AFPSTRTL,H), flag F_AFPOS which identifies that the present AF pulse is known, is set. The process checks if the present status is FAR MOVE (F_FARM=1). If it is FAR MOVE, the process proceeds to a CNTAFP11 operation, otherwise the process proceeds to a CNTAFP10 operation (S925=S929).

As described above, in the case of FAR END (F_ENDF=1) or NEAR END (F_ENDN=1), the count value of AF pulse is corrected by the corresponding predetermined value. If the input distance code is determined to be at neither of ends, the above end point correction is not performed.

Figure 40:
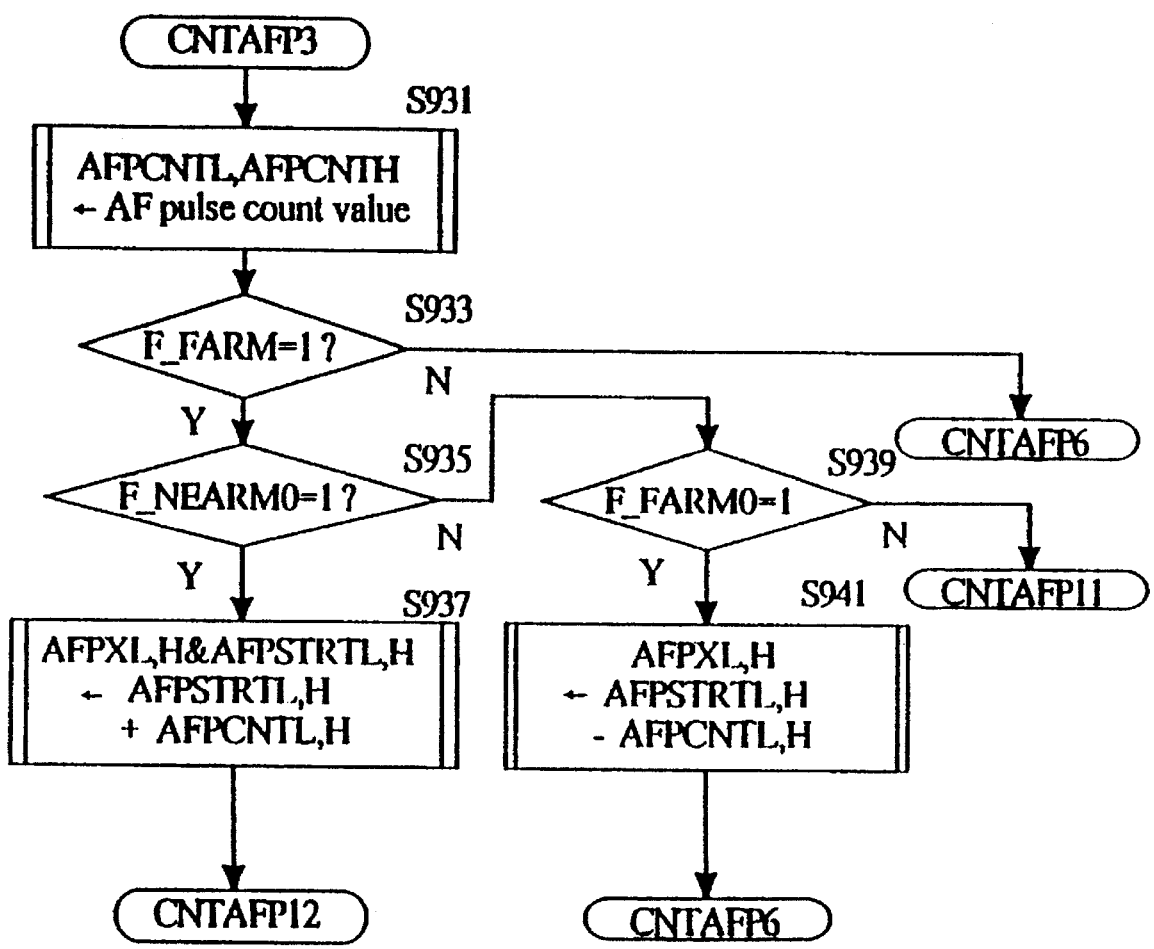

An operation (CNTAFP3 operation) when the group of focusing lenses 53F is positioned between the FAR END and NEAR END will be explained with reference to a flow chart shown in FIG. 40.

First, a counter value, in a hard counter of the present AF pulse, is set in an AF pulse counter (AFPCNTL,H) in steps S931, S933. If flag F_FARM is cleared, the process proceeds to a CNTAF6 operation. If F_FARM flag is set, it is checked if the previous status was NEAR MOVE (i.e., if flag F_NEARM0 is set) in steps S933, S935. If it is determined that the status has been changed from NEAR MOVE to FAR MOVE, an AF pulse count start value (AFPCNTL,H) is added to an AF pulse counter start value (AFPSTRL,H) so as to store it in the AFPXL,H&AFPSTRTL,H memory for present AF pulse value and AF pulse count start value. The process proceeds to a CNTAFP12 operation (S935, S937).

If the previous status was not NEAR MOVE, it is determined if the previous status was FAR MOVE. If it is not the FAR MOVE, i.e., lens was not moved, the process proceeds to CNTAFP11. If the previous status was also FAR MOVE, a count value (AFPCNTL,H) is subtracted from the AF pulse count start value (AFPSTRL,H) so as to store the difference in the present AF pulse value (AFPXL,H), since there is no change in driving direction. Then, the process proceeds to a CNTAFP6 operation (S939, S941).

Figure 41:
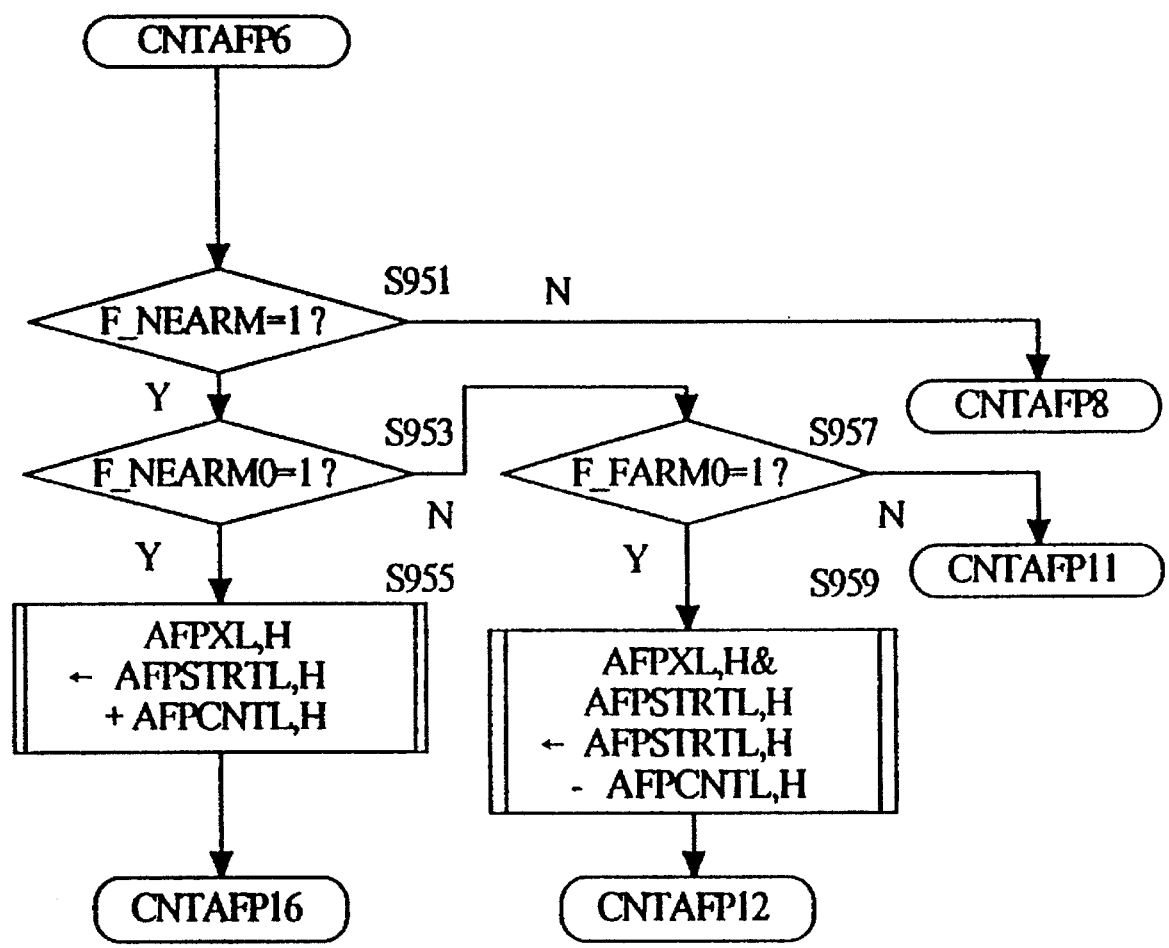

The CNTAFP6 operation, when the present status is not FAR MOVE, will be explained below with reference to the flow chart shown in FIG. 41. It is noted that the CNTAFP6 operation is the first operation that the process enters after start-up.

The process checks it if the status is NEAR MOVE. If not NEAR MOVE, the process proceeds to a CNTAFP8 operation (S951). If NEAR MOVE, the process checks if the previous status was NEAR MOVE. If previous status was also NEAR MOVE, an AF pulse count value (AFPCNTL,H) is added to the AF pulse count start value (AFPSTRTL,H) so as to store the sum in present AF pulse value (AFPXL,H) in steps S953, S955.

If the previous status was not NEAR MOVE, but rather FAR MOVE, this is an indication that the driving direction is to be changed. Accordingly, AFP count value (AFPCNTL, H) is subtracted from the AF pulse count start value (AFP-STRTL,H) so as to store the difference in the AF pulse value and AF pulse count start value (AFPXL,H&AFPSTRTL,H) in steps S958, S959. If the status is not FAR MOVE, the process proceeds to a CNTAFP11 operation (S957).

Figure 42:
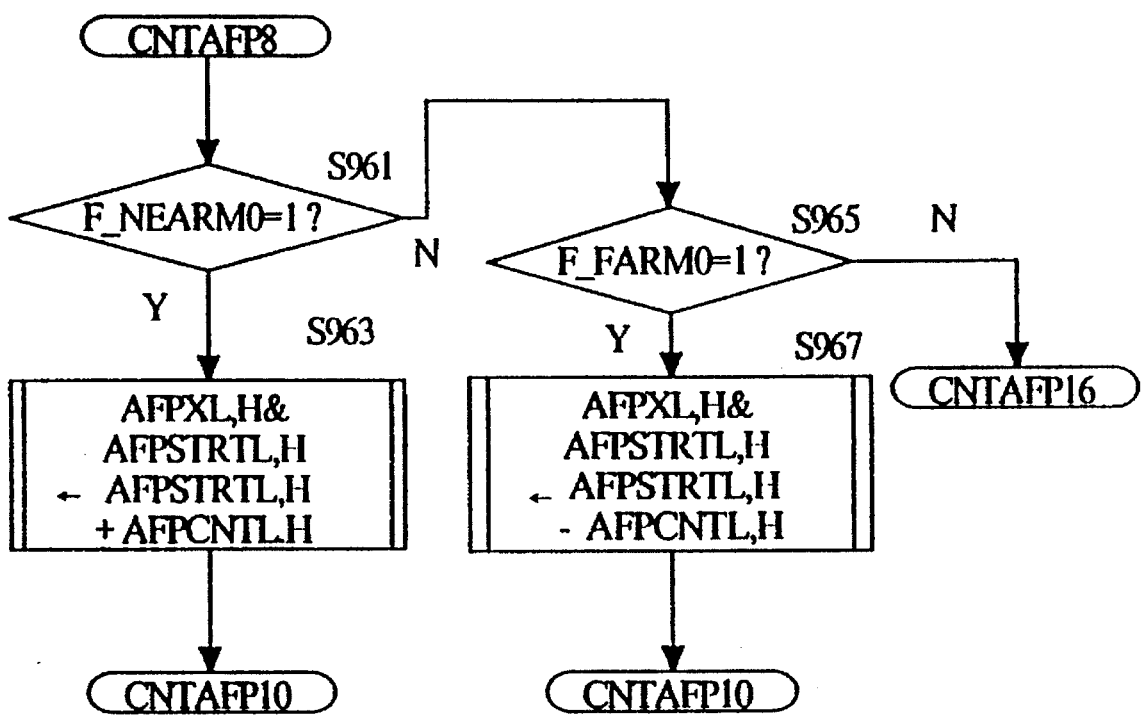

An operation effective upon stopping of the AF motor (CNTAFP8 OPERATION) will be explained below with reference to a flow chart shown in FIG. 42.

In the CNTAFP8 operation, the process first checks if the previous status was NEAR MOVE (S961).

If the previous status was NEAR MOVE, this means that the lens was stopped during NEAR MOVE. Accordingly, an AF pulse count value (AFPCNTL,H) is added to the AF pulse count start value (AFPSTRTL,H) and the sum is stored in the AF pulse value and AF pulse count start value (AFPXL,H & AFPSTRTL,H). The process then proceeds to a CNTAFP10 operation (S961, S963).

If the previous status was FAR MOVE, this means that the lens was stopped during FAR MOVE. Accordingly, an AF pulse count value (AFPCNTL,H) is subtracted from the AF pulse count start value (AFPSTRTL,H) so as to store the difference in present AF pulse value and AF pulse count start value (AFPXL,H & AFPSTRTL,H). The process then proceeds to a CNTAFP10 operation (S961, S965, S967).

If the previous status was not NEAR MOVE nor FAR MOVE, this means that the lens has been stopped. Accordingly, the process proceeds to a CNTAFP16 operation (S961, S965).

Figure 43:
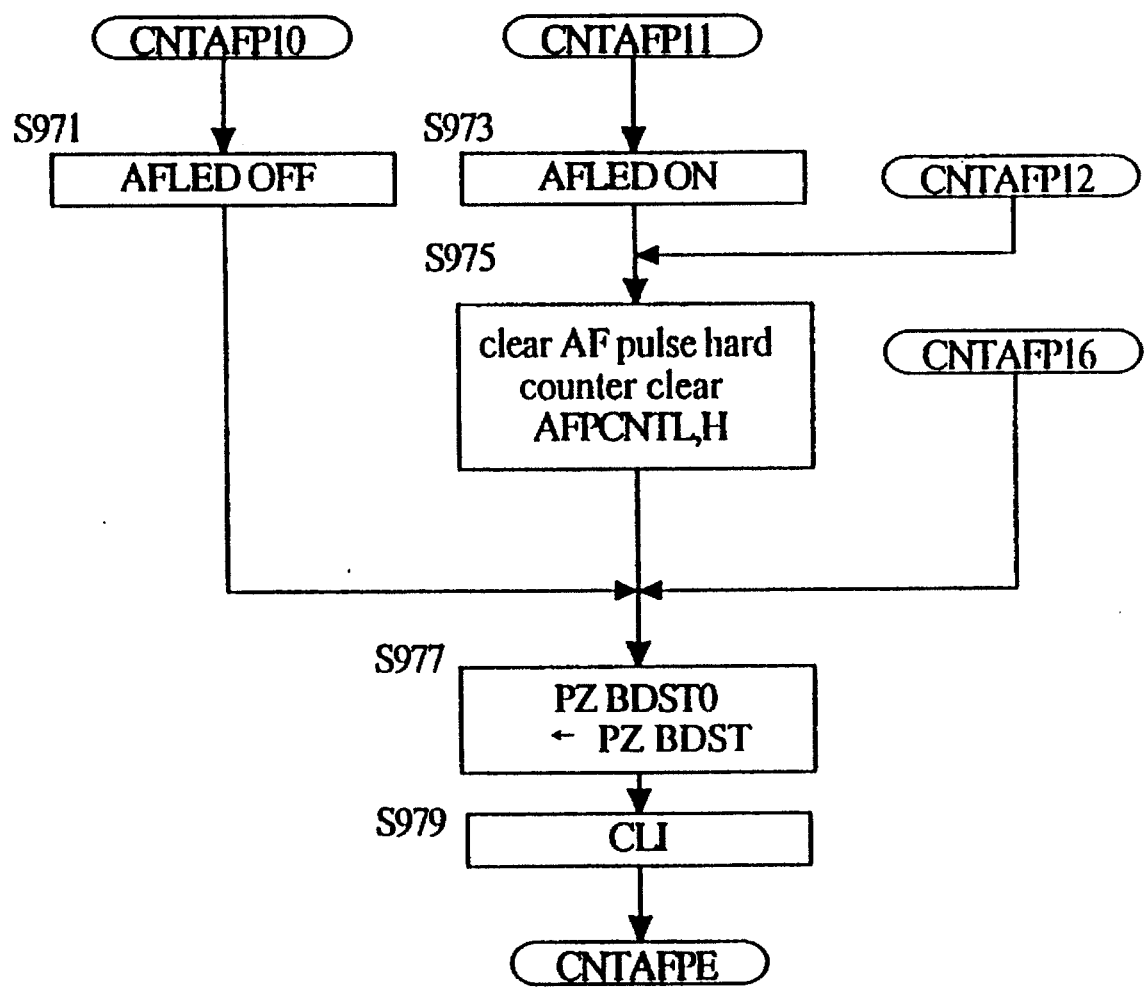

CNTAFP10, 11, 12, 16 operations will be explained below with reference to the flow chart shown in FIG. 43. The process enters CNTAFP10 just after the AF motor 39 has stopped. Accordingly, the LED of the AF pulser 59 is turned off, the content of PZ_BDST is stored in PZ_BDST0, and communication interruption is permitted. The process then passes through the AF pulse count operation (S971, S977, S979).

The process enters a CNTAFP11 operation upon start of AF driving. Accordingly, the LED of AF pulser 59 is turned on, AF pulse hard counter and AF pulse count value memory (AFPCNTL,H) is cleared, content of PZ_BDST memory is transferred to PZ_BDST0, and communication interruption is permitted. The process then passes through an AF pulse count operation (S973, S975, S977, S979).

The process enters a CNTAFP12 operation when driving direction is changed during the actuation of AF. Accordingly, the AF pulse hard counter and AF pulse count value (AFPCNTL,H) are cleared, the content of PZ_BDST memory is transferred to PZ_BDST0, and communication interruption is permitted. The process then passes through an AF pulse count operation (S975, S977, S979).

The process enters a CNTAFP16 operation or processing during movement in the direction of NEAR MOVE or FAR MOVE (S655, S641), or when the AF motor is stopping (S965). Accordingly, content of PZ_BDST is transferred to PZ_BDST0 and communication interruption is permitted. The process then passes through the AF pulse count operation (S977, S979).

LB COMMAND OPERATION

A operation regarding a command which has the power zoom lens 51 send the information of the lens, i.e., state of the lens, to the camera body, in accordance with the demand of the camera body, will be explained below with reference to table 4 and the flow charts shown in FIGS. 44 to 51. Content of the command is shown in Table 4. The flow charts shown in FIGS. 44 to 51 are details of an operation of S209 in a communication interruption routine shown in FIG. 8. An operation will be performed in accordance with the lower bits of the command.

PZ-LSTATE OPERATION

Figure 44:
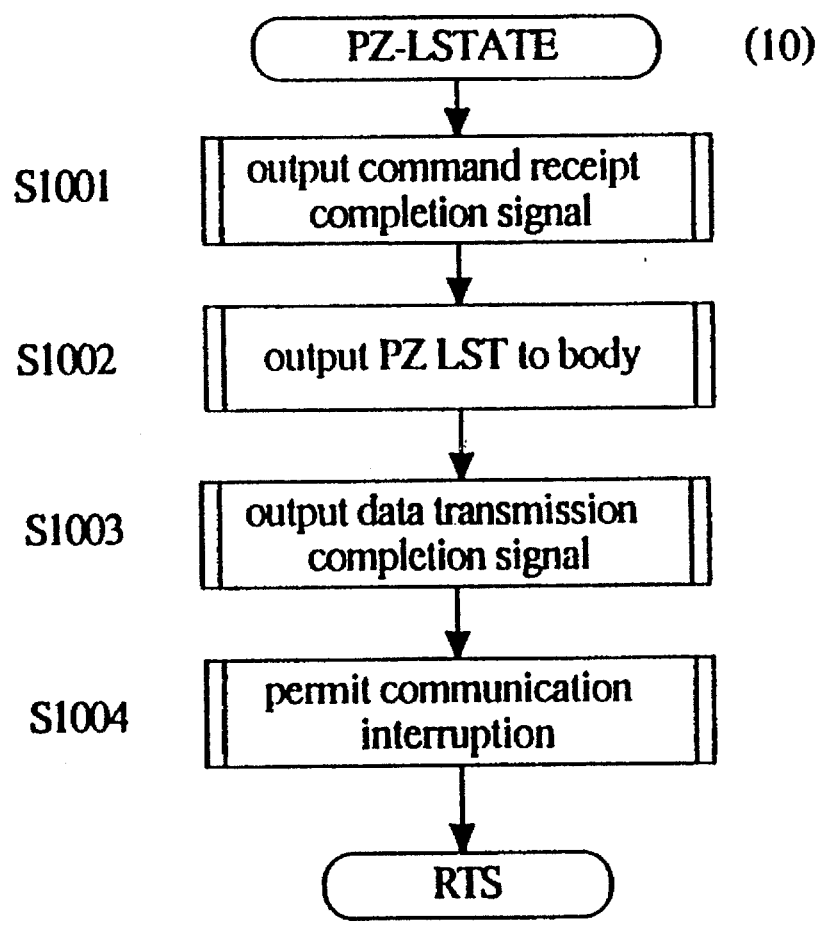
FIG. 44 is a flow chart regarding a transmission operation for the power zooming data on the photographing lens side.

The flow chart shown in FIG. 44 illustrates PZ-LSTATE (10) by which data regarding power zooming control of the power zoom lens 51 is sent to camera body 11. Lens CPU 61, upon receipt of a command requiring a lens state regarding power zooming (PZ-LSTATE), outputs command receipt completion signal and thereafter outputs data regarding the type of power zooming control, (for example, constant image magnification ratio zooming control) to the camera body 11 (S1001, S1002). A data input completion signal is outputted and communication interruption is permitted. The process is then returned (S1003, S1004).

Flags used in this operation will be explained below.

Flag F_TMOV (bit 0) is set when the zoom motor is moving in the TELE direction.

Flag F_WMOV (bit 1) is set when the zoom motor is moving in the WIDE direction.

Flag F_TEND is set when the group of zooming lenses 53Z is positioned at the TELE end.

Flag F_WEND is set when the group of zooming lenses 53Z is positioned at the WIDE end.

Flag F_IPZB is set when power zooming (initializing operation for ISZ, PZ, and retracting operation) is performed in a mode other than the manual power zooming.

Flag F_IPZI is set when manual power zooming is performed during ISZ operation.

Flag F_ISOK is set during ISZ operation.

Flag F_MPZI is set while manual power zooming is being performed.

POFF-STATE, POFFS-WSLEEP OPERATION

Figure 45:
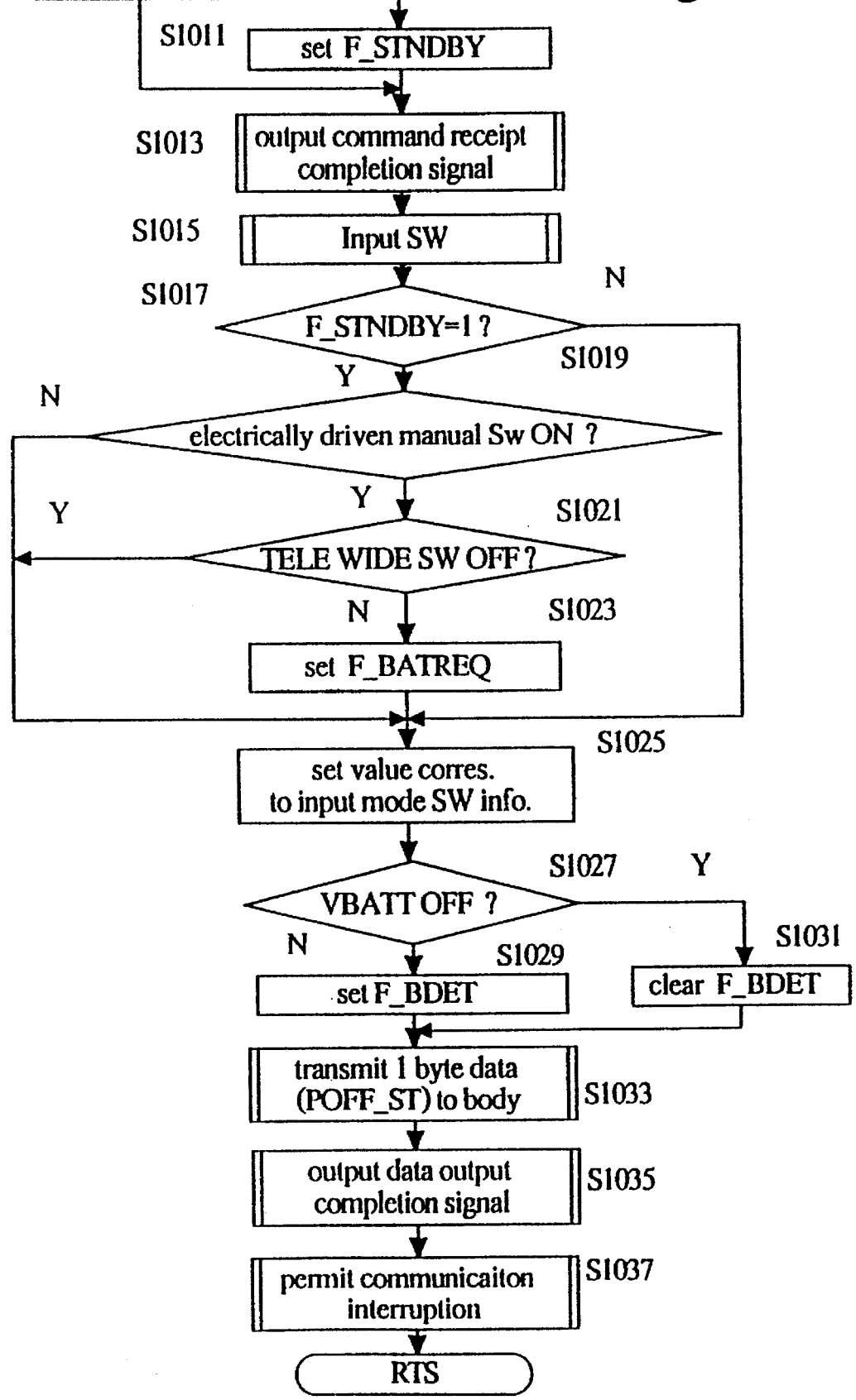
FIG. 45 is a flow chart regarding a standby operation for the photographing lens.

FIG. 45 illustrates a flow chart regarding the POFF-STATE (11) operation and POFFS-WSLEEP (12) operation. These operations serve to send to the body 11 information regarding power zooming of lens, battery request information, monitor information of the electric source (battery) for Pz, etc. The difference between POFF-STATE (11) and POFFS-WSLEEP (12) resides in whether or not lens CPU 61 enters a lower power consumption mode after completion of this command communication. When the POFFS-WSLEEP (12) operation is performed, flag F_STNDBY is set during the communication and lens CPU 61 proceeds to a low power consumption mode when returned to the main routine. That is to say, POFFS-WSLEEP (12) command is a command which performs both the POFF-STATE (11) and STANDBY command (30) of the instruction code.

In the case of the POFFS-WSLEEP (12) command, lens CPU 61 sets flag F_STNDBY, outputs command receipt completion signal, and inputs the condition of switches (75, 77). If flag F_STNDBY is set (in a case of POFFS-WSLEEP (12)), electrically driven/manual changing switch (D/M switch) is assigned to an electrically driven mode. At this time, if TELE or WIDE switch (speed changing switch) is turned on, the process sets the battery request flag F_BATREQ and proceeds to S1025. Otherwise, the process proceeds to S1025 (S1017, S1019, S1021, S1023).

If the flag F_STNDBY is set, the process normally completes this communication interruption and proceeds to a low power consumption mode after it is returned to the main routine. If, however, flag F_BATREQ is set, the process does not proceed to a low power consumption mode so that manual power zooming operation is possible, even though flag F_STNDBY is set to perform the normal operation, (see FIG. 7).

When flag F_STNDBY is not set, the process will not proceed to a low power consumption mode, even though it is returned to the main routine. Accordingly, operations such as manual power zooming will be possible even if flag F_BATREQ is not set in this command, provided that PZ speed switch 75 is turned on.

The process will proceed directly to S1025 if flag F_STNDBY is cleared (when POFF-STATE(11)).

In S1025, flags F_SLSW, F_ASSW, F_PZM, F_PZD, F_AFSW are set or cleared, depending upon the data of the zoom mode changing switch 77. The state of the VBTT terminal is monitored and if electric power for PZ is not supplied from the camera body 11, flag F_BDET is cleared (VBATT OFF), otherwise flag F_BDET is set (VBATT ON) in steps S1027–S1031. The data (POFF-ST) of 1 byte, as set above, is transmitted to camera body 11, a data input completion signal is outputted and communication interruption is permitted. The process is then returned (S1033–S1037).

When a POFF-STATE operation is performed, the process jumps to step S1013 while passing through flag F_STNDBY set operation in step S1011. Thereafter, operations similar to those of the POSFFS-WSLEEP operation will be performed.

LENS-INF1 OPERATION

Figure 46:
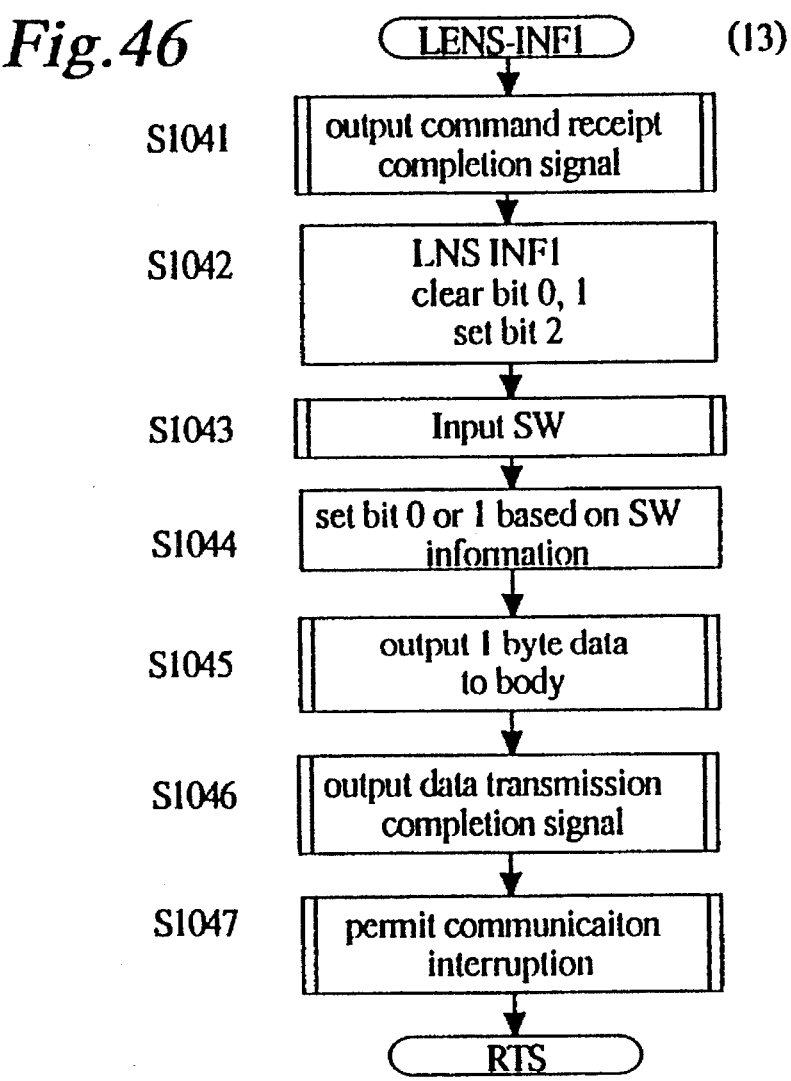
FIG. 46 is a flow chart regarding a transmission operation for variable data of the photographing lens.

A flow chart of LENS-INF1 shown in FIG. 46 illustrates an operation by which various information of lens 51 is sent to camera body 11.

Lens CPU 61, upon input of LENS-INF1 data request command, sends command receipt completion signal, clears 2 bits of LNS_INF1 data of 1 byte relating to the direction of power zooming, sets 1 bit to identify AE auto-lens, and inputs switch information of zooming direction (S1041–S1043). In response to the switch information as input, the corresponding bit is set so as to send 1 byte lens data to camera body 11 (S1044, S1045). A data transmission completion signal is outputted, and communication interruption is permitted. The process is then returned (S1046 and S1047). It is to be noted that LNS_INF1 data includes data relating to constant image magnification ratio zooming. The detail of which is described above.

LENS-INF2 OPERATION

Figure 47:
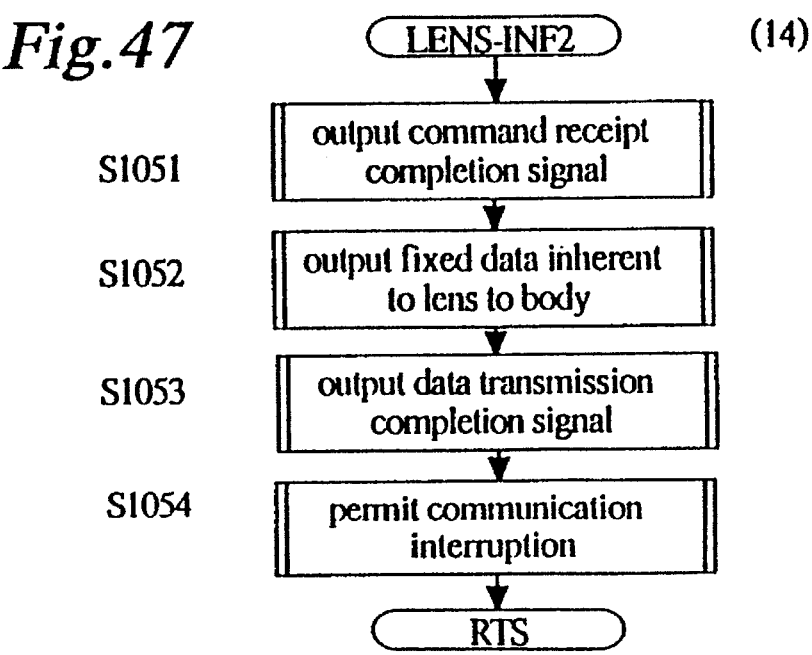
FIG. 47 is a flow chart regarding a transmission operation for fixed information of the photographing lens.

The flow chart of LENS-INF2, shown in FIG. 47, performs an operation by which fixed data inherent to lens 51 is sent to camera body 11.

Lens CPU 61, upon input of LENS-INF2 command, outputs a command receipt completion signal, outputs LNS-INF2 data to camera body 11, outputs a data input completion signal, and permits communication interruption. The process is then returned (S1051–S1054). LENS-INF2 data includes data to identify lens type, and PZ lens and the data is fixed data stored in ROM 61a.

LENS-AFPULSE OPERATION

Figure 48:
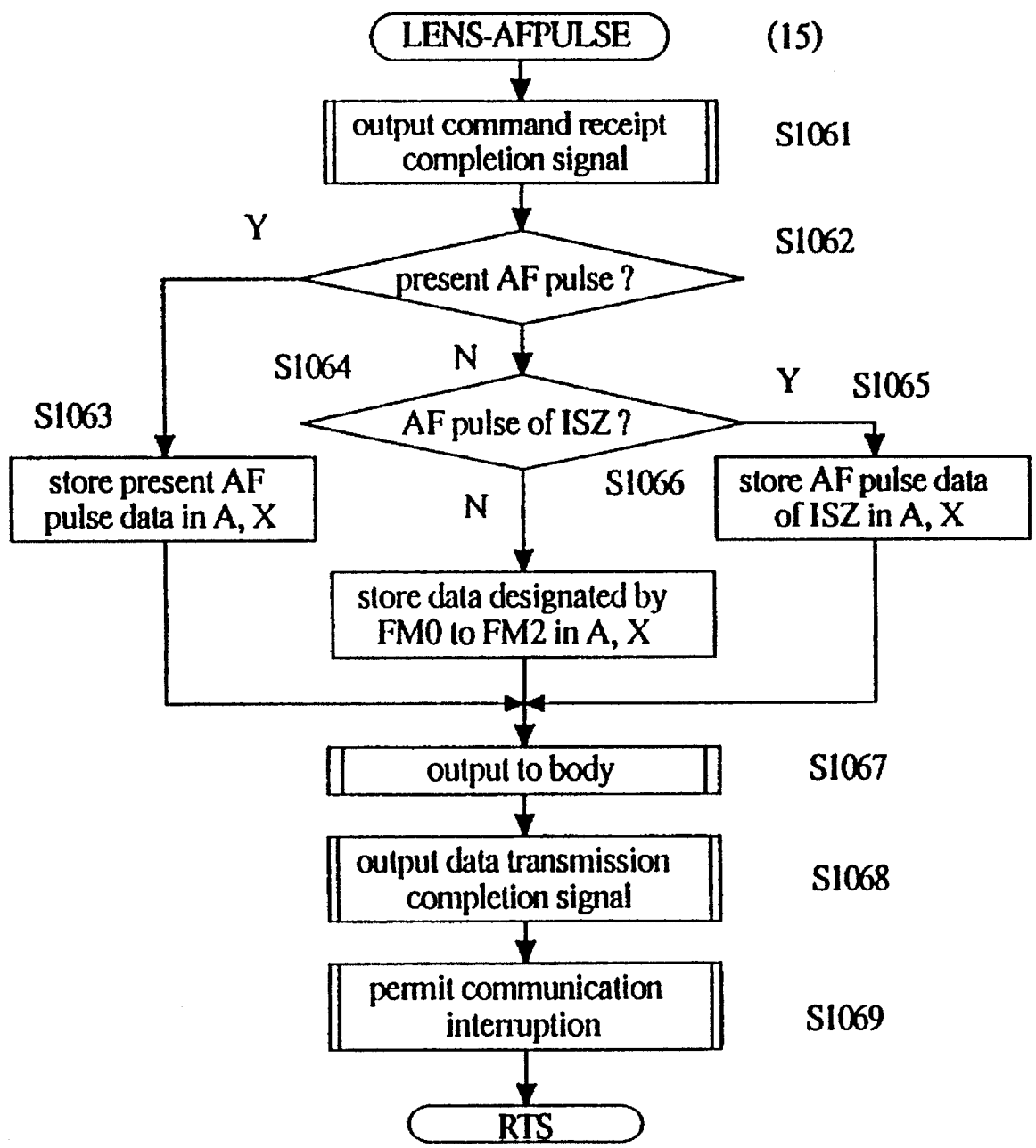
FIG. 48 is a flow chart regarding a transmission operation for an AF pulse count value on the lens side.

A flow chart of LENS-AFPULSE shown in FIG. 48 is for an operation by which lens AF pulse count data is outputted to camera body 11.

As explained above, the SET-AFPOINT command communication is always performed prior to communication of the LENS-AFPULS command. The content of the SET-AFPOINT command determines the AF pulse which is to be sent to the body by means of LENS-AFPULSE command.

Lens CPU 61, upon input of the LENS-AFPULSE command, outputs a command receipt completion signal, and, if present AF pulse is required, stores the present AF pulse number (AFPXL,H) in a register (S1061–S1063). When a pulse of constant image magnification ratio zooming (ISZ9) is demanded, AF pulse data (ISZ-AFPL,H) of ISZ is stored in the register (S1062, S1064, S1065). In a case other than the above two cases, AF pulse data (AFP0L,H–AFP7L,H) of designated address is stored in the register (S1062, S1064, S1066). Thereafter, AF pulse data, set in the register, is outputted to camera body 11, a data transmission completion signal is outputted, and communication interruption is permitted. The process is then returned (S1067–S1069).

FOCALLEN-X OPERATION

Figure 49:
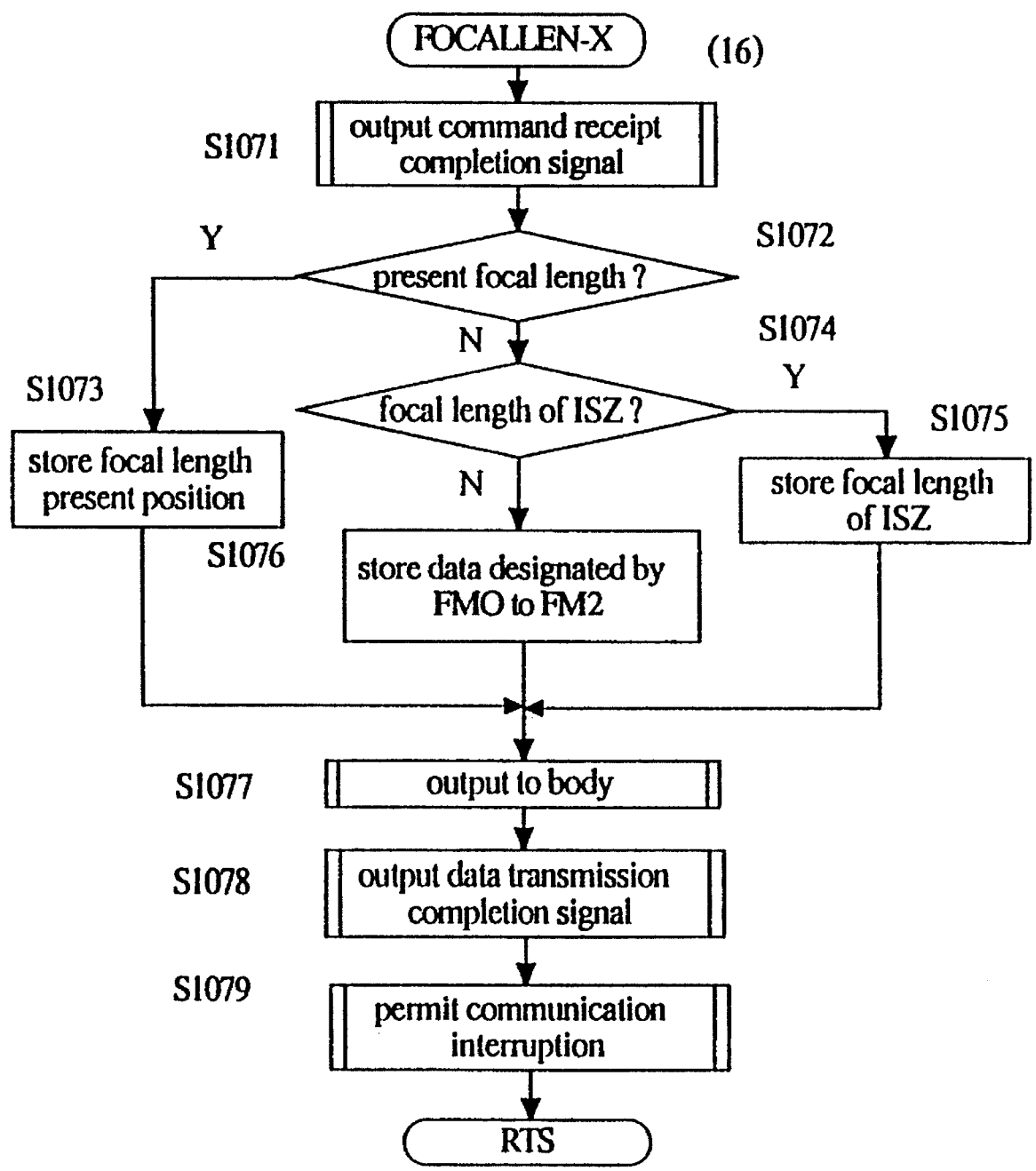
FIG. 49 is a flow chart regarding an output operation for real focal length data of the photographing lens.

A FOCALLEN-X operation by which focal length data of lens 51 is outputted to camera body 11 will be explained below with reference to a flow chart illustrated in FIG. 49.

As explained above, SET-PZPOINT command communication is always performed prior to FOCALLEN-X command communication. SET-PZPOINT command determines a focal length which is to be sent to the body upon receipt of the FOCALLEN-X command.

Lens CPU 61, upon receipt of the FOCALLEN-X command, outputs a command receipt completion signal, and stores the present focal length (FCLXL,H) in the register, if present focal length is required (S1071–S1073). When a focal length (ISZ-FCLL,H) for constant image magnification ratio zooming (ISZ) is required, a focal length (ISZ-FCLL,H) for constant image magnification ratio zooming is stored in the register (S1072, S1074, S1075). In a case other than the above two cases, a focal length (FCL0L,H–FCL7L, H) of designated address is stored in the register (S1072, S1074, S1076). The focal length data set in the register is outputted to camera body 11, a data transmission completion signal is outputted, and communication interruption is permitted. The process is then returned (S1077–S1079).

IMAGE-LSIZE OPERATION

Figure 50:
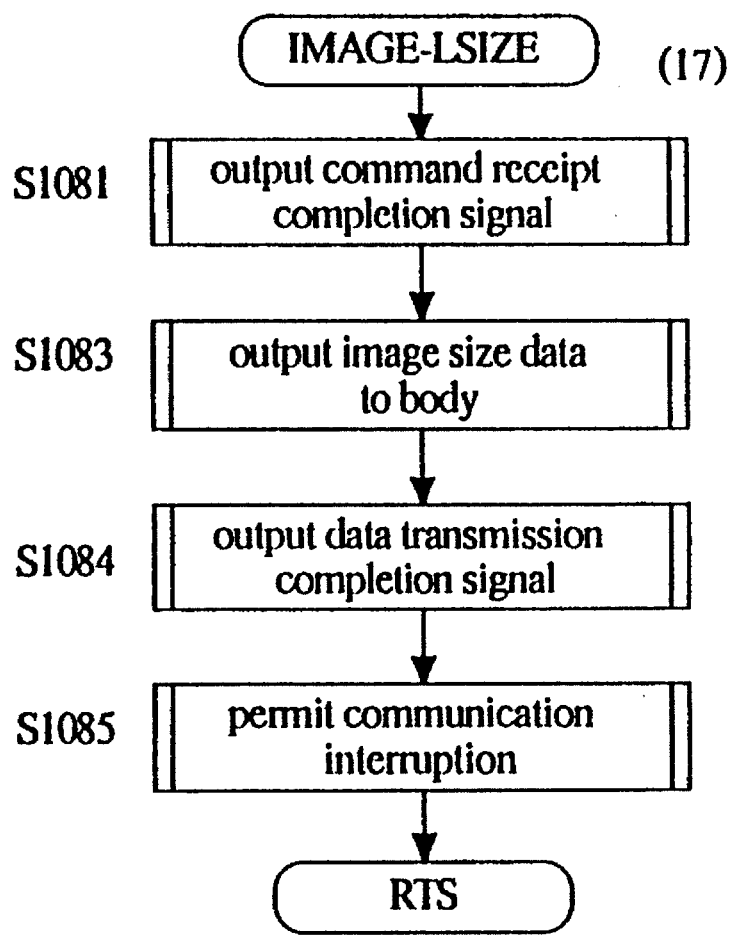
FIG. 50 is a flow chart regarding a transmission operation for constant image magnification data on the photographing lens side.

A flow chart of IMAGE-LSIZE shown in FIG. 50 is for an operation by which image magnification ratio data for performing constant image magnification ratio zooming, stored in lens RAM 61b at a predetermined address, is sent to camera body 11.

Lens CPU 61, upon input of IMAGE-LSIZE command, outputs a command receipt completion signal to camera body 11, outputs data (ISZ-IMGL,H) relating to image magnification ratio (image size) to camera body 11, outputs a data transmission completion signal, and permits communication interruption. The process is then returned (S1081–S1085).

16 BYTE DATA PROCESSING

Figure 51:
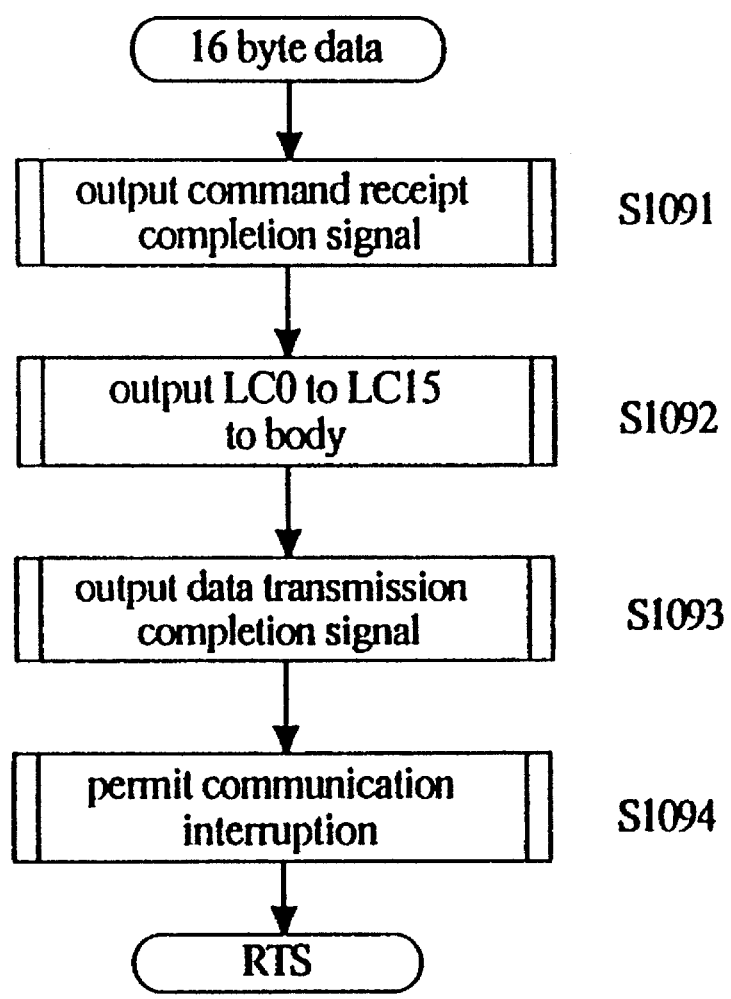
FIG. 51 is a flow chart regarding the output of all lens data.
Figure 52:
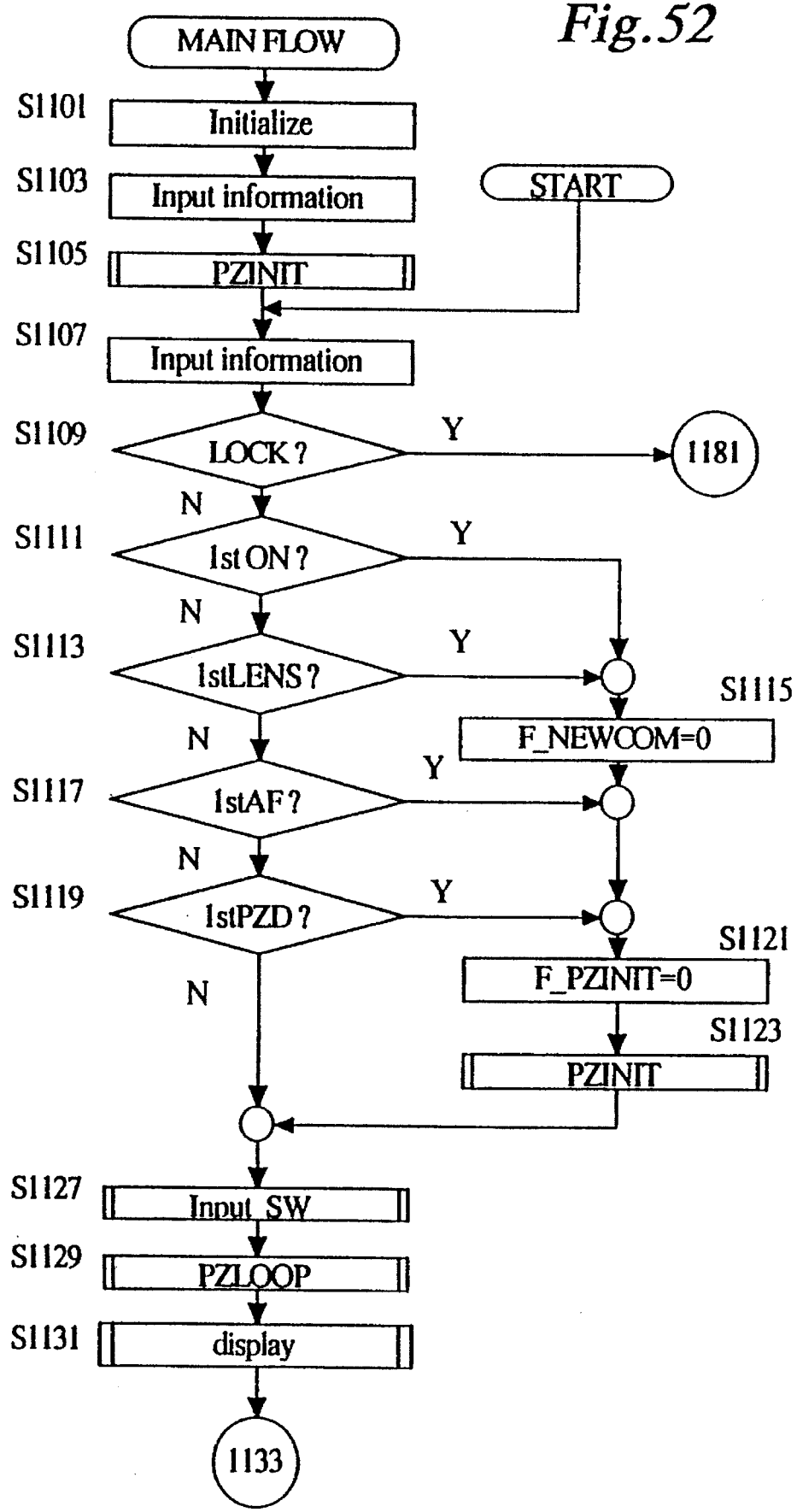
FIGS. 52, 53, 54, and 55 are a flow chart regarding a PZ actuation operation.

A 16 byte data flow chart shown in FIG. 51 is for an operation by which basic lens data of 16 bytes are all sent to camera body 11. It is to be noted that this command is a detail of the operation performed in the communication interruption routine of FIG. 8 at S221. Depending upon the lower bits of the command, each command will be performed. Processing of the first half 8 bytes and second half 8 bytes are similar to that of the 16 byte data communication and hence a detailed explanation is omitted.

Lens CPU 61, upon input of a 6 byte command, outputs a command receipt completion signal to camera body 11, outputs a predetermined data (LC0–LC15) of 16 bytes to camera body 11, outputs a data transmission completion signal and permits communication interruption. The process is then returned (S1091–S1094).

PZ OPERATION FOR BODY

An operation relating to power zooming at the side of camera body 11 will be explained below with reference to a flow chart shown in FIGS. 52 to 55. This operation or processing is performed by the main CPU 35 on the basis of a program stored in ROM 35a of the main (body) CPU 35 of the camera body 11.

The process first enters the operation of the main flow, when main CPU 35 is reset, such as when the main switch is turned on (when battery is inserted and electricity is generated). The process, when entering this operation, initializes RAM 35b, port setting, etc., inputs predetermined information by means of switch input or E2PROM DATA INPUT, and performs a power zoom initializing operation (PZINIT subroutine) (S1101, S1103, S1105). In this embodiment, power zoom initialization is an operation by which initialization is done to the PZ lens and focusing lens, for the purpose of detecting positions of the zooming lens and focusing lens. The above steps are done upon initial input of power source (i.e., when a main switch which is not shown is turned on). While electricity is supplied, the following steps (from S1107) will be repeated.

In S1107, predetermined information is inputted. If locked (i.e., when a main switch is turned on), photographing operation is possible, and hence the process proceeds with the necessary operations. If the lock is released (i.e., when the main switch is turned off), the process proceeds to a lock operation at and after S1181 (S1109).

When the lock is released for the first time, or if the process is performed for the first time after the photographing lens is mounted, flag F_NEWCOM (a flag which is set up when new communication is performed relative to the photographing lens after completion of old communication) is cleared, and a PZ initializing flag F_PZINIT is cleared so as to perform initialization of power zooming (S1109–S1115, S1121, S1123).

In the case that the lock is not initially released or the process does not perform an operation for the first time after the photographing lens is mounted, but the status is a first AF mode or first PZ mode, flag F_PZINIT is cleared in order to initialize various operations and data relating to AF, PZ, the flag being set when such data are initialized etc. The process then calls a PZINIT subroutine (S1111, S1113, S1117–S1123).

The process inputs switch information and performs an operation (PZLOOP subroutine) relating to power zooming and gives the necessary indication on the display panel. The process then proceeds to S1133 (S1127–S1131).

If the photometric switch SWS is turned OFF during the checking of photometric switch SWS at S1133, power supply Vdd of E2PROM and the peripheral parts control circuit is partly turned off (S1133, S1135). If flag F_AF, indicating that AF is being performed, is cleared, the process is returned to START, otherwise the process proceeds to step S1165 (S1136).

If flag F_AF is set, it is likely that AF processing and constant image magnification ratio zooming relating thereto have already been performed before photometric switch SWS is turned off. Accordingly, a constant image magnification ratio zooming stop flag F_ISZSTOP is set, and an operation to stop constant image magnification ratio zooming and to check whether or not the same has been stopped (IPZENDCHECK subroutine) is performed (S1136, S1165, S1167).

The process then clears focusing flag F_INFOCUS, performs an AF motor stopping operation, sends driving information of AF, etc. to power zooming lens 51 by means of PZ-BSTATE command communication, clears flag F_AF, and proceeds to step S1176 (S1169, S1171, S1173, S1175).

If the photometric switch SWS is turned ON upon the checking operation at step S1133, terminal Vdd is turned on (constant voltage is supplied), photometry and operations relating to the exposure are performed, and the results are displayed (S1137, S1138). If the status is not AF mode, the process jumps to an operation starting from step S1165 (S1139, S1165).

During the AF mode, flag F_AF is set, a photometric operation or integrating operation is started, and the integrated data is taken into the process so as to perform predetermined predictor operation (S1139, S1140, S1143).

If the results obtained from the predictor operation are effective, the process checks if focusing is required. If focusing is required, a focusing operation or processing is performed (S1145, S1149, S1151). When focusing is not required, and in the case of the non-power zooming mode (F_PZ=0), the process jumps to S1176. In the case of the power zooming mode, the process sends driving information of AF, etc. to the power zooming lens 51 by means of a PZ-BSTATE command, and actuates the AF motor 39. The process then proceeds to the moving object operation or processing starting from step S1159 (S1145. S1149, S1153–S1157).

When the result of calculated predictor is not within an effective range, for example, if contrast of the object is too low, the process performs a search operation to obtain effective value, and then proceeds to step S1153 (S1145, S1147). The search operation is to obtain effective defocus amount by means of an integrating operation by driving. AF motor 39 in the direction of the closest end or infinite end.

When the focusing operation at step S1157 or AF motor actuation at step S1157 has been completed, and if the object is a moving body, the process performs a moving object follow-up AF operation (S1159). If the status is in the constant image magnification ratio zooming mode, the process performs a constant image magnification ratio zooming operation and then proceeds to release switch SWR check operation at S1176 (S1159–S1163).

At step S1176, the process checks if release switch SWR has been turned on. If the release switch is turned off, the process is immediately returned to START. If the release switch is turned on, the process is returned to START after performing a releasing operation, provided that release is permitted (S1176, S1178, S1179).

If the lock is effected (i.e., the main switch is turned off) upon checking at S1109, the process proceeds to S1181. If the lock is effected for the first time in this routine and if in the power zooming mode, the process proceeds to a withdrawal operation (S1184–S1209) in order to withdraw the focal length data stored in preset zoom set mode to the camera body. Otherwise, the process jumps to step S1223 (S1181, S1183).

If the lock is not effected for the first time, or if the photographing lens is not a power zoom lens, the process shuts off constant voltage supply (CONT) and power supply (VBATT) to the photographing lens, and clears indication on display 45. The process is then returned to START (S1181, S1183, S1223–S1227).

In the withdrawal operation, address of the memory (RAM 61b) to be withdrawn is designated by means of a SET-PZPOINT command in order to withdraw the focal length stored in lens RAM 61b to the body. Then, the focal length data stored in the address designated by the FOCALLEN-X command is inputted from lens 51, so as to store them in body RAM 35b at address FLM as focal length data (S1184, S1185, S1187). IMAG-LSIZE data including image magnification ratio is inputted from lens RAM 65b so as to store the image magnification ratio data in body RAM 35b at address ISM, an LENS-INF2 data is inputted from RAM 65b. The process then proceeds to step S1195 (S1181–S1193).

In this embodiment, the image magnification ratio data is transferred to the camera body in order to simplify the process of communication in the retracting operation. However, it may also be possible that both the focal length data, which is obtained when an image magnification ratio is set, and the amount of lens movement data, regarding lens retraction, are transferred.

At steps S1195 and S1197, the process checks whether accommodation of power zoom is possible or power zoom is to be effected based on the data input by LENS-INF2. If it is impossible to accommodate power zoom or power zoom is not to be effected, the process immediately proceeds to CONT1. If power zoom accommodation is possible and power zoom is to be effected (repPZ=1, PZD=1), the body side requests BBATreq to check the battery. When the battery is normal, a command (RETRACT-PZ) to cause power zoom lens 51 to perform a power zoom accommodation operation is sent, a flag F_IPZON to identify that controlled zooming is being performed is set, and an NG timer is started. The process then proceeds to a CONT1 operation (S1195–S1209).

If the battery is found to be abnormal during battery checking, the process proceeds to the CONT1 operation (S1203). It should be noted that flag retPZ relates to information inherent to the lenses. This flag will be cleared when the zooming lens is, for example, an inner zooming lens and hence the lens does not require accommodation or retracting thereof, so that an accommodation or retracing operation is not performed.

In the CONT1 operation, it is checked, based on the AF retraction flag RETAF inputted by the LENS-INF2, whether the power zoom lens 51 is AF-retractable or in an AF mode. If the lens is AF-retractable and in the AF mode, the focusing lens 53F is returned to a retracted position by driving an AF motor 39 (S1211–S1215). Then, if controlled power zooming is being effected, a standby is continued until power zooming has ended, while checking the operation of the controlled power zoom. When power zooming ends, constant voltage supply and power to the camera lens are turned off and the display 45 is also turned off, resulting in a return to the start (S1217–S1227). If the lens is not AF-retractable or not in the AF mode, the lens retraction operation is skipped. Here, the flag RETAF is information inherent in the lens and is cleared when the zoom lens is an inner focusing type and a retraction of the focusing lens is not necessitated, as a result of which no processing for the retraction is performed.

[PZ, AF-INIT OPERATION]

Figure 56:
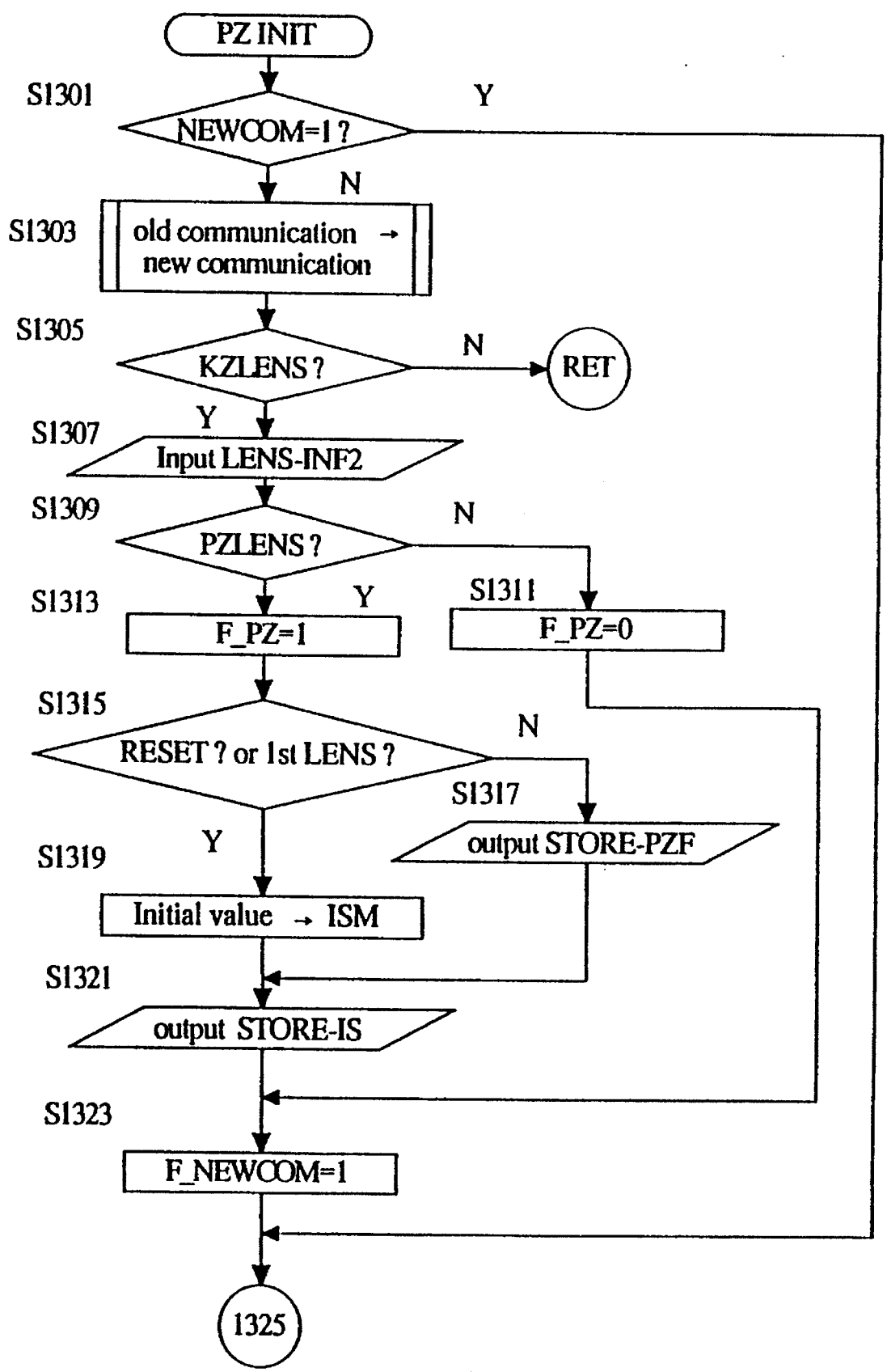
FIG. 56 is a flow chart regarding an initialization operation for PZ.
Figure 57:
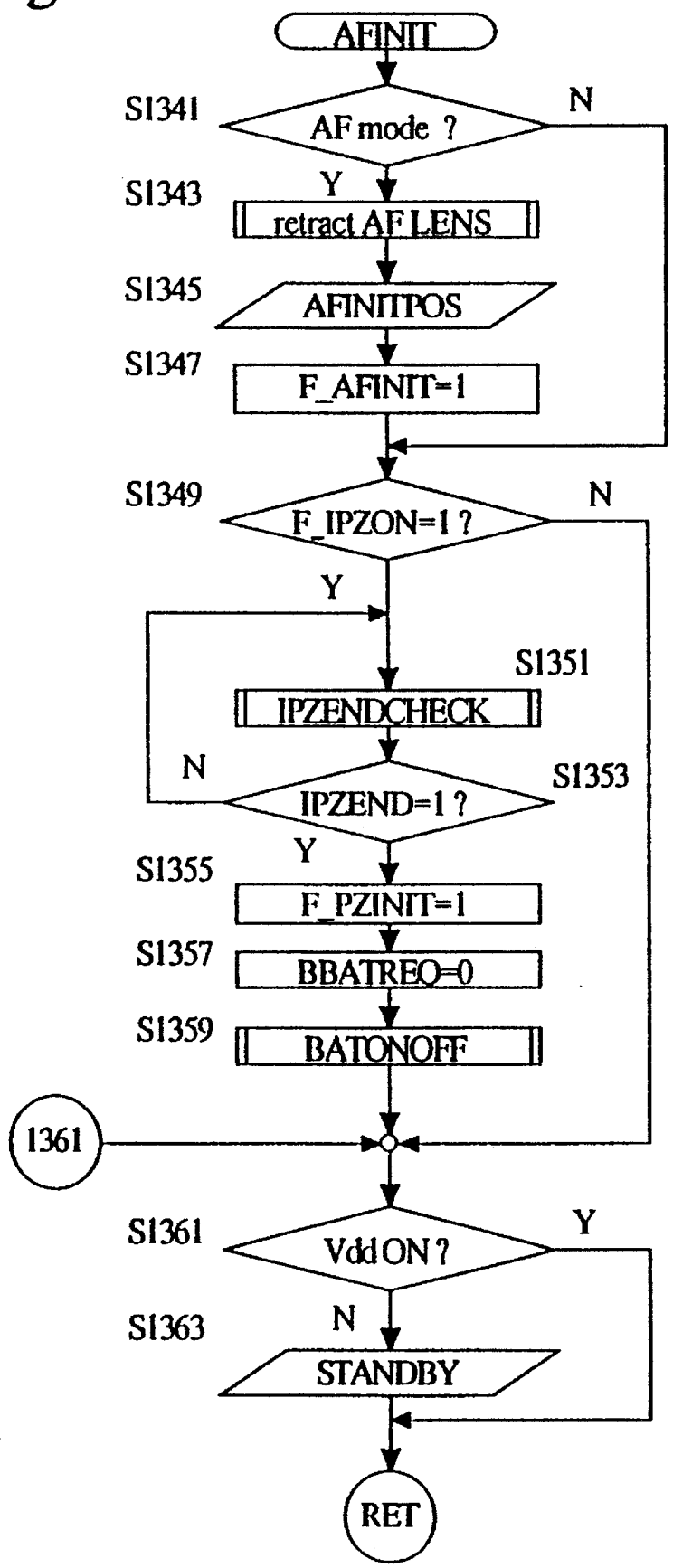
FIGS. 57 and 58 are a flow chart regarding an initialization operation for AF.
Figure 58:
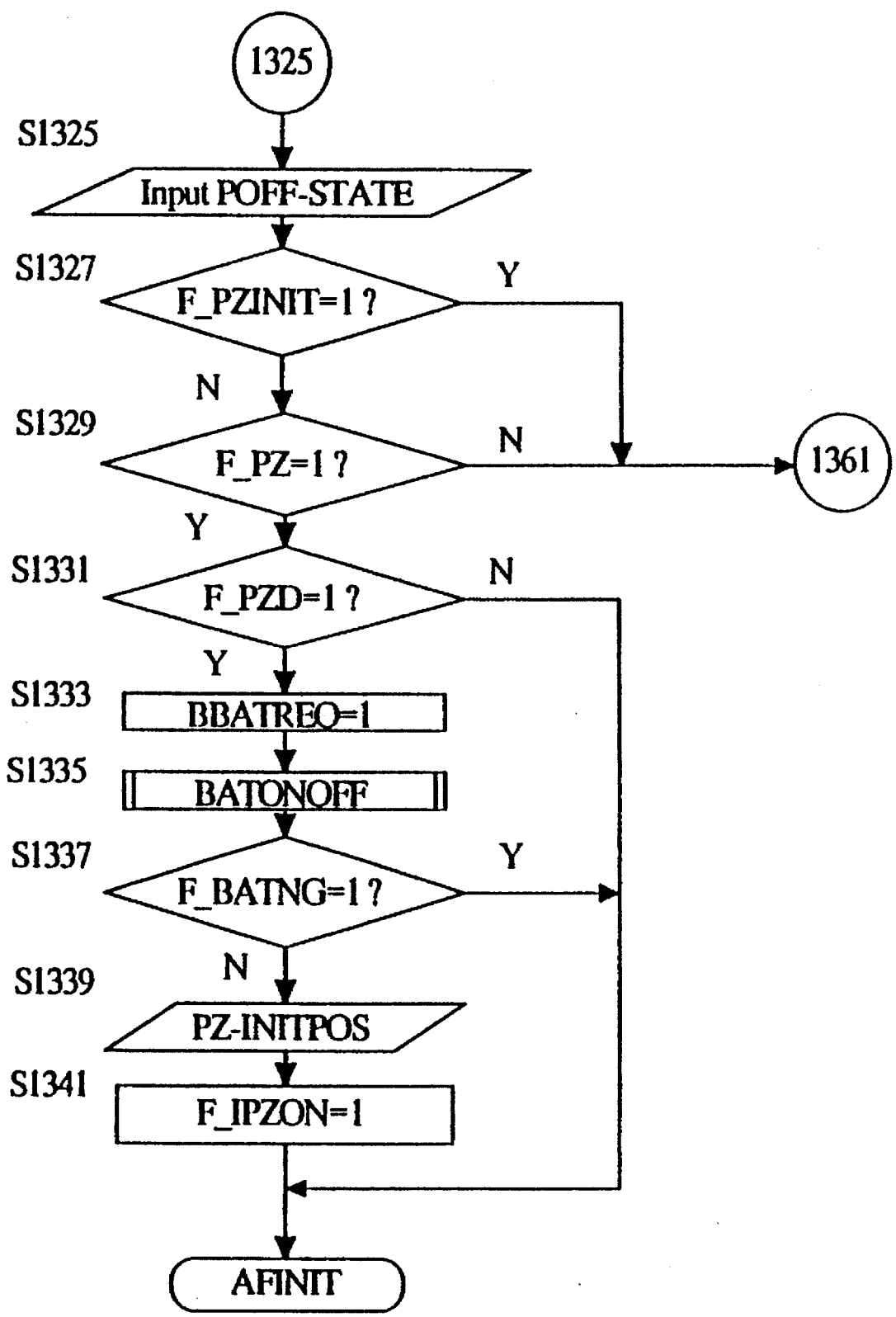

Hereinafter, the initialization operation of the power zoom lens 51 to be controlled on the side of the body 11 will be described with reference to a PZINIT subroutine as shown in FIGS. 56 to 58.

In the operation, the power zoom lens 51 initializes both the zooming lens group 53Z and the focusing lens group 53F and returns the information, sheltered by turning off the main switch in the body, to the lens 51. In detail, the former is an operation which detects the positions of the zooming lens and the AF lens, while the latter is an operation for again returning to the lens 51 (the lens RAM 65b) an image size of ISZ and a focal length for a preset zoom, which are sheltered in the body RAM 35b when the main switch is turned off (or locked).

If this processing is initiated for the first time, a new communication flag NEWCOM indicative of the end of the old communication is cleared and thus the old communication is performed to communicate with the lens ROM in synchronization with the clock of the camera body 11. After that, the old communication is switched to the new communication which communicates with the lens CPU 61 in synchronization with the clock of the lens CPU 61 (S1301, S1303).

If an attached camera lens is not a Kz lens (including the power zoom lens 51 according to the present embodiment) having the lens CPU, the new communication is impossible so that the flow is returned. On the contrary, if the lens is the Kz lens, an input of data from the camera lens is effected by the new communication LENS-INF2 (14) and it is checked if the attached lens is the power zoom lens (PZ lens) (S1305, S1309). If it is not the PZ lens, a flag F_PZ identifying the PZ lens is cleared and, the flow advances to step S1323 (S1309, S1311).

If the attached lens is the PZ lens, the flag F_PZ is set. When a reset is effected in the camera body 11 (or when the battery is exchanged) or when the lens is first attached to the camera body 11, an initial value is stored in an image size memory (ISM) (S1313, S1315, S1319). In the other cases, information regarding the focal length for a preset zooming operation and the like, sheltered in the body RAM 35b, is stored through a STORE-PZF (28) communication at a predetermined address (FCLOL, H to FCL7L, H) of the lens RAM 61b for the lens CPU 61. Then, a STORE-IS (29) communication is performed so that the image size, sheltered in the RAM (35b) of the body CPU or the image size of the initial value set at step S1319, is stored at predetermined addresses (ISZ-IMGL, H) of the RAM (61b) for the lens CPU, and a new communication flag is set (S1321, S1323).

Next, the data is inputted through a POFF-STATE (11) communication from the lens CPU 61, and then the flow is sent to step S1361 where a standby operation is performed if the flag F_PZINIT, which indicates that initialization of the power zoom has been completed, is set or if the flag F_PZ has been cleared (S1325 to S1329).

If the flag PZINIT is cleared and the flag F_PZ is set, and when power zooming is not performed (i.e., when a flag F_PZD (bit 5 of POFF-STATE data) is cleared), that is, when manual zooming is performed, the flow advances to an AF initialization (AFINIT) operation (S1325 to S1331). When the power zoom mode is used, a flag F_BBATREQ, requesting power supply for PZ, is set and the power zoom lens 51 is supplied with power by means of the BATONOFF subroutine. Further, it is checked whether or not the power is supplied thereto in a normal manner (S1131 to S1137). If the power from the battery is not outputted to the power zoom lens 51 in a normal manner thereto (i.e., flag F_BATNG=1), the flow advances to the AFINIT operation. On the contrary, if power supply is normal (the flag F_BATNG=0), a PZ-INITPOS command (32) is outputted to force the camera lens to initialize PZ. Further, the flow advances to the AFINIT operation after setting up the flag F_IPZON, indicating that initialization of PZ has been completed.

AFINIT OPERATION

A flowchart for an AFINIT operation, as shown in FIGS. 57 and 58, is an operation for initialization of the AF. Further, in the present embodiment, the AF is initialized after initialization of PZ. However, the AF may be initialized before initialization of PZ.

In the AFINIT operation, under the condition that the camera lens is in the AF mode, a focusing lens 53F is moved to the retracted position, at which point the tube length is minimized (S1341, S1343). Specifically, the position is the far (i.e., infinity) position according to the present embodiment. The initialization data is then inputted by an AFINIT-POS communication and a flag F_AFINIT is set (S1345, S1347). Also, upon initialization, the lens CPU 61 generally initializes the lens RAM61b for AF-pulse counting.

Next, if a flag F_IPZON, indicative of power zooming other than manual power zooming being effected, is set, it is checked in an IPZENDCHECK subroutine whether or not the initialization of power zooming is ended (S1349 to S1353). When the initialization of power zooming has ended, a flag F_PZINIT, identifying the end of power zooming initialization, is set while a battery request flag F_BBATREQ at the body side is set to "0". Further, in a BATONOFF subroutine, it is requested to stop the power supply and it is checked if the stop has been completed (S1355 to S1359).

Then, if power supply for a photometric IC17, CCD21 and E$^2$PROM43 and the like of the body 11 are turned on (Vdd ON), the flow is returned. However, if they are turned off, a STANDBY command is effected, and the flow is returned after the lens CPU 61 of the camera lens 51 is set in a standby state (a transfer to a low power consumption mode) (S1361, S1363).

[BATONOFF OPERATION]

Figure 59:
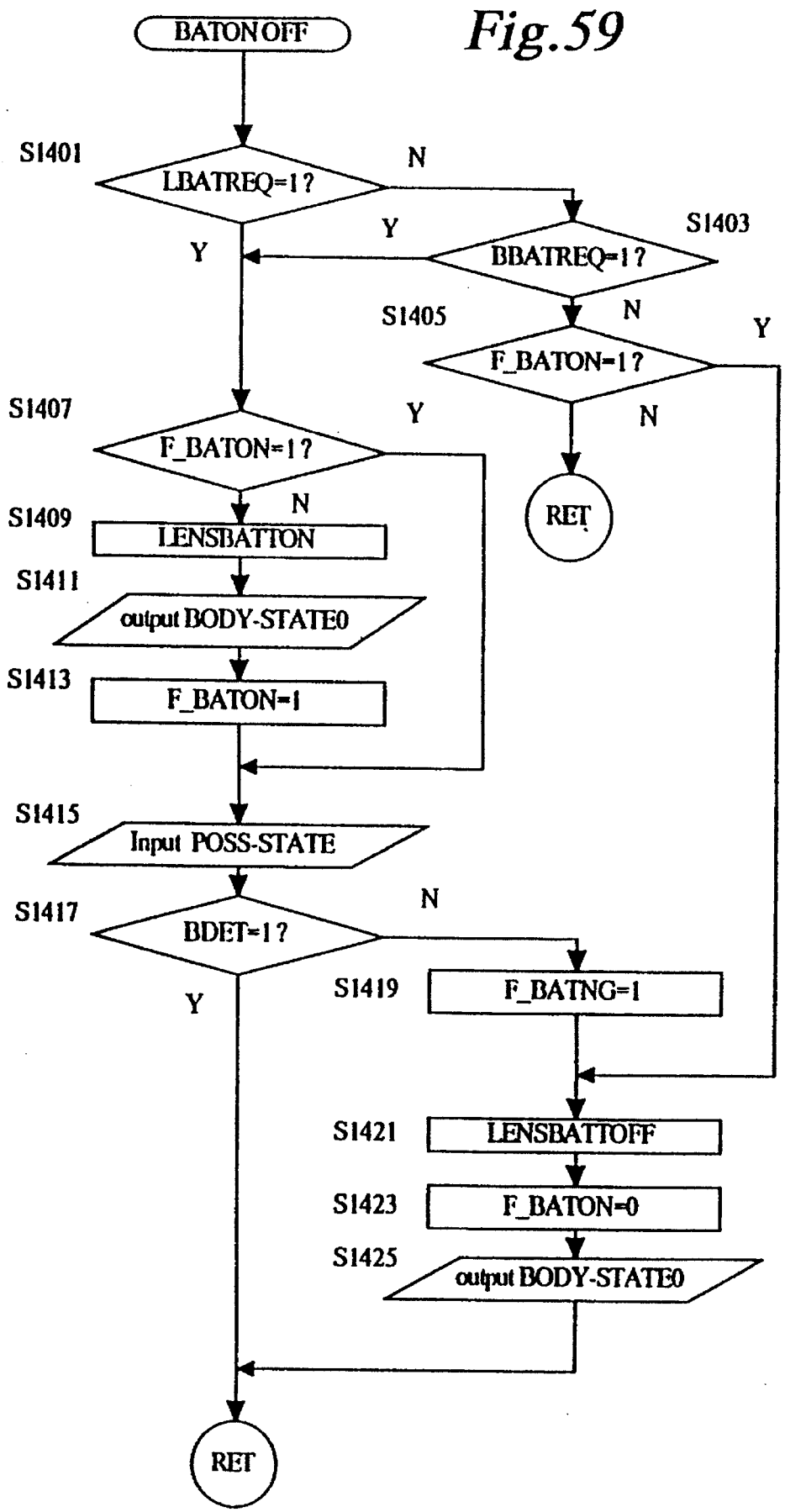
FIG. 59 is a flow chart regarding an operation for checking supply of electricity.

A BATONOFF flowchart, as shown in FIG. 59, illustrates a checking operation performed by a main CPU 35, wherein it is checked whether power for a zoom motor 65 is normally supplied from the camera body 11 to the power zoom lens 51 upon issuance of a power request (or a battery request) from the body or the lens. In the present embodiment, such a battery request may be issued by either of the camera body 11 itself or the camera lens 51.

In the BATONOFF operation, first of all, if the battery request is not issued from either of the power zoom lens 51 or the camera body 11, the flow is returned when power supply to the VBATT terminal has been already stopped (i.e., when flag F_BATON has been cleared (S1401, S1403, S1405)). However, when the power supply is effected the power supply to the power zoom lens 51 is turned off, the flag F_BATON is cleared, a BODY-STATE0 output command is issued so as to send information indicative of the power supply being turned off (BATT of bit 5 is cleared) to the lens. Thereafter the flow is returned (S1421 to S1425).

When the battery request is issued from the power zoom lens 51 or the camera body 11 (i.e., when a LBATREQ or BBATREQ of bit 1 of the POFF-STATE data is set) and if the power is not yet being supplied, the power zoom lens 51 starts to be supplied with power and BODY- STATE0 data, concerning the body state, transmits information indicative of the power supply being supplied (i.e., a BBAT of bit 5 is set) to the lens. After the flag F_BATON, identifying the power supply underway, is set, POFF-STATE data is inputted. However, if the power supply is already turned on, the flow goes directly to step S1415 where POFF-STATE data is inputted (S1407 to S1415).

If the battery supply is normal (i.e., flag F_BDET=1 in bit0 of POFF-STATE), the flow is returned (S1417). However, if the battery supply is abnormal, for example, in the case of a short circuit, a flag F_BATNG identifying the battery abnormality is set, power supply to the power zoom lens 51 is cutoff, and flag F_BATON is cleared. Further, a BODY-STATE0 command is issued to send to the lens information regarding the "ON" state of the power supply and then the flow is returned (S1419 to S1425).

[PZ-LOOP OPERATION]

Figure 60A:
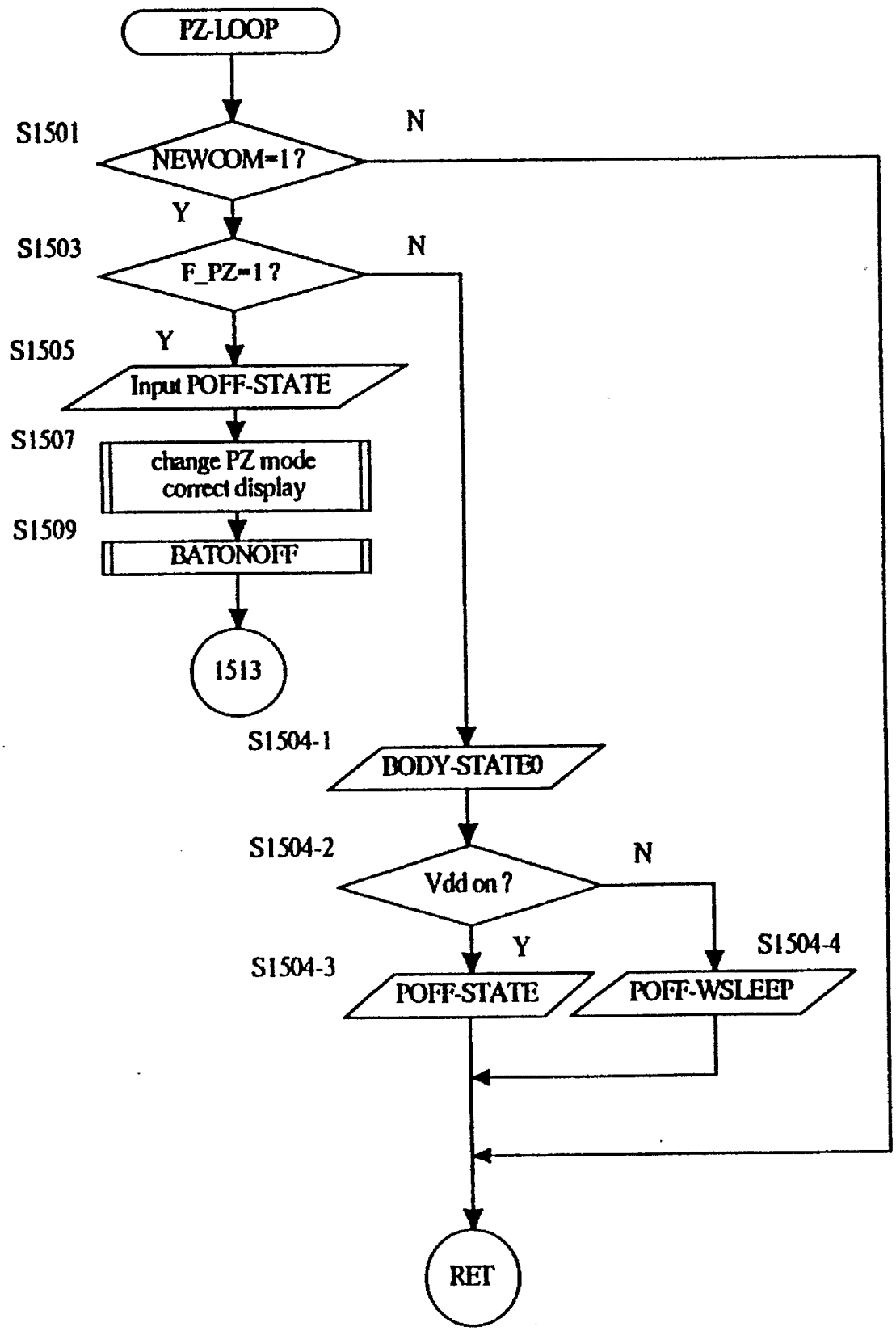
FIGS. 60A, 60B, and 61 are a flow chart regarding a loop operation for PZ.
Figure 60B:
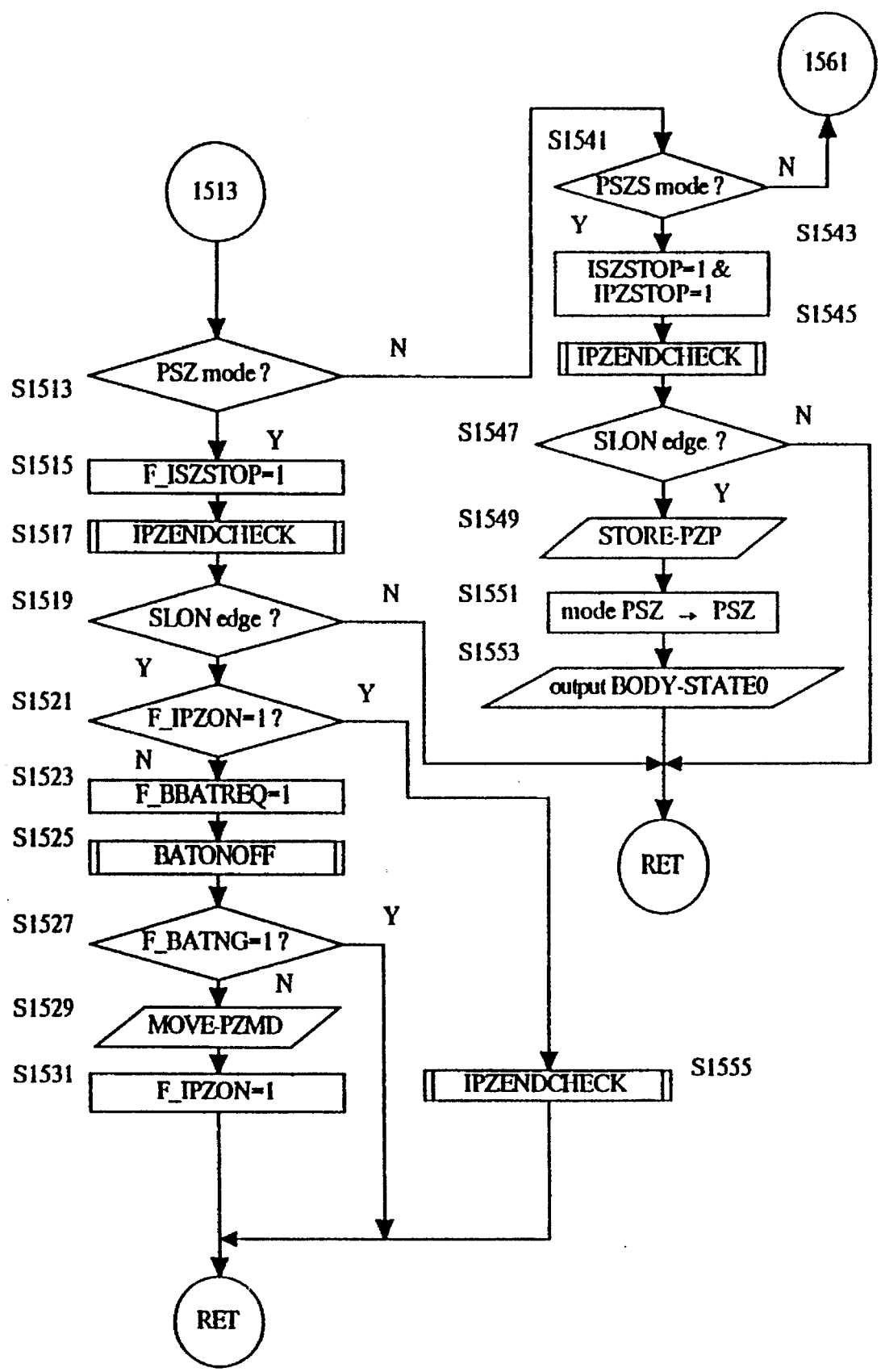
Figure 61:
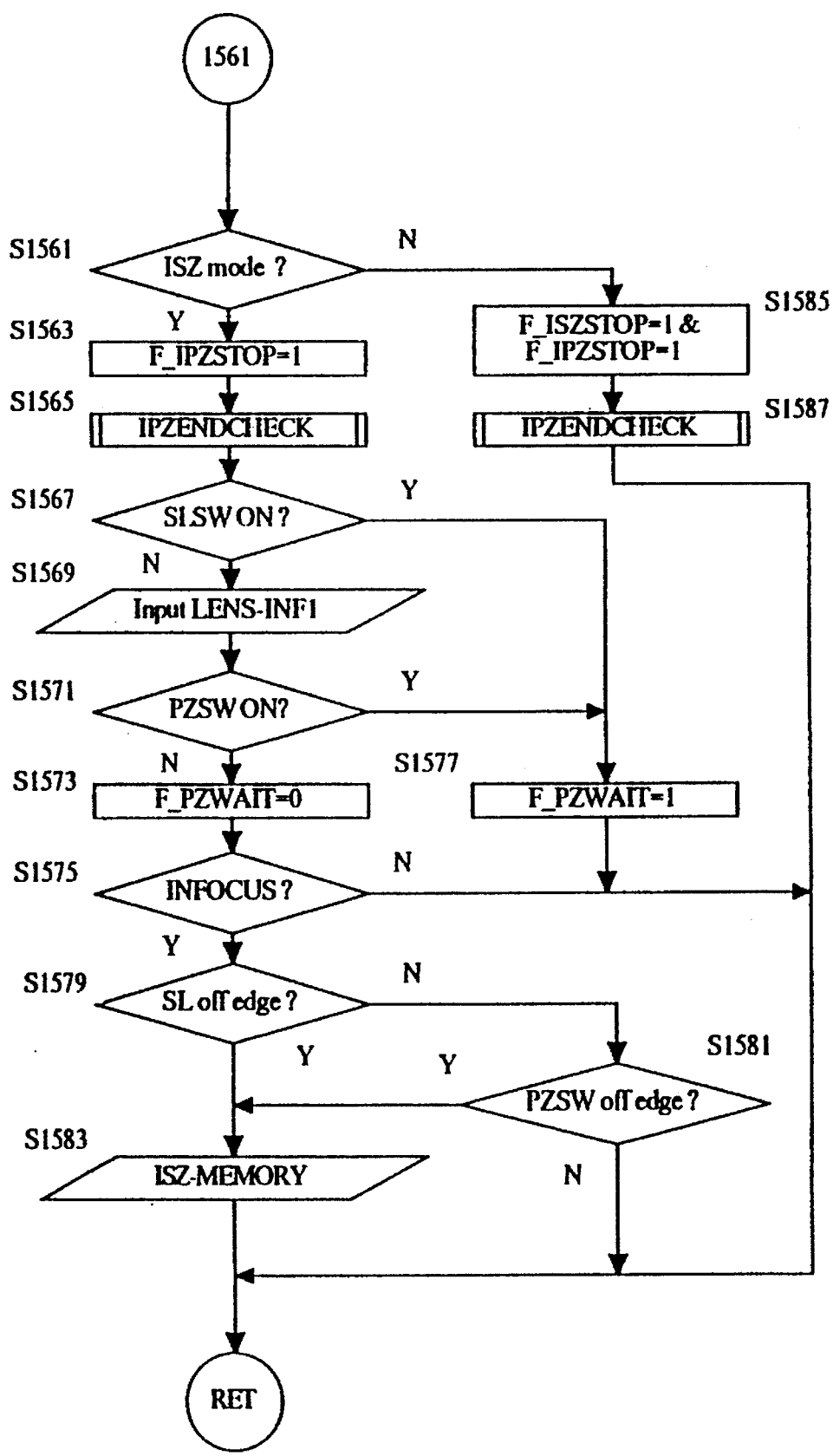

A PZ-LOC operation, as shown in FIGS. 60A, 60B and 61, is an operation of power zooming which is intermittently performed by the main CPU 35. In this operation, a plurality of tasks, such as power zoom relations, preset zooming, by which power zooming is adjusted to a preset focal length, and presetting of the focal length and image size constant zoom control are processed. In the present embodiment, the current focal length is stored when an SL switch is turned on (a PZ mode switch 77) during a preset zoom set (PSZS) mode while power zooming is adjusted to the preset length when the SL switch is turned on during a preset zoom (PSZ) mode. Then, an image size, at the time when the SL switch is turned off, or when a zoom operation ring is returned to the neutral position (i.e., when a PZ speed switch 75 is turned off), is stored.

Upon initiation of this operation, the flow advances to S1505 at which point the respective tasks are processed under the condition that the new communication and power zooming are enabled, but the flow is directly returned if the new communication is impossible. Also, when the new communication is possible, but power zooming is impossible, a BODY-STATE0 communication is effected (S1501, S1503, S1504-1). With this BODY-STATE0 communication, the body-side information such as a mode information of the power zoom is sent to the lens, but an input of the information of the lens, such as the state of the switch of the lens, is performed by the POFF-STATE communication when the Vdd is turned on (S1504-2, S1504-3). When the Vdd is turned off, an input of the lens information is performed by the POFFS-WSLEEP communication and the lens CPU 61 is transferred to the standby mode (the low power consumption mode) (S1504-2, S1504-4). Due to the POFFS-WSLEEP command, the lens CPU 61 maintains low power consumption until the next communication command is received.

At S1505, various data, such as lens switches from the power zoom lens 51, are inputted in the POFF-STATE. Further, depending on the data, a switching of the PZ mode and a display correction are effected and the power supply is performed or stopped (S1503 to S1509). Then, based on the inputted data, the following operations are performed (S1509 to S1511).

If the current mode is the preset zoom (PSZ) mode, the actuation of constant image size zooming is inhibited (a flag F_ISZSTOP is set) and constant image size zooming is completed in an IPZENDCHECK subroutine (S1513 to S1517). Unless preset zooming actuation (or drive) is initiated (the SL switch is turned on), the flow is returned (S1519). If preset zooming actuation is initiated and continues (F_IPZON=1), a checking operation which determines if the preset zoom has ended is performed in the IPZENDCHECK subroutine. When it has ended, the flow is returned (S1519, S1521, S1555).

Unless preset zooming is being actuated, the camera body 11 itself requests the power supply, and the power supply is performed (S1521 to S1525). Then, if the battery is abnormal, the flow is directly returned. On the other hand, if the battery is normal, power zooming is adjusted to a focal length position which is stored at an address designated by a transmission of a MOVE-PZND command, and the flow is returned followed by setting of a flag F_IPZON, which identifies the continuation of preset zooming (S1527 to S1531).

If the current mode is the preset zoom set (PSZS) mode, a flag (F_ISZSTOP, F_IPZSTOP) by which preset zooming and constant image size zooming drive are stopped, is set and in the IPZENDCHECK subroutine, preset zooming or the constant image size zooming drive is stopped (S1513, S1541, S1543, S1545).

Then, when the SL switch is turned on, in order to store the current focal length in a designated address of the lens RAM 61b by the lens CPU 61, a STORE-PZP command is transmitted to the power zoom lens 51, the preset zoom set (PSZS) mode is changed to the preset zoom (PSZ) mode, whereas the values of bit 2-0 in the BODY-STATE0 command are changed, and the power zoom lens 51 is notified of changes, such as a renewal of the preset zoom mode by an output of the BODY-STATE0 data. Thereafter the flow is returned (S1547 to S1553). If the SL switch SW remains off, the flow is returned without any processing (S1547).

When the current mode is the constant image size zooming mode, preset zooming is stopped and it is checked if preset zooming has ended (S1541, S1561, S1563, S1565).

Here, when the SL switch is being depressed, a flag F_PZWAIT, which inhibits initiation of constant image size zooming, is set and the flow is returned (S1567, S1577). When the SL switch is turned off, LENS-INF1 data is inputted. If the zoom switch (a zoom speed change switch 75) is turned on, a flag F_PZWAIT, which inhibits initiation of constant image size zooming, is set and the flow is returned (S1567, S1577). If the zoom speed change switch 75 is positioned at a neutral point (i.e., when it is turned off), the flag F_PZWAIT is cleared and the focus condition is checked. If out of focus, the flow is returned (S1571 to S1575). If in focus, an ISZ-MEMORY command for storing an image size, at the time when the SL switch is turned off or when the Zoom speed change switch 75 is returned to the neutral point (turned off), is outputted to the camera lens, and the flow is returned. If none of the above are applicable, the flow is directly returned (S1579 to S1583).

If none of the above modes are applicable, preset zooming and constant image size zooming are stopped and the flow is returned after checking the end of preset zooming (S1513, S1541, S1561, S1585 to S1587).

IPZENDCHEK OPERATION

Figure 62:
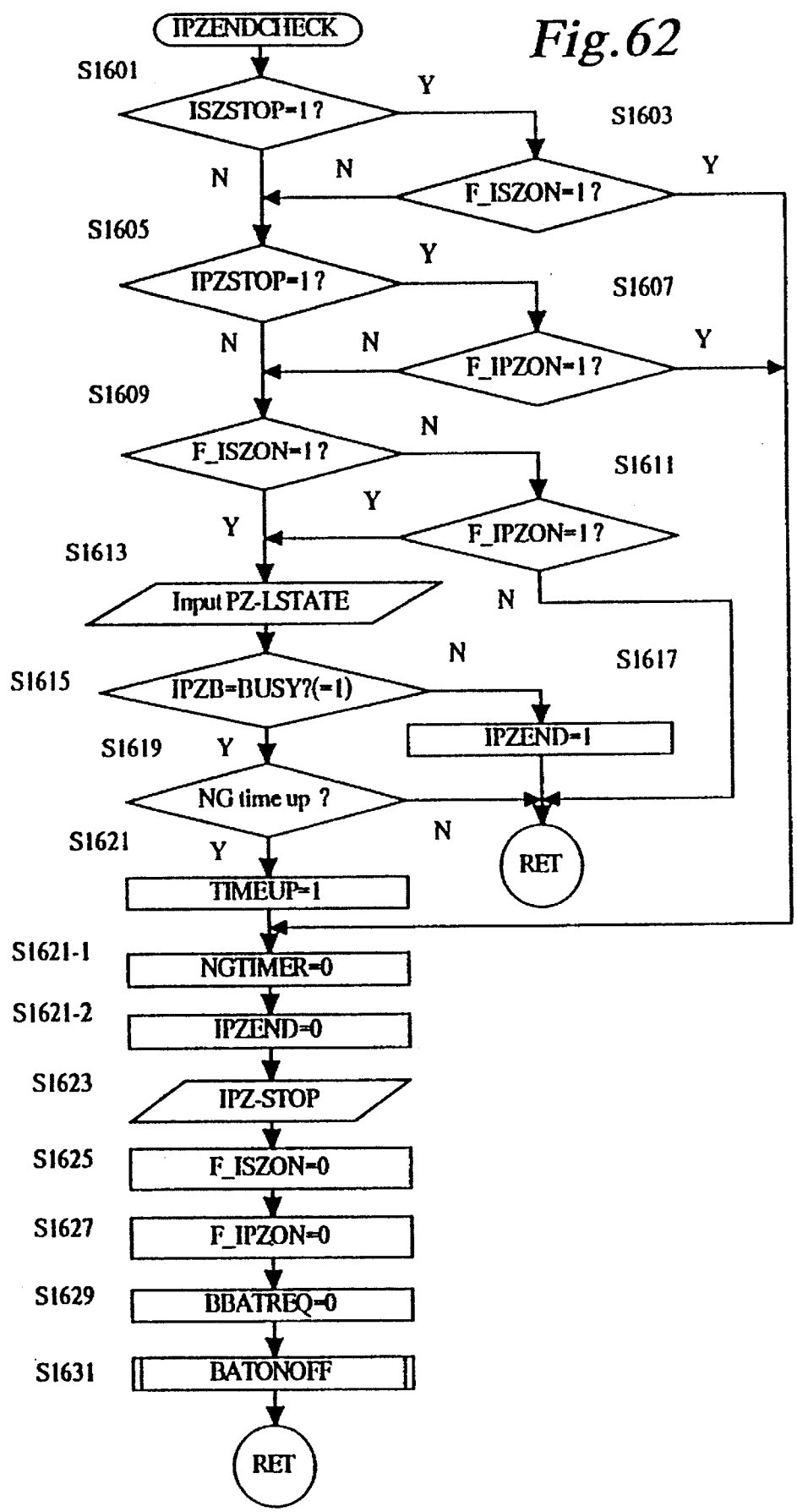
FIG. 62 is a flow chart regarding an operation for checking for completion of preset powered zooming.
Figure 63:
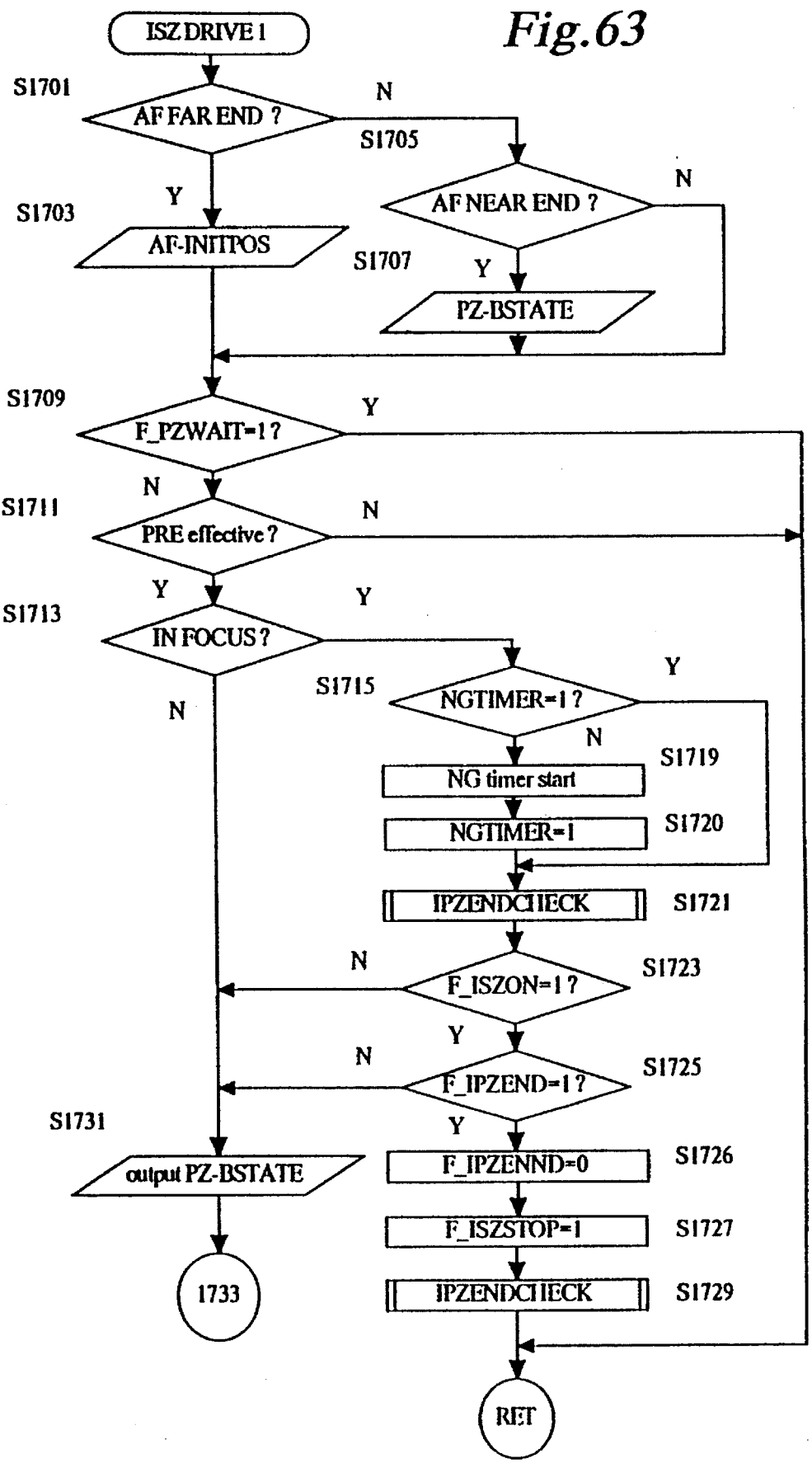
FIGS. 63 and 64 are a flow chart showing a first embodiment of constant image magnification zooming.
Figure 64:
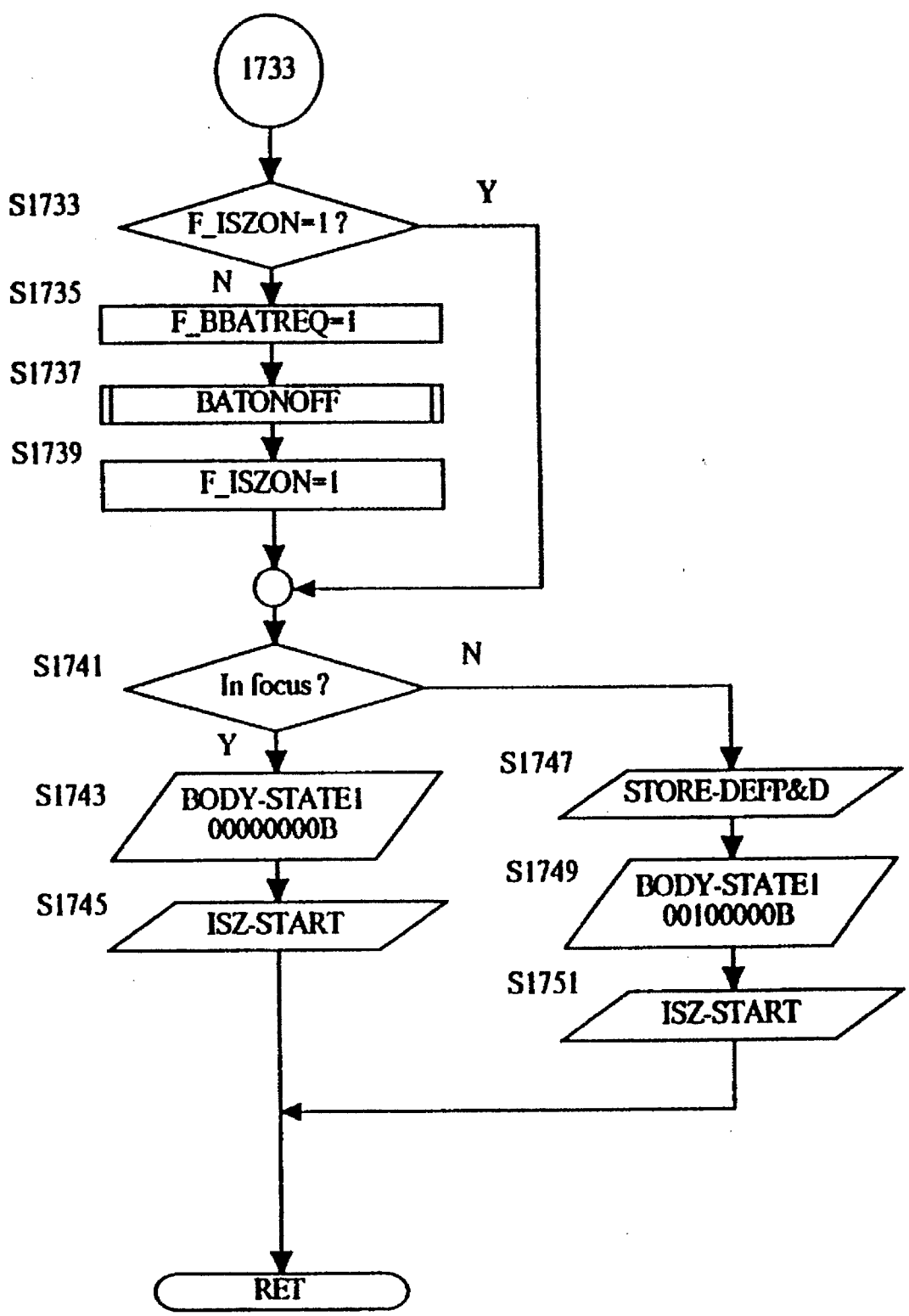

An IPZENDCHEK flowchart, as shown in FIG. 62, is a body-side operation which finishes preset power zooming and constant image size zooming and checks for the completion thereof.

Upon initiation of the IPZENDCHEK subroutine, during constant image size zooming completion and constant image size zooming-on (F_ISZSTOP=1, F_ISZON=1) or during preset zooming completion and the preset zooming-on (F_IPZSTOP=1, F_IPZON=1) state, an NGTIMER flag and an IPZEND flag are cleared, a transmission of an IPZ-STOP command to stop the power zoom is performed to clear the respective flags F_ISZON, F_IPZON and BBATREQ, and the flow is returned after stopping the battery supply and checking it (S1601 to S1607, S1623 to S1631).

If not currently in the state of constant image size zooming-on or preset zooming-on, a PZ-LSTATE data is inputted and it is checked whether the power zoom lens 51 is in the preset zooming-on or constant image size zooming-on states. If not currently in the state of zooming-on (IPZB=0), a flag of preset zooming completion or constant image size zooming completion is set and the flow is returned (S1601 to S1617). If currently in the preset zooming-on or constant image size zooming-on (IPZB=1) states, the flow is returned unless an abnormal detection timer (NG timer) expires (S1619).

Since it is expected that an abnormal event has occurred if the NG (abnormality detection) timer expires before the end of constant image size zooming, a TIMEUP flag is set (F_TIMEUP=1) and a NGTIMER flag and IPZEND flag are cleared (F_NGTIMERUP=0, F_IPZEND=0) (S1622-1, S1622-2). Then, a power zooming stop operation is performed (S1623 to S1631). If the NG timer has not yet expired, the flow is directly returned.

[ISZ-DRIVE1 OPERATION]

Figure 53:
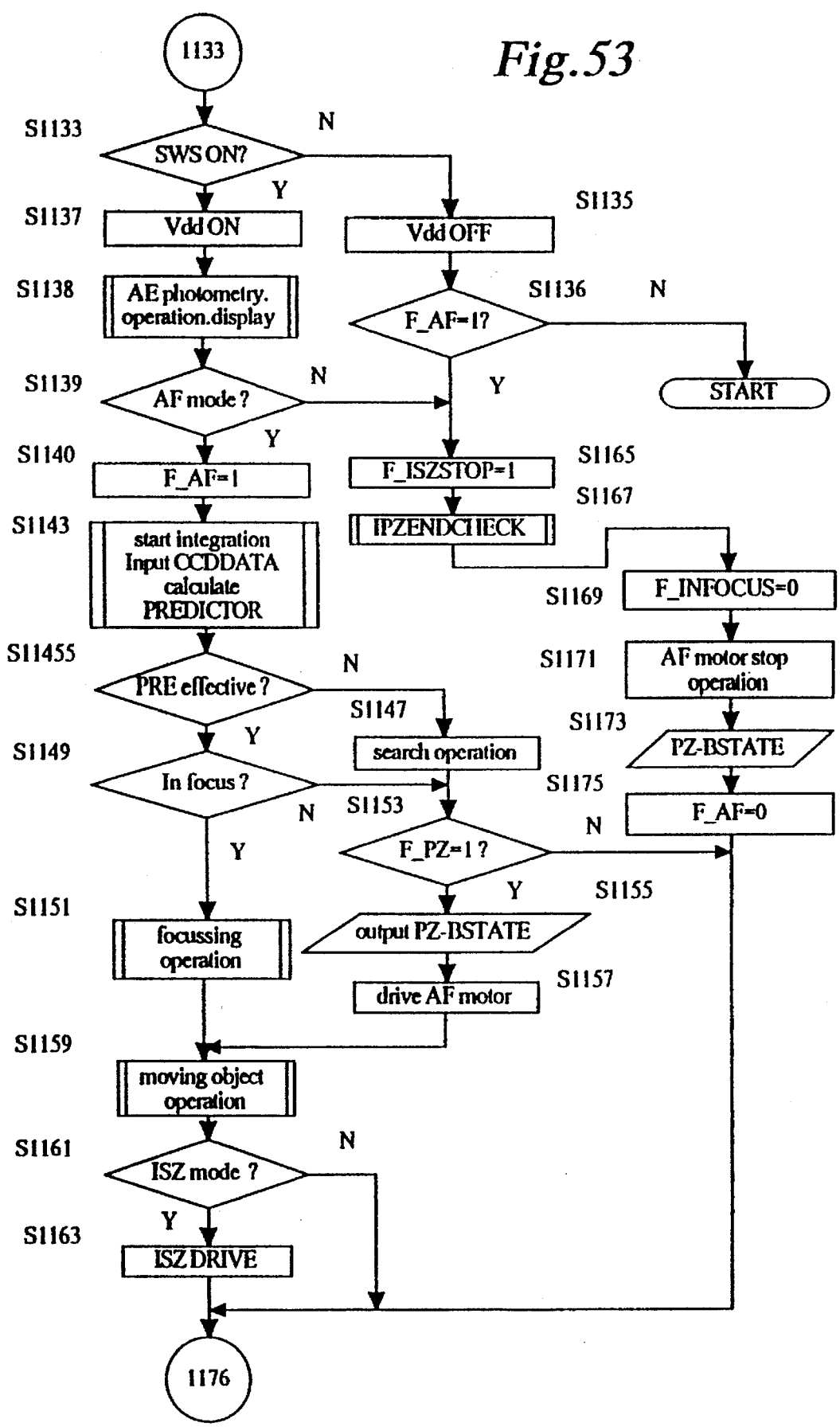
Figure 54:
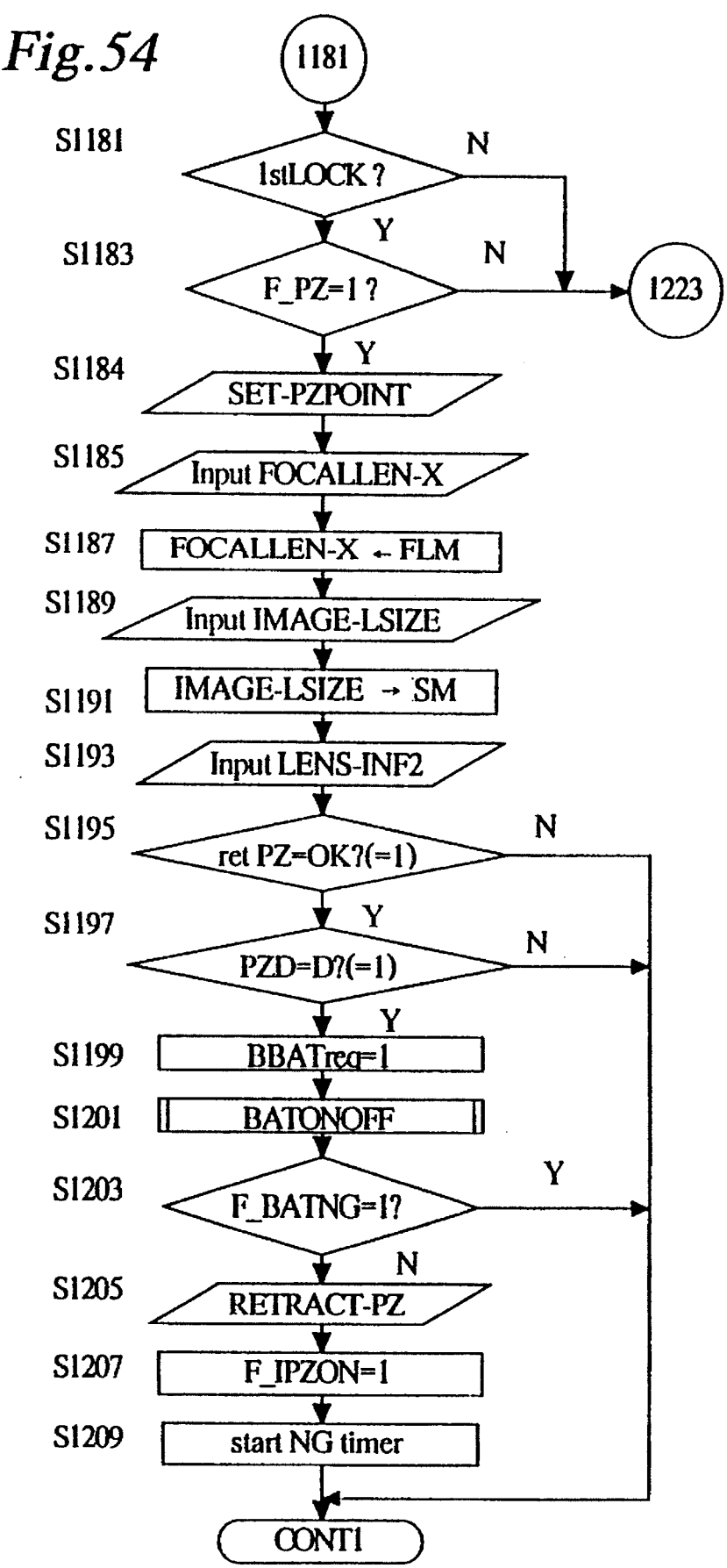
Figure 55:
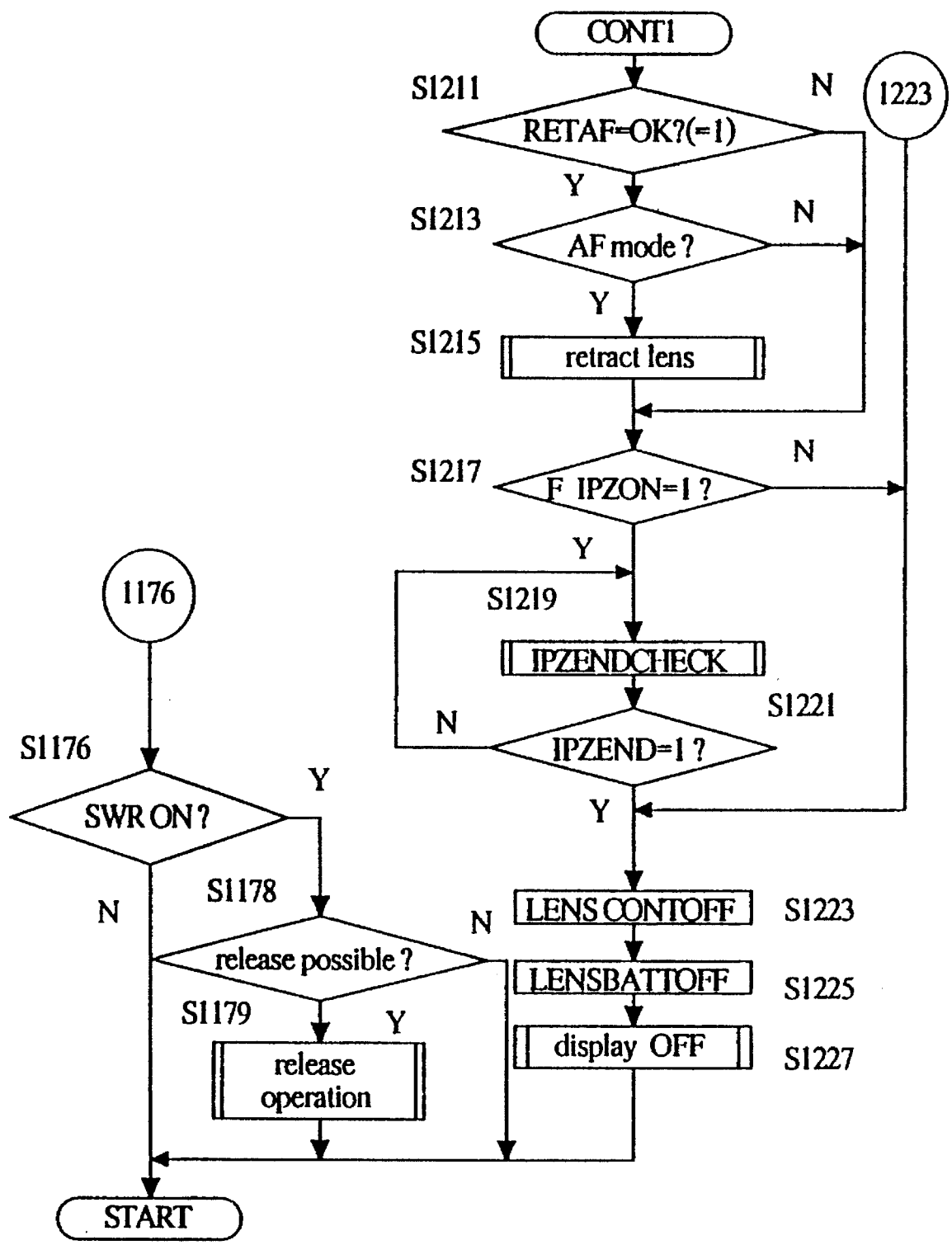

A flowchart (ISZ-DRIVE1) as shown in FIGS. 63 to 66 is an operation in body CPU 31 in which the power zoom lens 51 (a lens CPU 61) is forced to perform a constant image size zooming operation. The ISZ-DRIVE operation is called at S1163, as shown in FIG. 53.

When the focusing lens is at its infinite position, data concerning an AF position is transmitted to the power zoom lens 51 by an AF-INTPOS command (S1701, 1703). When the focusing lens is at its near position, PZ body state data concerning the power zoom mode of the camera body is transmitted to the power zoom lens 51 by PZ-BSTATE (S1701, S1705, S1707).

If a power zoom wait (F_PZWAIT=1) has been effected or if the result of a predictor operation is invalid, the flow is returned without any processing (S1709, S1711). If power zoom wait has not been effected and the result of the predictor operation is valid, the focus condition is checked (S1709 to S1713). If in focus, it is checked if the NG timer has been actuated (F_NBTIMER=1). If it has not been actuated, the NG timer is started and a flag F_NGTIMER is set, thereafter advancing to step S1721 (S1713, S1715, S1719, S1720). If the NG timer has already been actuated, the foregoing operation is skipped and the flow is advanced to S1721.

Next, after checking the completion of constant image size zooming at step S1721 (IPZEND-CHECK), it is checked if the completion of the same has occurred while in the constant image size zooming-on state (S1723, S1725). If in the constant image size zooming-on state (F_ISZON=1) and the constant image size zooming has ended (IPZEND= 1), a flag IPZEND is cleared and a flag ISZSTOP is set. Further, the flow is returned after an end operation of constant image size zooming is performed in an IPZEND-CHECK subroutine (S1725 to S1729).

If not in the constant image size constant zooming-on state or if constant image size zooming has not ended, a transmission of data concerning the power zoom state in the camera body 11 is performed by a PZ-BSTATE command (S1723, S1725, S1731). Then, if not in the constant image size zooming-on state, power supply is requested on the body side and a checking of the battery supply is performed. Further, after a flag identifying the continuation of constant image size zooming is set, the flow advances to an in-focus judgment but the flow advances to the in-focus judgment.

However, if already in the constant image size zooming-on state (S1733 to S1741), the flow directly advances to the in-focus judgment.

If in focus, in order to perform constant image size zooming based on the current AF pulse (i.e., the value of AFPXL, AFPXH), predetermined data is transmitted to the power zoom lens 51 by the BODY-STATE 1 command. Further, after a transmission of a constant image size zooming start (ISZ-START) command is effected to start constant image size zooming by the power zoom lens 51, the flow is returned (S1741 to S1745). If out of focus, defocus pulse data, measured by the camera body 11, is transmitted by a STORE-DEF & D command. After that, data, by which the constant image size zooming is effected based on the defocus pulse, is transmitted by a BODY,STATE1 command. Finally, a constant image size start command (ISZ-START) is transmitted, and the flow is returned.

[ISZ-DRIVE2]

Figure 65:
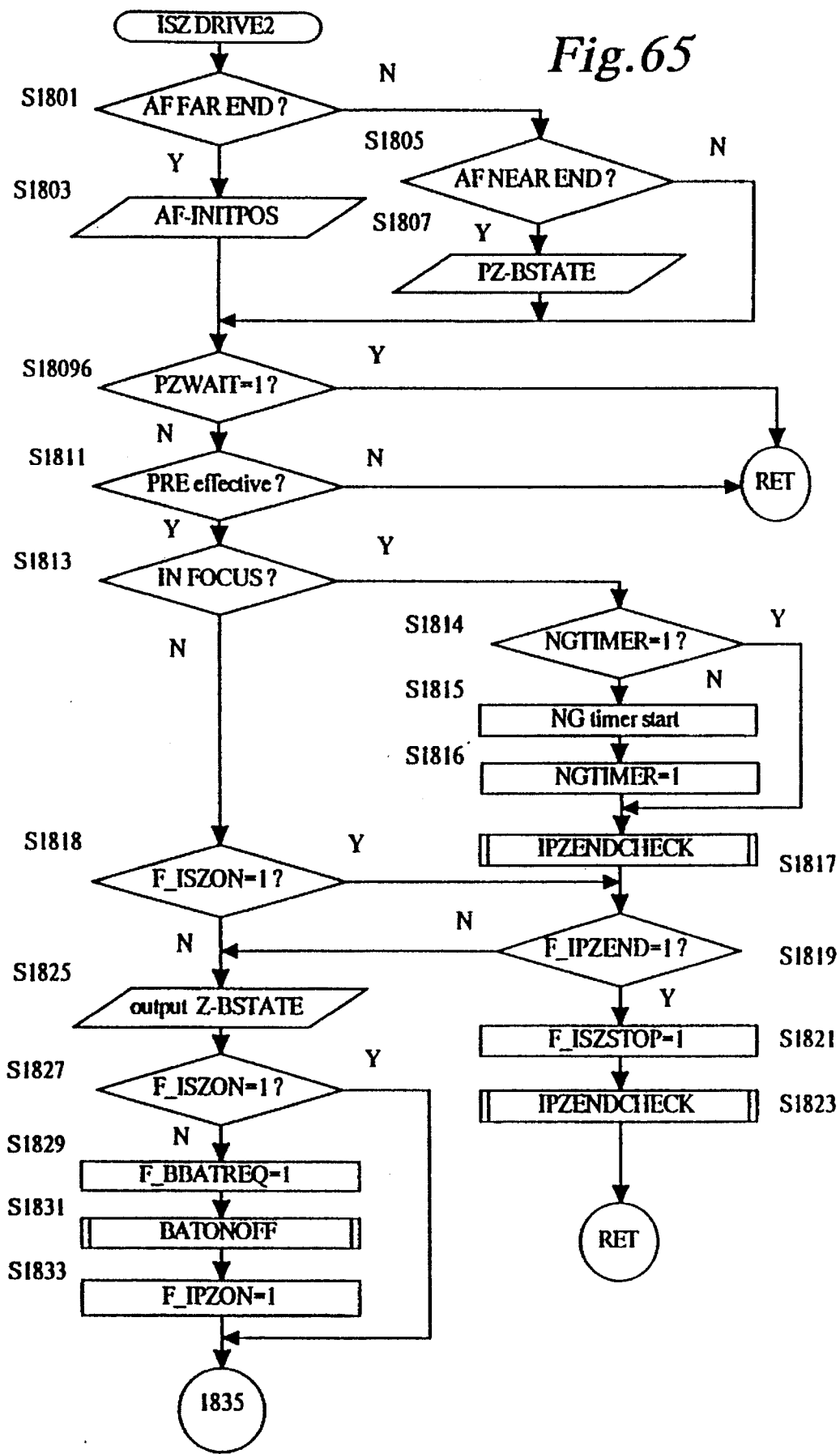
FIGS. 65 and 66 are a flow chart showing a second embodiment of constant image magnification zooming.
Figure 66:
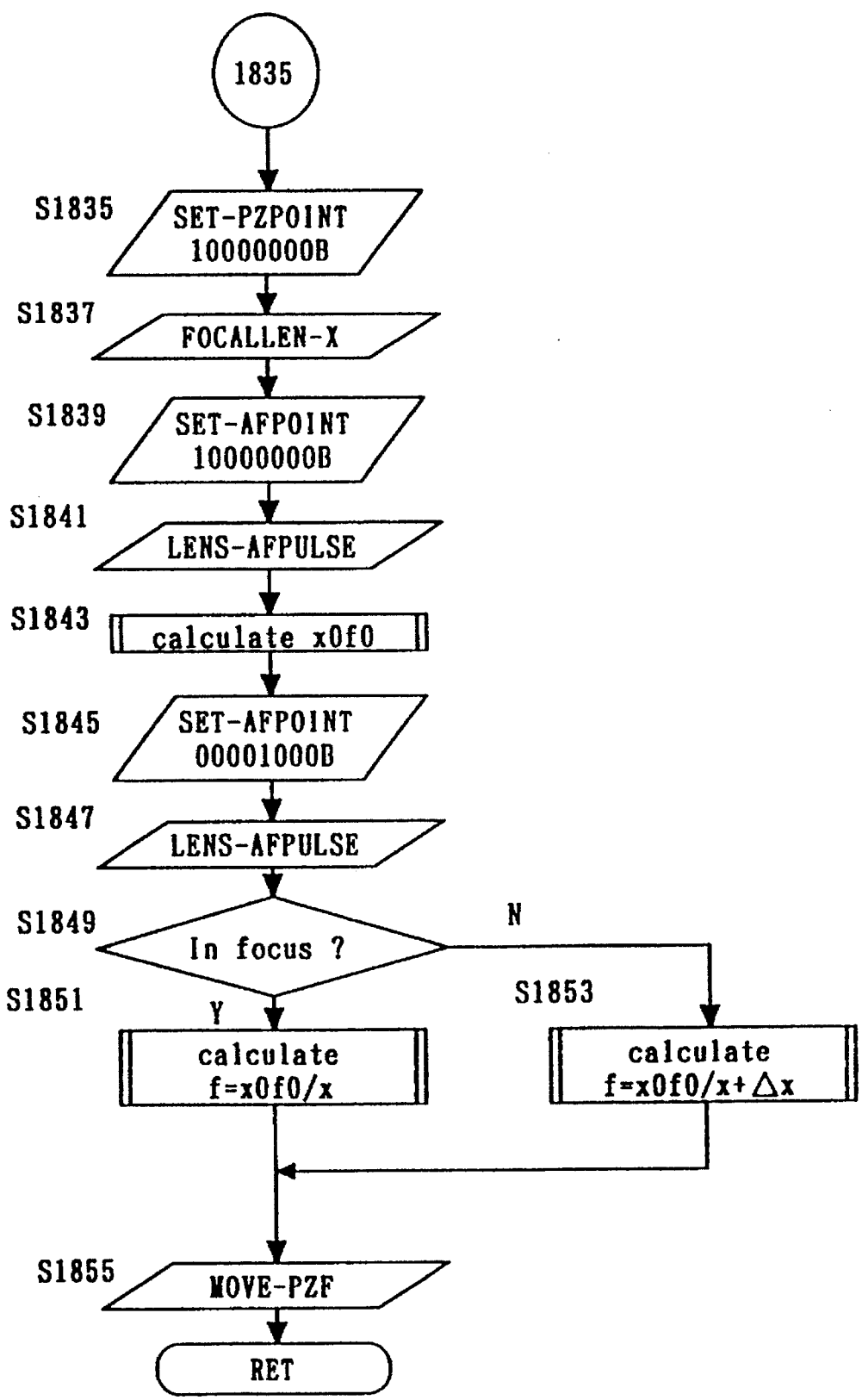

Hereinafter, a second embodiment of the constant image size zooming operation as shown in FIGS. 65 and 66 will be described. This second embodiment is characterized in that the operations and controls concerning constant image size zooming are performed in the camera body 11.

Since the operations from S1801 to S1823 are similar to those from S1701 to S1731, explanations are omitted. Hereinafter the operations from S1825 will be described.

If the lens is not focused, transmission of data concerning the power zoom state of the camera body 11 is performed by a PZ-BSTATE command (S1813, S1825 to S1833). Then, if the power zoom lens 51 is not undergoing constant image size zooming, power supply is requested by the body side. The battery supply operation and the checking thereof are then performed. Additionally, a control zooming-on flag F_IPZON is set (S1827 to S1833).

Next, transmission of a SET-PZPOINT command is issued designating an address of the lens RAM 61b in which the focal length, at the time of image size storing, is stored, and an input of the focal length (FOCALLEN-X data), at the time of image size storing and designated by the SET-PZPOINT command, is issued from the power zoom lens 51 (S1835, S1837). Further, a transmission of a SET-AFPOINT command is effected with a designation of the focal length data, at the image size storing, stored in the lens RAM 61b, and an input of number of AF pulses (LENS-AFPULSE data), at the time of the image size storing, is effected from the lens 51 (S1839, S1841). Then, the image size (x0f0) is operated based on the inputted data (S1843). Further, a transmission of the SET-AFPOINT command is effected with a designation of the current number of the AF pulses and an input of the current number of the AF pulses, (LENS-AFPULSE data) is effected based on the designation from the lens 51 (S1845, S1847).

Next, it is checked whether if the lens is in focus and, in the case that it is in-focus, the focal length is found from an equation ④ by utilizing the current number x of AF pulses. If not in focus, it is checked if the photographing image is a moving object. If it is a moving object, the focal length is calculated in the same manner as that of the in-focus calculation, based on the present AF pulse. If it is not a moving object, a target focal length is found from an equation ⑤ utilizing the current number x of AF pulses and de-focus pulses Δx (S1849 to S1853). Then, after transmissions of a command by which the power zoom is performed to the operated target focal length and the focal length data (MOVE-PZF command), the flow is returned (S1855).

The lens CPU 61, receiving this MOVE-PZF command, drives a zooming lens 53F to the target focal length sent from the camera body.

In this embodiment, the method for calculating the target focal length is changed according to the focusing state of the photographing lens. However, the method may be changed according to other conditions, for instance, the condition of whether or not the moving object prediction mode is being effected.

In this case, a judgement operation "Is the photographing image a moving object ?" is to be added before S1853. In the case of a moving object, the target focal length is calculated by the present lens moving amount at S1851. If not a moving object, the focal length is calculated at S1853. The reason why the target focal length is calculated without utilizing defocus amount when the moving object prediction mode is effective, is to make the driving speed of the lens faster and more stable.

[ISZ-DRIVE3]

Figure 67:
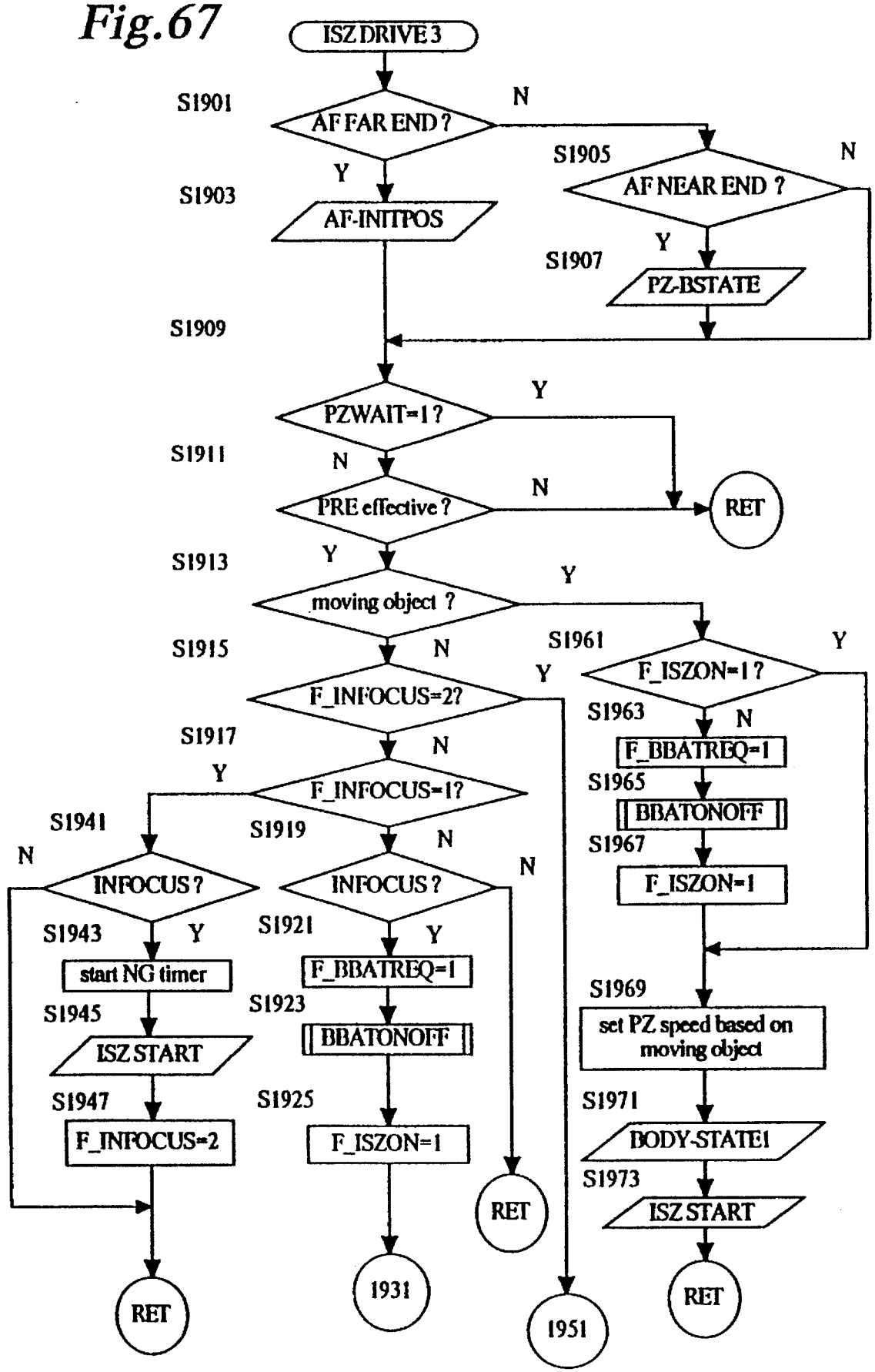
FIGS. 67 and 68 are a flow chart showing a third embodiment of constant image magnification zooming.
Figure 68:
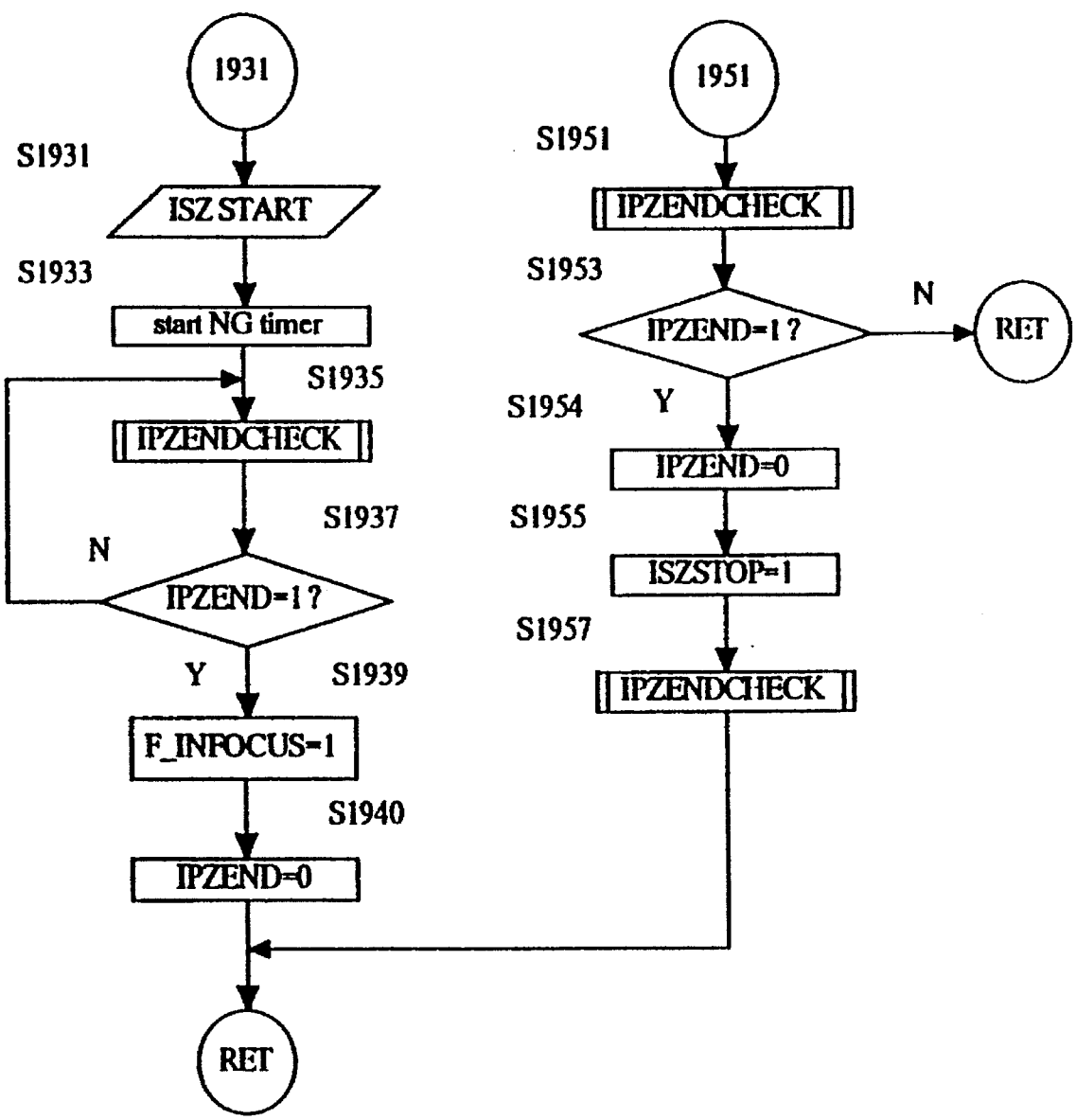

A constant image size zooming operation, as shown in FIGS. 67 and 68, illustrates a third embodiment of the present invention. In this embodiment, a modification of constant image size zooming is controlled at the side of the body 11. In detail, in the case that constant image size zooming is effected after the lens comes into focus once, the in-focus state may be shifted when the zooming is ended. Therefore, according to the third embodiment, the AF operation and constant image size zooming are again effected after constant image size zooming has ended. In addition, this embodiment is provided with a method for driving the lens during constant image size zooming by changing its speed depending on the speed of moving object at the time of the moving object prediction AF.

If the focusing lens 53F is in the far position, a AF-INITPOS command is transmitted to the taking lens (power zoom lens 51 (S1901, S1905, S1907)). If the focusing lens is in the near position, PZ body state data concerning the power zoom mode of the camera body is transmitted to the power zoom lens 51 by PZ-BSTATE command (S1901, S1905, S1907).

If the lens is in a power zoom wait mode or if the result of the predictor operation is invalid, the flow returns without any processing (S1909, S1911).

If the lens is not in the power zoom wait mode and if the result of the predictor operation is valid, it is checked whether a subject is a moving object (S1909 to S1913). If the subject is a moving object and the constant image size zooming-on flag has been cleared (i.e., not during constant image size zooming), a body's battery request flag (F_BATREQ=1) is set and battery supply is effected. Further, the constant image size zooming-on flag (F_ISZON= 1) is set (S1961 to S1967). Then, power zoom speed is set, depending on the speed of the moving object (moving speed on an image surface). A flag ISD is cleared to effect the ISZ control by using the set power zoom speed data and the AF pulse at the current position. Further, a transmission of an ISZ-START command is effected through the BODY-STATE1 data communication to force the camera lens 51 to commence constant image size zooming (S1969 to S1973).

In the case that the object is not moving, it is checked if the lens is in-focus for the second time (F_INFOCUS=2) or the first time (F_INFOCUS=1 (S1913, S1915, S1917)). Here, the F_INFOCUS is two bits. If the lens is not in-focus for first or second time, i.e., in an initial state, it is checked if it is in focus. If not in-focus, the flow is returned. In the case of an in-focus condition, the body battery request flag BBATREQ is set to effect the power supply, and the constant image size zooming-on flag F_ISZON is set (S1919 to S1925).

Then, transmission of the constant image size zooming start command is effected so that constant image size zooming and the NG timer are started. It is then checked if constant image size zooming has ended. When it has ended, the first operation is ended after a first in-focus condition flag is set and a constant image size zooming end flag F_IPZEND is cleared (S1935 to S1940).

The next time this operation is initiated, the flow moves from S1917 to S1941 because the first in-focus flag is set. It is then checked whether it is again in focus. If not in focus, the flow is returned and the foregoing operation is repeated until an in-focus condition is achieved. If it is in focus, the NG timer is started and the constant image size zooming start command is transmitted to the camera lens to force the camera lens to start constant image size zooming. The flow is then returned after the second in-focus flag is set (S1943 to S1947).

If this ISZ-DRIVE 3 operation is initiated after the end of the S1947 operation, the second in-focus flag is set so that the flow advances from S1915 to S1951 and it is checked if constant image size (control) zooming has ended. If the control zoom has not ended, the flow is returned If the control zoom has ended, a control zoom end flag IPZEND is cleared and constant image size zooming stop flagISZS-TOP is set. The flow is then returned after the constant image size zooming end operation is performed (S1953 to S1957).

[AFP-CNT OPERATION]

Figure 69:
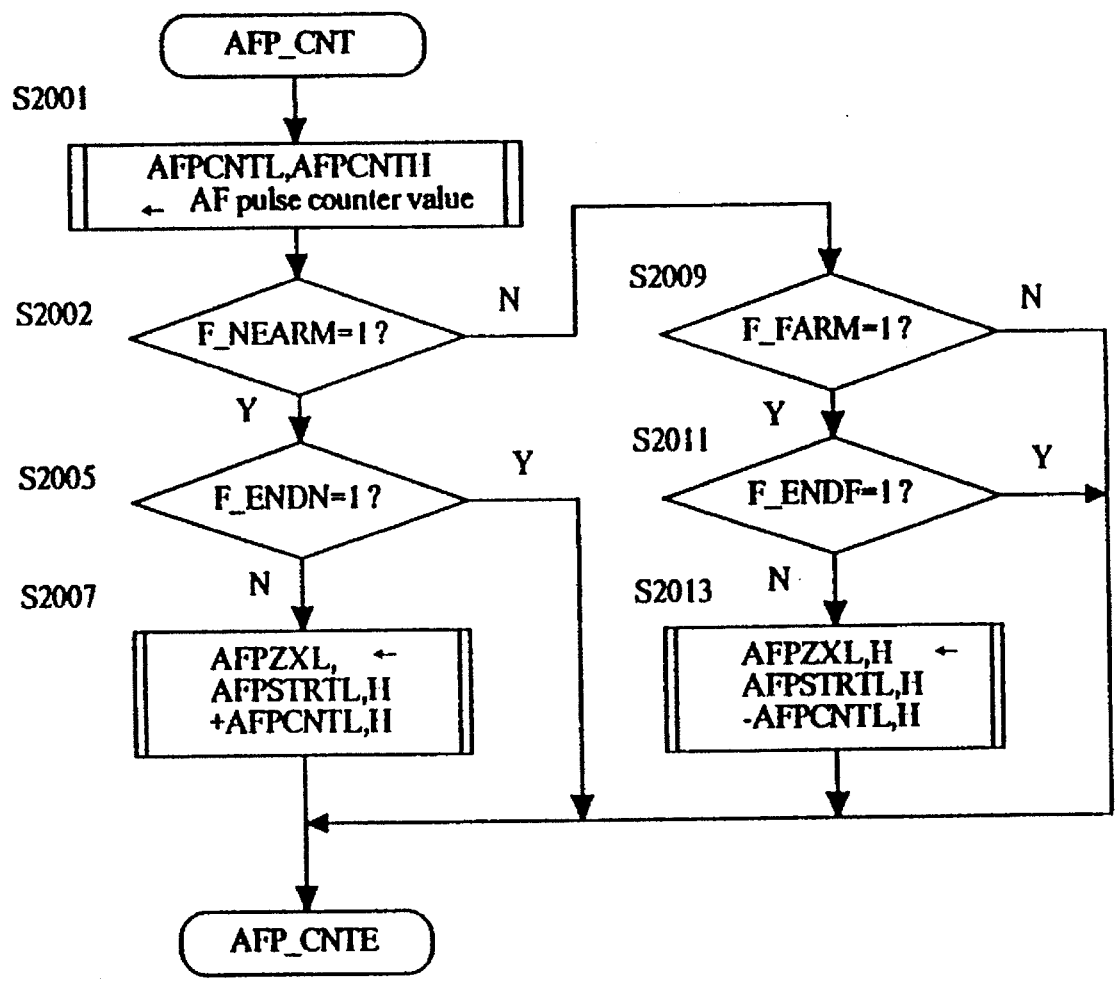
FIG. 69 is flow chart regarding an operation for AF pulse count.

An AFP-CNT operation, as shown in FIG. 69, is an AF pulse count operation in the power zoom lens 51. The lens CPU 61 comprises an AF pulse counter for counting AF pulses outputted from an AF pulser 59 in a hardware manner. This AFP-CNT operation is initiated at 2 ms intervals by a 2 ms timer interrupt. This operation illustrates, in detail, the operation at S303 in the 2 ms timer interrupt routine, as shown in FIG. 9.

In the AFP-CNT operation, a count value of the AF pulse hard counter is first stored in an AF pulse count value memory (addresses AFPCNTL, H of the lens RAM 61b (S2001)). Then, by reference to data (i.e., data installed in bit 3-0 of PZ-BDST, which is a predetermined address of RAM 61b) concerning an AF operation which is inputted by PZ-BSTATE command when an AF motor 39 is moving the lens to the near end and before it arrives at the near end, the AF pulse count value is added to an AF pulse count start value (AFPSTRTL, H) and this is stored in the current AF pulse value memory (AFPXL, H of the lens RAM 61b) before ending the routine. However, if it arrives at the near end, the flow immediately ends (S2002 to S2007).

When the AF motor 39 is moving the lens to the far end and before it arrives at the far end, the AF pulse count value is subtracted from the current AF pulse count start value and the result is stored in the current AF pulse value memory (AFPXL, H) to end the AFP-CNT operation. If it arrives at the far end, the AFP-CNT operation is immediately ended (S2009 to S2013). Also, if the lens is neither moving towards the near end nor the far end, the AF motor does not rotate. Therefore the AFP-CNT operation ends without any processing (S2002, S2009).

[AFP-ADJ OPERATION]

Figure 70:
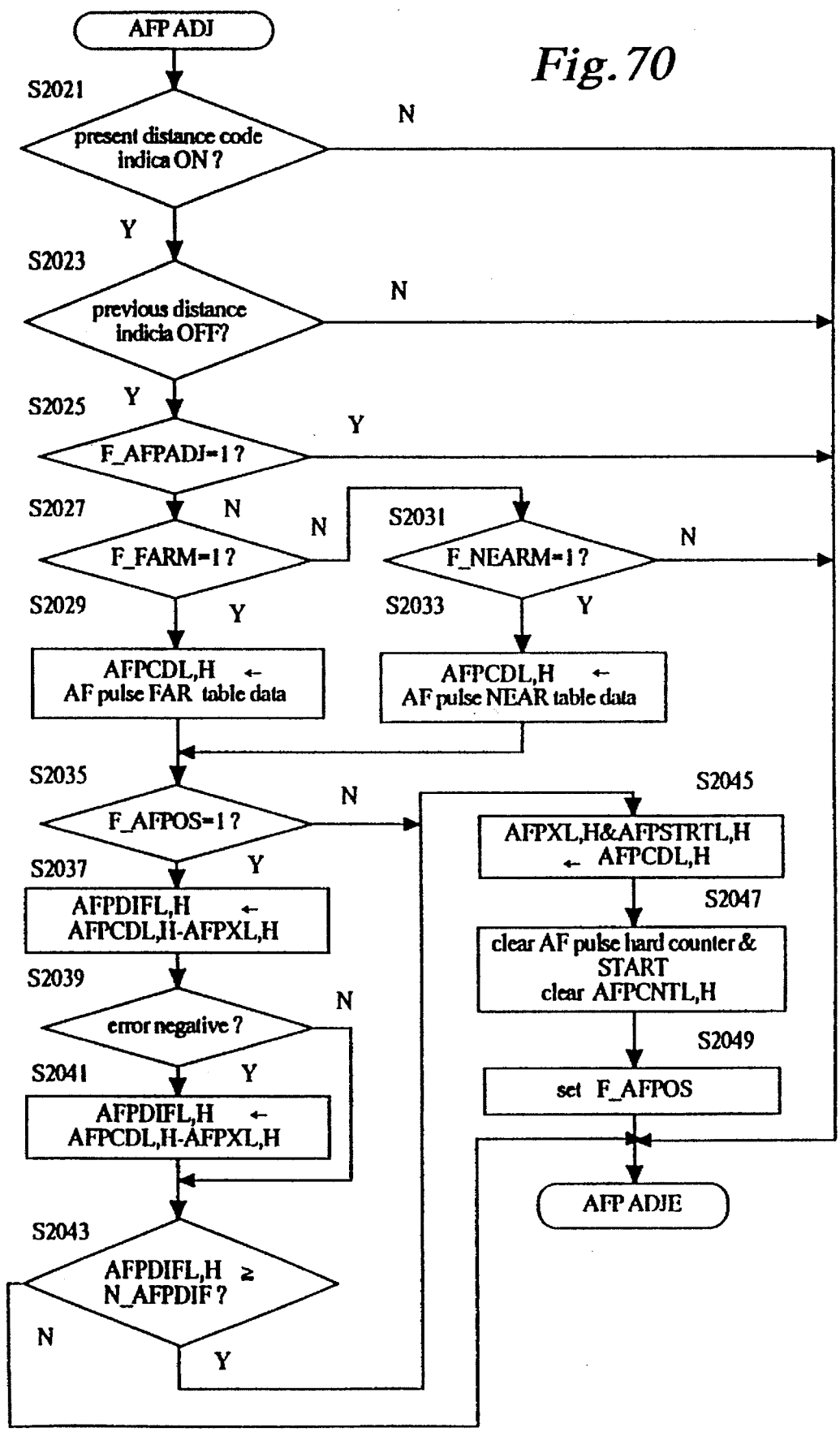
FIG. 70 is a flow chart regarding an operation for adjusting AF pulse count value.

An AFP-ADJ flowchart as shown in FIG. 70 is an operation at the side of the camera lens 51. It amends the current AF pulse value affected by backlash and the like. In the present embodiment, the AF pulse value at the far end is set at zero and the AF pulse value at the near end is set at the maximum value. Then, the present AF pulse count is amended every time the brush 85 crosses one of the indicators 83 on the distance code 81, in accordance with an absolute pulse number, which is to be determined by the position of the indicator 83, based on an absolute value code. The present operation is a detail of the 2 ms timer interrupt routine at S307, as shown in FIG. 9.

Upon initiation of the AFP-ADJ operation, it is first checked if the brush 85 has contacted the indicator 83. If not, the operation is ended (S2021). If contacted, the flow is directly returned in the case that such a contact was achieved during the preceding operation (S2021, S2023). In other words, at the time when the indicator 83 and the brush 85 contact is detected (at an edge of the indicator 83).

If the indicator 83 and the brush 85 contact each other and such contact occurs when the AF motor 39 is moving the lens to the far position, an AF pulse FAR table data (data concerning an edge at the near end side of the indicator 83) corresponding to the near end position of the indicator 83 is read and stored in addresses AFPCDL, H. If such contact occurs during the near end movement, an AF pulse NEAR table data (data concerning an edge at the FAR end side of the indicator 83) corresponding to the far end position of the indicator 83 is read and stored in addresses AFPCDL, H (S2025 to S2033). The reason why there are two kinds of tables, i.e. the FAR table and the NEAR table is because the indicator 83 has a width and an absolute position at the contact time which is different along the width, depending on the contact direction. When the AF motor 39 is stopped, the flow is immediately ended (S2027, S2031). Further, a flag F_AFPADJ at S2025 is provided for test purposes and is usually cleared.

Next, if the current AF pulse value is known (when a flag F_AFPOS is set), the current AF pulse count value (data of the AFPXL, H) is subtracted from the table data (AFPCDL, H) and its subtracted value (difference) is stored in an AF pulse error memory (AFPDIFXL, H (S2035, S2037)). Here, when the error is negative, the absolute value of the error is stored in an AF pulse current value memory (S2039, S2041).

It is then checked if the difference is larger than an allowable error (N_AFPDIF). If it is smaller, the operation is directly ended. However, if larger, an amendment is effected, that is, the table data (AFPCDL, H) are incorporated into the current AF pulse value memory (AFPXL, H) and the AF pulse count start value memory (AFPSTARTL, H (S2043, S2045)). On the other hand, if the AF pulse current value is not known, the amendment operation at S2045 is unconditionally performed (S2035, S2045).

Then, the AF pulse hard counter is cleared and started and the AF pulse count start value (AFPCNTL, H) is cleared. After that, a flag F_AFPOS, showing the current AF pulse value being known, is set and the operation ends (S2047, S2049).

[LMT-DTC OPERATION]

Figure 71:
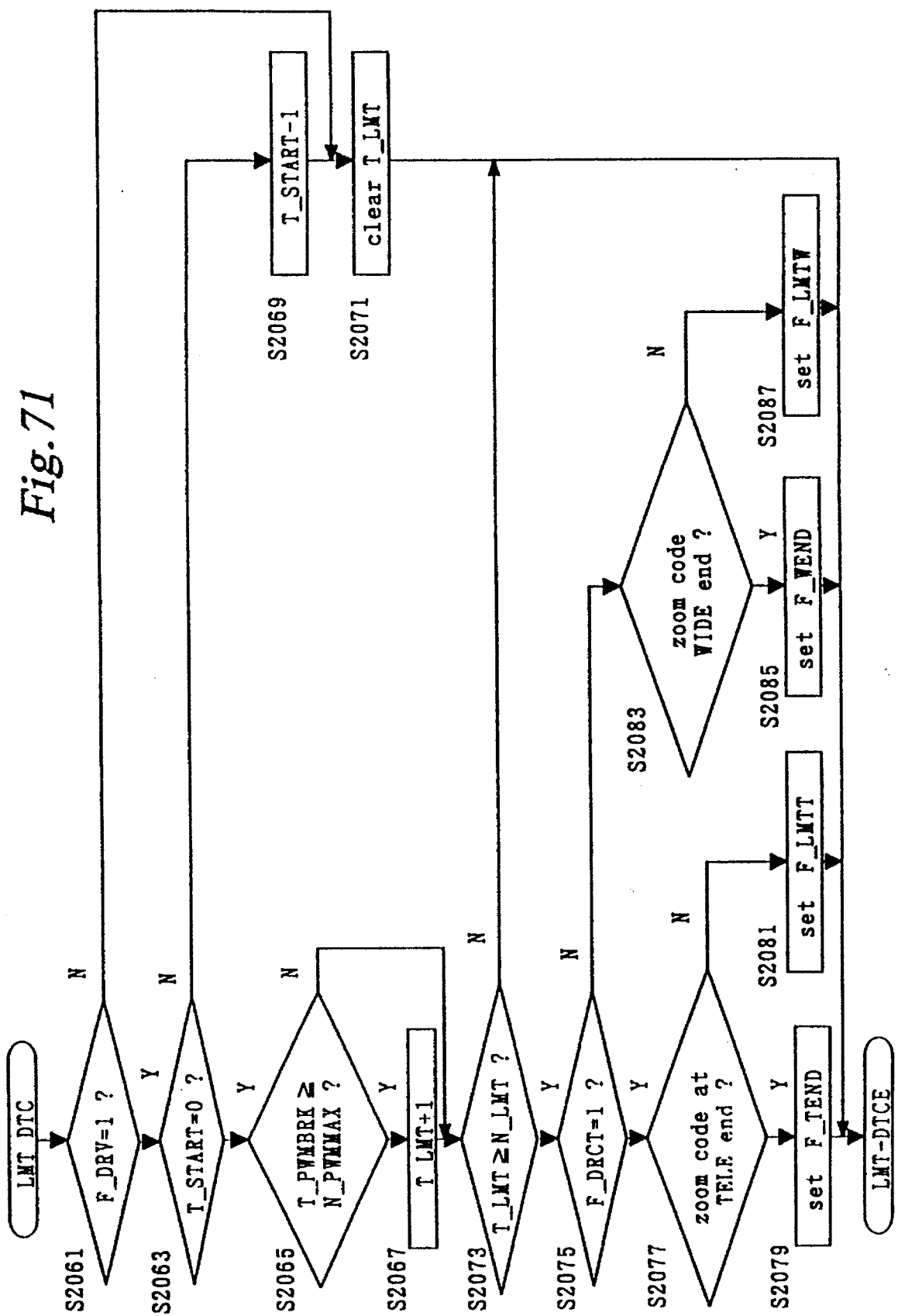
FIG. 71 is a flow chart regarding an operation for a PZ terminal point.
Figure 72:
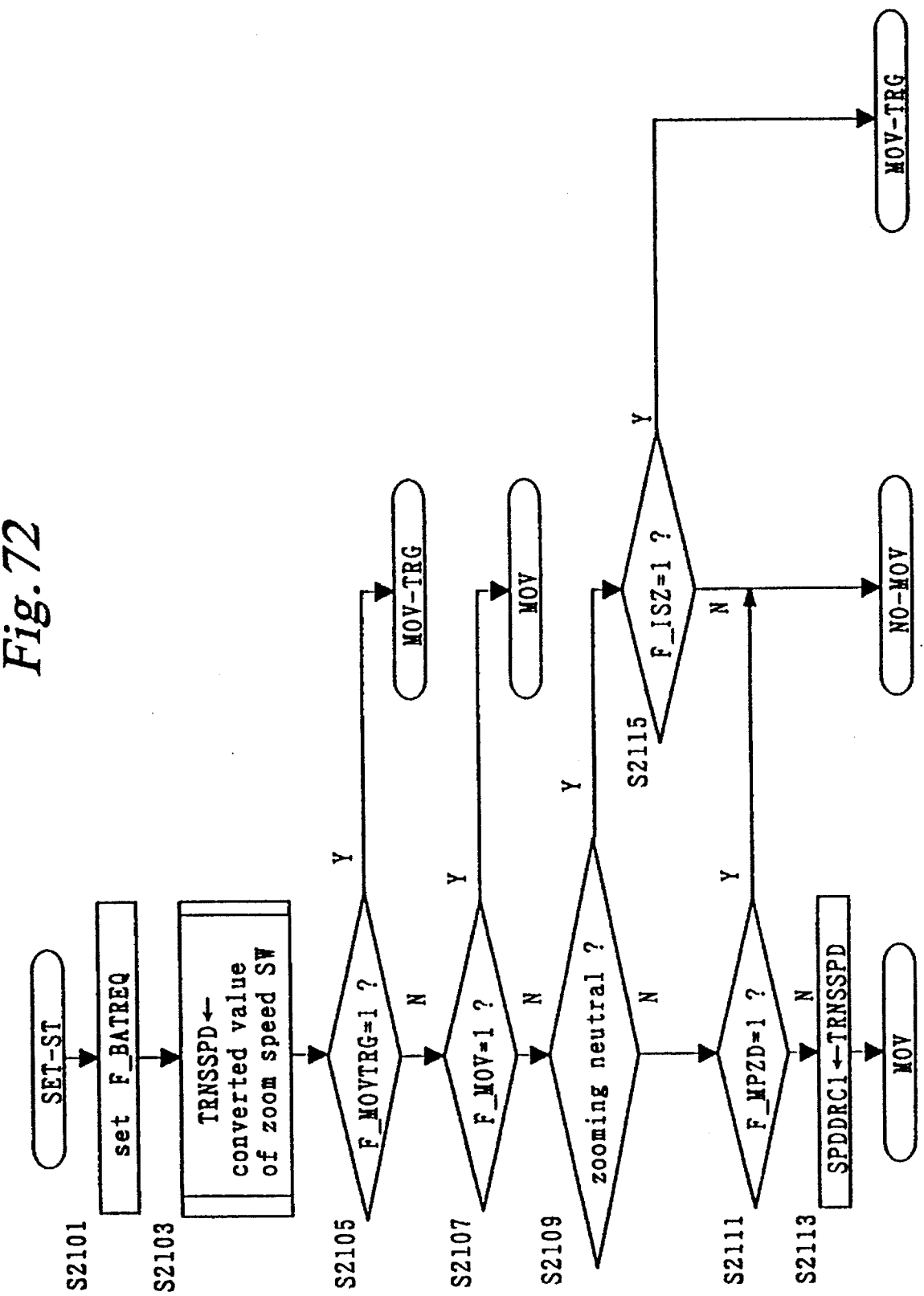
FIG. 72 is a flow chart regarding an operation for controlling rotational direction and rotational speed of a zoom motor.

A LMT-DTC flowchart as shown in FIG. 71 is an operation on the side of the camera lens 51. This operation detects that a zooming lens group 53Z has arrived at an end point or that movement is prevented by some external circumstances (i.e., the lens group 53Z has arrived at a para-end point). According to the present embodiment, such detections are performed by checking if, during the drive of a PZ motor 65, the PZ pulses are outputted within a predetermined period of time. Further, the predetermined period of time is changed depending on a driving speed of the PZ motor (zooming speed). Also, since a starting torque becomes larger for a constant period after the start of the PZ motor (i.e., upon a transfer from a stop state or a braking state to a driving state), the detection of the end point is not performed. The present operation illustrates the detail of the 2 ms timer interrupt routine at S351, as shown in FIG. 10.

First, it is checked if the PZ motor is performing a driving operation. In the case of non-driving, the flow exits after clearance of a limit counter T_LMT, which detects arrival at a limit (i.e., the end point or the para-end point (S2061, S2071)). Specifically, a PWM timer T_PWM is cleared when the PZ pulse is outputted to initiate the PZ pulse count interrupt operation as shown in FIG. 12.

During the PZ drive, it is checked if a counter T_START, which measures the time since the start, becomes zero (i.e., whether a predetermined period of time has expired). In the case that it is not zero, the counter T_START is decremented by one and the limit counter T_LMT is cleared to leave the operation (S2061, S2063, S2069, S2071). This processing is initiated every 2 ms so that the counter T_START is decremented every 2 ms. The value of the counter T_START is set at a predetermined value when the zoom motor is started, but the end point detection is not performed within a constant period after that start.

The fact that the counter T_START becomes zero means that a predetermined time has expired after the motor start, as a result of which the flow advances to the operation of end point detections, from S2065.

In the case that a duty ratio T_PWMBRK of a PWM becomes more than its maximum limit value N_PWFLMAX, the counter T_LMT for the end point detection is incremented by one and the flow advances to S2073. In the opposite case, the flow exits and advances to S2073 (S2065, S2067). Also, if the motor is engaged in DC drive (i.e., the maximum speed drive), the value of the maximum limit value N_PWMMAX, as a duty ratio T_PWMBRK, is established. Therefore, during the DC drive, the limit counter T_LMT is incremented by one (S2065, S2067).

Next, a PWM drive of the zoom motor is controlled as follows.

The PWM duty ratio T_PWMBRK is usually set at a smaller value than the maximum limit value N_PWMMAX. Accordingly, the counter T_LMT is not incremented and the flow exits (S2065, S2073). However, if the PZ pulse is not outputted for a constant period of time, the duty ratio T_PWMBRK is gradually increased by the 2 ms timer routine and becomes a value similar to the maximum limit value N_PWMMAX (generally DC drive) after a predetermined period to let the counter T_LMT be incremented by one.

Here, in the case of the PWM low speed drive, the value of the PWM duty ratio T_PWMBRK is small in the beginning. Therefore, upon arrival at the end point or the para-end point, it takes a long time for the counter T_LMT to be incremented.

In the case of the PWM high speed drive<the value of the PWM duty ratio T_PWMBRK is large. Therefore, upon arrival at the end point or the para-end point, it takes a shorter time for the counter T_LMT to be incremented in comparison with that of the PWM low speed drive.

With the above processing, it is possible to change the end point detection time depending on the zoom motor drive speed (S2063, S2067). Further, if the counter T_LMT is below a predetermined value (N_LMT), a predetermined end point detection period will have not yet expired so that the flow immediately leaves this subroutine (S2073).

If the counter T_LMT increases beyond the predetermined value N_LMT, it is regarded as the end point or the para-end point. In the case of a tele-direction drive, a tele end flag F_TEND is set if a zoom code is a tele end value. However, if the zoom code is not the tele end value, its stop is effected by any abnormality and therefore a para-tele end flag F_LMTT is set (S2075 to S2081). In the case of a wide-direction drive, a wide end flag F_WEND is set if a wide code is the wide end value. However, if the zoom code is not a wide end value, its stop is effected by any abnormality and therefore a para-wide end flag F_LMTW is set (S2075, S2083 to S2087).

[SET-SET OPERATION]

A SET-SET flowchart as shown in FIGS. 72 to 80 is an operation at the side of the power zoom lens 51 and configured to settle a status (speed control bit) such as controls of rotational direction, speed, stop and brake of the zoom motor. The present operation is a detail of the 2 ms interrupt routine, as shown in FIG. 10. Further, this SET-SET operation includes, as shown in FIGS. 72 to 80, a MOV operation, an INIT3 interrupt operation, a NO-MOVE, a MOV1 operation, BRK1, 2-operation, a STP1 operation, a MOV-TRG operation and a DRV-TRG8 operation.

Firstly, a power request flag F_BATREQ is set and position of the zoom speed change switch 75 is transformed into a predetermined code (which indicates its direction and speed). Thereafter the code is stored in a transformed value memory TRNSSPD (S2101, S2103).

If the lens is driven towards a designated position (F_MOVTARG=1), the flow advances to the MOV_TRG operation. If it is an usual move or drive in a designated direction (i.e., when a F_MOV is set), the flow advances to the MOV operation (S2105, S2107).

If it does not correspond to any move or drive and a zoom operation ring is located on a neutral position (when the zoom switch 75 is turned off), the flow advances to the MOV-TARG operation when in the image size constant zoom mode while the flow advances to the NO-MOV operation when in the non-image size constant zoom mode (S2109, S2115). If the zoom operation ring is not located in the neutral position, flow advances to the NO-MOV operation when a manual power zoom stop bit is set (F_MPZD= 1). If not, manual power zooming is being effected and therefore the flow advances to the MOV operation with a storage of a zoom speed data, which is transformed from a zoom switch status, in an address SPDDRC1 (S2109, S2111, S2113).

In the above operation, since upon initiation of a release operation in the body and the like a flag F_MPZD is set by a communication command BODY-ATATE1 (22), the manual power zoom operation during the release can be stopped. Also, upon reception of a transmission of a communication command IPZ-STOP (35) for stopping the power zoom, the respective flags such as F_MOVTRG, F_MOV and F_ISZ are cleared and therefore power zoom operations in addition to the manual power zoom can be stopped.

[MOV OPERATION]

Figure 73:
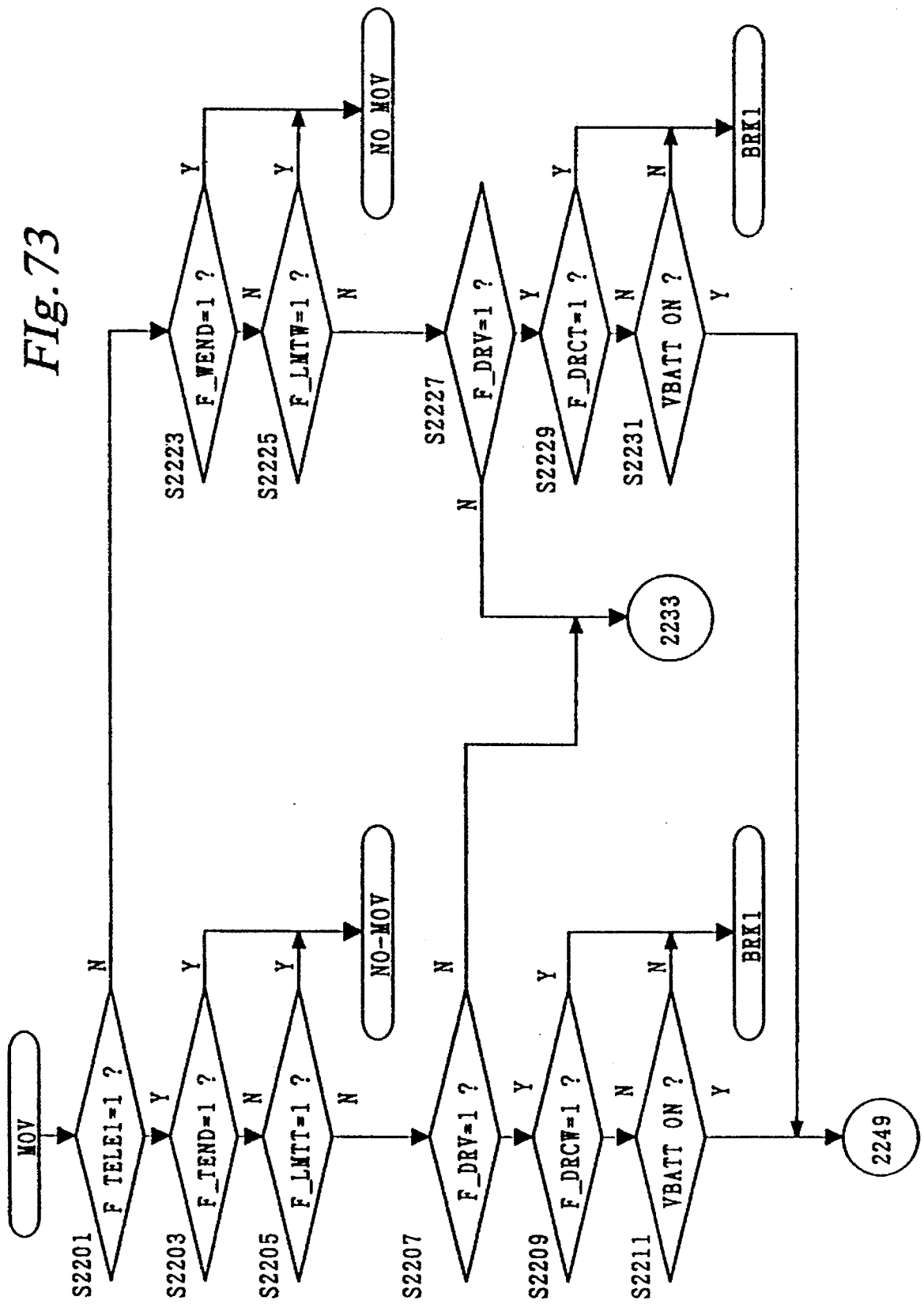
FIGS. 73, 74, and 75 are a flow chart regarding powered zooming operation by a zoom switch.
Figure 74:
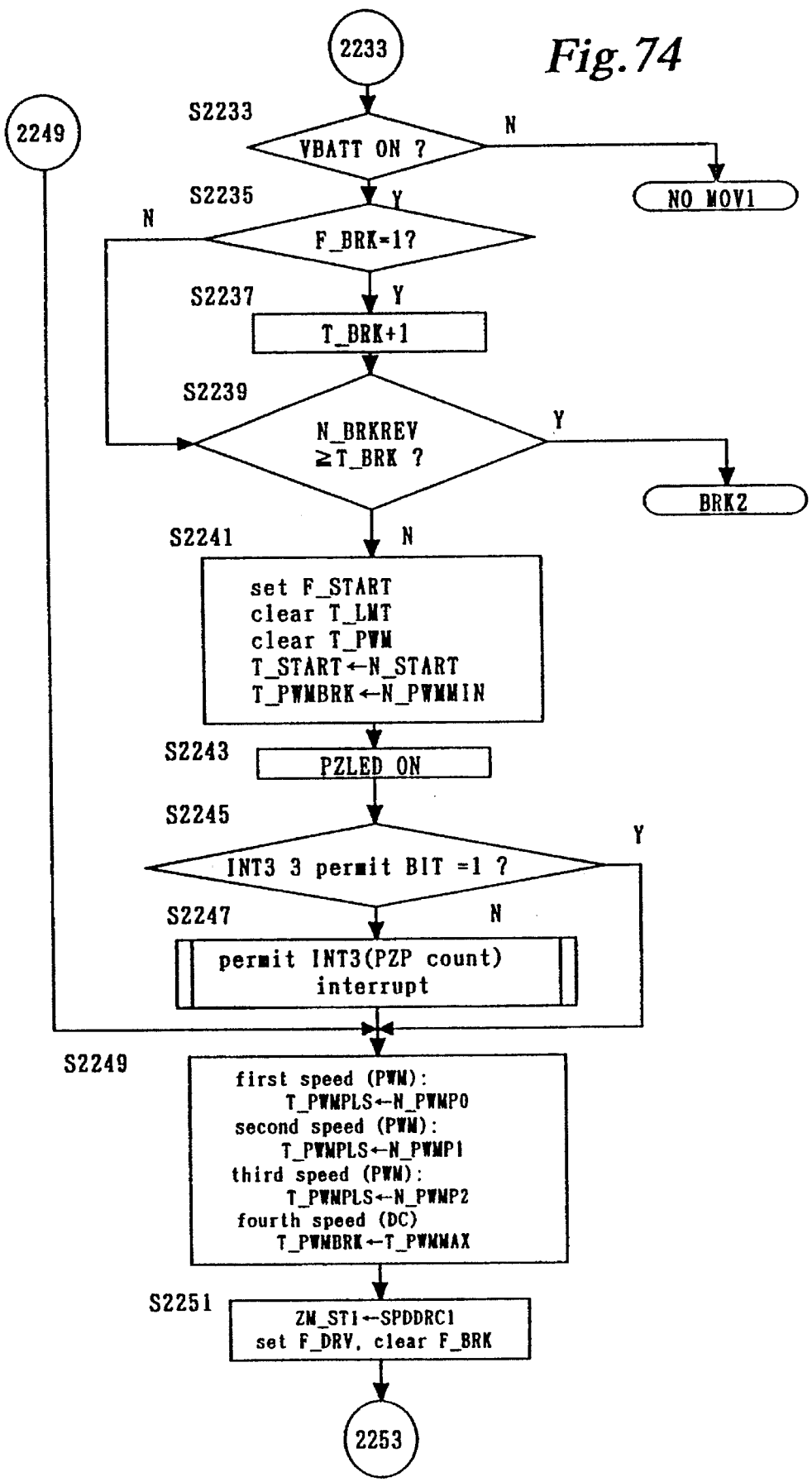
Figure 75:
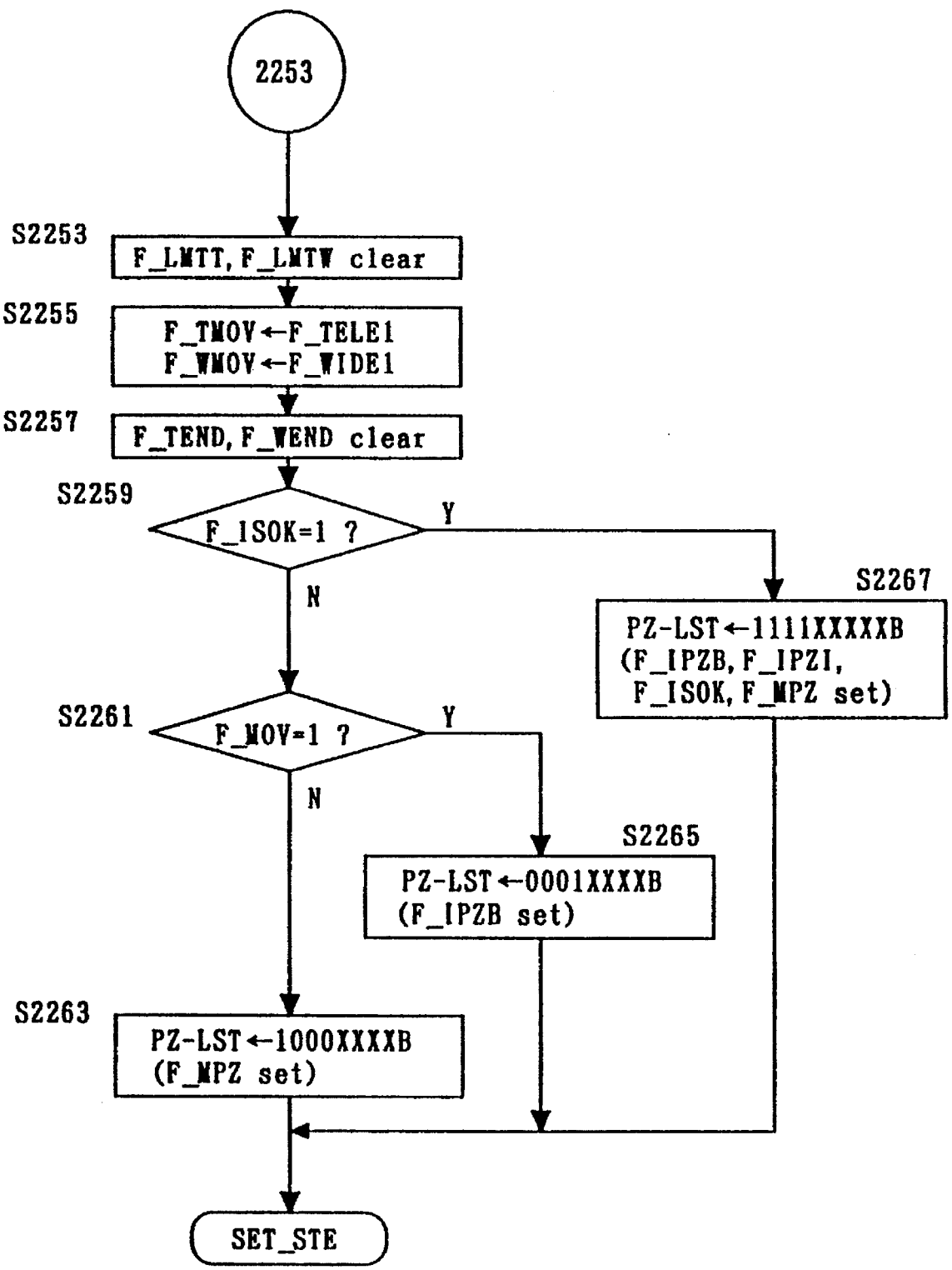

Next, control of the power zoom motor will be described with reference to a MOV flowchart, as shown in FIGS. 73 to 75. This control is an operation in the body power lens 51 and concerns manual zooming and controlled power zooming in a designated direction (i.e., when the flag F_MOV is set up).

Firstly, it is checked (i.e., bit0 of a move direction memory SPDDRC1) if movement is in the tele direction (F_TELE1=1 (S2201)).

If the direction of movement is in the tele direction and it arrives at the tele end or para-tele end, the flow advances to the NO-MOV operation (S2201 to S2205). If it is an initial movement (or a start), the flow advances to an operation S2233 for initialization (S2207). Then, by reference to data concerning the previous zooming motor operation stored in the memory ZM-ST1, which is used for operating the zoom motor, if movement occurred the preceding time, but in a different direction (of the zoom motor), or if the power supply from the body is turned off, the flow advances to the brake operation (BRK1 (S2207 to S2211)). If at the present time the movement is in the same direction as that of the preceding operation and the power supply is turned on, the flow advances to a speed settle operation at S2249 (S2207 to S2211).

If the movement is not in the tele direction, but arrives at the wide end or the para-wide end (F_WEND=1 or F_LMTW=1), the flow advances to the NO-MOV operation (S2201, S2223, S2225). If the lens starts, but does not arrive at the wide end or the para-wide end, the flow advances to a processing S2233 for initialization. If movement occurred the preceding time, but the present movement is in a different direction or if the power supply from the body is turned off, the flow advances to the brake operation (BRK1). If the present movement is in the same direction as that at the preceding movement and if the power supply is turned on, the flow advances to the speed settle operation at S2249 (S2225 to S2231).

The initial set up operation upon start-up is executed on condition that power from a power source is being supplied. If power is not being supplied, the operation proceeds to an ending process (NO-MOV1 (S2233 represents the foregoing operation)).

When power is being supplied, the brake counter T_BRK is incremented by 1, if the brake flag F_BRK is set (i.e., when the motor is being braked). If the brake counter T_BRK is less than a predetermined value (N_BRKREV), the operation proceeds to a brake 2 operation (BRK2) at which point a brake is applied (S2235 through S2239).

When the brake flag F_BRK has been cleared, or if it has been set whilst brake timer T_BRK is greater than a predetermined value, braking is completed. In such case, the start up flag F_START is set, and the limit timer T_LMT and the PWM timer, T_PWM, are cleared. Then, a counter is set so that terminal detection does not take place for a certain period of time after the start-up, and the initial value (i.e., minimum value) of the PWM duty ratio is set (S2235 through S2241 represent the foregoing operation). This means, the start flag F_START is set, the terminal detecting counter T_LMT and the PWM counter T_PWM are cleared, an initial value is entered at the start counter T_START, and a duty ratio T_PWMBRK of PWM is filled with the minimum value. Setting the minimum value at T_PWMBRK provides the slowest start-up for PWM.

Upon completion of the setting operation, the LED of the PZ pulser 69 is turned on to prepare for the PZ pulse count. Then, PZ pulse count interruption (INT3) is enabled, if it was disabled, before proceeding to a speed setting operation (S2249 (S2243 through S2247 represent the foregoing operations)).

In the speed setting operation, a PZ pulse interval (T_PWMPLS value) is set according to the speed selected. In this preferred embodiment, the time during which electricity is supplied at PWM is controlled so that PZ pulses are outputted at the selected PZ pulse interval. Four speeds can be selected in this preferred embodiment, but not limited to four. The speed is selected according to the two bits, bits 2 and 3 (F_SPDA1, F_SPDB1), of SPDDRC1. Since the fourth speed is not controlled by PWM control, but rather by DC control, a PZ pulse interval is not set. The Maximum value is set at PWM duty ratio T_PWMBRK for terminal detection (S2065 in FIG. 71).

Upon completion of the speed selection, the speed and its direction (SPDDRC1) are inputted in the zoom control memory (ZM-ST1), the drive flag F_DRV is set, and the brake flag F_BRK is cleared (S2251). Bit 3-0 of ZM-ST1 (i.e., flags SPD1, SPD0, DRCW, DRCT) are set so that the flags correspond to bit 3-0 of SPDDRC1 (i.e., flags SPDB1, SPDA1, WIDE1, TELE1), respectively. The telephoto end and wide-angle end dummy flags, F_LIMTT and LIMTW, are then cleared. The drive direction flags, F_TMOV, F_WMOV, F_TELE1, F_WIDE1, are set while the telephoto end and wide-angle end flags, F_TEND and F_WEND, are cleared (S2253 through S2257 represent the foregoing operations). F_TMOV, F_WMOV, F_TEND and F_WEND are flags for the PZ-LST data, and are set so that the flags F_TMOV and F_WMOV correspond to F_TELE1, F_WID1 of SPDDRC1, respectively. In the case that either one of F_TMOV and F_WMOV is set, the other is cleared.

During the zooming operation at a constant image magnification, manual power zooming is activated by interrupting constant image magnification. Predetermined bits are set at the memory data (PZ_LST) for the PZ conditions of the lens, and the flag is set before processing is completed (S2259 and S2267). When zooming is not being performed at a constant image magnification, if power zooming (manual power zooming) is being effected by a zoom switch operation, data including flag F_MPZ for manual power zooming is set at the zoom condition data (PZ-LST). If controlled power zooming (i.e., zooming to a specified direction) is being effected, data (including flag F_IPZB) for the controlled power zooming are entered at the zooming condition data (PZ-LST), before the SET-ST operation is completed (S2261 through S2265 represent the foregoing processes). The content of the PZ_LST data is transmitted to the camera body by means of communication using command PZ-LSTATE(10).

INIT3 INTERRUPTION ENABLING OPERATION

Figure 76:
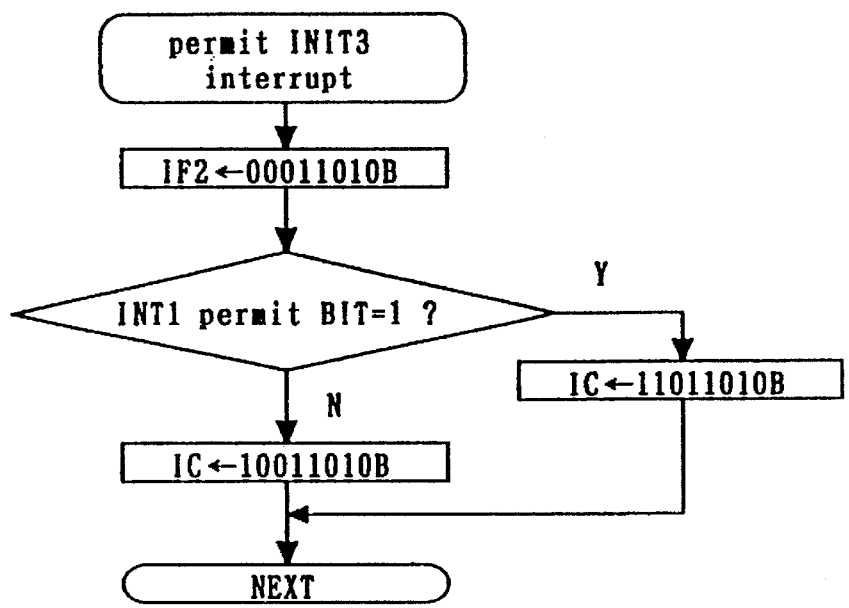
FIG. 76 is a flow chart regarding interruption treatment for PZ pulse count.
Figure 82:
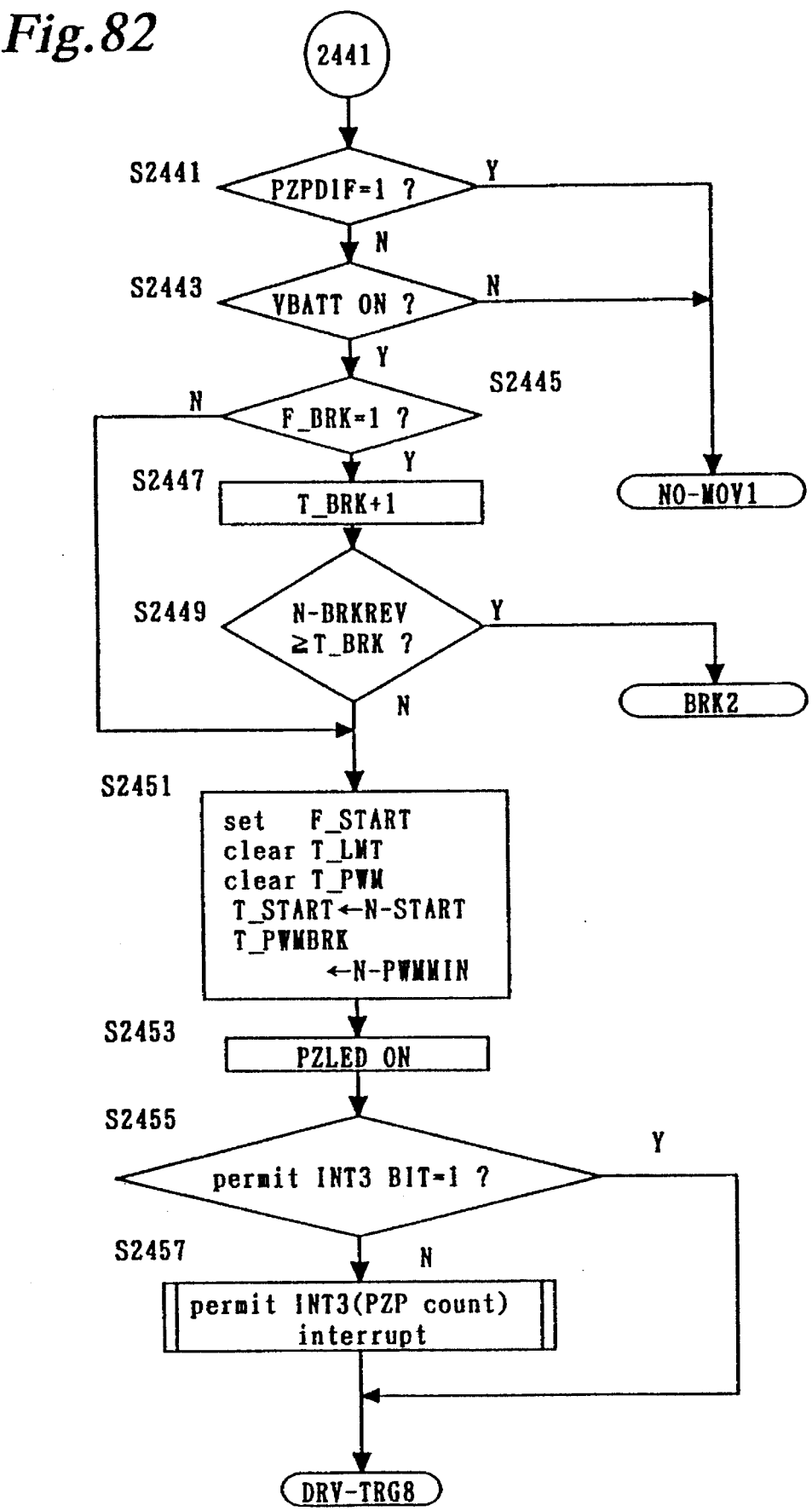

FIG. 76 shows an operation that enables interruptions by the PZ pulse count. In this preferred embodiment, the PZ pulse counting is effected by software using an interruption of a 2-ms timer. In this process, the enabling bit for the INIT interruption is set to enable counter interruptions by PZ pulses. This operation shows the details of step S2247 in FIG. 74 and S2457 in FIG. 82.

NO-MOV AND NO-MOV1 OPERATIONS

Figure 77:
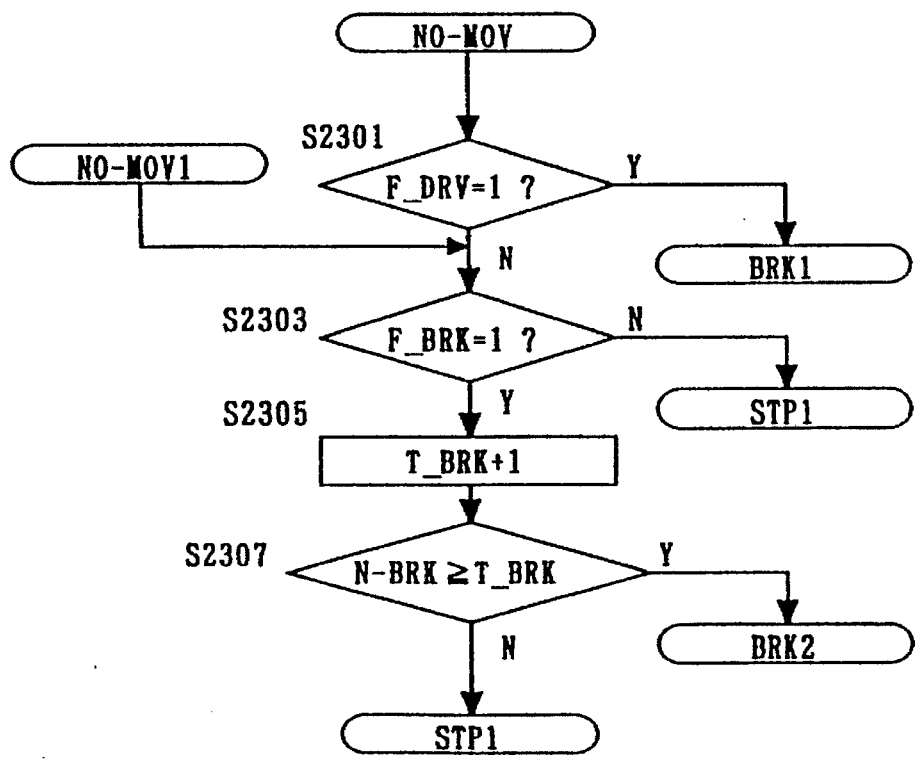
FIG. 77 is a flow chart regarding an operation for stopping powered zooming.

Flow charts NO-MOV and MOV1 shown in FIG. 77 are operations that stop the power zooming operation or effect a shift to a braking operation. When power zooming is being effected (i.e., when flag F_DRV has been set), the operation proceeds to the BRK1 operation. If power zooming is not being effected, and if brake is not being effected (i.e., flag F_BRK has been cleared), the operation proceeds to the ending operation (STP1). If brake is being effected, the brake counter is incremented by 1, and if the value exceeds a predetermined value (N_BRK), the ending operation (STP1) is executed. If the value is less than the predetermined value, the operation proceeds to Brake 2 (BRK2) to continue the braking operation (S2301 through S2307 represent the foregoing processes). Since this NO-MOV1 operation is performed when power zooming is not being effected, the ocess begins from step S2303, skipping step S2301.

BRK1 AND BRK2 OPERATIONS

Figure 78:
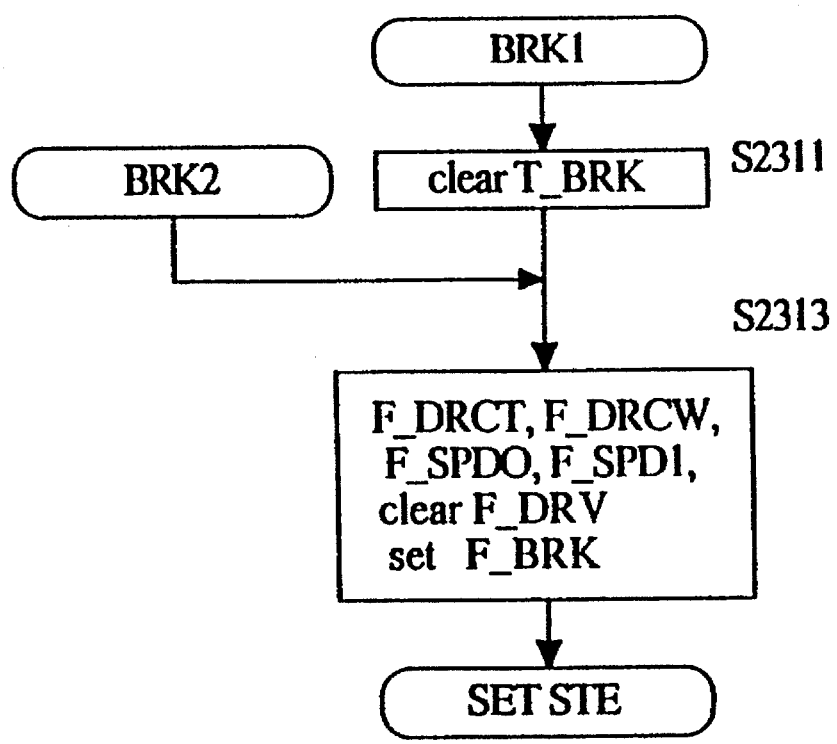
FIG. 78 is a flow chart regarding an operation for braking the zoom motor.

In the brake operation (BRK1) in FIG. 78, the brake timer T_BRK is cleared and the telephoto direction flag F_DRCT, wide-angle direction flag F_DRCW, speed-1 flag F_SPD0, speed-2 flag F_SPD1, and the drive flag F_DRV are cleared. The brake flag F_BRK is then set (S2311 and S2313 represent the foregoing processes). Since BRK2 is entered only after the second operation, only step S2313 is executed. After completing the above operations, the SET-ST operation is completed.

STP1 OPERATION

Figure 79:
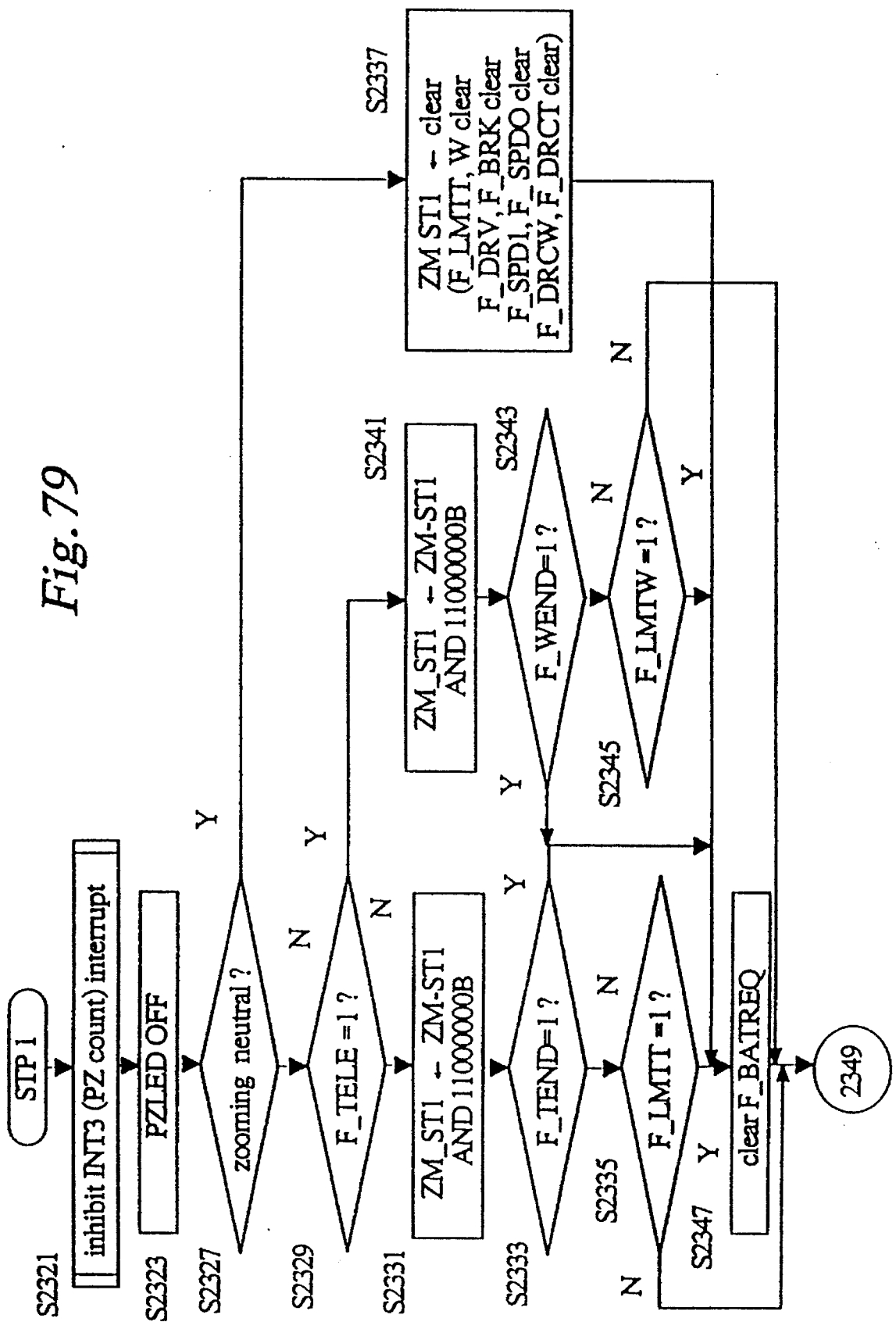
FIGS. 79 and 80 are a flow chart regarding an operation for setting state of the photographing lens.
Figure 80:
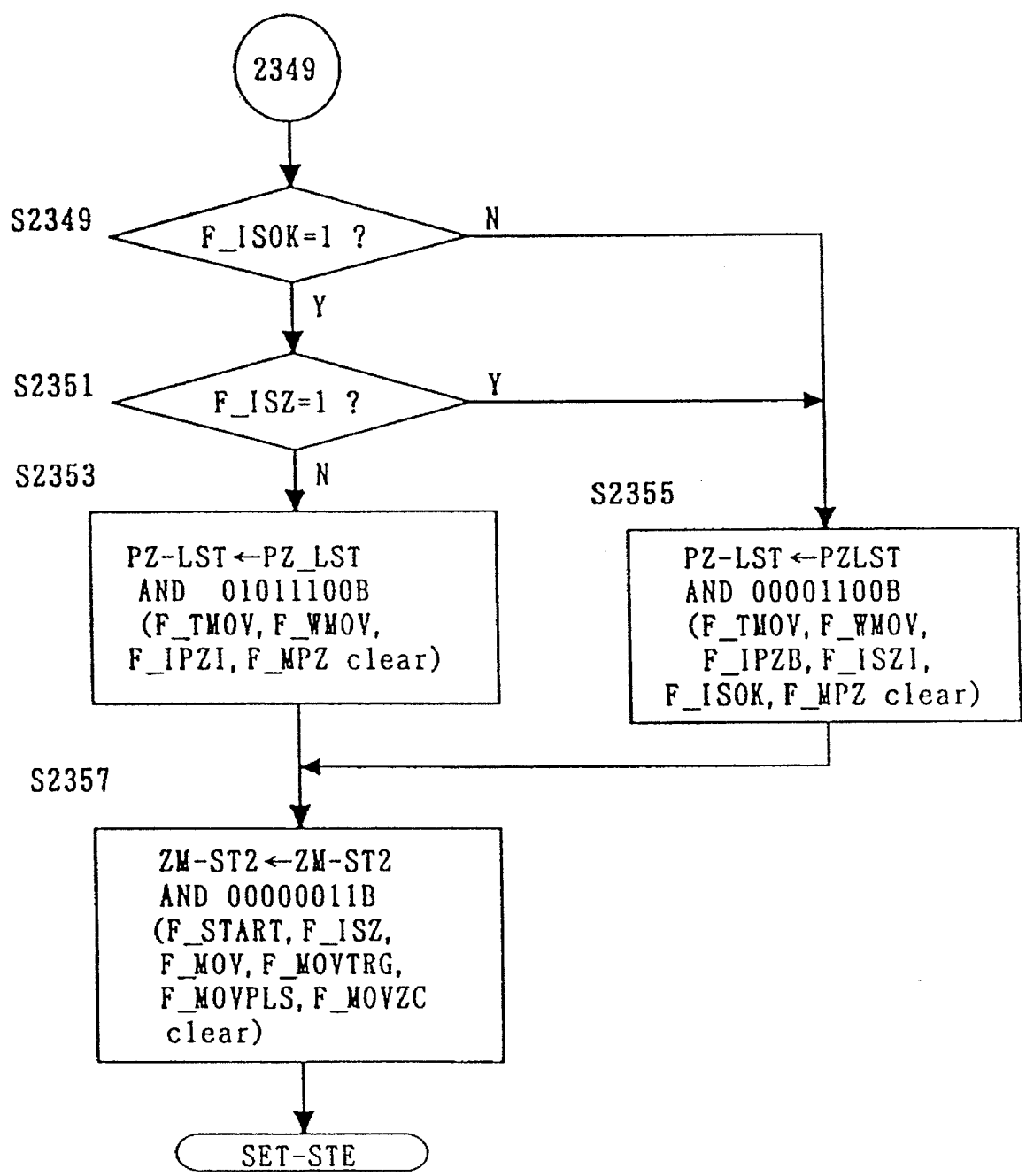

The STP1 flow chart shown in FIG. 79 is an operation for stopping the power zooming operation.

First, the PZ pulse count interruption is disabled, and the LED of the PZ pulser 69 is turned off (S2321 and S2323).

When the zoom switch 75 is at the neutral position, ZM_ST1 data is cleared (i.e., all the flags are cleared), and a battery request is cancelled (S2327, S2337 and S2347) before proceeding to step S2349. When the zoom switch 75 returns to the neutral position, the dummy terminal flags (F_LMTT and F_LMTW) are cleared. Therefore, zooming can also be performed in the direction that the dummy terminal was previously set.

When the zoom switch 75 is not set at the neutral position, but rather the telephoto direction, flags F_LMTT and F_LMTW in the ZM_ST1 data are left unchanged, while all the other flags are cleared (S2329, S2331). If the lens is at the telephoto end, or at the pseudo-telephoto end, a battery request is cancelled before proceeding to S2349. If the lens is neither at the telephoto end nor the pseudo-telephoto end, the battery request is not cancelled, and the operation proceeds to step S2349 (S2333 and S2335 represent the foregoing processes). When the zoom motor 65 is revolving toward the wide-angle direction, flags F_LMTT and F_LMTW in the ZM_ST1 data are left unchanged, while other flags are cleared (S2329 and S2341). In the wide-angle end or in the pseudo-wide-angle end, the battery request is cancelled before proceeding to step S2349. If, however, the lens is neither at the telephoto end nor the pseudo-telephoto end, the battery request is not cancelled before proceeding to step S2349 (S2343 and S2345 represent the foregoing processes).

In S2349, whether or not zooming with a constant image magnification is being effected is tested. In step S2351, whether or not a calculation for zooming with a constant image magnification has been completed is tested. If zooming with a constant image magnification is in operation, but the calculation has not been completed, flags F_TEND, F_WEND, F_IPZB and F_ISZOK in the PZ_LST data are left unchanged, while other flags F_TMOV, F_WMOV, F_IPZI and F_MPZ are cleared (S2353). If zooming with a constant image magnification is not being effected, or if the calculation has not been completed during zooming with a constant image magnification, flags F_TEND and F_WEND in the PZ_LST data are left unchanged, while other flags are cleared (S2355). The content of the data PZ_LST is transmitted to the camera body 11 by means of communication using command PZ-LSTATE(10).

The logical sum of the ZM-ST2 data and a predetermined data is stored in ZM-ST2. The start flag F_START, the zoom flag for constant image magnification, F_ISZ, the specified direction drive flag F_MOVTARG, the specified position drive flags, F_MOVPLS and F_MOVZC, etc. are all cleared, after which the SET-ST operation is completed (S2357). This means, flags F_PZPOS and F_PZPDRC in the ZM-ST2 data are left unchanged, while other flags are cleared.

Flag F_PZDRC has the same function as those of flags F_DRCW and F_DRCT in the data of ZM-ST1. The flag F_PZDRC indicates that the lens is driven to the wide end when F_PZDRC=1 and that the lens is driven to the tele end when F_PZDRC=0.

MOV-TRG OPERATION

Figure 81:
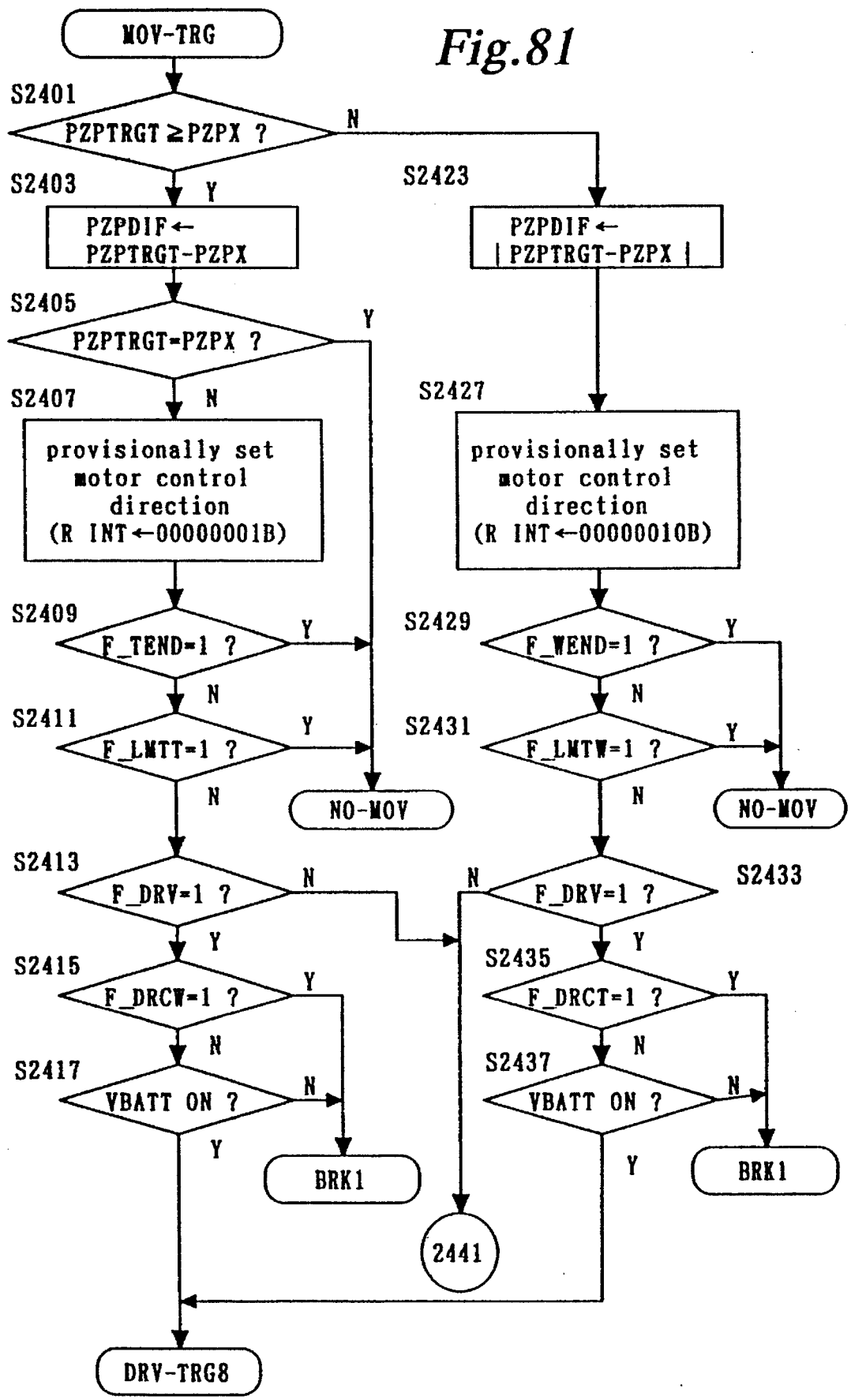
FIGS. 81 and 82 are a flow chart regarding powered zooming toward a designated focal length.

The flow chart shown in FIG. 81 is the MOV-TRG operation for driving the zoom lens to a desired position. First, whether or not the targeted number of PZ pulses is greater than the present PZ pulse is checked (S2401). If it is greater, driving is effected in the telephoto direction, while if it is smaller, driving is effected in the wide-angle direction.

When the driving operation is effected in the telephoto direction, the targeted number of PZ pulses (PZPTRGT) is subtracted by the present number of pulses (PZPX), and the difference is stored in the memory (PZPDIF) as the number of driving pulses (S2403). If the targeted number of pulses and the present number of pulses are equal, the operation proceeds to NO-MOV (S2405) because the driving operation is not necessary. If they are not equal, the direction of the motor driving operation is temporarily set for the telephoto direction. If it is either in the telephoto end or in the pseudo-telephoto end, the operation proceeds to NO-MOV (S2407 through S2411). If it is neither the telephoto end nor pseudo-telephoto end, but during the driving operation, the operation proceeds to BRK1 if the wide direction flag F_DRCW is set, or if the battery is turned off (S2413 through S2417). If driving is being effected in the same direction, and if the battery is on, the operation proceeds to DRV-TRG8 (S2413 through S2417). If it is not being driven, the operation proceeds to S2441.

When driving is being effected in the wide-angle direction, the targeted number of pulses (PZPTRGR) is subtracted from the present number of pulses (PZPX), and the difference is stored in the memory (PZPDIF) as the number of driving pulses (S2423). The driving direction of the zoom motor is then temporarily set for the wide-angle direction, and if it is in the wide terminal or in the pseudo-wide terminal, the operation proceeds to NO-MOV (S2427 through S2431).

If the lens is is neither at the wide-angle end nor the pseudo-wide-angle end, but rather in the midst of the driving operation, the operation proceeds to BRK1, if the telephoto direction flag F_DRCT is on or if the battery is turned on (S2433 through S2437). If driving is being effected in the same direction, and if the battery is turned on, the operation proceeds to DRV-TRG8 (S2433 through S2437). If driving is not currently being effected, the operation proceeds to S2441.

In this control method, the possibility exists that an excess pulse will occur as a result of the driving being changed to braking when the targeted PZ pulses and the present PZ pulses become equal. However, since an excess pulse is of minimal importance, the operation proceeds to NO-MOV1 when the difference pulse PZPDIF is 1, or when it is not 1 but power supply is turned off (S2441 through S2443).

When the difference pulse PZPDIF is not 1, and when power supply is on, the brake counter T_BRK is incremented by 1, if the brake flag F_BRK is set. If the brake counter T_BRK is smaller than a predetermined value, the operation proceeds to the braking operation (BRK2 (S2443 through S2449 represent the foregoing processes)).

If the brake flag F_BRK has been cleared, or if the brake counter T_BRK is greater than a predetermined value, the brake operation is completed. The start-up flag F_START is set, and the limit timer and the PWM timer are cleared. The counter is then set so that terminal detection is not performed for a certain period of time after start-up, and an initial value (i.e., the minimum value) is set for the PWM duty ratio (S2451). This means, the start flag F_START is set, the terminal detecting counter T_LMT and PWM counter T_PWM are cleared, an initial value is entered in the start counter T_START, and the minimum value is entered in the PWM duty ratio T_PWMBRK.

Upon completion of the setting operation, the LED of the PZ pulser 69 is turned on to prepare for the PZ pulse counting. If PZ pulse interruption is not enabled, it is enabled before proceeding to DRV-TRG8 (S2453 through S2457).

DRV-TRG8 OPERATION

Figure 83:
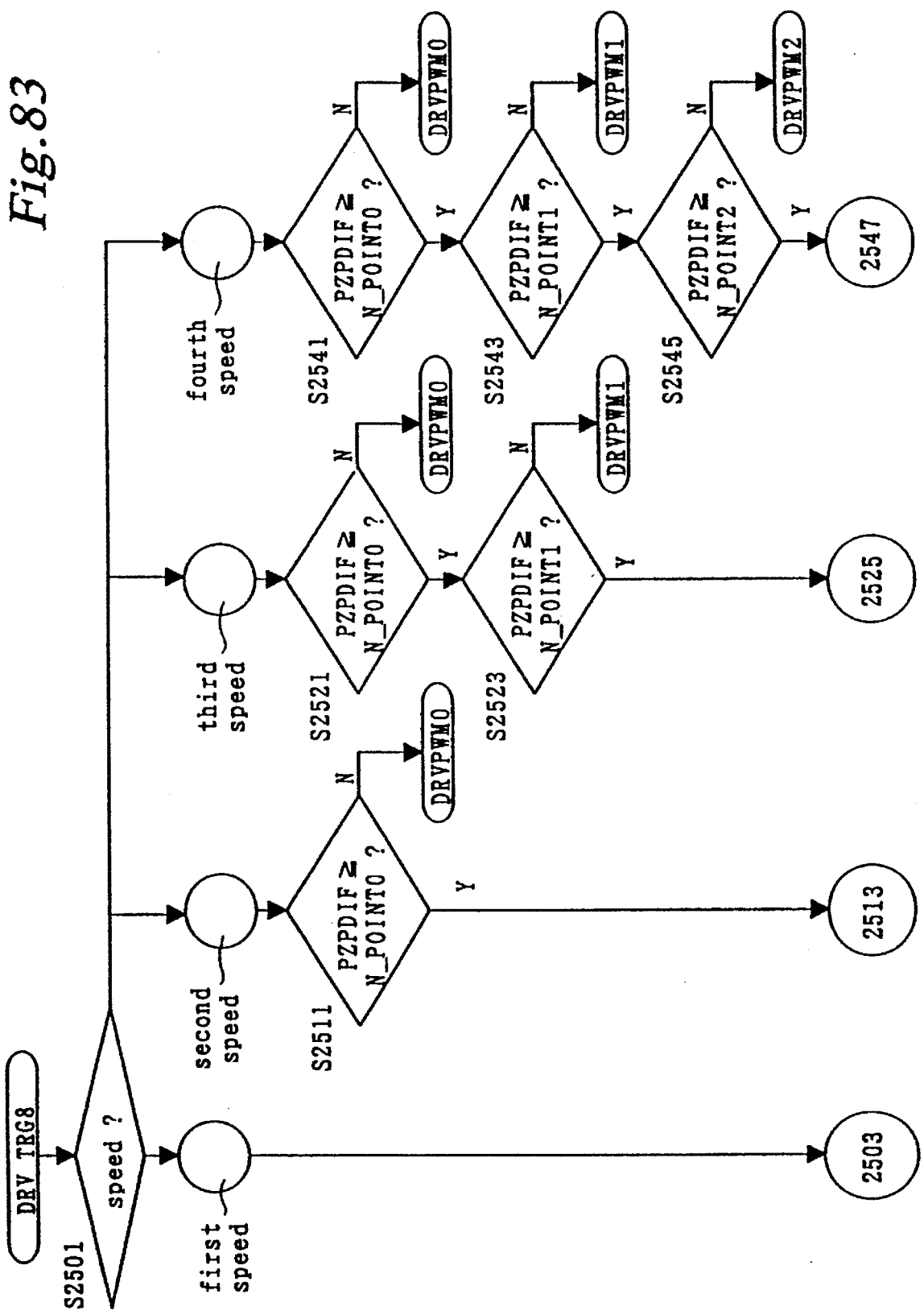
FIGS. 83 and 84 are a flow chart regarding an operation for adjusting drive speed in accordance with a pulse number, which corresponds to a target position.
Figure 84:
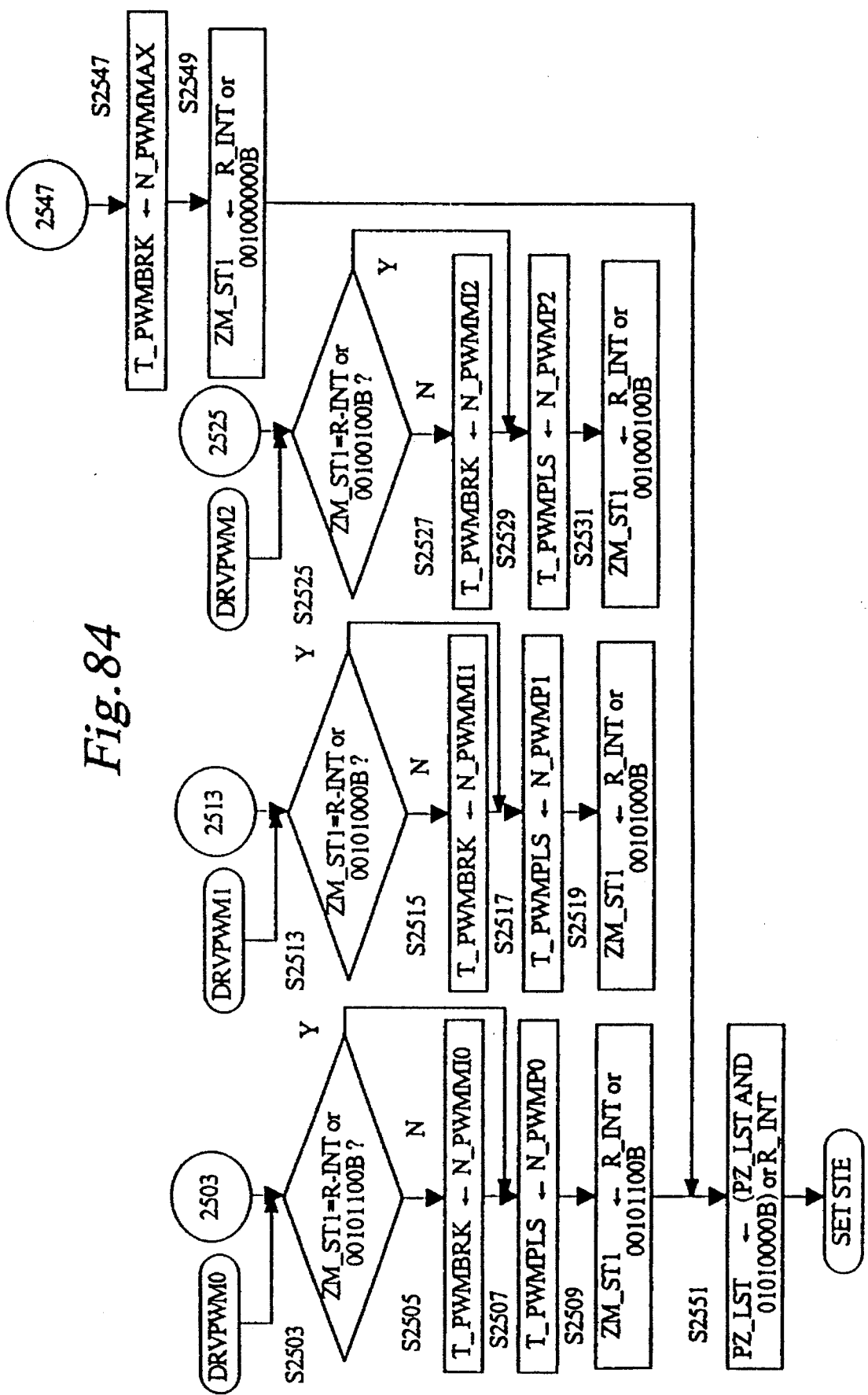
Figure 85:
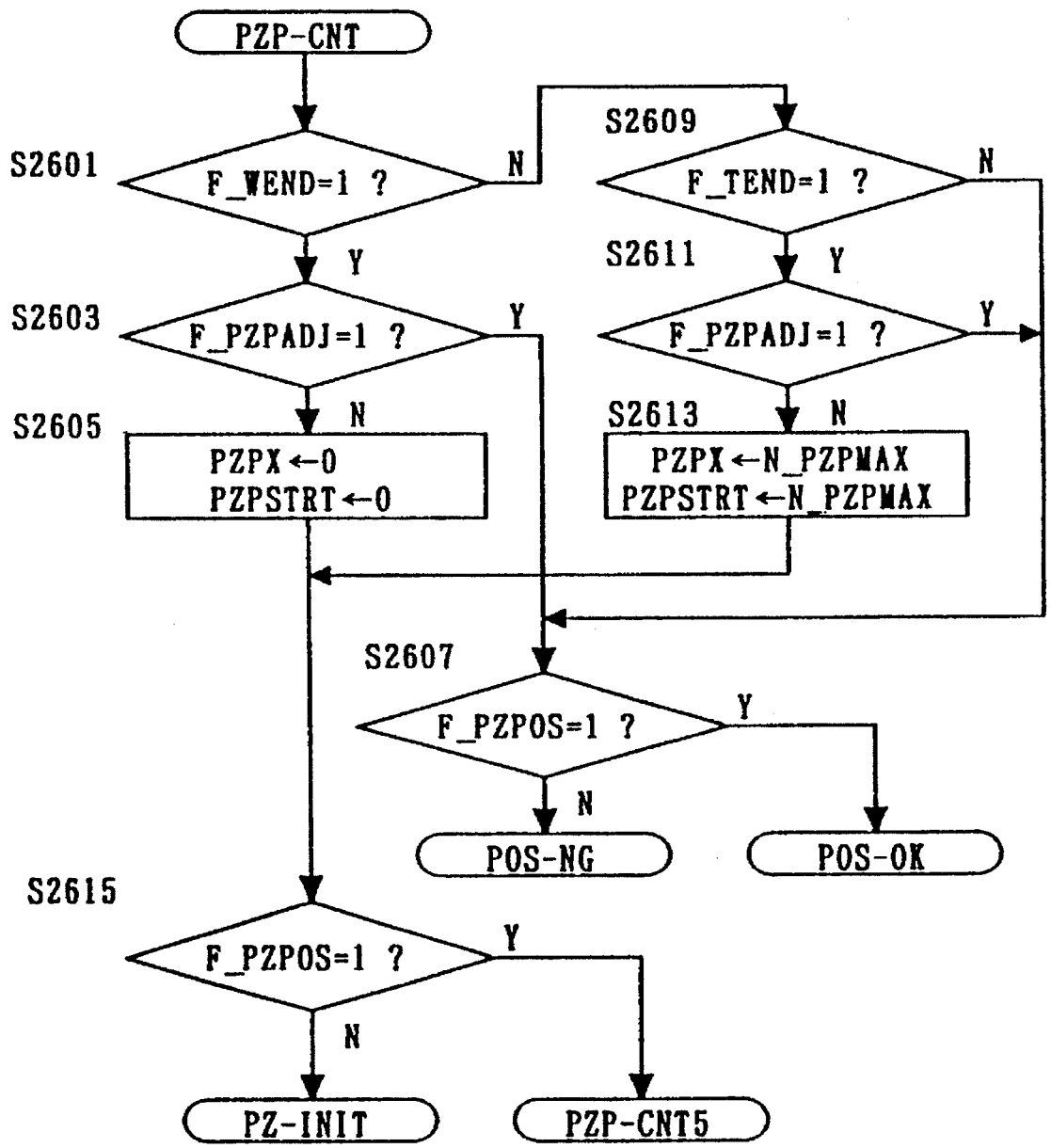
FIG. 85 is a flow chart regarding an operation for correction of PZ pulse count when a terminal point is achieved.

The DRV-TRG8 operation shown in FIGS. 83 and 84 is an operation to control the speed according to the number of the driving PZ pulses until the targeted focal distance is reached, and in which speeds are changed in several steps in accordance with the number of pulses to the targeted position (PZPDIF). In this preferred embodiment, when the number of driving pulses to the target is equal to or above that of the third pulse, driving is done at the fourth speed (DC driving), which is the maximum speed. When it is less than that of the third pulse, but equal to or above that of the second pulse, driving is done at the third speed. When it is less than that of the second pulse, but equal to or above that of the first pulse, the second speed is selected. When it is less than that of the first pulse, the first speed is selected. In this operation, the fourth speed is greater than the third, which is greater than the second, which is greater than the first. The number of the third pulses is greater than the second, which is greater than the first. Also in this preferred embodiment, four speeds can be selected. However, the number of speeds may be more or less than four, or a large number of steps for effecting an almost continuously variable speed.

First, a speed selection operation (S2501) is performed in accordance with the selected zooming speed. That is to say, when the first speed is selected, the operation proceeds to step S2503, the second speed to step S2511, the third speed to step S2521, and the fourth speed to step S2541, respectively. The selection of the speed is based on the value in bits 2 and 3 (F_SPDA2 and F_SPDB2) of SPDDRC2.

SPDDRC2 is utilized when the target position has been set. The zooming direction, at the time when the lens starts to be driven, and the zooming speed, which is automatically set by the main CPU 35 or the lens CPU61, are set in the SPDDRC2.

When the first speed is selected, whether or not there are any changes in the speed and its driving direction (the value of ZM-ST1) is tested. If there are changes, the standard value for the first speed N_PWMMI0 is set at the PWM brake timer (PWM duty ratio). If there are not any changes, nothing is done at this stage. Then the PZ pulse cycle N_PWMP0 of the first speed is set at T-PWMPLS, and the logical sum of R_INT and a predetermined data is stored in ZM-ST1 (i.e., setting of the speed and its direction (S2503 through S2509 represent the foregoing operations)). By means of the above operations, the slowest speed is selected. The logical sum of the PZ-LST data and a predetermined data is computed. Further logical sum of the above mentioned sum and the R_INT data is stored in the PZ-LST data, before the SET-ST operation is completed (S2551).

When the second speed is selected, whether or not the number of pulses to the target position is equal to or above that of the first pulses is tested. If it is smaller, the operation proceeds to DRVPWM0 (S2503 for the first speed). It it is equal to or above, the operation proceeds to step S2513 in which whether there are any changes in speed or its direction (i.e., the value of ZM-ST1) is tested to control at the second speed. If there are any changes, the standard value of the second speed is set at PWM brake timer (PWM duty ratio). If there are no changes, an operation is not performed. The cycle N_PWMP1 of the PZ pulse for the second speed is then set at T-PWMPLS. The logical sum of the R_INT data and a predetermined data is stored in ZM-ST1 before proceeding to S2551, S2503 through S2509 represents the foregoing operations, wherein the second speed is selected.

When the third speed is selected, whether or not the number of pulses to the target position (PZPDIF) is less than that of the first pulses is tested. If it is smaller, the operation proceeds to step S2503 (DRVPWM0) for the first speed. If it is equal to or above the number of first pulses, and less than that of the second pulses, the operation proceeds to DRVPWM1 for the second speed operation (S2521 and S2523). If it is equal to or above the number of second pulses, the control is performed at the third speed. Whether or not there are any changes in speed and direction (i.e., the value of ZM-ST1) is tested. If there are any changes, the standard value, N_PWMMI2 of the third speed, is set at PWM brake timer (PWM duty ratio). If there are no changes, no operation is performed. The cycle N_PWMP2 of the PZ pulse for the third speed is then set at T-PWMPLS. The logical sum of the R_INT data and predetermined data is stored in ZM-ST1 before proceeding to step S2551. Steps S2523 through S2531 represent the foregoing operations, wherein the third speed is selected.

When the fourth speed is selected, whether or not the number of pulses to the target (PZPDIF) is equal to or above that of the first pulses is tested. If it is less than the number of first pulses, the operation proceeds to step S2503 (DRVPWM0) for the first speed processing. If it is equal to or above the number of the first pulses, and less than the number of the second pulses, the operation proceeds to DRVPW1 for the second speed processing. If it is equal to or above the number of second pulses, and less than the number of the third pulses, the operation proceeds to DRVPWM2. If it is equal to or above the number of third pulses, the maximum value N_PWMMAX is set at the PWM brake timer (PWM duty ratio), and the logical sum of R_INT data and a predetermined data is set at ZM-ST1, before proceeding to step S2551. Steps S2547 and S2549 represent the foregoing operations. The fourth speed (DC drive) is selected.

PZP-CNT OPERATION

PZP-CNT flow charts shown in FIGS. 85 through 89 are for operations regarding the PZ pulse count. These are the details of step S335 in the interruption routine for a 2 ms timer in FIG. 10.

To calibrate the PZ pulse (i.e., when F_PZPADJ=0) when the zoom lens group 53Z is at the wide-angle end, the present PZ pulse value and the PZ pulse count starting value are reset to zero. Then, if the flag F_PZPOS, which shows whether or not the present position is known, has been set, the operation proceeds to PZP-CNT5. If the present position flag has been cleared, the operation proceeds to the initializing operation (PZ-INIT) of the power zoom (S2601 through S2605 and S2615 represent the foregoing operations). When calibration is not carried out, if the present position is known (i.e., when F_PZPOS=1), the operation proceeds to the present-position OK operation (POS-OK). IF the present position is unknown (F_PZPOS=0), the operation proceeds to the present-position unknown operation (POS-NG (S2603 and S2607 represent the foregoing operations)).

Likewise, to calibrate the PZ pulse when the zoom lens is at the telephoto end, the present PZ pulse value and the PZ pulse count starting value are set to the maximum (N_PZPMAX). If the flag that shows the present position as being known has been set, the operation proceeds to the PZP-CNT5. If the flag has been cleared, the operation proceeds to the PZ initializing operation (PZ-INIT (S2609, S2611, S2613, and S2615 represent the foregoing operations)). When no calibration is needed, if the present position is known (i.e., when the flag is on), the operation proceeds to the present-position OK operation (POS-OK), but if the present position is not known, the operation proceeds to the present-position unknown (POS-NG) operation (S2611 and S2607). As explained above, when the zoom lens group 53Z is at the wide-angle end (F_WEND=1), or at the telephoto end (F_TEND=1), the PZ pulse is calibrated with a predetermined value. F_PZPADJ is a flag for testing, and when F_PZPADJ=1, calibration is not performed.

When the lens is neither at the telephoto end nor at the wide-angle end, if the present position is known, the operation proceeds to the present-position OK operation (POS-OK), but if the present position is unknown, the operation proceeds to the present-position unknown operation (POS-NG (S2601, S2611 and S2607 represent the foregoing operations)).

POS-NG AND PZ-INIT OPERATIONS

Figure 86:
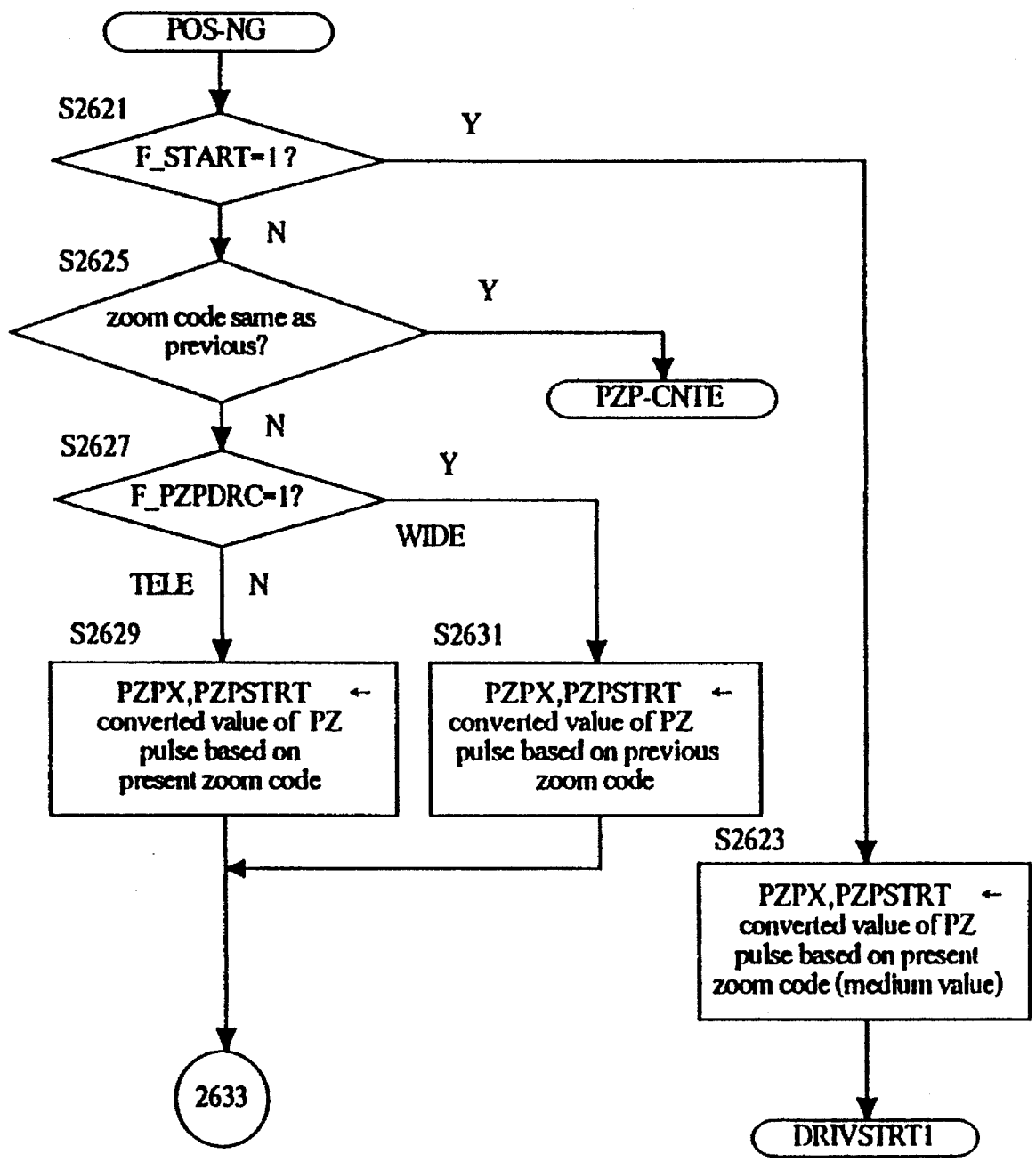
FIG. 86 is a flow chart regarding an operation for correcting the PZ pulse counter when actual or present position of the zooming lens is unknown.
Figure 87:
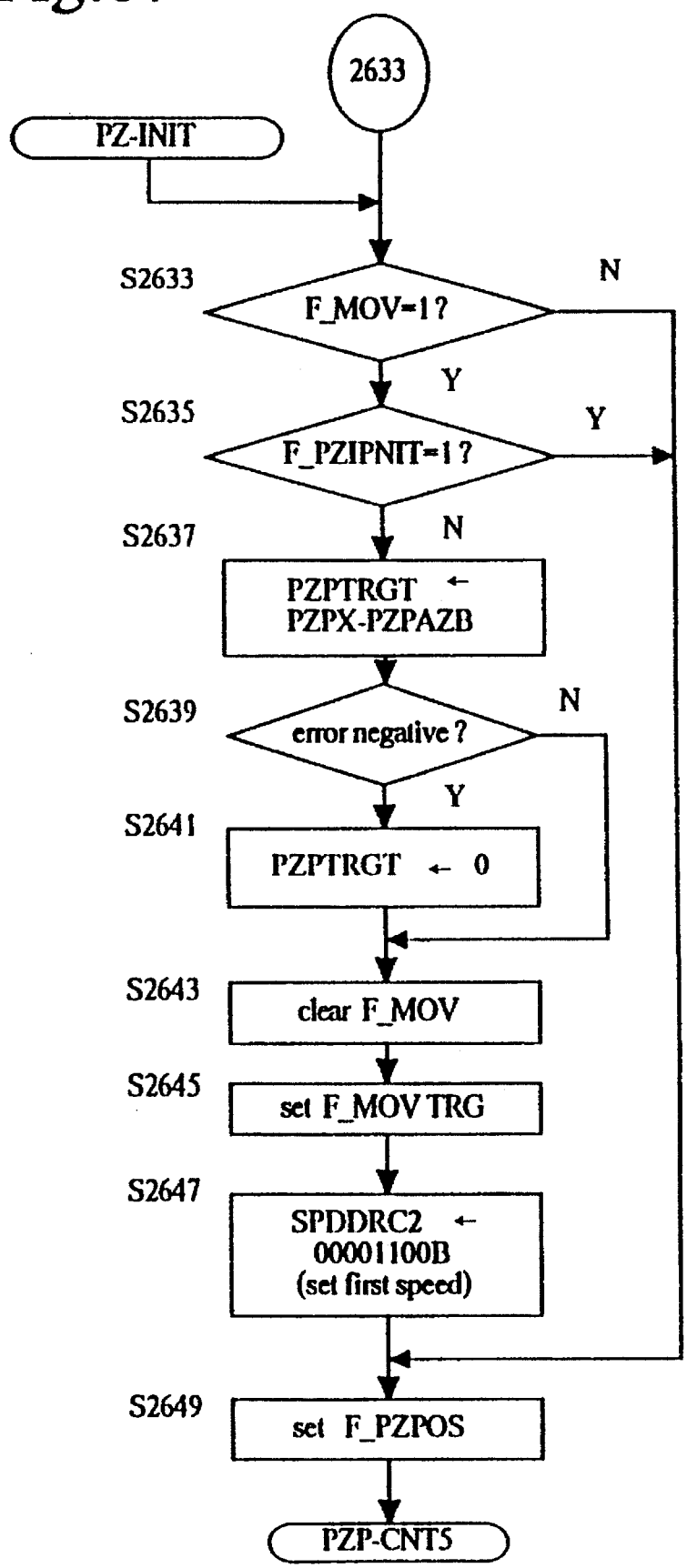
FIG. 87 is a flow chart regarding an operation for correcting the PZ pulse counter when actual or present position of the zooming lens is unknown.

POS-NG and PZ-INIT, shown in FIGS. 86 and 87, are operations effective when the present position is unknown, or when the telephoto end or wide-angle end has been reached.

The POS-NG and PZ-INIT operations are executed when the present position of the zoom lens is unknown. Usually, if the present position is not known, the POS-NG and PZ-INIT operations are also executed when the initializing command PZ-INITPOS (32) is transmitted from the camera body when the main switch in the camera body is turned on, or when the zooming operation is switched from manual to power.

In this preferred embodiment, when the PZ-INITPOS command is transmitted, the zoom lens group 53Z is moved toward the telephoto end at the slowest speed. The present position of the zoom lens group can be detected by storing the number of absolute PZ pulses in a certain address (PZPX and PZPSTRT) at the position where the first divisional point 72 of the zoom code plate 71 or the telephoto end is detected. Further, in this embodiment, the zoom lens group 53Z is returned to its original position after detecting the present position. This can be done by the following procedures: when the PZ_INITPOS command is transmitted, a counter (PZPAZB) is cleared (making it zero) the first divisional point on the zoom code plate or the PZ pulse to the telephoto end is counted, and the zoom lens is returned from that position (i.e., when the present position is detected) to the position with which the count corresponds. This returning operation of the zoom lens is performed in the PZ-INIT operation (especially in S2637 through S2649).

The operation of the zoom lens at the slowest speed is executed by the PZ-INITPOS command through communication.

In this preferred embodiment, the lens is driven toward the telephoto end in a uniform manner to detect the present position. However, this may be toward the wide-angle end, or either direction may be selected based on other conditions.

Furthermore, in this preferred embodiment, when the present position is unknown, it can be detected automatically (i.e., the present position can be known), even if the P_INITPOS command is not transmitted from the camera body 51 at the time the lens has reached at a divisional point on the zoom code plate or the terminal points (i.e., far side and/or near side) when the manual power zoom is operated.

When the operation enters the POS-NG operation, if the start flag F_START has been set (i.e., at the time the zoom motor is activated), the PZ pulse conversion value (i.e., roughly detected PZ pulse value) on the zoom code plate 71, which is read-in for the operation, is set at the present position and the start pulse counter. The operation proceeds to the zoom driving operation (DRIVSTART1 (S2621 and S2623 represent the foregoing operations)). The following operation is performed when the startflag F_START is set OFF. When the zoom code is the same asthe previous one, the switching point has not been reached. The executio n then exits the PZP_CNT operation (S2623 andS2625). Whe n the zoom code has been changed (i.e., when atthe division al point on the code plate), the PZ pulseconversion v alue of the zoom code, which is entered for thepresent oper ation, is entered at the present PZ pulse value(PZPX) and P Z pulse count starting value (PZPSTRT), if thedriving is t oward the telephoto side (F_PZPDRC=0). If thedriving is t oward the wide-angle side (F_PZPDRC=1), thePZ pulse con version value of the zoom code that was enteredpreviously, is entered at the PZ pulse value (PZPX) and thePZ pulse cou nt starting value (PZPSTRT (S2627 through S2631represent th e foregoing operations)).

When the move flag (F_MOV) has been cleared (i.e., when the PZ_INITPOS command has not been transmitted), or when flag F_PZPINIT has been set, the flag F_PZPOS, which indicates recognition of the present position, is set when flag F_PZPINIT has been set before proceeding to the pulse count (PZP-CNT5) operation (S2633, S2635 and S2649).

When the move flag F_MOV has been set (i.e., the PZ-INITPOS command has been transmitted), and when the present position flag F_PZPINIT has been turned OFF, the targeted PZ pulse (PZPTRGT) is the present PZ pulse value (i.e., the code plate border value) subtracted by the PZ pulse count value (PZPAZB) from the original position before the PZ initializing to the border position on the code plate (S2633, S2635 and S2637). The F_PZPINIT is a flag for disabling the initializing operation of PZ, and is used for testing. When F_PZPINIT=1, the operation is disabled.

A borrow in the above subtraction is indicative of an error in the counting process. In such a case, the targeted number of PZ pulses is set to zero to clear the drive flag F_MOV. If there is no borrow, the move flag is cleared without any other processing (S2639 and S2641). Then, the move flag for the target value (F_MOVTRG) is set ON, the PZ speed is set to the first speed (the slowest speed), and the present position flag is set ON, after which the operation proceeds to the PZP-CNT5 operation (S2643 through S2649).

When the operation starts at the PZ-INIT operation, S2633 is the starting set.

POS-OK AND DRVSTRT1 OPERATIONS

Figure 88:
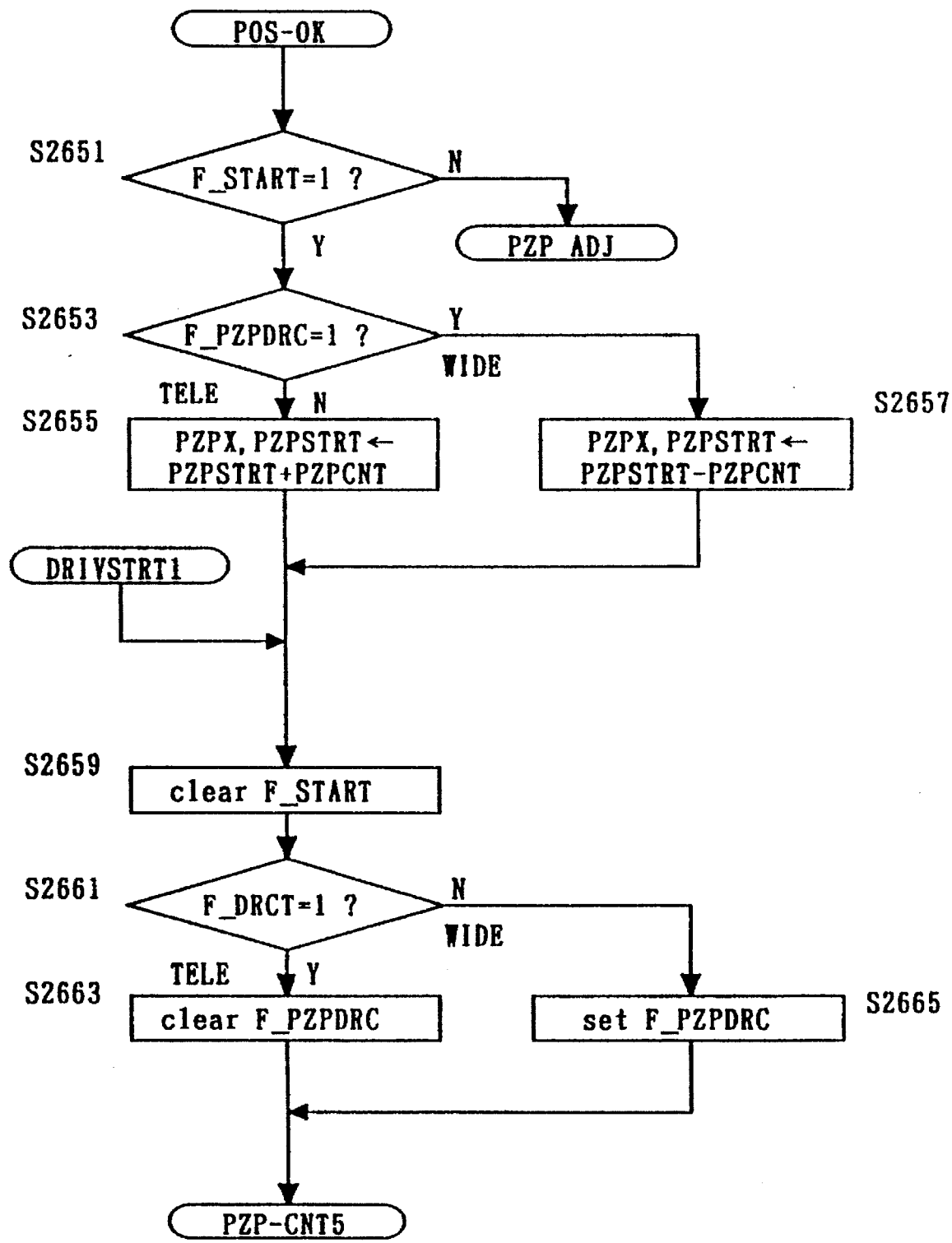
FIG. 88 is a flow chart regarding an operation of the PZ pulse count when actual or present position of the zooming lens is known.

The POS-OK operation shown in FIG. 88 is the PZ pulse counting operation in which the present position is known.

When the operation has started already (i.e., the start flag has been cleared), the operation proceeds to the PZ pulse calibrating operation (PZP-ADJ operation). When the operation is about to start, if the driving operation is effected in the telephoto direction (F_PZPDRC=0), the sum of the PZ pulse count staring value (PZPSTRT) and the PZ pulse count value (PZPCNT) is entered into the PZ pulse count starting value (PZPATRT) and into the present PZ pulse count value (PZPX). If the driving operation is effected in the side-angle direction (F_PZPDRC=1), the PZ pulse count starting value (PZPSTRT) is subtracted by the PZ pulse count value (PZPCNT) and entered into the PZ pulse count starting value (PZPSTRT) and into the present PZ pulse count value (PZPX (S2651 through S2657 represent the foregoing operations)).

The start flag F_START is then cleared, and the power zooming direction flag F_PZPDRC is cleared (i.e., the telephoto direction is selected) when the driving operation is effected in the telephoto direction (i.e., the direction toward which the lens is going to move this time). If the movement is effected in the wide-angle direction (i.e., the current direction toward which the lens is going), the power zooming direction flag F_PZPDRC is set (i.e., the wide-angle direction is selected (S2659 through S2665 represent the foregoing operations)).

When the operation begins from DRIVSTART1, step S2659 is the first step. The start flag is cleared, and the driving direction is set in steps S2659 through S2665.

The PZP-ADJ AND PZP-CNT5 OPERATIONS

Figure 89:
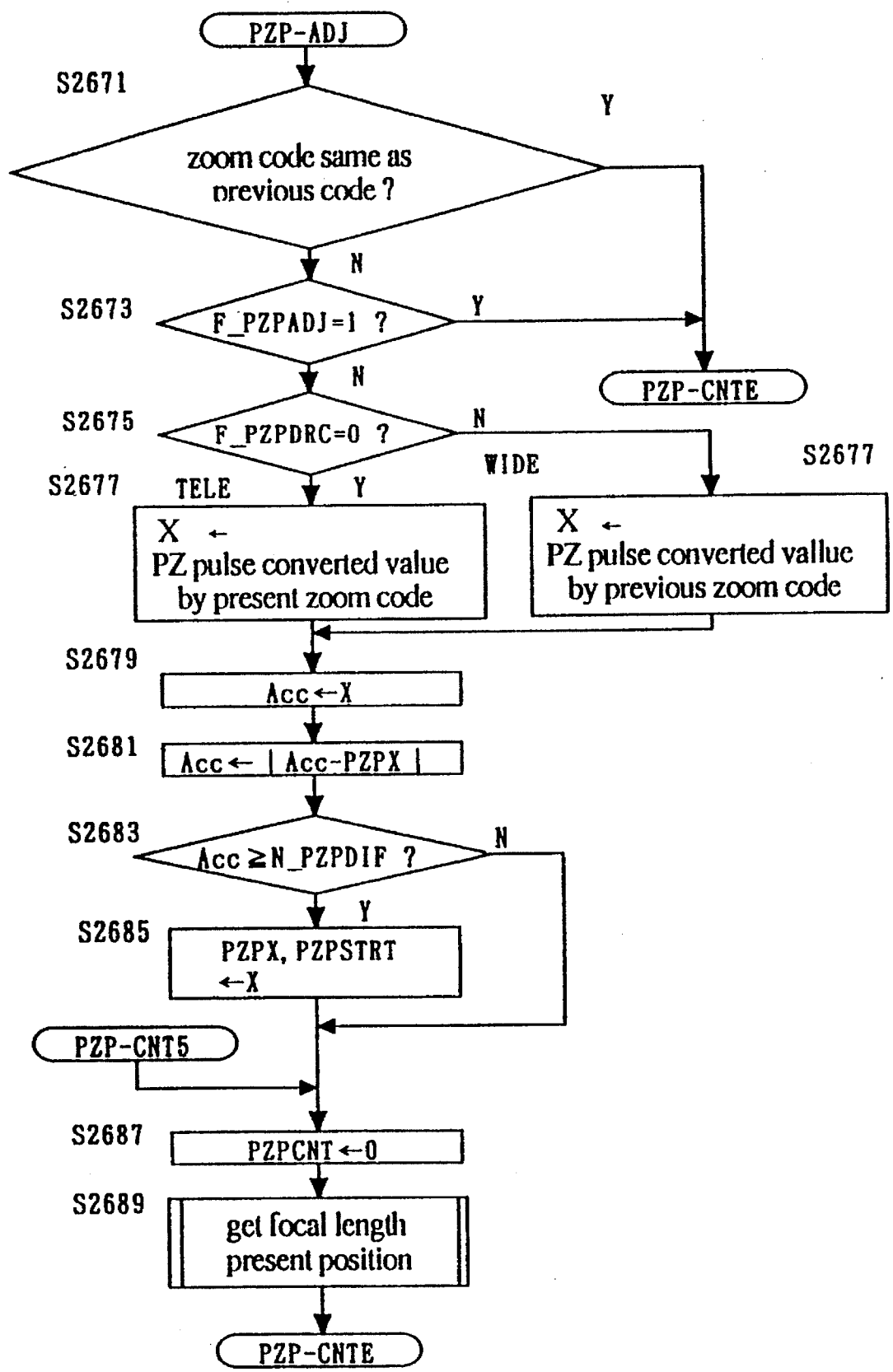
FIG. 89 is a flow chart regarding an operation for correcting the PZ pulse counter.

The PZP-ADJ operation, shown in FIG. 89, is for calibrating calculation errors of the PZ pulse count.

The zoom code is first checked if it is the same as the previous code. If it is the same, the flow exits the PZP-ADJ operation because calibration is impossible. If it is different, the calibration operation continues, provided that the PZP calibration disabling flag F_PZDADJ has been cleared, i.e. waits until it exceeds the divisional region (border) of the code plate 71. In this operation, the PZP calibration disabling flag F_PZDADJ is for testing, and is usually cleared.

If the direction of the power zooming operation is toward the telephoto direction, the present pulse conversion value of the zoom code is stored in register X. If the direction is toward the wide-angle direction, the previous pulse conversion value of the zoom code is stored in register X, and the value in register X is stored in the accumulator to check if the absolute value of the difference between this value and the PZ pulse value is within the calibration limit (S2679 through S2683). If it exceeds the calibration limit, the value of register X is stored in the present PZ pulse value and in the PZ pulse count starting value to perform calibration. If it is within the calibration limit, no calibration is performed. The PZ pulse count value (PZPCNT) is cleared, and the number of the PZ pulses at the present focal distance is converted to the present focal distance (mm) based on table data, and it is then stored in FCLXL and H, after which the execution quits the PZP-CNT operation (S2685 through S2689 represent the foregoing operations)).

When the operation starts from PZP-CNT5, step S2683 is the first step in which the PZ pulse count value is cleared, the number of pulses of the present focal distance is converted to the present focal distance (mm), and then stored, after which the execution quits the PZP-CNT operation (S2685 through S2689).

When there is an instruction to execute a PZ pulse initializing operation by the above mentioned PZ-INITPOS command from the body (i.e., when the body's main power is turned on), the zooming operation is performed toward the telephoto side. The present position PZ pulse value (PZPX) and the start position (PZPSTRT) can be selected by detecting the absolute position from the border position of the divisional region when it exceeds the divisional region of the code plate 71. Further, the original position can also be returned to after the present position has been detected.

While zooming, every time the border of the code plate 71 is exceeded, the absolute number of pulses at the border part is read-in from the table and compared with the count value. If the difference is greater than a predetermined value, calibration (alteration) is effected.

(ISZMEMO OPERATION)

Figure 90:
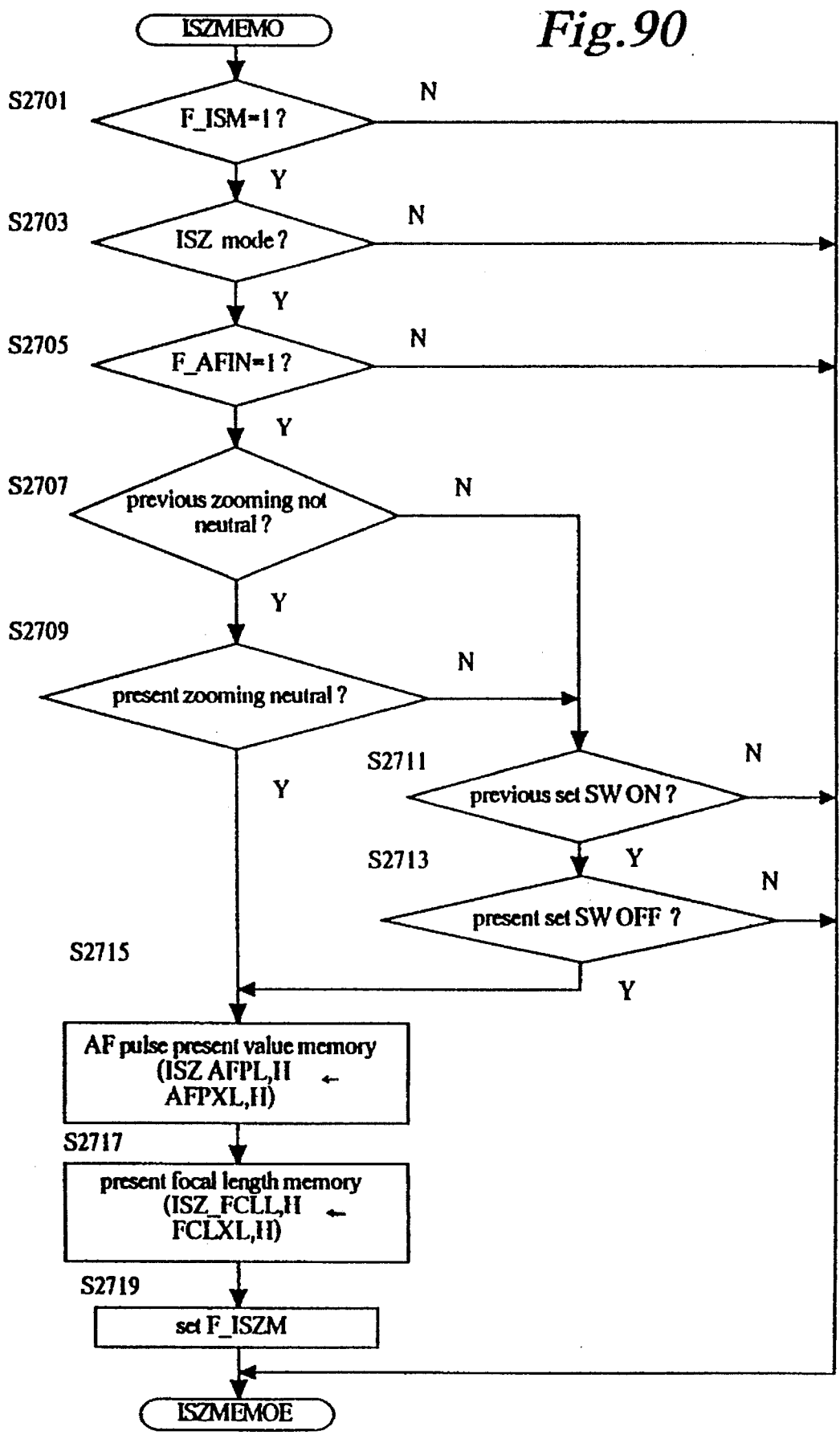
FIG. 90 is a flow chart regarding an operation for presetting a focal length.

The flow chart ISZMEMO shown in FIG. 90 is an operation for storing image magnification values. In other words, it is an operation whereby, the present AF pulse value (AFPX) and the present focal length (FCLXL and H) are stored by effecting the zoom speed changing switch 75 or the set switch (SL switch, SW) when in the constant image magnification zooming mode. This operation is the detail of S359 in the interrupting routine for a 2 ms timer shown in FIG. 10.

In this preferred embodiment, the AF pulse value and the focal distance are stored at the time when the zoom ring is returned to the neutral position, provided an in-focus condition exists, or when the set switch is turned off, even if the zoom lens is not at the neutral position.

In the ISZMEMO operation, the image magnification lens memory flag F_ISM is set, and the constant image magnification mode is selected. The operation then proceeds to storing operations step S2707 and beyond, provided that the in-focus flag F_AFIN has been set (S2701 through S2705). The image magnification lens memory flag F_ISM is transmitted from the body by command PZ-BSTATE(20) and is stored in PZ-BDST.

The image magnification memory flag F_ISM is usually transmitted after being cleared. Storing of the image magnification memory for the present AF pulse value and the present focal distance is not performed by the lens alone, but is performed when the command ISZ-MEMORY(36) is transmitted from the body. Furthermore, the transmission of the command ISZ-MEMORY(36) takes place when the zoom speed switch 75 has returned to the neutral position or when the set switch SL is turned off after the body checks Bit 2 (SLSW) of the periodical communication POFF-STATE(11) and Bits 0 and 1 (PTSW and PWSW) of LENS-INF1(13) to determine whether the set switch SL (SL switch) and the zoom speed switch 75 are turned on or off.

As explained above, when the flag F_ISM is set and transmitted, the image magnification is stored by the lens after determining whether the set switch SL and zoom speed switch 75 are on or off, not by the command ISZ-MEMORY from the body.

When the zoom switch 75 has just been returned to the neutral position, after being in some position other than the neutral position, or when the set switch, which was previously ON, has just been turned OFF, the present value of the AF pulse is stored at the address ISZ-AFPL and H. The present focal distance is then stored at the adress ISZ-FCLL and H, and the image magnification calculation instruction flag F_ISM is set before the ISZMEMO operation is terminated (S2707 through S2719).

In other words, the image magnification is stored in the memory at the time when the zoom switch 75 has returned from the telephoto or wide-angle side to the neutral position, provided that an in-focus condition exists and the flag F_ISM has been set, or when the set switch is turned off.

MTL-CTL OPERATION

Figure 91:
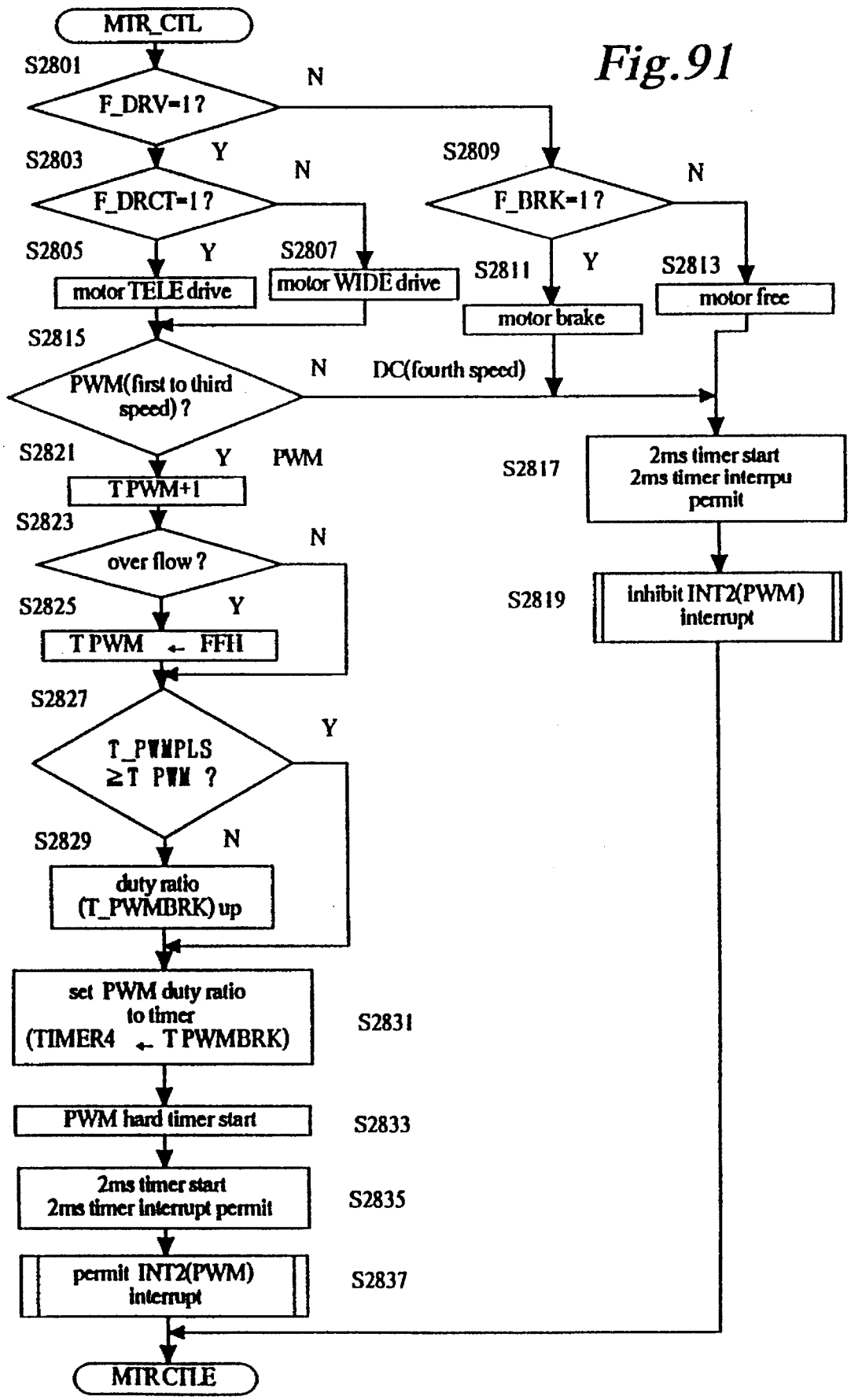
FIG. 91 is a flow chart regarding drive control for the zoom motor.

The MTL-CTL flow chart, shown in FIG. 91, is an operation that controls the driving operation of the zoom motor 65 corresponding to the zoom motor control flags (i.e., each flag of ZM-ST1) which have been set by the SET-ST operation. This operation is the detail of S363 in the interruption routine for the 2-ms timer shown in FIG. 10.

When the drive flag F_DRV has been cleared and when the brake flag F_BRK has been set, brake is applied to the zoom motor 65. When the brake flag F_BRK has been cleared, a 2-ms timer is started after the zoom motor 65 is released. Then, the interruption for the 2 ms timer is enabled, and the PWM interruption is disabled before completing the operation (S2801, S2809 through S2813, S2817 and S2819 represent the foregoing operations).

When the drive flag F_DRV has been set, and if it is set for telephoto, the zoom motor 65 drives the lens toward the telephoto end. If it is set for wide-angle, the zoom motor 65 drives the lens toward the wide-angle end (S2801 through S2807).

When the motor is actuated at the fourth speed (DC drive), the 2 ms timer is started, the 2 ms timer interruption is enabled, and the PWM interruption is disabled, before completing the operation (S2815, S2817 and S2819).

When the motor is driven at the first through fourth speeds, the PWM hard timer is incremented by 1. When the incremental value overflows, the maximum value (FFH) is assigned to the PWM hard timer. If overflow has not occurred, the incremental value is maintained (S2815, S2821 through S2825).

Next, whether or not the PWM hard timer value (T_PWM) has exceeded the PWM's PZ pulse cycle (T_PWMPLS) is determined (i.e., whether the PZ pulse is transmitted within the PZ pulse cycle time of PWM). If exceeded, the duty ratio (T_PWMBRK) is increased because the pulse has not been transmitted within the cycle time. If not exceeded, the duty ratio (T_PWMBRK) is set as it is in the hard timer for PWM control, and the hard timer for PWM control is started (S2827 through S2833). Then, the 2 ms timer is started, interruption for the 2 ms timer is enabled, and PWM interruption is enabled before the operation is completed (S2835 and S2837).

[RELEASE OPERATION]

Figure 92:
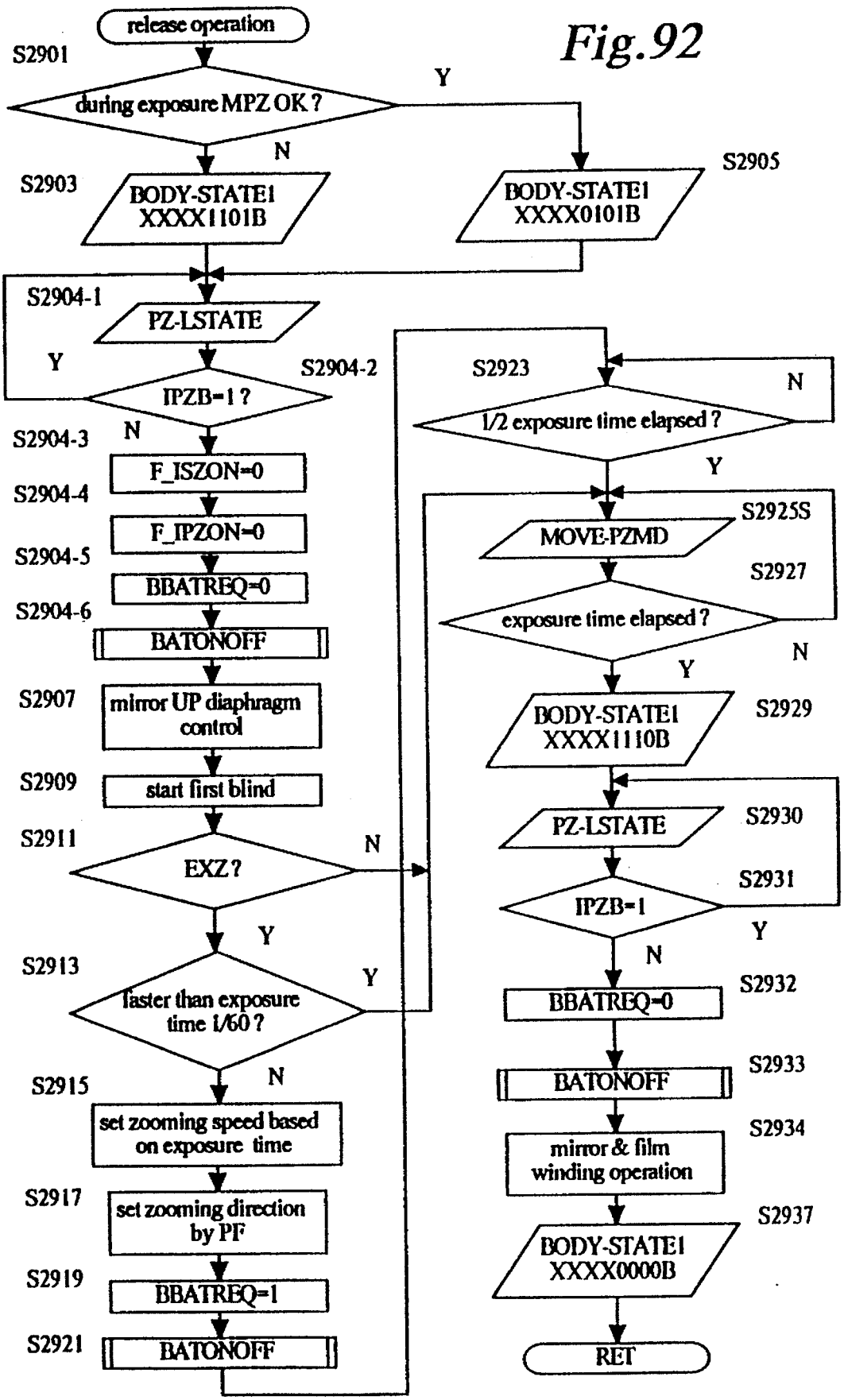
FIG. 92 is a flow chart regarding a release operation on the camera body side.

The following explains the release operation of the camera body 11, as shown in FIG. 92. This release operation is executed by the main CPU 35 provided that the release switch SWR is turned on.

It is determined whether or not mid-exposure manual power zooming is possible, based on the data stored in the E²PROM, etc. In response to the determination, predetermined data is transmitted to the lens by the BODY-STATE1 command (S2901, S2903 and S2905). When mid-exposure manual power zooming is possible, the MPZ disabling flag (MPZD) is cleared, the control zooming halt flag (IPZD) is set, and the BODY-STATE1 data, in which the during-release flag (REL) has been set, is transmitted (S2905). When mid-exposure manual power zooming is not possible, the MPZ disabling flag (MPZD) is set, the control zooming halt flag (IPZD) is set, and BODY-STATE1 data, in which the during-release flag (REL) has been set, is transmitted (S2903). If it is known through this communication that control zooming (i.e., zooming with constant image magnification or preset zooming) is being effected, control zooming is stopped.

In this embodiment, by setting the control zooming halt flag and sending it to the lens by way of the body state 1 command, substantially the same action as that which occurs when sending the IPZ-STOP command in the instruction command can be carried out. However, it is also possible to stop the zooming by an IPZ-STOP command.

Next, the flag F_IPZB is checked by means of transmission of the PZ_LSTATE command to determine whether or not control zooming (i.e., zooming with constant image magnification or preset zooming) has been completed (S2904-1 to 2). Upon completion, the flag F_ISZON for zooming with constant image magnification and flag F_IPZON for preset zooming are cleared, and the battery request in the body flag is cleared before the power supply by the battery is halted (S2904-3 through 6).

The mirror 13 is then lifted up by the mirror motor, and the iris diaphragm is closed by the diaphragm driving mechanism. After these operations are completed, it is checked whether or not mid-exposure zooming is being effected by operating the first blind of the exposure mechanism 27 (S2907, S2909 and S2911). If mid-exposure zooming is being effected, operations in steps S2913 through S2923 are executed.

[MID-EXPOSURE ZOOMING]

Figure 93:
FIG. 93 is a timing chart regarding inter-exposure zooming.

The operation of mid-exposure zooming will be further explained below, referring to the timing chart in FIG. 93. In mid-exposure zooming, a zooming speed is selected in accordance with the exposure time provided that the exposure time (shutter speed) is longer than a predetermined time (e.g. ⅙₀ seconds). Then, the direction of power zoom (i.e., TELE direction or WIDE direction) is selected, power is supplied to the power zoom lens 51, it is determined whether or not power is being supplied in a normal manner. Then, a delay equal to one half of the exposure time is effected, provided that the power supply is normal (S2911, S2913 through S2923).

When one half of the exposure time has elapsed, the data for zooming speed and its direction, which have been set in S2915 and S2917, is transmitted to the power zoom lens 51 by the MOVE-PZMD communication command, power zooming of the power zoom lens 51 is activated, and the full exposure time is awaited (S2923 through S2927).

Upon expiration of the exposure time (i.e., the second blind finishes running), manual power zooming is disabled and mid-exposure zooming is halted by the BODY-STATE1 communication (S2929). Next, whether or not mid-exposure zooming has been stopped is determined by checking flag IPZB using the PZ-LSTATE data communication (S2929 through S2931). When confirming a complete stop (IPZB= 0), the battery request flag of the body is cleared, and power supply from the battery is stopped (S2931 through S2933). Then, the mirror motor 33 and the film winding motor 25 are driven to retract the mirror and to wind the film, respectively. Manual power zooming is enabled by the BODY-STATE1 communication before control is returned (S2934 through S2937).

In this preferred embodiment, the exposure time for mid-exposure zooming is ⅙₀ second and above. However, the time is not limited to it. Likewise, although the zooming speed is changed according to the exposure time, it does not have to be changed. Although power zooming is started after one half of the exposure time has passed, the timing of the start and end of power zooming may be decided arbitrarily.

[PZ MODE SWITCHING OPERATION]

Figure 94:
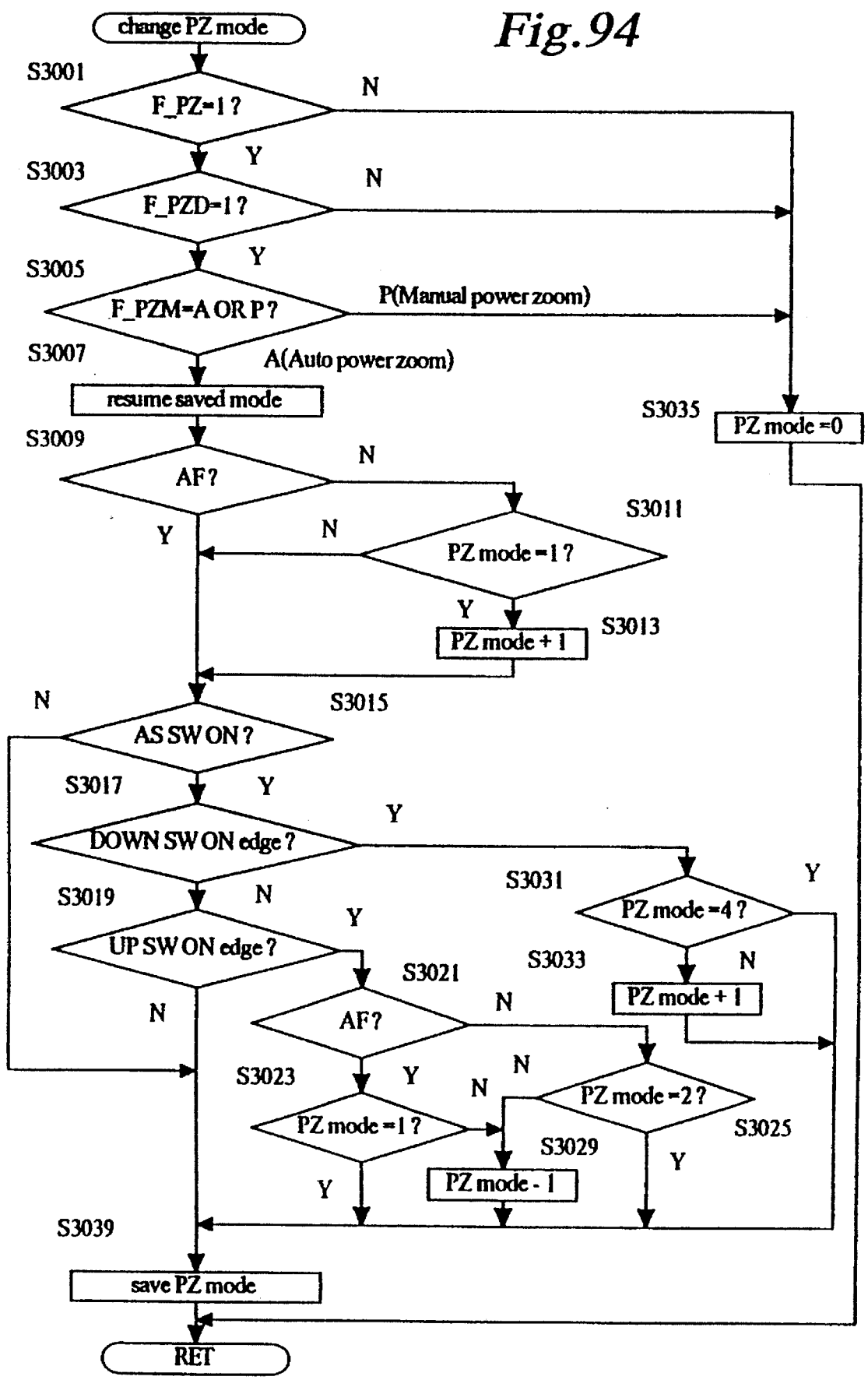
FIG. 94 is a flow chart regarding an operation for changing modes of powered zooming.

The power zoom (PZ) mode switching operation of the camera body 11, as shown in FIG. 94, will be explained below. This PZ mode switching operation is executed in S1507 of the PZ loop operation shown in FIG. 60A, and the PZ mode changing operation is executed when the mode switch 77 of the photographing lens 51 is operated. In this preferred embodiment, there are five kinds of zooming modes; the manual zooming or manual-power zooming, constant image magnification zooming, preset zooming, preset zoom setting and mid-exposure zooming modes. In this flow chart, each mode has a number; No. 0 is the manual zooming or manual-power zooming mode, No. 1 is the constant image magnification zooming mode, No. 2 is the preset zooming mode, No.3 is the preset zooming setting mode, and NO. 4 is the mid-exposure zooming mode.

First, it is determined if the mounted lens is a power zoom lens and if the zoom mode is a manual zoom mode or a power zoom mode, if so, it is then determined if the power zoom lens is a manual power zoom (i.e., electric motor driven zoom) or auto-power zoom. If the lens is a power zoom lens, or power zoom lens but not automatic power zoom, the power zoom mode flag is cleared. The operation maintains these conditions and control is returned (S3001, S3035 and S3039).

If the lens is an auto-power zoom lens, the already preserved mode is retrieved. If it is in the auto-focus mode, no processing takes place. However, if it is not in the auto-focus mode, constant image magnification zooming cannot be performed. Therefore, if the retrieved PZ mode is the constant image magnification zooming mode (1), it is changed to an upper mode. If it is not the PZ mode, no operation takes place (S3090 through S3013).

Next, when the up and down switches SWUP and DN are turned on, a changing operation of the PZ mode is performed (S3015 through S3029) provided that the AS switch (i.e., zoom mode switch) of the power zoom lens 51 is turned on.

For instance, when the down switch SWDN is turned on, the zoom mode is changed upward until it becomes No. 4 (S3017, S3031 and S3033). When the UP switch SWUP is turned on, the zoom mode is changed downward until it becomes No. 1. However, when not in the auto-focus mode, constant image magnification is not selected (S3019 through S3029).

Upon completion of the UP/DOWN operation, the selected mode number is preserved, control is then returned (S3039). The state of the switch SWAS is included in the data transmitted by the POFF-STATE communication.

[THE PZ PULSE COUNT INTERRUPTION OPERATION]

Figure 95:
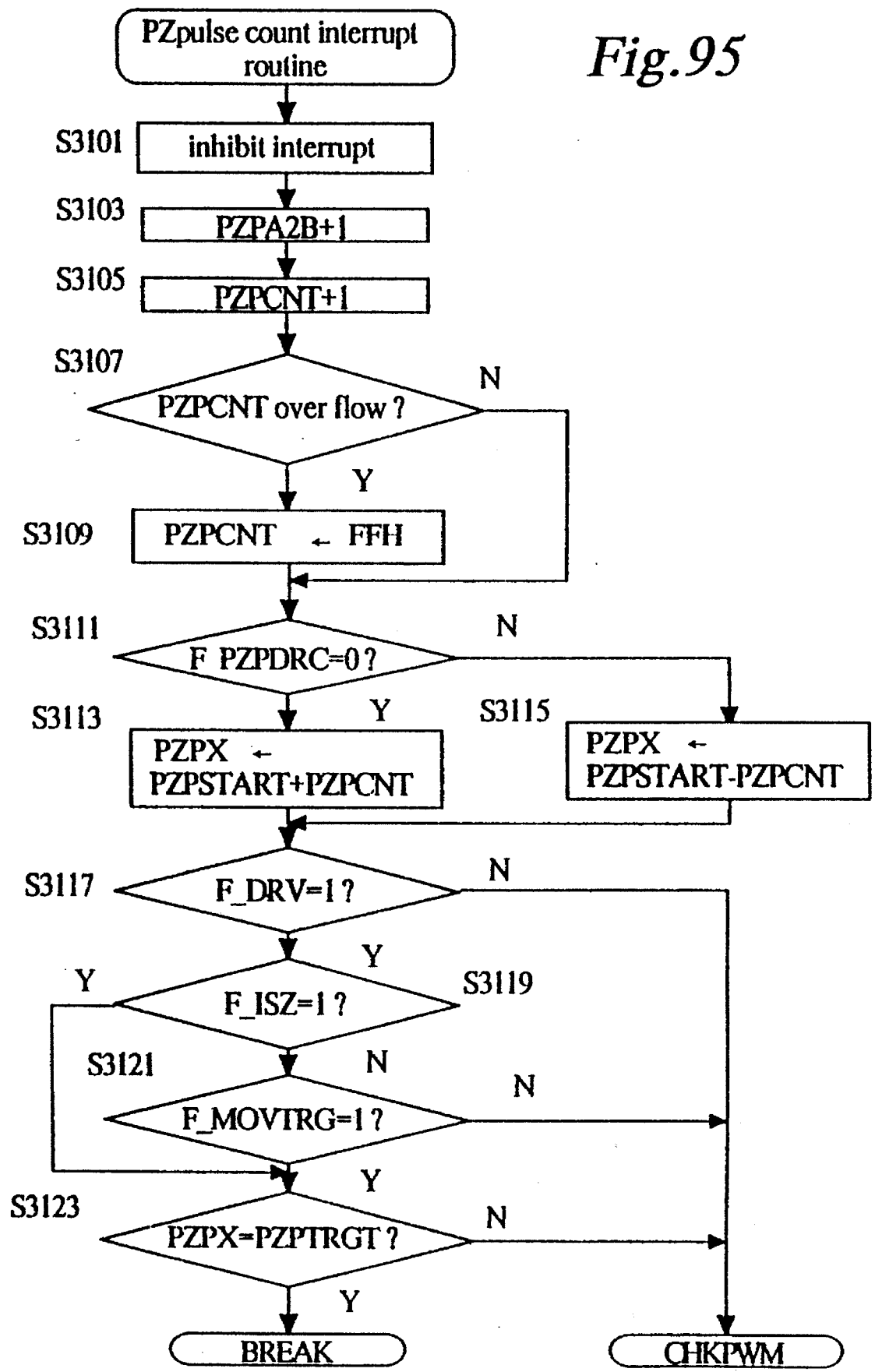
FIG. 95 is a flow chart regarding an interruption operation for the PZ pulse count.
Figure 96:
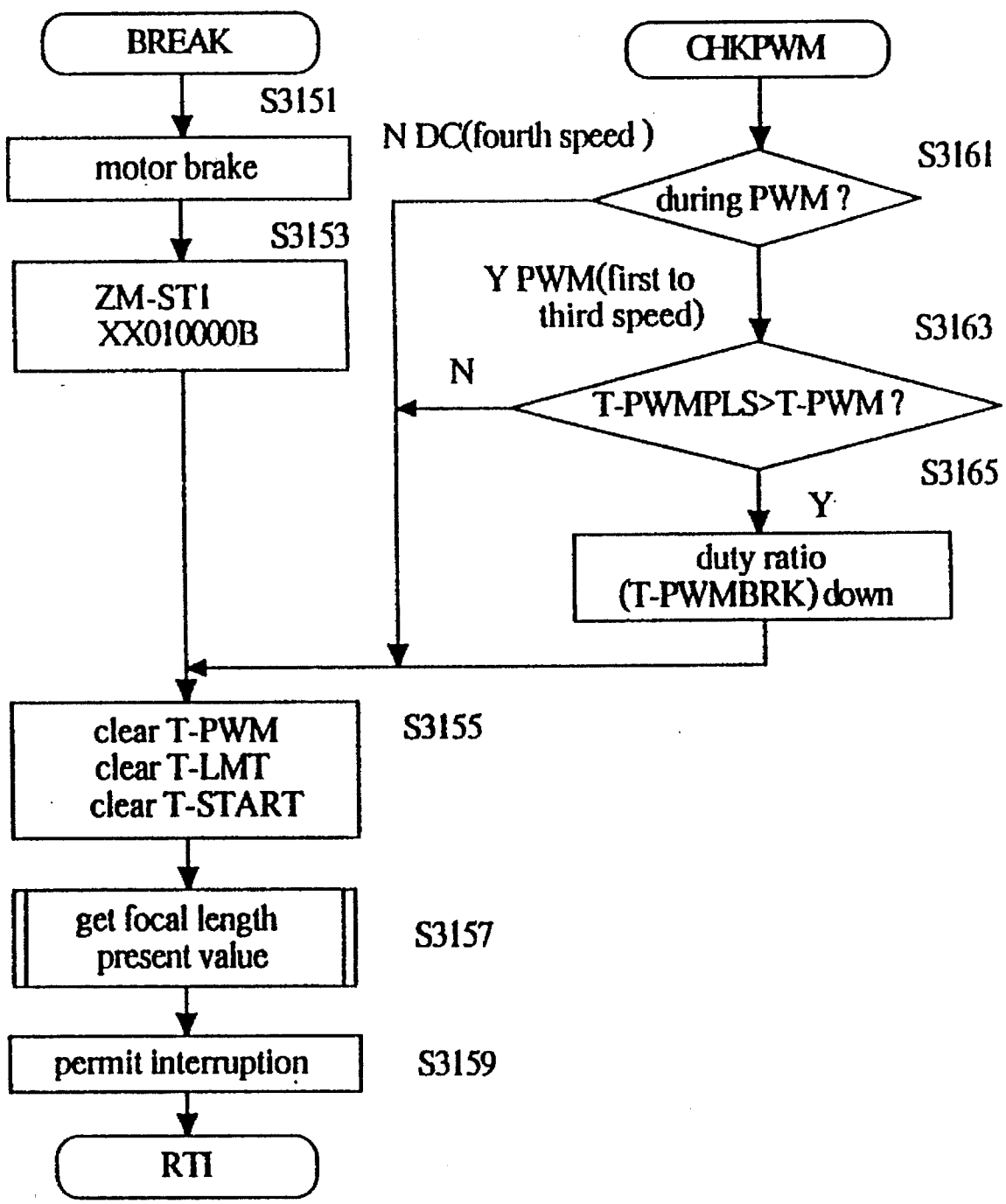
FIG. 96 is a flow chart regarding an operation for controlling PWM of the zoom motor.

The following explains the PZ pulse count interruption operation shown in FIGS. 95 and 96, which is executed in the photographing lens 51. This interruption takes place at the upright of a PZ pulse output, the counting of which is performed by software. The interruption may be performed at the downfall of a pulse, depending on the setting of the lens CPU.

First, interruption is disabled, and the PZ counter (PZPA2B), which counts the PZ pulses in the PZ initializing operation, and the PZ pulse count value (PZPCNT) are incremented by 1. When the PZ pulse counter value overflows, the maximum value is entered in the PZ pulse count value (S3101 through S3109).

Next, the driving direction of the power zoom lens is checked. If it is in the telephoto direction, the PZ pulse count starting value is added by the PZ pulse count value and entered into the present PZ pulse value. If it is the wide-angle direction, the PZ pulse count starting value is subtracted by the PZ pulse count value and entered into the present PZ pulse value (S3111 through S3115).

Then, when the driving operation is not being performed (F_DRV=0), the operation proceeds to the PWM control checking (CHKPWM) in S3117. When the driving operation is being performed, but constant image magnification zooming is being effected, or driving is not toward the targeted position, the operation proceeds to the PWM control checking operation (CHKPWM) in S3117 through S3121. When constant image magnification zooming is being effected or the driving operation is toward the targeted position, the number of the present PZ pulse and the number of the targeted PZ pulse are not equal, the operation proceeds to the PWM control checking (CHKPWM). If they are equal, the operation proceeds to the braking operation (BRAK) to stop the zoom motor immediately (S3117, S3119 and S3123).

[THE BRAK AND CHKPWM OPERATIONS]

FIG. 96 shows a flow chart regarding the braking operation (BRAK operation) of the zoom motor and the PWM checking operation. These operations are to reduce the speed of the PZ motor.

In the braking operation, the brake is first applied to the zoom motor (by closing the input terminal of the zoom motor), and the brake data is entered into ZM-ST1. For the brake data, F_BRK is set, flag F_LMTT and F_LMTW remain unchanged, and the others are cleared (S3151 and S3153 represent these operations).

The PWM timer, the limit timer, and the start timer are cleared. Data for the present focal distance is obtained from the present PZ pulse value (PZPX) and stored in FCLXL and H, after which interruption is enabled before control is returned (S3155 through S3159).

The CHKPWM operation is to reduce the duty ratio in the PWM control. When the PWM driving is not in operation, the operation proceeds to S3155 with the fourth speed (DC) unchanged. When the PWM driving is in operation, if the PWM timer (T-PWM) is less than the PWM pulse cycle (T-PWMPLS), the duty ratio is reduced because the power zooming speed is too high. The operation then proceeds to S3155. If the PWM timer is greater than the PWM pulse cycle, the operation proceeds to S3155 without any further processes (S3161 through S3165 represent the foregoing operations).

Many functions of this preferred embodiment were explained in the foregoing paragraphs. A part or all of these functions may be built in a single camera system (i.e., a camera body and a photographing lens).

According to the present invention, it is possible to provide various kinds of controls in the power zoom lens in closer coordination with the camera body, because communication means to communicate commands and data with the camera body is built in both the camera body and the power zoom lens, which is detachably attached to the camera body.

As can be understood from the above explanation, in a single lens reflex camera having a power zoom lens according to the present invention, since the image magnification and the target focal length are obtained in accordance with the displacement of the focusing lens unit in the optical axis direction to effect the power zooming control in the constant image magnification control mode, the calculation is simplified. Furthermore, since the image magnification and the target focal length are determined only by the displacement of the focusing lens unit, there is no unstable factor in the driving operation of the lens. Accordingly, a quick, responsive, and stable constant image magnification zoom control can be achieved.

In addition to the foregoing, since the image magnification and the target focal length are calculated in accordance with the defocus amount and the displacement of the focusing lens unit in the optical axis direction when the object is out of focus and in focus, respectively, as mentioned above, a precise constant image magnification control can be effected.

TABLE 1

| I | Instruction Name | Instruction Code |
|---|---|---|
| 0 | STANDBY | 30 |
| 1 | AF-INITPOS | 31 |
| 2 | PZ-INITPOS | 32 |
| 3 | RETRACT-PZ | 33 |
| 4 | RET-PZPOS | 34 |
| 5 | IPZ-STOP | 35 |
| 6 | ISZ-MEMORY | 36 |
| 7 | ISZ-START | 37 |

TABLE 2

| No | Instruction Name | Instruction Code |
|---|---|---|
| 0 | LROM 16 byte data | 40 |
| 1 | LROM first half 8 byte data | 41 |
| 2 | LROM second half 8 byte data | 42 |

TABLE 3

| BL | BL COMMAND | Command Code | B7 | B6 | B5 | B4 | B3 | B2 | B1 | B0 | dimension |
|---|---|---|---|---|---|---|---|---|---|---|---|
| 0 | PZ-BSTATE | 20 1:<br>0: | ISM<br>lens<br>body | AFif<br>yes<br>no | Mobj<br>yes<br>no | ovAF<br>yes<br>no | toFm<br>yes<br>no | toNm<br>yes<br>no | endF<br>yes<br>no | endN<br>yes<br>no | — |
| 1 | BODY-STATE0 | 21 1:<br>0: | m AF<br>C<br>S | swAF<br>A<br>M | BATT<br>yes<br>no | swS<br>off<br>on | Vdd<br>on<br>off | IPZC<br>4 | IPZB<br>2 | IPZA<br>1 | — |
| 2 | BODY-STATE1 | 22 | ISsp<br>SP B | ISsp<br>SP A | ISZD<br>pre<br>AFx | AF L<br>on<br>off | MPZD<br>stop<br>ena. | IPZD<br>stop<br>ena. | WIND<br>yes<br>no | REL<br>yes<br>no | — |
| 3 | SET-AFPOINT. | 23 | ISZM | FM2 | FM1 | FM0 | X | | | | |
| 4 | SET-PXPOIN. | 24 | ISZM | FM2 | FM1 | FM0 | X | | | | |
| 5 | STORE-AFP | 25 | ISZM<br>128 | AM2<br>64 | AM1<br>32 | AM0<br>16 | 2048<br>8 | 1024<br>4 | 512<br>2 | 256<br>1 | Pulse |
| 6 | STORE-DEFP&D | 26 | SIGN<br>128 | 64 | 32 | 4096<br>16 | 2048<br>8 | 1024<br>4 | 512<br>2 | 256<br>1 | ×4 μm |
| 7 | STORE-PZP | 27 1:<br>0: | 128<br>AFM<br>memo<br>no | 64<br>AM2<br>4 | 32<br>AM1<br>2 | 4096<br>16<br>AM0<br>1 | 2048<br>8<br>PZM<br>memo<br>no | 1024<br>4<br>FM2<br>4 | 512<br>2<br>FM1<br>2 | 256<br>1<br>FM0<br>1 | Pulse |
| 8 | STORE-PZF | 28 | ISZM<br>128 | FM2<br>64 | FM1<br>32 | FM0<br>16 | 8 | 4 | 1024<br>2 | 512<br>256<br>1 | mm |
| 9 | STORE-IS | 29 | | | | | 2 | 1 | ½ | ¼ | |
| A | MOVE-PZMD | 2A<br>1/<br>1:<br>0: | 8<br>SP B<br>wide | 16<br>SP A<br>tele | 32<br>MD W<br>wide<br>no | 64<br>MD T<br>tele<br>no | 128<br>MD M<br>memo<br>no | 256<br>MvM2<br>4 | 512<br>MvM1<br>2 | 1024<br>MvM0<br>1 | times<br>— |
| B | MOVE-PZf | 2B | SP B<br>128 | SP A<br>64 | 32 | 16 | 8 | 4 | 1024<br>2 | 512<br>256<br>1 | mm |

TABLE 4

| LB | LB COMMAND | Command Code | B7 | B6 | B5 | B4 | B3 | B2 | B1 | B0 | dimension |
|---|---|---|---|---|---|---|---|---|---|---|---|
| 0 | PZ-BSTATE | 10 1:<br>0: | MPZ<br>on<br>off | ISok<br>ng.<br>ok | IPZI<br>int.<br>ok | IPZB<br>busy<br>end | Wend<br>end<br>no | Tend<br>end<br>no | Wmov<br>move<br>stop | Tmov<br>move<br>stop | — |
| 1 | POFF-STATE | 11 1:<br>0: | PH<br>Req.<br>no | AFsw<br>AF<br>M | PZ D<br>D<br>M | PZ M<br>A P | ASsw<br>ON<br>OFF | SLsw<br>ON<br>OFF | LBAT<br>Req.<br>no | Bdet<br>on<br>off | — |
| 2 | POFFS-WSLEEP | 12 | not<br>avai<br>labl | | | | | | | | — |
| 3 | LENS-INF1<br>(Continue) | 13 1:<br>0: | ISmW<br>wide<br>no | ISmT<br>tele<br>no | ISdC<br>½ | ISdB<br>¼ | ISdA<br>⅛ | Lens<br>A<br>M | PWsw<br>wide<br>off | PTsw<br>tele<br>off | — |
| 4 | LENS-INF2 | 14 1:<br>0: | exPZ<br>yes<br>no | exAF<br>yes<br>no | exAE<br>yes<br>no | ex B<br>yes<br>no | rePZ<br>ok<br>ng | reAF<br>ok<br>ng | verB<br>2 | verA<br>1 | — |
| 5 | LENS-AFPULSE | 15 | 128 | 64 | 32 | 16 | 2048<br>8 | 1024<br>4 | 512<br>2 | 256<br>1 | Pulse |
| 6 | FOCALLEN-X | 16 | 128 | 64 | 32 | 16 | 8 | 4 | 1024<br>2 | 512<br>256<br>1 | mm |
| 7 | IMAGE-LSIZE | 17 | 1/<br>8 | 16 | 32 | 64 | 2<br>128 | 1<br>256 | ½<br>512 | ¼<br>1024 | times |

TABLE 5

| | |
|---|---|
| LC0 | ADD_AE1A (LB4) |
| lens kind　　version data | MTF　VNT data (additional data) 1st |
| LC1 | ADD_AE2A (LB4) |
| LENS data | circular flare　data (additional data) 1st |
| LC2 | |
| DISTANCE data | |
| LC3 | |
| K-VALUE data | |
| LC4 | KSF_AL　(LBB) |
| abberation correction, near distance abberation correction data | K-VALUE new communication data LOW |
| LC5 | KSF_AH　(LBB) |
| light color abberation correction data | K-VALUE new communication data HIGH |
| LC6 | |
| open abberation data | |
| LC7 | |
| AF minimum actuation condition | |
| LC8 | CD_ZOOMN |
| focal length data | for zoom code input |
| LC9 | CD_ZOOMO |
| nominal AVmin　AVmax data | for zoom code input |
| LC10 | CD_DISN |
| mv'　nv'　data | for distance code input |

-continued
TABLE 5

| LC11 | | | | | | | | CD_DISO | | | | | | | |
|---|---|---|---|---|---|---|---|---|---|---|---|---|---|---|---|
| | | | AVC 1/EXP data | | | | | | | | for distance code input | | | | |
| LC12 | | | | | | | | SW_ZOOM | | | | | | | |
| | | | mv1 AVminsif data | | | | | | | | for zoom SW input | | | | |
| LC13 | | | | | | | | SW_KVAL | | | | | | | |
| | | | AVmin | | | | | | | | for K-VALUE input | | | | |
| LC14 | | | | | | | | SW_ZMN | | | | | | | |
| | | | UNT_12 UNT_6 data | | | | | DM | SL | PA1 | PA0 | | SPD2 | SPD1 | SPD0 |
| LC15 | | | | | | | | SW_ZMO | | | | | | | |
| | | | incorporated flash suited END data | | | | | DMO | SLO | PA10 | PA00 | | SPD 20 | SPD 10 | SPD 00 |

TABLE 6

| BD_ST0 (BL0) | | | | | | | | ST_PZPOI (BLA) | | | | | | | |
|---|---|---|---|---|---|---|---|---|---|---|---|---|---|---|---|
| MAF | SWAF | BATT | SWS | VDD | IPZ2 | IPZ1 | IPZ0 | | | | for SET-PZPINT | | | | |
| BD_ST1 (BL1) | | | | | | | | ST_AFPOI (BLB) | | | | | | | |
| IS SPB | IS SPA | ISZD | AFL | MPZD | IPZD | WIND | REL | | | | for SET-AFPINT | | | | |
| MOV_PZFL (BL2) | | | | | | | | POFF_ST (LBO, 1) | | | | | | | |
| | | | MOVE-pzf LOW | | | | | PH REQ | AFSW | PZD | PZM | ASSW | SLSW | BAT REQ | BDET |
| MOV_PZFH (BL2) | | | | | | | | LNS_INF1 (LB2) | | | | | | | |
| | | | MOVE-pzf HIGH | | | | | ISMW | ISMT | ISDC | ISDB | ISDA | LENS | PWSW | PTSW |
| MOV_PZMD | | | | | | | | PZ_LST (LBA) | | | | | | | |
| | | | | MDM | | | | MPZ | ISOK | IPZI | IPZB | WEND | TEND | WMOV | TMOV |

-continued
TABLE 6

| ST_PZP (BL4) | | | | | | | |
|---|---|---|---|---|---|---|---|
| for STORE-PZP | | | | | | | |

| SCRT_IN (BLF) | | | | | | | |
|---|---|---|---|---|---|---|---|
| for secret data input | | | | | | | |

| ST_DEFPL (BL5) | | | | | | | |
|---|---|---|---|---|---|---|---|
| AF defocus pulse of body LOW | | | | | | | |

| SCRT_OUT (LBF) | | | | | | | |
|---|---|---|---|---|---|---|---|
| for secret data output | | | | | | | |

| ST_DEFPH (BL5) | | | | | | | |
|---|---|---|---|---|---|---|---|
| AF defocus pulse of body HIGH | | | | | | | |

| BD_VER | | | | | | | |
|---|---|---|---|---|---|---|---|
| for BODY VERSION input | | | | | | | |

| ST_DEFL (BL5) | | | | | | | |
|---|---|---|---|---|---|---|---|
| AF defocus amount of body LOW | | | | | | | |

| FLG1 | | | | | | | |
|---|---|---|---|---|---|---|---|
| un-used | GET CMD | REC ALC | BNK | RLT ON | RLT BNK | OPON | OP BNK |

| ST_DEFH (BL5) | | | | | | | |
|---|---|---|---|---|---|---|---|
| AF DRC | AF defocus amount of body HIGH | | | | | | |

| FLG2 | | | | | | | |
|---|---|---|---|---|---|---|---|
| unused | | | | | STN DBY | SCK NG | CMD NG |

| ST_PZFL (BL6) | | | | | | | |
|---|---|---|---|---|---|---|---|
| STORE-pzf LOW | | | | | | | |

| COMMAND | | | | | | | |
|---|---|---|---|---|---|---|---|
| BODY → LENS COMMAND | | | | | | | |

| ST_PZFH (BL6) | | | | | | | |
|---|---|---|---|---|---|---|---|
| STORE-pzf HIGH | | | | | | | |

| TST_ADRH | | | | | | | |
|---|---|---|---|---|---|---|---|
| test address data LOW | | | | | | | |

| ST_AFPL (BL7) | | | | | | | |
|---|---|---|---|---|---|---|---|
| STORE-AFP LOW | | | | | | | |

| TST_ADRL | | | | | | | |
|---|---|---|---|---|---|---|---|
| test address data HIGH | | | | | | | |

| ST_AFPH (BL7) | | | | | | | |
|---|---|---|---|---|---|---|---|
| STORE-AFP HIGH | | | | | | | |

| TST_DATA | | | | | | | |
|---|---|---|---|---|---|---|---|
| test WRITE data | | | | | | | |

| PZ_BDST (BL9) | | | | | | | |
|---|---|---|---|---|---|---|---|
| ISM | AFIF | MOBJ | OVAF | FARM | NEA RM | ENDF | ENDN |

| TST_FLG1 | | | | | | | |
|---|---|---|---|---|---|---|---|
| PZP CNT | AFP CNT | DM | LMT DTC | REV | PZI NIT | PZP ADJ | AFP ADJ |

| PZ_BDSTO | | | | | | | |
|---|---|---|---|---|---|---|---|
| ISMO | IFO | MOB JO | OVA FO | FAR MO | NER RMO | END FO | END NO |

| TST_FLG2 | | | | | | | |
|---|---|---|---|---|---|---|---|
| PUL LUP | PUL LDN | IO | ZMSW | ZMC | DISC | MTR CTL | SET ST |

TABLE 7

| R_ZOOM, ZM_ST1 | | | | | | | | AFPSTRTL |
|---|---|---|---|---|---|---|---|---|
| LMTW | LMTT | DRV | BRK | SPD1 | SPD0 | DRCW | DRCT | counter start position AF pulse LOW |

| SPDDRC1 | | | | | | AFPSTRTH |
|---|---|---|---|---|---|---|
| zoom speed direction register 1 | | SPD B1 | SPD A1 | WID E1 | TEL E1 | HIGH |

| SPDDRC2 | | | | | | AFPCNTL |
|---|---|---|---|---|---|---|
| zoom speed direction register 2 | | SPD B2 | SPD A2 | WID E2 | TEL E2 | AF pulse counter LOW |

| TRANSSPD | | | | | AFPCNTH |
|---|---|---|---|---|---|
| zoom speed SW transformed value | | SPDB | SPDA | WIDE | TELE | HIGH |

| PZ_LSTO | | | | | | | AFPXL |
|---|---|---|---|---|---|---|---|
| MPZD | ISOKO | IPZ IO | IPZ BO | WEN DO | TEN DO | WMO VO | TMO VO | AF pulse present position LOW |

| ZM_ST2 | | | | | | | AFPXH |
|---|---|---|---|---|---|---|---|
| unused | MOV ZC | MOV TRG | MOV | ISZ | START | PZP DRC | PZ POS | AF pulse present position HIGH |

| ZM_ST3 | | AFPA2BL |
|---|---|---|
| unused | REVW REVT | AF pulse generic counter LOW |

| T_LMT | AFPA2BH |
|---|---|
| end point detecting timer (counter) | HIGH |

| T_BRK | AFPCDL |
|---|---|
| zoom motor braking time timer (counter) | distance code AF pulse transformed value LOW |

| T_PWM | AFPCDH |
|---|---|
| PWM timer (counter) | HIGH |

| T_PWMPLS | AFPDIFL |
|---|---|
| PWM PZ pulse period (interval) | difference between distance code transformed value and present position LOW |

-continued
TABLE 7

| T_PWMBRK | AFPDIFH |
|---|---|
| PWM brake timer value (PWM duty ratio) | HIGH |
| T_START | PZPSTRT |
| zoom motor start-up timer (counter) | PZ pulse at counter start position |
| T_REV | PZPCNT |
| zoom motor reverse timer | PZ pulse counter |
| ZM_MODE | PZPX |
| zoom mode | present position PZ pulse |
| ZM_DATA | PZPA2B |
| zoom data | PZ pulse generic counter |

TABLE 8

| PZPCD | ISZ_AFPL |
|---|---|
| zoom code PZ pulse transformed value | ISZ AF pulse LOW |
| PZPDIF | ISZ_AFPH |
| difference between target and present value | HIGH |
| PZPTRGT | ISZ_FCLL |
| target PZ pulse | ISZ focal length LOW |
| PZPF | ISZ_FCLH |
| target PZ pulse (present value calculate) | HIGH |
| PZPFPRE | ISZ_IMGL |
| target PZ pulse (predictor calculate) | ISZ image size LOW |

-continued
TABLE 8

| FCLXL | | | | | | | | ISZ_IMGH | | | | | | |
|---|---|---|---|---|---|---|---|---|---|---|---|---|---|---|
| present focal length LOW ||||||||  HIGH ||||||| |

| FCLXH | | | | | | | | FCLL | | | | | | |
|---|---|---|---|---|---|---|---|---|---|---|---|---|---|---|
| HIGH |||||||| focal length for PZ pulse transform LOW ||||||| |

| ISZ_ST | | | | | | | | FCLH |
|---|---|---|---|---|---|---|---|---|
| FPRE OK | FPRE | ISZ XOM | ISZ FOM | ISZ M | STIS | 1st AFP | AF POS | focal length for PZ pulse transform HIGH |

| CD_DSNEW | | | | | | | UNVCNTR | | | | | | |
|---|---|---|---|---|---|---|---|---|---|---|---|---|---|
| present distance code (remove chattering) ||||||| universal counter ||||||| |

| CD_DSOLD | | | | | | | REGC | | | | | | |
|---|---|---|---|---|---|---|---|---|---|---|---|---|---|
| previous distance code (remove chattering) ||||||| generic register C (inhibited to be used other than MAIN) ||||||| |

| CD_DSN | | | | | | | REGD | | | | | | |
|---|---|---|---|---|---|---|---|---|---|---|---|---|---|
| present distance code ||||||| generic register D (inhibited to be used other than MAIN) ||||||| |

| CD_DSO | | | | | | | REGE | | | | | | |
|---|---|---|---|---|---|---|---|---|---|---|---|---|---|
| previous distance code ||||||| generic register E (inhibited to be used other than MAIN) ||||||| |

| CD_ZMNEW | | | | | | | R_BE | | | | | | |
|---|---|---|---|---|---|---|---|---|---|---|---|---|---|
| present zoom code (remove chattering) ||||||| generic register R_BE (inhibited to be used other than MAIN) ||||||| |

| CD_ZMOLD | | | | | | | R_CE | | | | | | |
|---|---|---|---|---|---|---|---|---|---|---|---|---|---|
| previous zoom code (remove chattering) ||||||| generic register R_CE (inhibited to be used other than MAIN) ||||||| |

| CD_ZMN | | | | | | | SFT_L | | | | | | |
|---|---|---|---|---|---|---|---|---|---|---|---|---|---|
| present zoom code ||||||| generic register SFT_L (inhibited to be used other than MAIN) ||||||| |

| CD_ZMO | | | | | | | SFT_M | | | | | | |
|---|---|---|---|---|---|---|---|---|---|---|---|---|---|
| previous zoom code ||||||| generic register SFT_M (inhibited to be used other than MAIN) ||||||| |

TABLE 9

| | |
|---|---|
| R_DEFL | stack area |
| for calculation of FPRE X | |
| R_DEFH | |
| for calculation of FPRE X | |
| R_STO | |
| for serial communication timer-over | |
| R_DHEN | |
| for LSB → MSB data transform | |
| R_ROOP | |
| for AE AF all data comunication | |
| R_VECTL | |
| for communication interrupt | |
| R_VECTH | |
| for communication interrupt | |
| R_LROML | |
| LROM first address LOW | |
| R_LROMH | |
| LROM first address HIGH | |
| R_LROMNL | |
| LCO first address LOW | |
| R_LROMNH | |
| LCO first address HIGH | |

-continued
TABLE 9

| | | | | | | | | | | | | | |
|---|---|---|---|---|---|---|---|---|---|---|---|---|---|
| | | | | | | | | | | | | | |
| | | | | | | | | | | | | | |
| | | RCONCM | | | | | | | | | | | |
| | | for storing command during CHBNK | | | | | | | | | | | |
| | | R_INT | | | | | | | | | | | |
| | | generic register (for timer interrupt) | | | | | | | | | | | |
| | | DUMMY | | | | | | | | | | | |
| | | for code plate, SW input, WAIT | | | | | | | | | | | |

TABLE 10

| | stack area | | | | | | FCL0L | | | | | |
|---|---|---|---|---|---|---|---|---|---|---|---|---|
| | | | | | | | FCL0H | | | | | |
| | | | | | | | FCL1L | | | | | |
| | | | | | | | FCL1H | | | | | |
| | | | | | | | FCL2L | | | | | |

-continued
TABLE 10

| | |
|---|---|
| | FCL2H |
| | FCL3L |
| | FCL3H |
| | FCL4L |
| | FCL4H |
| | FCL5L |
| | FCL5H |
| | FCL6L |
| | FCL6H |
| | FCL7L RETPOSL |
| | RET focal length for PZPOS LOW |
| | FCL7H RETPOSH |
| | HIGH |

TABLE 11

| AFP0L | XOFOL |
|---|---|
| | ISZ XOFO LOW |
| AFP0H | XOFOM |
| | ISZ XOFO MIDDLE |
| AFP1L | XOFOH |
| | ISZ XOFO HIGH |
| AFP1H | ISZ_FPXL |
| | PRE operation X LOW |
| AFP2L | ISZ_FPXH |
| | PRE operation X HIGH |
| AFP2H | ISZ_FL |
| | ISZ F result LOW |
| AFP3L | ISZ_FH |
| | ISZ F result HIGH |
| AFP3H | ISZ_FPL |
| | ISZ FPRE result LOW |
| AFP4L | ISZ_FPH |
| | ISZ FPRE result HIGH |
| AFP4H | |
| | |

We claim:

1. A constant image magnification ratio zooming control apparatus of a zoom lens, comprising:

means for detecting a focal length of said zoom lens;

means for detecting an amount by which a focus lens of said zoom lens advances from a predetermined position;

means for selecting a constant image magnification mode from among a plurality of photographing modes, said constant image magnification mode being selected by a predetermined manipulation of a magnification setting switch that is settable by a photographer;

means for storing focal length information detected by said focal length detecting means and an advancement amount of said focus lens that is detected by said focus lens advancement amount detecting means when said magnification setting switch is set and when said constant image magnification mode is selected;

means for determining a target focal length when said constant image magnification mode is set, according to the following formula:

$$f = x_0 \cdot f_0 / x;$$ and means for driving said zoom lens to said target focal length when said constant image magnification mode is set, wherein f equals the target focal length, $x_0$ equals the advancement amount of said focus lens detected by said focus lens advancement amount detecting means and stored in said storing means, $f_0$ equals the focal length information detected by said focal length detecting means and stored in said storing means, and x equals a lens advancement amount for an object to be photographed in an in-focus condition.

2. The apparatus of claim 1, further comprising a camera body having a shutter release switch, said driving means driving said lens when a predetermined manipulation of said shutter release switch occurs.

3. The apparatus of claim 1, further comprising means for calculating a de-focus amount of the object to be photographed relative to an in-focus condition, said target focal length determining means further comprising means for performing a second calculation for obtaining said target focal length according to the following formula:

$$f = x_0 \cdot f_0 / (x + \Delta x), \text{ where}$$

$\Delta x$ equals the defocus amount of the object to be photographed relative to the in-focus condition, said second calculation being performed by said second calculation performing means when said constant image magnification mode is selected and said calculated de-focus amount is valid or said object to be photographed is not moving relative to said zoom lens.

4. The apparatus of claim 1, further comprising:

means for determining whether the object to be photographed is moving relative to said zoom lens; and means for calculating a de-focus amount of the object to be photographed relative to an in-focus condition, said target focal length determining means further comprising means for performing a second calculation for obtaining said target focal length according to the following formula when said determining means determines that the object to be photographed is moving relative to said zoom lens:

$$f = x_0 \cdot f_0 / (x + \Delta x), \text{ where}$$

$\Delta x$ equals the defoeus amount of the object to be photographed relative to the in-focus condition, said second calculation being performed by said second calculation performing means when said constant image magnification mode is selected and one of said calculated de-focus amount is valid or said object to be photographed is not determined to be moving relative to said zoom lens.

5. The apparatus of claim 4, further comprising means for varying a drive speed of said zoom lens by said driving means when said determining means determines that the object to be photographed is moving relative to said zoom lens.

6. The apparatus of claim 1, further comprising:
a camera body;
means for selectively attaching said zoom lens to said camera body; and
means for exchanging data between said zoom lens and said camera body.

7. The apparatus of claim 1, further comprising:
means for determining whether the object to be photographed is moving relative to said zoom lens;
wherein said target focal length determining means obtains said target focal length according to said formula when said determining means determines that the object to be photographed is moving relative to said zoom lens.

8. A method for controlling an image magnification ratio of a zoom lens, comprising the steps of:
detecting a focal length of the zoom lens;
detecting an amount by which a focus lens of the zoom lens advances from a predetermined position;
selecting a constant image magnification mode from among a plurality of photographing modes, the constant image magnification mode being selected by a predetermined manipulation of a magnification setting switch by a photographer;
storing data related to detected focal length information and data related to a detected advancement amount of the focus lens when the magnification setting switch has been set and when the constant image magnification mode has been selected;
determining a target focal length of the zoom lens when the constant image magnification mode is set, according to the following formula:

$f = x_0 \cdot f_0 / x$; and driving the zoom lens to the target focal length when the constant image magnification mode is set, wherein
f equals the target focal length,
$x_0$ equals the stored data representing the detected advancement amount of the focus lens,
$f_0$ equals the stored data representing focal length information detected by the focal length detecting means, and
x equals a lens advancement amount for an object to be photographed in an in-focus condition.

9. The method of claim 8, further comprising the step of driving the lens when a predetermined manipulation of a shutter release switch, associated with a camera body to which the zoom lens is attached, occurs.

10. The method of claim 8, further comprising the step of calculating a de-focus amount of the object to be photographed relative to an in-focus condition, so that the target focal length is determined according to the following formula:

$f = x_0 \cdot f_0 / (x + \Delta x)$, where $\Delta x$ equals the defocus amount of the object to be photographed relative to the in-focus condition.

11. The method of claim 8, further comprising the steps of:
determining whether the object to be photographed is moving relative to the zoom lens; and
calculating a de-focus amount of the object to be photographed relative to an in-focus condition, the target focal length performing a second calculation to obtain the target focal length according to the following formula when it is determined that the object to be photographed is moving relative to the zoom lens:

$f = x_0 \cdot f_0 / (x + \Delta x)$, where $\Delta x$ equals the defocus amount of the object to be photographed relative to the in-focus condition, the second calculation being performed when the constant image magnification mode is selected and one of the calculated de-focus amount is valid or the object to be photographed is not determined to be moving relative to the zoom lens.

12. The method of claim 11, further comprising the step of varying a driving speed of the zoom lens when the object to be photographed is determined to be moving relative to the zoom lens.

13. The method of claim 8, further comprising the steps of:
attaching the zoom lens to a camera body; and
exchanging data between the zoom lens and the camera body.

14. The method of claim 8, further comprising the steps of:
determining whether the object to be photographed is moving relative to the zoom lens; and
obtaining the target focal length according to said formula when it is determined that the object to be photographed is moving relative to the zoom lens.

* * * * *

UNITED STATES PATENT AND TRADEMARK OFFICE
CERTIFICATE OF CORRECTION

PATENT NO.    : 5,617,173
DATED         : April 1, 1997
INVENTOR(S)   : M. KAWASAKI et al.

It is certified that error appears in the above-indentified patent and that said Letters Patent is hereby corrected as shown below:

At column 84, line 60 (claim 4, line 15), change "defoeus" to ---defocus---.

Signed and Sealed this

Twenty-sixth Day of August, 1997

Attest:

BRUCE LEHMAN

Attesting Officer

Commissioner of Patents and Trademarks